United States Patent
Takashima et al.

(10) Patent No.: US 8,264,463 B2
(45) Date of Patent: Sep. 11, 2012

(54) INPUT DEVICE AND ELECTRONIC APPARATUS

(75) Inventors: Kouichiro Takashima, Tokyo (JP); Seiji Muramatsu, Saitama (JP); Tsutomu Takahashi, Kanagawa (JP); Shun Kayama, Saitama (JP); Yukiko Shimizu, Saitama (JP); Takashi Sawada, Tokyo (JP); Satoshi Kushima, Tokyo (JP); Shinji Kanada, Tokyo (JP); Minoru Tomita, Saitama (JP)

(73) Assignees: Sony Corporation, Tokyo (JP); Sony Mobile Communications Japan, Inc., Tokyo (JP)

( * ) Notice: Subject to any disclaimer, the term of this patent is extended or adjusted under 35 U.S.C. 154(b) by 959 days.

(21) Appl. No.: 12/234,344

(22) Filed: Sep. 19, 2008

(65) Prior Publication Data

US 2009/0079698 A1    Mar. 26, 2009

(30) Foreign Application Priority Data

Sep. 21, 2007 (JP) ................. 2007-246071
Jul. 10, 2008 (JP) ................. 2008-180807

(51) Int. Cl.
*G06F 3/02* (2006.01)
*G09G 5/00* (2006.01)
(52) U.S. Cl. ....................................... 345/169
(58) Field of Classification Search .............. 345/169
See application file for complete search history.

(56) References Cited

U.S. PATENT DOCUMENTS

| 6,424,338 | B1 * | 7/2002 | Anderson | 345/173 |
| 7,321,361 | B2 * | 1/2008 | Sato et al. | 345/173 |
| 2004/0125947 | A1 * | 7/2004 | Charlier et al. | 379/433.07 |
| 2004/0178989 | A1 * | 9/2004 | Shahoian et al. | 345/156 |
| 2006/0192749 | A1 * | 8/2006 | Lowles et al. | 345/102 |

FOREIGN PATENT DOCUMENTS

| JP | 02-230310 | 9/1990 |
| JP | HEI 08-076926 | 3/1996 |
| JP | 2003-091360 | 3/2003 |

(Continued)

OTHER PUBLICATIONS

Japanese Patent Office, Notice of reasons for refusal, issued in connection with Japanese Patent Application No. 2008-180806, dated May 1, 2012. (3 pages).

(Continued)

*Primary Examiner* — Quan-Zhen Wang
*Assistant Examiner* — Nelson D Runkle, III
(74) *Attorney, Agent, or Firm* — K&L Gates LLP

(57) ABSTRACT

An input device inputs information by a slide operation depending on an operation body. The device contains a housing having an operation surface, a detection unit that is provided in the housing and includes an electrostatic capacitance sheet member which detects a slide position of the operation body to output a position detection signal, and an operation unit that covers an entire surface of the detection unit and is slide-operated along the operation surface of the housing. The operation unit has a convex shape which becomes thicker along a sliding direction from one direction of the operation surface of the housing and also which becomes thinner toward the other direction of the operation surface thereof. The electrostatic capacitance sheet member includes a switch portion that is switched by a press-in operation of the operation body to the operation unit.

16 Claims, 66 Drawing Sheets

FOREIGN PATENT DOCUMENTS

| | | |
|---|---|---|
| JP | 2003-223275 | 8/2003 |
| JP | 2003-256120 | 9/2003 |
| JP | 2003-296015 | 10/2003 |
| JP | 2004-070505 | 3/2004 |
| JP | 2004-227222 | 8/2004 |
| JP | 2005-063227 | 3/2005 |
| JP | 2005-063230 | 3/2005 |
| JP | 2005-326293 | 11/2005 |
| JP | 2006-195706 | 7/2006 |
| JP | 2006-215738 | 8/2006 |
| JP | 2007-065993 | 3/2007 |

OTHER PUBLICATIONS

Japanese Patent Office, Notice of reasons for refusal, issued in connection with Japanese Patent Application No. 2008-180807, dated Apr. 17, 2012. (5 pages).

* cited by examiner

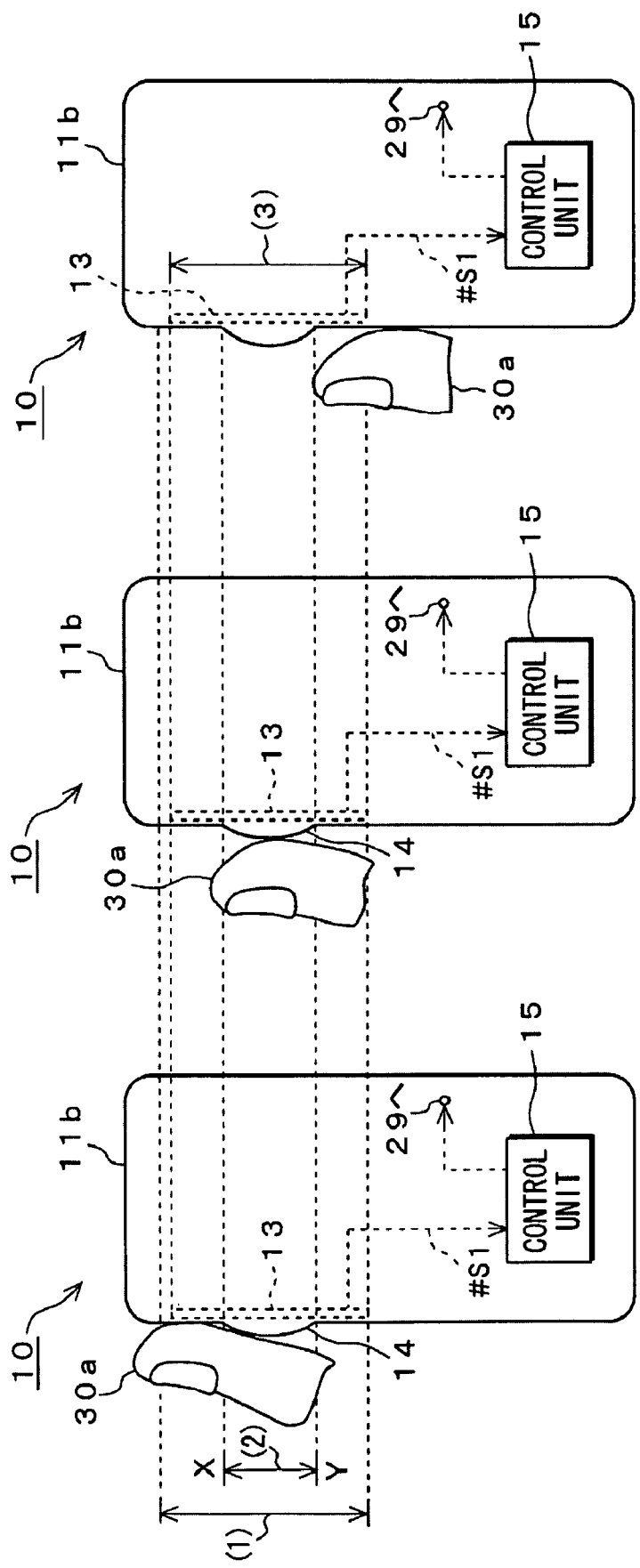

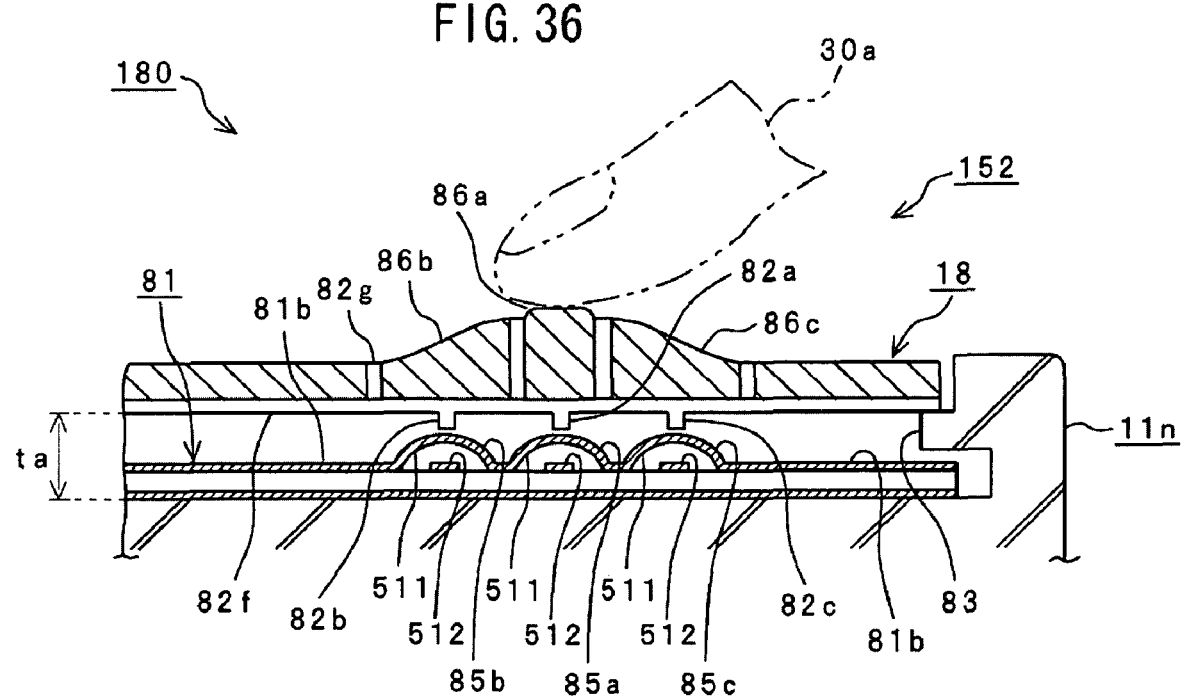

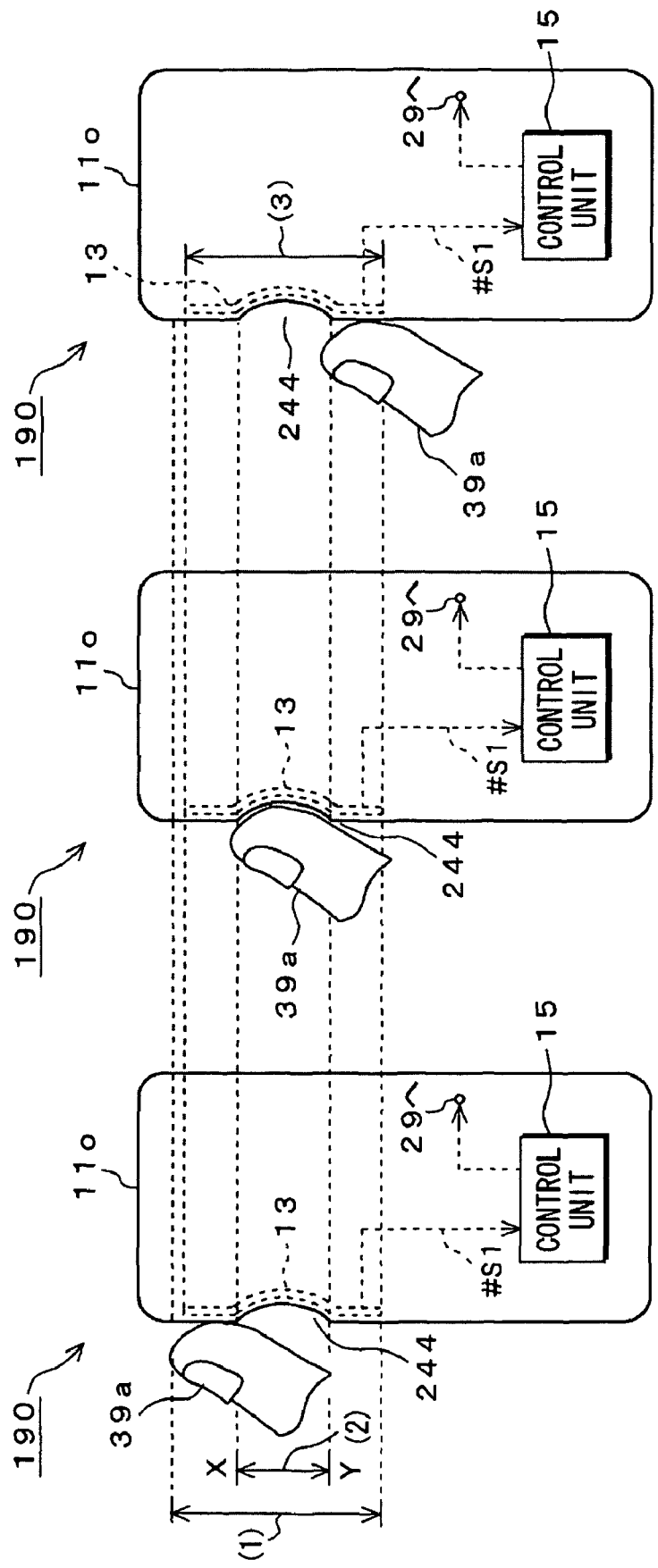

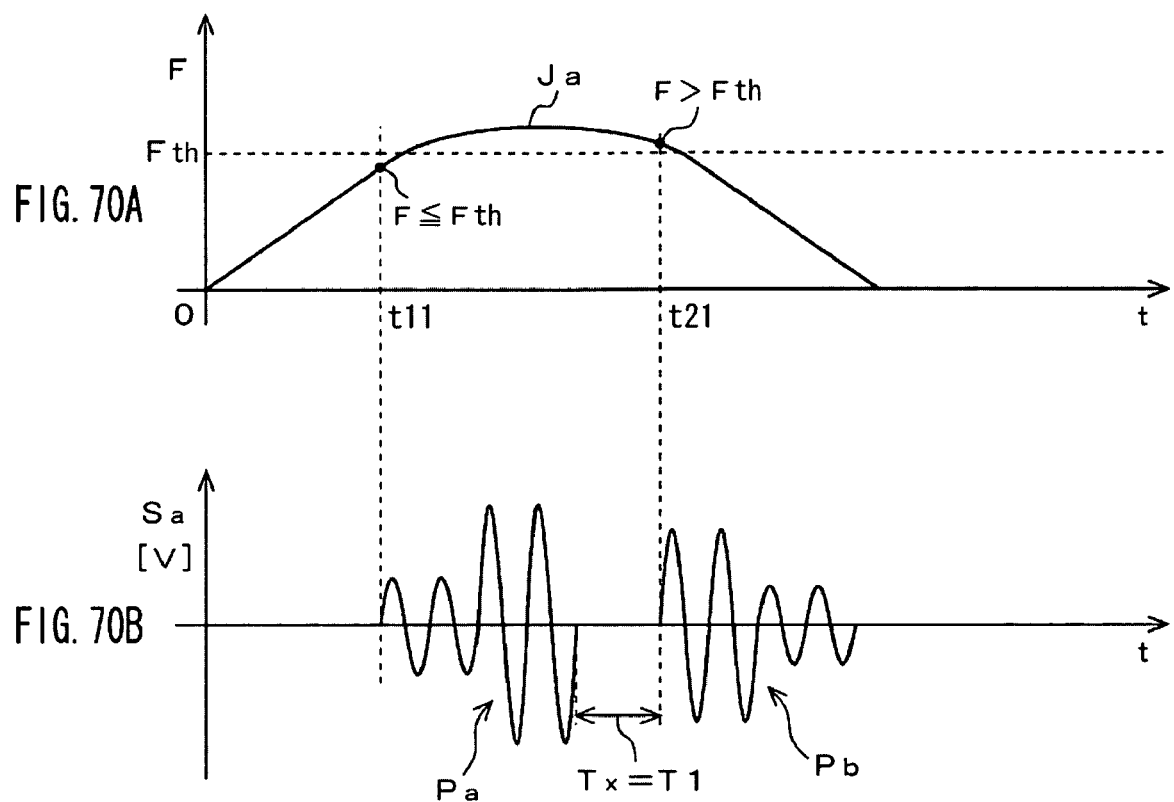

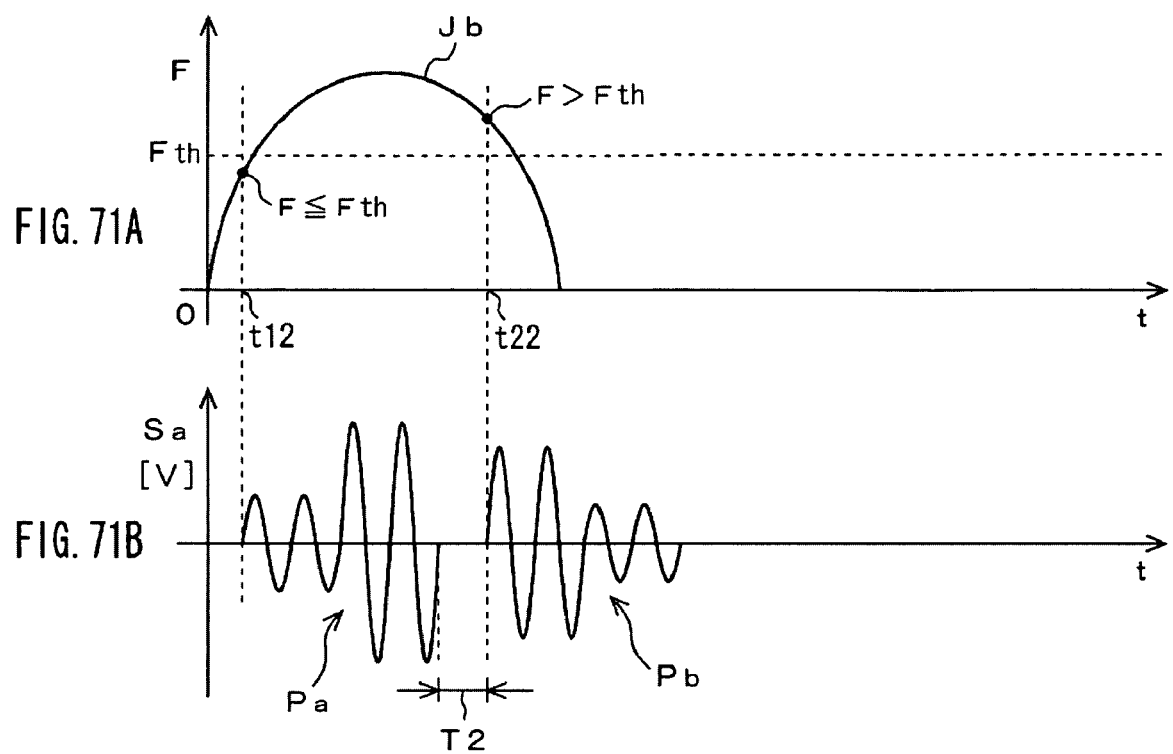

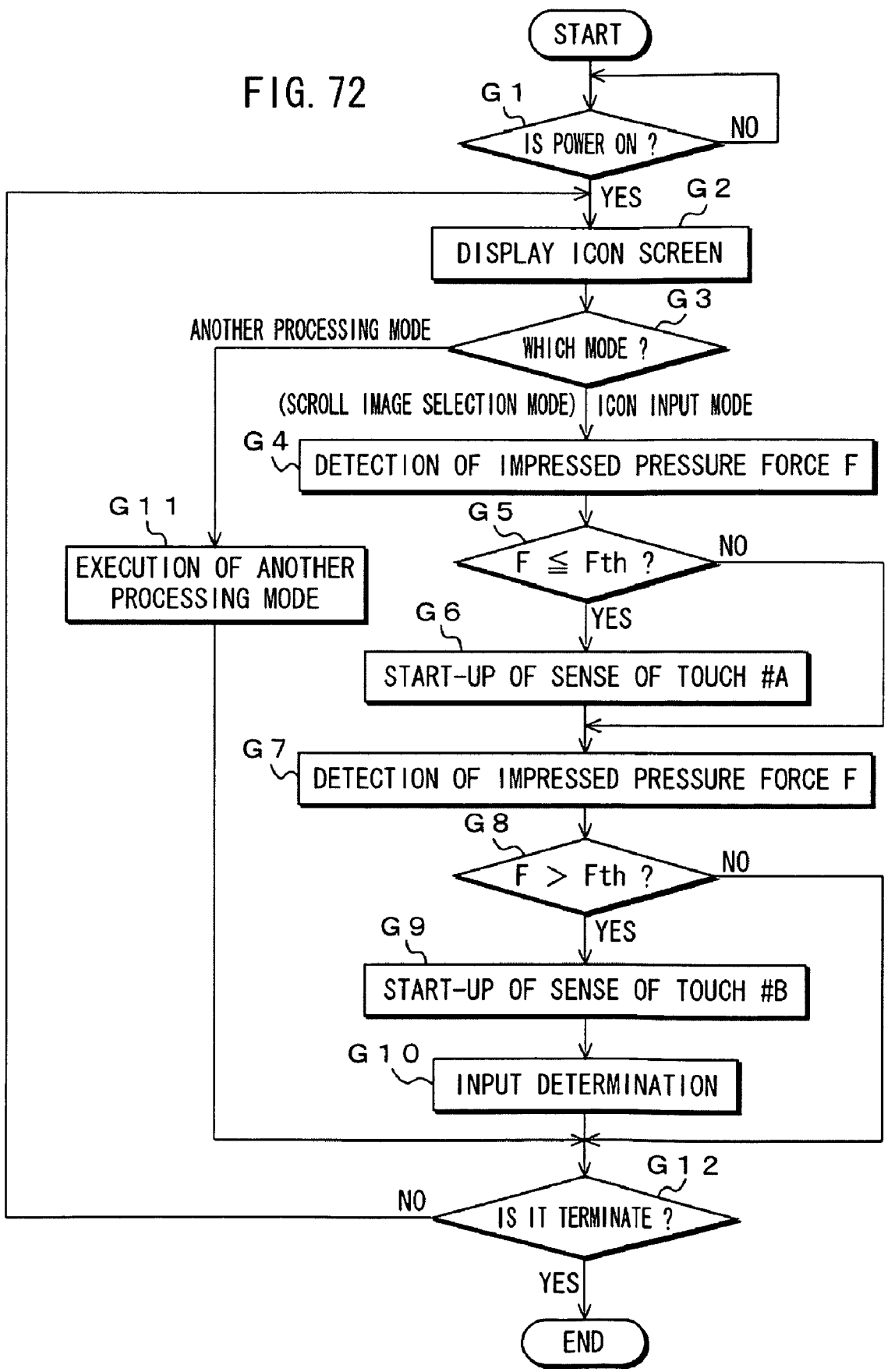

INPUT DEVICE AND ELECTRONIC APPARATUS

CROSS REFERENCES TO RELATED APPLICATIONS

The present application claims priority to Japanese Patent Applications JP2007-246071 and JP2008-180807 filed in the Japanese Patent Office on Sep. 21, 2007 and Jul. 10, 2008, the entire contents of which are being incorporated herein by reference.

BACKGROUND

The present application relates to an input device which is applicable to a digital camera, a video camera, a mobile phone, a mobile terminal device, a personal computer (hereinafter, referred to as PC), a note type PC, a home system electronic apparatus and a remote controller thereof or the like, and an electronic apparatus using the same.

In resent years, it has become in such a state in which a user (operator) images a subject by using a digital camera with various kinds of operation modes and takes various contents in a mobile terminal device such as a mobile phone, a PDA (Personal Digital Assistant) so as to utilize them. These apparatuses such as the digital camera, the mobile terminal device are provided with input devices. As the input device, a key board, an input unit of a JOG dial or the like, and a touch panel formed by combining a display unit, and the like are often used.

FIG. 1 shows a configuration of an input device 500 relating to related art. The input device 500 shown in FIG. 1 contains a housing 501, a rotary operation unit (hereinafter, referred to as JOG dial 502), a circuit board 503, and a dome switch 504.

The input device 500 has the housing 501 with a predetermined size and the housing 501 has an opening portion 505 at the side portion thereof. The jog dial 502 is mounted on the circuit board 503 in a state in which a key-top portion of the JOG dial 502 is exposed from this opening portion 505. The JOG dial 502 has a circular shape and is mounted rotatably on the circuit board 503 through a shaft 506 (rotation axis). The JOG dial 502 excluding the key-top portion thereof occupies a space within the housing 501.

The JOG dial 502 also has a magnetic material such as a magnet or the like, which is not shown, on the rear surface thereof. Two hall ICs 507, 508, which are placed at the positions interlinking the magnetic field caused by this magnetic material, are mounted on the circuit board 503 with being separated by a predetermined angle, thereby allowing a two-phase rotation detection signal to be outputted by a fact that the magnetic material of the rear surface of the JOG dial cross the hall ICs 507, 508.

Also, a bias member (not shown) biases the shaft 506 from the circuit board 503 toward the outside of the housing 501. The dome switch 504 is mounted on the circuit board 503 which is facing in parallel with the axial direction of the shaft 506 and the dome switch 504 can be turned on or off when the JOG dial 502 is pressed-into against biasing force of the bias member.

Japanese Patent Application Publication No. 2003-256120 discloses a mobile information terminal and a program therefor in connection with an input device including this kind of JOG dial (see Pages 2 to 3 and FIG. 1). This mobile information terminal contains a terminal device main body, a display unit on the terminal device main body, and a JOG dial approximately at the center of the main body. The JOG dial is provided at a position separated from that of the display unit. This JOG dial rotates clockwise or counterclockwise and an image displayed on the display unit rotates in cooperation with this rotation. Furthermore, when the JOG dial is pushed down in the direction of the main body, the image area changes.

Also, Japanese Patent Application Publication No. 2004-070505 discloses an input device mountable on an air conditioner or an electronic apparatus such as audio in connection with an input device accompanied by vibrations (see Page 5 and FIG. 3). This input device contains an operation unit possessing functions of a rotary switch, of a push switch, and of a slide switch concurrently, and the selection of the operation item and input determination operation are executed by rotating, sliding or depressing the operation unit. Any vibrations are accompanied with an occasion of the input determination operation.

FIG. 2 shows a configuration of an input device 600 relating to related art. The input device 600 shown in FIG. 2 includes a key-top 602 of a non-rotary type, which has a flat front surface. The input device 600 has a predetermined sized housing 601 and an opening portion 605 at a side portion of the housing 601. The key-top 602 is mounted movably on a circuit board with a part of the key-top 602 being exposed from this opening portion 605. The key-top 602 is mounted so that it is inserted into the opening portion 605 of the housing 601 and the non-operation surface thereof faces the inside of the housing 601. The key-top 602 has a flange 606 and this flange 606 is hooked on an inside portion of the housing 601 around the opening portion 605. This enables the key-top 602 to be prevented from slipping out of the opening portion 605.

A circuit board 603 is provided on the inside of the key-top 602 and the circuit board 603 is provided with a dome switch 604 which is operated so as to be turned on or/and off by the press-in operation of the key-top 602. On the inside of the key-top 602, there are arranged a sensor 613, a pusher piece 619, the dome switch 604, and the circuit board 603 in this order. The pusher piece 619 is arranged so as to be sandwiched between the sensor 613 and the side portion of the circuit board 603. When the key-top 602 having the flat front surface is mounted with respect to a side portion of the housing in this manner, the key-top 602 hardly occupies a space within the housing as compared with the above-mentioned JOG dial.

Also, Japanese Patent Application Publication Heisei 02-230310 discloses a menu selection device in connection with a function of an input device (see Page 2 and FIG. 1). This menu selection device includes an item selector and an item input unit. The item input unit is provided on the item selector and the selection and the input of an item are allotted to the same key, and it is constituted such that the item display key and the item selection input key are juxtaposed.

Further, Japanese Patent Application Publication No. 2005-063230 discloses an input device in connection with a key-top exposed from an opening portion (see Page 9 and FIG. 16). This input device is provided with a window opening at a predetermined position of a casing and an item selection is executed by slide-operating an operation button exposed from this window opening, changeover of an item selection screen of page shift, scroll or the like is executed by press-operating another operation knob.

Also, Japanese Patent Application Publication No. 2005-063227 discloses an input device (see Page 8 and FIG. 15). This input device is provided with an window opening at a predetermined position of a casing, an item selection is executed by slide-operating an operation button exposed from this window opening, and a predetermined region in the specified item selection screen is zoom-displayed by press-operating another operation knob.

Meanwhile, the mobile information terminal seen in Japanese Patent Application Publication No. 2003-256120, in which a display unit and a JOG dial are separately arranged, presents to an operator only a single sense of touch which a mechanical structure is to generate and the actual status is that there can be obtained no sense of touch having impact for the operator. Furthermore, the JOG dial excluding the key-top portion thereof occupies a major space within the housing. Consequently, the area (space) in which other parts are mounted is reduced, which blocks compactification of the electronic apparatus applied with the input device.

Also, in the electronic apparatus seen in Japanese Patent Application Publication No. 2004-070505 or Japanese Patent Application Publication Heisei 02-230310, an input device with a touch input function by combining a touch panel selected from various kinds of systems and a display unit is mounted, but when an icon is selected on the display unit, an operator get no sense of touch in synchronization with the selection thereof.

Incidentally, an input device with sense of touch function is constituted by combining a plurality of vibration bodies and an input unit and in case of trying to obtain sense of touch by executing contact-operation linearly on the input operation surface thereof, not only the manufacturing process becomes complicated but also there may be a situation in which no satisfactory sense of touch is obtained when the speed with which the operator executes contact-operation on the input operation surface is different, depending on a fact that a structure for separately arranging a display unit and an input unit as disclosed in Japanese Patent Application Publication No. 2003-256120 and an input function combining a touch panel selected from various kinds of systems and a display unit are only simply combined. As a result thereof, it will cause a cost increase of an electronic apparatus.

According to input devices as disclosed in Japanese Patent Application Publication Nos. 2005-063230 and 2005-063227, the item selection is executed by slide-operating the operation button exposed from the window opening provided at a predetermined position of the casing and the item selection screen of page shift, scroll or the like is changed over by press-operating another operation knob. However, an operation mechanism becomes complicated, so that miniaturization, thinner fabrication or the like of the operation unit may be blocked and it may be a fear that the operability thereof is lowered or malfunction occur. Also, the complicated operation mechanism causes a cost increase.

SUMMARY

It is desirable to provide an input device and an electronic apparatus in which miniaturization, thinner fabrication, and the operability of the operation unit can be improved by devising a detection electrode for a slide position detection and a contact structure of a switch portion and at the same time, malfunction can be lowered, cost-reduction can be realized, and manufacturing processing can be simplified.

According to an embodiment, there is provided a first input device that inputs information by a slide operation depending on an operation body. The device contains a housing having an operation surface, a detection unit that is provided in the housing and includes an electrostatic capacitance sheet member which detects a slide position of the operation body to output a position detection signal, and an operation unit that covers an entire surface of the detection unit and is slide-operated along the operation surface of the housing. The operation unit has a convex shape which becomes thicker along a sliding direction from one portion of the operation surface of the housing and also which becomes thinner toward the other portion of the operation surface thereof. The electrostatic capacitance sheet member includes a switch portion that is switched by a press-in operation of the operation body to the operation unit.

In the embodiment of the first input device, the electrostatic capacitance sheet member includes a sheet shaped detection electrode which detects the slide position of the operation body and outputs the position detection signal, and a portion of the detection electrode protuberates in a dome shape and a dome-shape-protuberating region of the detection electrode forms a movable contact constituting the switch portion.

Consequently, in a case in which information is inputted by the slide operation depending on the operation body, in addition to the slide operation feeling of becoming thicker along the sliding direction from one portion of the operation surface of the housing in response to the slide operation depending on the operation body which operates the input device, it is possible to present the slide operation feeling of becoming thinner toward the other portion of the operation surface.

Also, a movable contact of the switch portion that is formed by the region of the detection electrode which is partially protuberated in a dome shape and a fixed contact constituting the switch portion are connected with each other in response to the press-in operation of the operation body to the operation unit. Consequently, it becomes possible to use the same electrostatic capacitance sheet member compatibly as the detection electrode constituting the electrostatic capacitance sheet that detects the slide position and a movable contact constituting the switch portion for a determination-confirmation key.

Thus, it becomes possible to provide a non-rotary side jog tool with a dome key or the like which has a new structure different from a rotary side jog tool in the past and which obtains the operation feeling approximately similar to such a side jog tool. Furthermore, miniaturization and thinner fabrication of the operation unit, and the operability thereof can be improved, so that it is possible to attempt the lowering of malfunction, cost-down and the simplification of manufacturing process of the input device.

According to another embodiment, there is provided a first electronic apparatus. The first electronic apparatus contains a housing having an operation surface, and an input device that is provided at the housing and inputs information by a slide operation depending on an operation body. The input device includes a detection unit that is provided in the housing and includes an electrostatic capacitance sheet member which detects a slide position of the operation body to output a position detection signal, and an operation unit that covers an entire surface of the detection unit and is slide-operated along the operation surface of the housing. The operation unit has a convex shape which becomes thicker along a sliding direction from one direction of the operation surface of the housing and also which becomes thinner toward the other direction of the operation surface thereof. The electrostatic capacitance sheet member includes a switch portion that is switched by a press-in operation of the operation body to the operation unit.

In an embodiment of the first electronic apparatus, there is provided the embodiment of the first input device, so that in addition to the slide operation feeling of becoming thicker along the sliding direction from one portion of the operation surface of the housing in response to the slide operation depending on the operation body which operates the electronic apparatus, it is possible to present the slide operation feeling of becoming thinner toward the other portion of the operation surface. Also, it becomes possible to use the same electrostatic capacitance sheet member compatibly as the detection electrode constituting the electrostatic capacitance sheet that detects the slide position and a movable contact constituting the switch portion for a determination-confirmation key.

Also, there is employed a connection structure between the movable contact of the switch portion which is formed by the dome-shape-partially-protuberating region of the detection electrode and a fixed contact constituting the switch portion, so that it becomes possible to provide an electronic apparatus provided with a non-rotary side jog tool with a dome key or the like which has a new structure different from a rotary side jog tool with a dome key in the past and which obtains the operation feeling approximately similar to such a side jog tool. Furthermore, miniaturization and thinner fabrication of the input device, and the operability thereof can be improved, so that it is possible to attempt the lowering of malfunction, cost-down and the simplification of manufacturing process of the electronic apparatus.

According to a further embodiment, there is provided a second input device that inputs information by a slide operation depending on an operation body. The second input device contains a housing having an operation surface, a detection unit that is provided in the housing and includes an electrostatic capacitance sheet member which detects a slide position of the operation body to output a position detection signal, and an operation unit that covers an entire surface of the detection unit and is slide-operated along the operation surface of the housing. The operation unit has a concave shape formed by being dug-down along a sliding direction from one portion of the operation surface of the housing and also, by being dug-up toward the other portion of the operation surface thereof. The electrostatic capacitance sheet member includes a switch portion that is switched by a press-in operation of the operation body to the operation unit.

In the embodiment of the second input device, the electrostatic capacitance sheet member includes a sheet shaped detection electrode which detects the slide position of the operation body and outputs a position detection signal and a portion of the detection electrode protuberates in a dome shape and a dome-shape-protuberating region of the detection electrode forms a movable contact constituting the switch portion.

Consequently, in a case in which information is inputted by the slide operation depending on the operation body, in addition to the slide operation feeling of being dug-down along the sliding direction from one portion of the operation surface of the housing in response to the slide operation depending on the operation body which operates the input device, it is possible to present the slide operation feeling of being dug-up toward the other portion of the operation surface.

Also, a movable contact of the switch portion which is formed by the dome-shape-partially-protuberating region of the detection electrode and a fixed contact constituting the switch portion are connected with each other in response to the press-in operation of the operation body to the operation unit. Consequently, it becomes possible to use the same electrostatic capacitance sheet member compatibly as the detection electrode constituting the electrostatic capacitance sheet that detects the slide position and a movable contact constituting the switch portion for a determination-confirmation key.

Also, there is employed a connection structure between a movable contact of the switch portion which is formed by the dome-shape-partially-protuberating region of the detection electrode and a fixed contact constituting the switch portion, so that it becomes possible to provide a non-rotary side jog tool or the like of a reverse structure with respect to a non-rotary side jog tool or the like of the first input device. Furthermore, miniaturization and thinner fabrication of the operation unit, and the operability thereof can be improved, so that it is possible to attempt the lowering of malfunction, cost-down and the simplification of manufacturing process of the electronic input device.

According to an additional embodiment, there is provided a second electronic apparatus. The second electronic apparatus contains a housing having an operation surface, and an input device that is provided at the housing and inputs information by a slide operation depending on an operation body. The input device includes a detection unit that is provided in the housing and includes an electrostatic capacitance sheet member which detects a slide position of the operation body to output a position detection signal, and an operation unit that covers an entire surface of the detection unit and is slide-operated along the operation surface of the housing. The operation unit has a concave shape formed by being dug-down along a sliding direction from one portion of the operation surface of the housing and also, by being dug-up toward the other portion of the operation surface thereof. The electrostatic capacitance sheet member includes a switch portion that is switched by a press-in operation of the operation body to the operation unit.

In the embodiment of the second electronic apparatus, there is provided the embodiment of the second input device, so that in addition to the slide operation feeling of being dug-down along the sliding direction from one portion of the operation surface of the housing in response to the slide operation depending on the operation body which operates the electronic apparatus, it is possible to present the slide operation feeling of being dug-up toward the other portion of the operation surface.

Also, a movable contact of the switch portion which is formed by the dome-shape-partially-protuberating region of the detection electrode and a fixed contact constituting the switch portion are connected with each other in response to the press-in operation of the operation body to the operation unit. Consequently, it becomes possible to use the same electrostatic capacitance sheet member compatibly as the detection electrode constitutes the electrostatic capacitance sheet that detects the slide position and a movable contact constituting the switch portion for a determination-confirmation key.

Also, there is employed a connection structure between a movable contact of the switch portion which is formed by the dome-shape-partially-protuberating region of the detection electrode and a fixed contact constituting the switch portion, so that it becomes possible to provide a non-rotary side jog tool or the like of a reverse structure with respect to a non-rotary side jog tool or the like of the first input device. Furthermore, miniaturization and thinner fabrication of the input device, and the operability thereof can be improved, so that it is possible to attempt the lowering of malfunction, cost-down and the simplification of manufacturing process of the electronic apparatus.

Additional features and advantages are described herein, and will be apparent from the following Detailed Description and the figures.

BRIEF DESCRIPTION OF THE FIGURES

FIGS. 10A to 10C are conceptional diagrams each showing operation examples of the input device 10;

FIG. 36 is a cross-section diagram of the input device 180, showing an internal configuration thereof;

FIGS. 39A to 39E are plan views showing configuration of other patterns for trace detection applicable to the input device 180 or 180' or the like;

FIG. 41 is a cross-section diagram of the input device 180', showing a relation example of width of each key part 86a to 86c of a key-top 152 and width of each dome switch 85a to 85c or the like;

FIGS. 53A to 53C are conceptional diagrams showing operation examples of the input device 190;

FIGS. 70A and 70B are diagrams each showing a relation example of impressed pressure force F and vibration pattern (No. 1 thereof);

FIGS. 71A and 71B are diagrams each showing a relation example of impressed pressure force F and vibration pattern (No. 2 thereof);

FIG. 72 is a flowchart showing an information processing example in the mobile phone 101 or the like relating to respective embodiments.

DETAILED DESCRIPTION

The following describes preferred embodiments of an input device and an electronic apparatus with reference to the drawings.

[Embodiment 1]

Figure 3A:
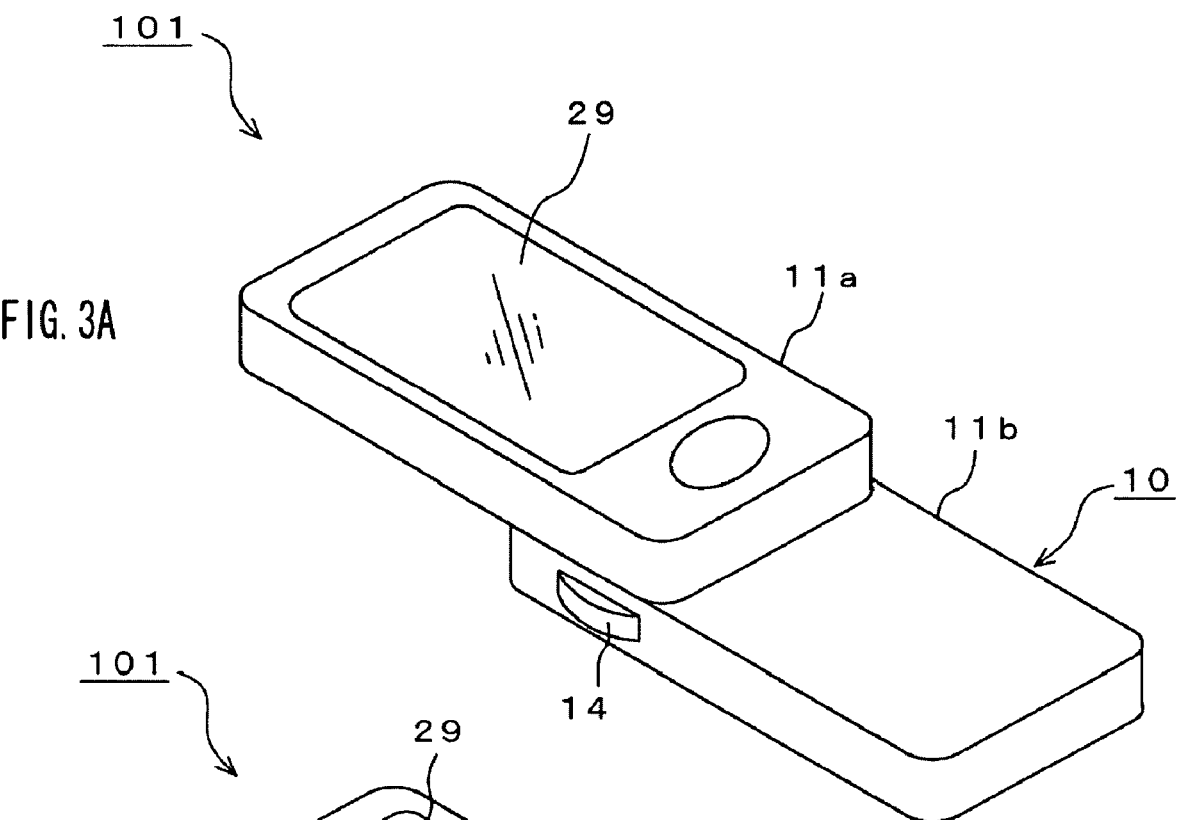
FIGS. 3A and 3B are perspective views of a mobile phone 101 including an input device 10 as a first embodiment, each showing a configuration of the mobile phone 101.
Figure 3B:
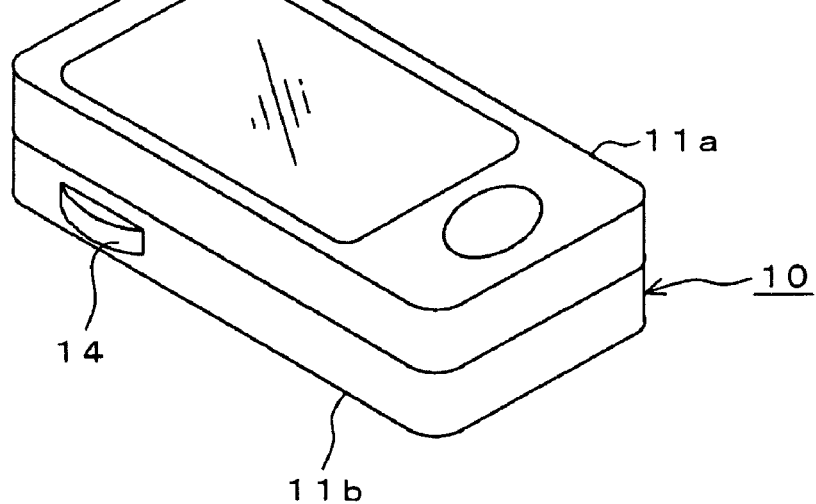

FIGS. 3A and 3B show a configuration of a mobile phone 101 provided with an input device 10 as a first embodiment.

The mobile phone 101 shown in FIG. 3A constitutes one example of an electronic apparatus and includes a slide type housing structure. The mobile phone 101 contains an upper housing 11a and a lower housing 11b which is mounted with an embodiment of the input device 10 according to an embodiment. The upper housing 11a, for example, is slidably engaged back and forth with the lower housing 11b. The mobile phone 101 employs an operation surface slide housing structure, as shown in FIG. 3B, such that the upper housing 11a covers the operation surface on the lower housing 11b.

The upper housing 11a contains a display unit 29 having a predetermined size which displays a wait screen image or the phone number of the partner side or the like. A liquid crystal display monitor is used for the display unit 29. The input device 10 is provided in the lower housing 11b. The input device 10 includes the operation surface at an upper portion and a side portion and the upper portion operation surface includes an operation panel 18 in which a ten-key of numerals [0] to [9], a symbol [*] key, a symbol [#] key and the like are arranged.

Figure 4:
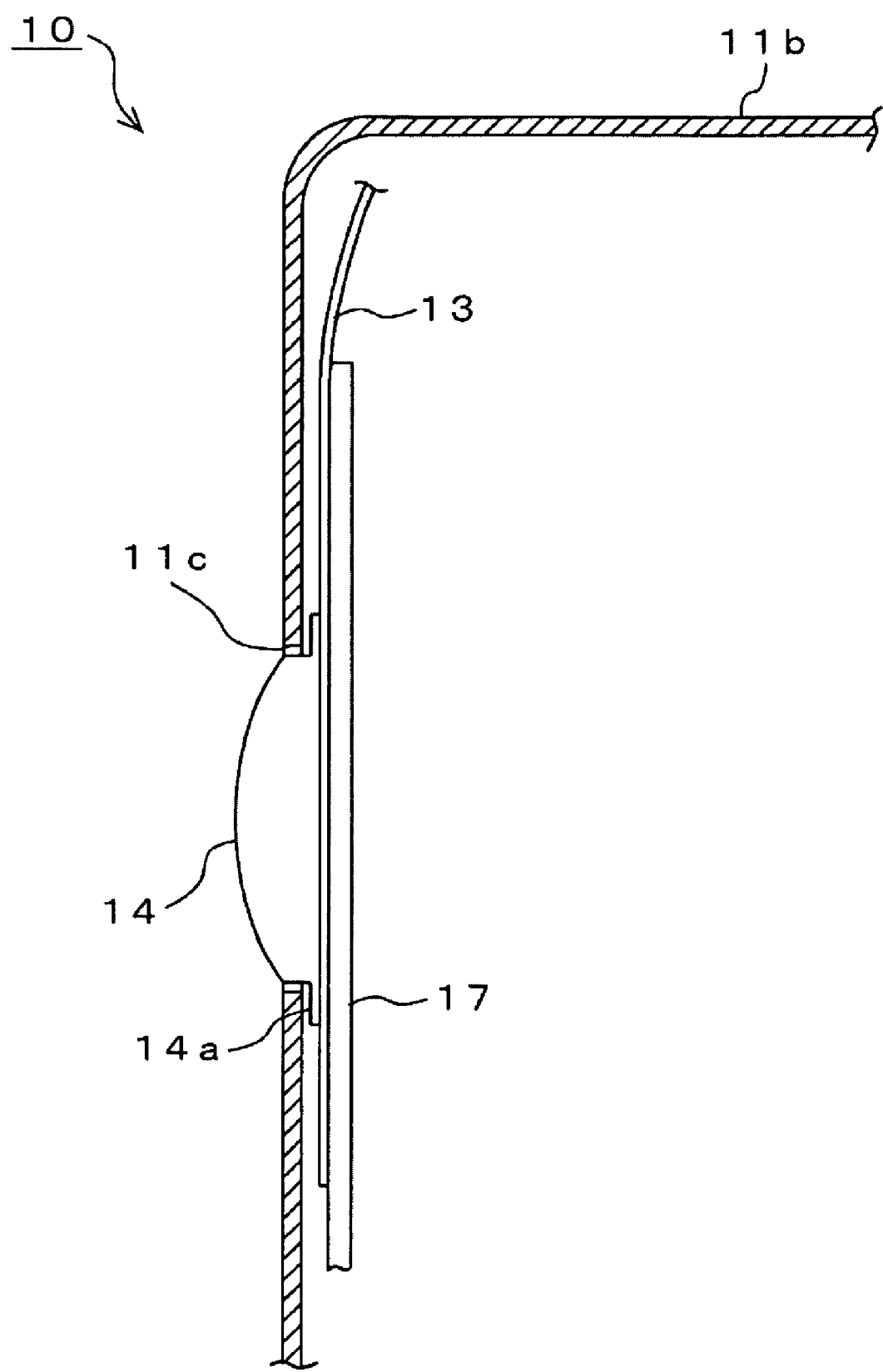
FIG. 4 is a cross-section diagram of the input device 10 showing an internal configuration thereof.

FIG. 4 shows an internal configuration of the input device 10. The input device 10 shown in FIG. 4 is a device for inputting information by a slide operation depending on an operation body, for example, an operator's thumb (hereinafter, simply referred to as finger 30a).

The input device 10 contains a circuit board 17, a sensor 13, and a key-top 14 in addition to the ten-key of number [0] to [9], the [*] key, the [#] key and the like. In this embodiment, the lower housing 11b has a predetermined sized opening portion 11c at a predetermined position, for example, at an operation surface of a left side portion of the lower housing 11b.

The circuit board 17 for mounting electronic parts is arranged in the inside of the lower housing 11b. The sensor 13 is provided in the circuit board 17 and in a case in which the mobile phone 101 is operated by a left hand of the operator, the sensor operates as to detect the slide position of the finger 30a or the like. Electrostatic capacitance sheet member by which the impressed pressure force of the slide position is converted to the electrostatic capacitance and detected is used for the sensor 13. In a case in which there is mounted the sensor 13 composed of the electrostatic capacitance sheet member, the sensor 13 detects the slide position of the operator's finger to output a position detection signal. The [cursor moving method] described in Japanese Patent No. 3920833 or the [coordinate input device] described in Japanese Patent No. 3909230 are applicable for the electrostatic capacitance sheet member.

Other than the electrostatic capacitance sheet member, a pressure detecting sheet member using piezoresistive effect is used for the sensor 13. The pressure detecting sheet member reads resistance change caused by the impressed pressure force of the slide position and converts it into the electric signal. The [force sensor, force detecting system and force detecting program] described in Japanese Application Publication No. 2005-326293 is applicable for the pressure detecting sheet member. When the sensor 13 composed of the pressure detecting sheet member is mounted, a pressure detection signal is outputted by detecting the pressure of the slide position of the operator's finger.

The key-top 14 is inserted into the opening portion 11c opened in the operation surface of the left side portion of the lower housing 11b. The key-top 14 constitutes one example of the operation unit, covers an entire surface of the sensor 13, and is slide-operated along the operation surface of the left side portion of the lower housing 11b. For example, the key-top 14 has the non-operation surface thereof of a flat shape and a flange 14a (flange-shaped portion) at the circumferential edge portion of the non-operation surface.

The key top 14 is mounted in a state in which the non-operation surface thereof is combined toward the inside of the lower housing 11b and the flange 14a is hooked on a portion surrounding the opening portion 11c of the left side portion of the lower housing 11b, thereby prohibiting the key top 14 from being pulled-out. The key top 14 has a convex shape which becomes thicker along the sliding direction from one portion of the operation surface of the lower housing 11b and also which becomes thinner toward the other portion of the operation surface.

In this embodiment, the convex shape of the key-top 14 covering the entire surface of the sensor 13 forms an arc having a predetermined height and width. The key-top 14 is slide-operated along a shape of the arc. By doing like this, in addition to the slide operation feeling of becoming thicker in an arc shape along the sliding direction from one portion of the operation surface of the lower housing 11b in response to the slide operation by the operator's finger 30a, it is possible to present the slide operation feeling of becoming thinner in the arc shape toward the other portion of the operation surface. Consequently, it becomes possible to provide a non-rotary side jog tool with a dome key or the like which is a new structure different from a rotary side jog tool in the past and which obtains the operation feeling approximately similar to such a side jog tool. The key-top 14 of this shape, when retrieving various kinds of information, is applicable, for example, as a scroll key when selecting a telephone directory, when selecting files and on an occasion of expansion and reduction or a determination key for these and also an information selection key of a volume key and the like when adjusting audio volume.

In this embodiment, the key-top 14 is constituted by material that is different from material of the lower housing 11b. Here, when surface roughness of the material constituting the key-top 14 is substituted as "A" and surface roughness of the material constituting the lower housing 11b is substituted as "B", such a relation as A<B is set between the surface roughness "A" and the surface roughness "B". For example, a PC resin, an ABS resin, these synthetic resins or the like is used for the lower housing 11b. Aluminum (Al), its alloy or the like is used for the key-top 14. Totally, it is preferable that at a protrusion portion constituting the key-top 14, the surface roughness "A" thereof is less than the surface roughness "B" of the lower housing 11b. The protrusion portion may be constituted by a PC resin, an ABS resin, these synthetic resins or the like and aluminum or its alloy or the like may be coated on the front surface thereof.

When the material of the key-top 14 is constituted in this manner, it becomes possible to perform the slide operation of the portion which becomes thicker along the sliding direction from the left side portion of the operation surface and also which becomes thinner toward the other portion of the operation surface thereof smoothly as compared with the slide operation in the operation surface of the left side portion of the lower housing 11b and it becomes possible to select information easily by the slide operation of the operator's finger 30a.

In this embodiment, the detection area in which the slide position of the operator's finger 30a is detected by the sensor 13 is set to be wider than the operation area which is slide-operated by the operator's finger 30a at the key-top 14. By doing like this, it is possible to include one portion of the operation surface and the other portion of the operation surface of the lower housing 11b sandwiched the convex shaped key-top 14 in the slide operation region with respect to the slide operation by the operator's finger 30a. It becomes possible for the key-top 14 in this shape to set a retrieving pitch of the scroll key when retrieving various kinds of information and an audio volume adjustment pitch of the volume key and the like when adjusting audio volume so as to be wider.

Figure 5:
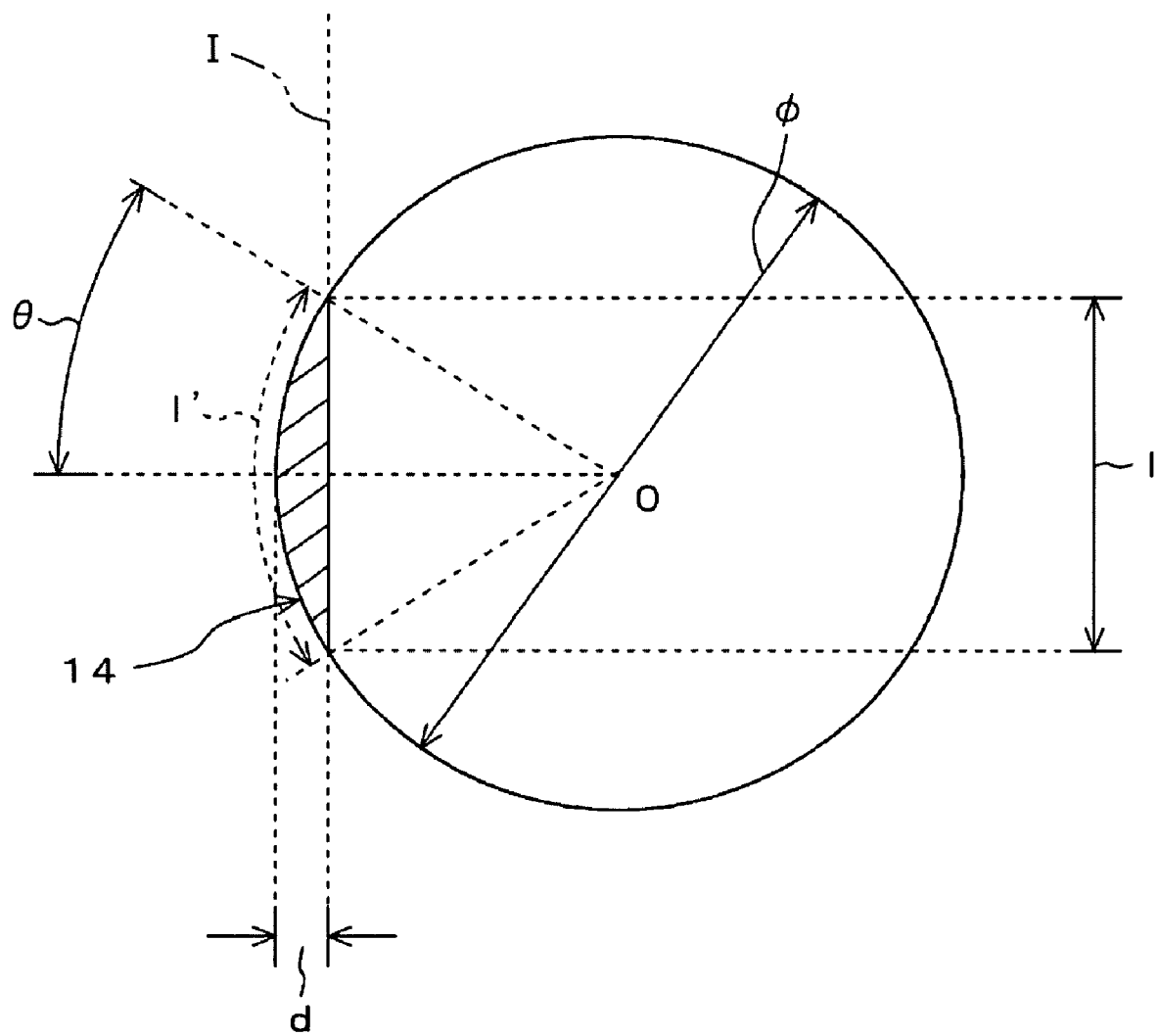
FIG. 5 is a conceptional diagram showing a size setting example of s protrusion position of a key-top 14.

FIG. 5 shows a size setting example of the protrusion position of the key-top 14. The shaded portion shown in FIG. 5 forms an arc convex shape. In the drawing, a line shown by the dotted line corresponds to the side portion operation surface "I". This arc convex shape is a portion formed on the left side of the side portion operation surface "I" when a circle intersecting with the side portion operation surface "I" is drawn. Here, a diameter of the circle is φ and by making the origin "o" of the circle be a reference, when an angle formed between a vertex portion of the arc convex shape and a hem portion of the arc convex shape is substituted as θ, an arc angle of the arc convex shape is 2θ and in this embodiment, 2θ=2× 29.2 degrees. Also, the protrusion distance of the arc convex shape which protrudes on the left side from the side portion operation surface "I" is substituted as "d" and the protrusion length of the sliding direction thereof is substituted as "l".

In this manner, when a circle whose diameter φ=20 mm and an arc angle 2θ=58.4° are to be set, for example, with respect to the side portion operation surface "I", it is possible to obtain a shape of the protrusion position of the key-top 14 of around; the protrusion distance of an exposed portion d=1.3 mm, its protrusion length l=10.08 mm and its outer circumferential length la=10.18 mm.

It should be noted that, the outer circumferential length "l'" of the exposed portion of the arc convex shape can be applied with 2π☐φ☐θ/360 degrees. In this embodiment, in a case in which the outer circumferential length "l'" of the exposed portion of the key-top 14 and the number of pulses obtained from the sensor 13 by the slide operation are to be set, the slide distance is set as 1.7 mm/pulse in case of attempting to obtain 6 pulses from the sensor 13. Similarly, the slide distance is set as 2.03 mm/pulse in case of attempting to obtain 5 pulses, the slide distance is set as 2.545 mm/pulse in case of attempting to obtain 4 pulses and the slide distance is set as 3.39 mm/pulse in case of attempting to obtain 3 pulses.

Figure 6:
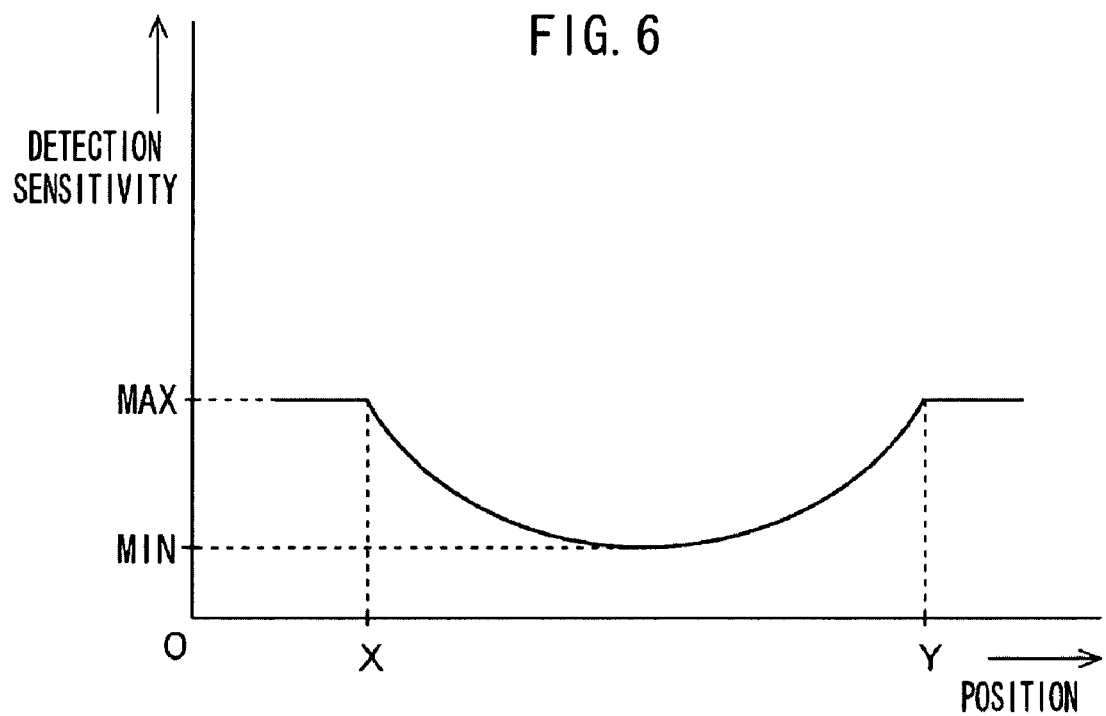
FIG. 6 is a graph diagram showing a detection sensitivity example of an input device 10.

FIG. 6 shows a detection sensitivity example of the input device 10. In FIG. 6, the horizontal axis indicates the slide position along the sliding direction. The vertical axis indicates the detection sensitivity of the sensor 13. In the drawing, "x" is a position of an upward start portion (first hem portion) and is a position at which the arc convex shape of the key-top 14 starts becoming thicker when the key-top 14 is slide-operated along the sliding direction from one portion of the operation surface of the lower housing 11b. "Y" is a position of a downward end portion (second hem portion) and is a position at which the arc convex shape of the key-top 14 finishes becoming thinner when this key-top 14 is slide-operated successively toward the other portion of the operation surface.

In this embodiment, with respect to the detection sensitivity of the sensor 13, for example, in a case in which an electrostatic capacitance sheet member is used for the sensor 13, the detection sensitivity of a constant (highest sensitivity) is obtained on the nearer side of the upward start portion "X" of the arc convex shape of the key-top 14. Also, the detection sensitivity thereof lowers while approaching to a center region between the upward start portion "X" and the downward end portion "Y" from the upward start portion "X" and becomes the lowest at approximately the center region. Further, the detection sensitivity thereof uprises while approaching to the downward end portion "Y" from the center region and at the downward end portion "Y" and subsequently, the detection sensitivity of a constant (highest sensitivity) is again obtained. The protrusion distance "d" of such a key-top 14 changes like a quadratic function with respect to the sliding direction. This enables to be realized the sensor 13 having the detection sensitivity which changes like a quadratic function to form a concave shape (reverse Ω shape).

Figure 7:
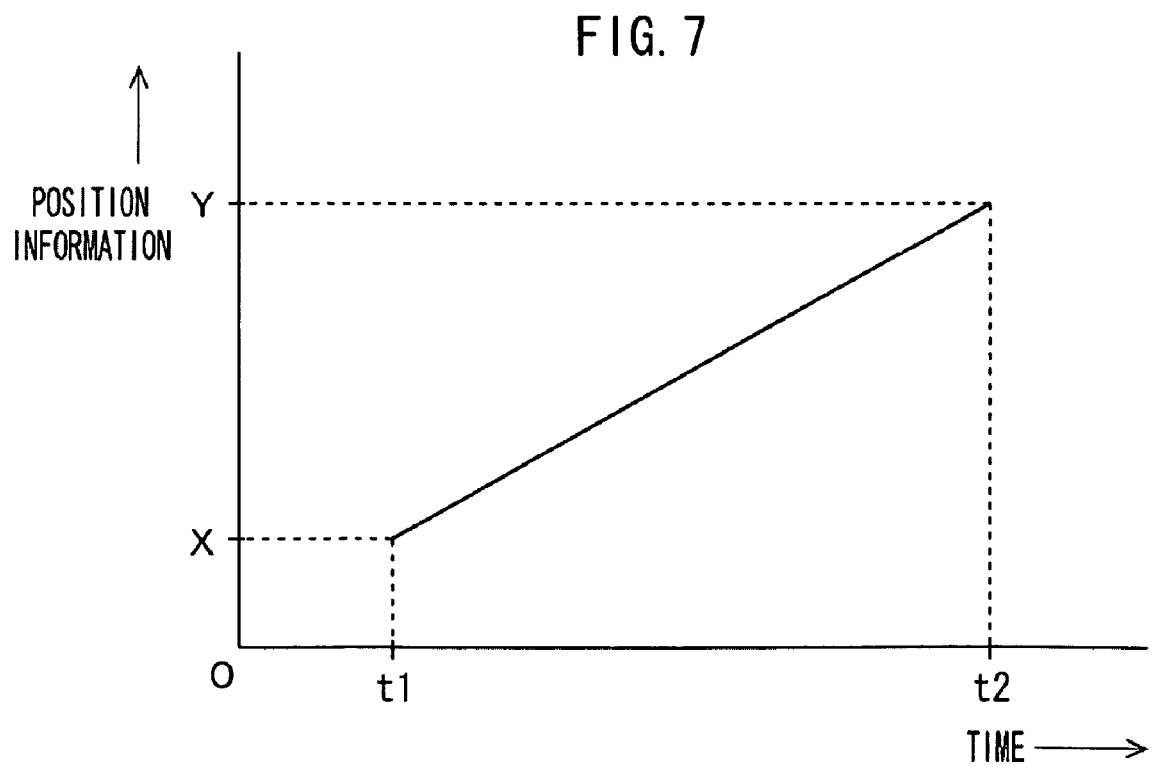
FIG. 7 is a graph diagram showing a position detection example of the input device 10.

FIG. 7 shows a position detection example of the input device 10. In FIG. 7, the horizontal axis indicates the time relating to the slide operation. The vertical axis indicates position detection information of the sensor 13. In the drawing, "X" is a position of the above-mentioned upward start portion (first hem portion) and "Y" is a position of a downward end portion (second hem portion).

In this embodiment, for example, when an electrostatic capacitance sheet member is used for the sensor 13, operating so as to become thicker along the sliding direction from one portion of the operation surface of the lower housing 11b with a constant sliding speed from the front side of the upward start portion "X" of an arc convex shape of the key-top 14, so as to become thinner toward the other portion of the operation surface, and so as to slide via the downward end portion "Y" is performed. In this case, with respect to the position detection information of the sensor 13, it is possible to obtain the position information in which the upward start portion "X" and the downward end portion "Y" are coupled in approximately a straight line.

According to this position detection information, when it is passed through the upward start portion "X" at time t1, there is obtained the position detection information indicating the upward start portion "X", and when it is passed through the downward end portion "Y" at time t2, there is obtained the position detection information indicating the downward end portion "Y". Thus, the sensor 13 is used by which the position detection information that changes like a linear function is obtained with respect to the time relating to the slide operation of such a key-top 14.

In the past system, the slide position of the operation body has been judged only by the value of the position detection information. However, when the sensor 13 outputting the detection sensitivity and the position detection information shown in FIG. 6 and FIG. 7 is used, it becomes possible to input-process applications displayed on the display unit 29 by comprehensively judging the slide position, the pressing-into force and the like of the operation body together with the value of the position detection information and respective time change rates of the position detection information and the detection sensitivity. Thus, in case of combining a dome switch in the input device 10, it becomes possible to prevent malfunction in a case in which the dome switch is touched unintendedly or the like (see third embodiment).

Figure 8:
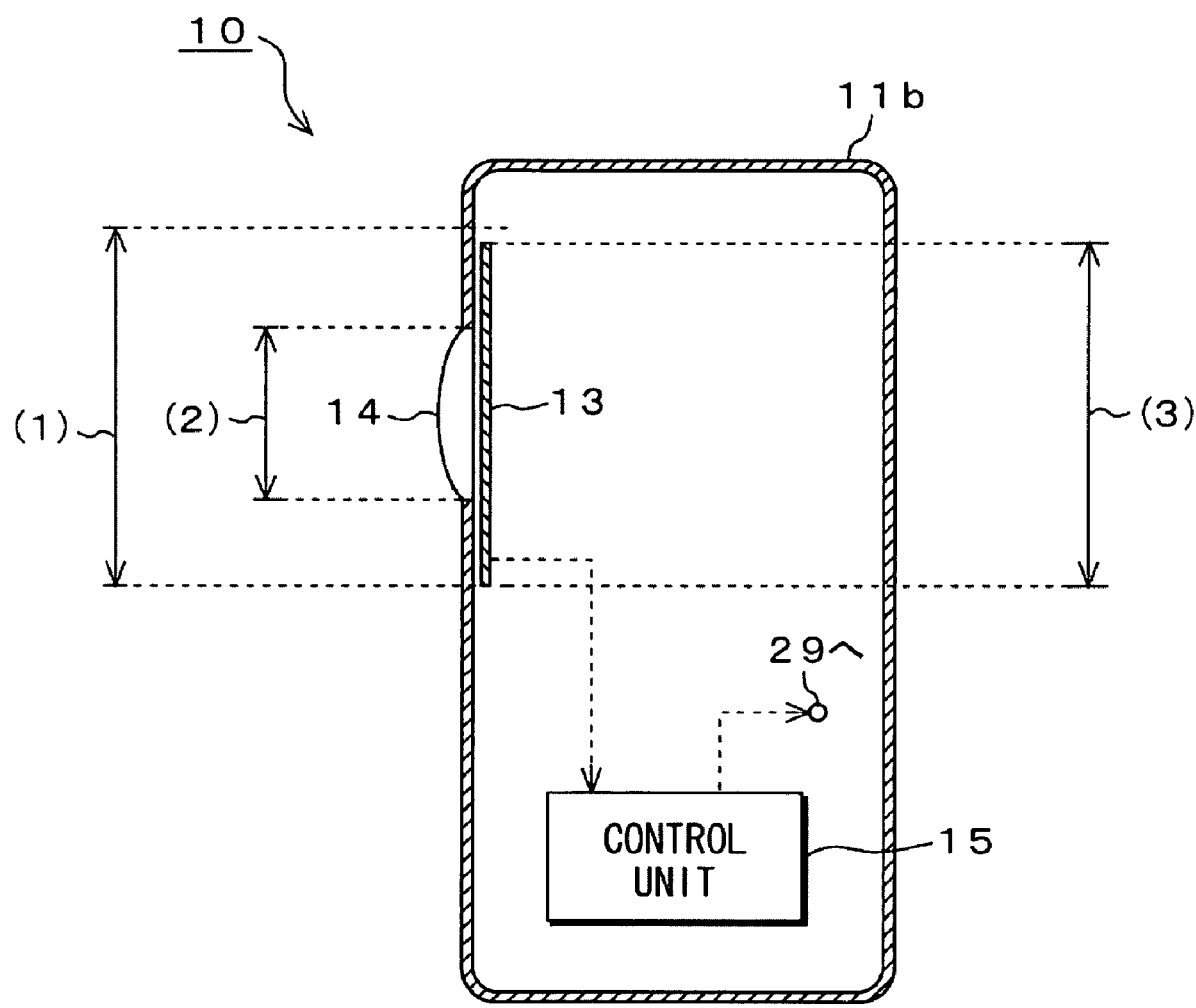
FIG. 8 is a cross-section diagram of the input device 10 showing an operation region example thereof.

FIG. 8 shows an operation region example of the input device 10. In FIG. 8, reference number, (1) denotes an operation region of the input device 10 and a range in which the operator's finger 30a actually slides. Reference number, (2) denotes a protrusion area of the key-top 14 (protrusion length "l" of exposed portion). Reference number (3) denotes a detection area in the sensor 13. On the whole surface of this detection area, there are bedded an electrostatic capacitance sheet member, a pressure detecting sheet member and the like.

In this embodiment, in order to realize a reliable operability of the input device 10, it is set so as to have a relation such that the detection area (3) of the sensor 13 is more than the protrusion area (2) of the key-top 14. This is because the finger 30a may trace over a wide region backward and forward the protrusion area (2) of the key-top 14 when it is considered about a sliding trajectory when the operator's finger 30a is slide-operated on the key-top 14. When the detection area (3) of the sensor 13 is set to be wide, it becomes possible to secure the amount of movement per one pulse more largely.

The sensor 13 is connected with a control unit 15 in which the slide operation speed of the operator's finger 30a is detected and the display pitch of the scroll images 29a', 29b' in the display unit 29 (see FIG. 1, FIGS. 9A and 9B) is adjusted in response to the slide operation speed of the operator's finger 30a. The scroll images 29a', 29b' are displayed in the display unit.

Figure 9A:
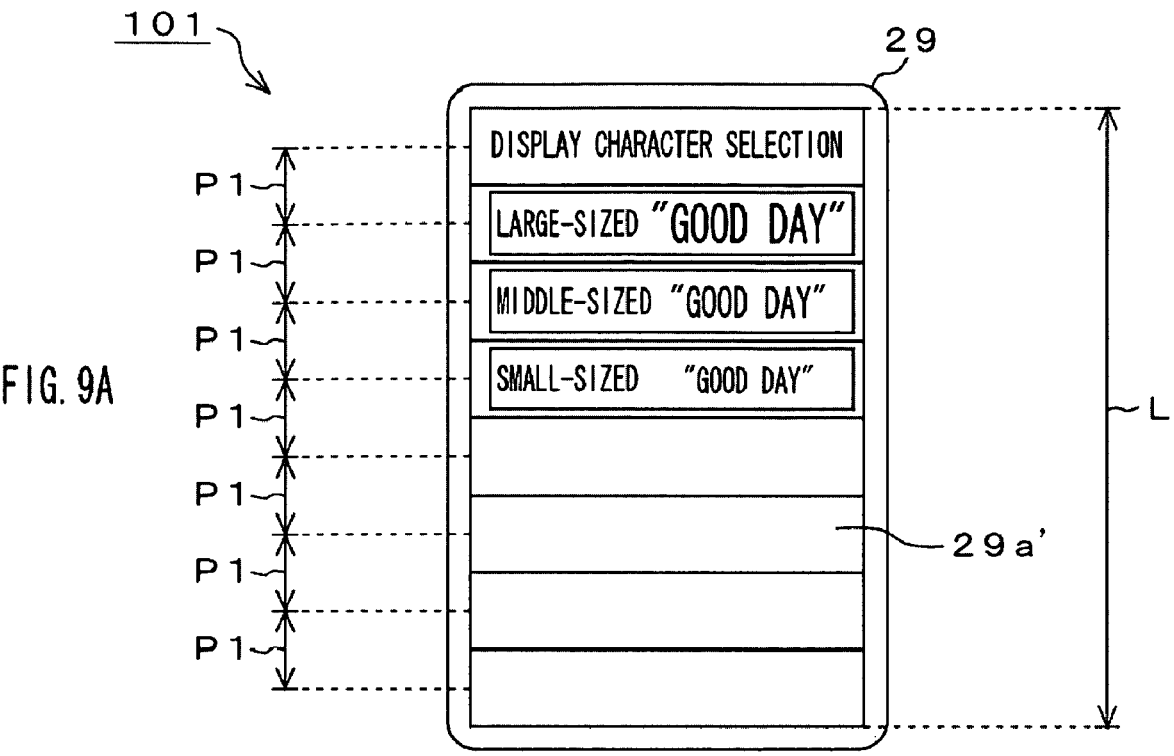
FIGS. 9A and 9B are cross-section diagrams each showing setting examples of the amount of slide Sx in the input device 10.
Figure 9B:
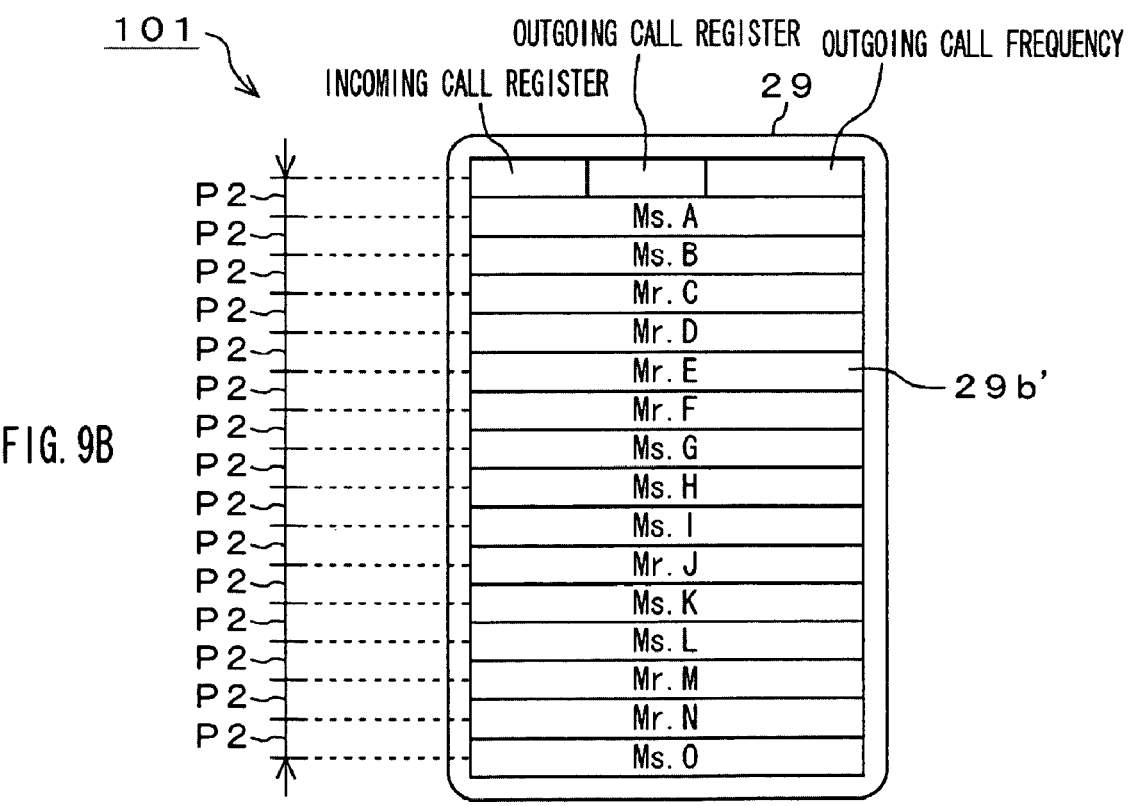

FIGS. 9A and 9B show a setting example of the amount of slide Sx in the input device 10. On the display unit 29 shown in FIG. 9A, the scroll images 29a and the like are displayed corresponding to the slide position of the operator's finger 30a, which is detected by the sensor 13. The scroll image 29a' of this example is a display by an application relating to a display character selection having a few selection items or the like. On this scroll screen, character icon images of [Large-sized "Good day."], [Middle-sized "Good day."] and [Small-sized "Good day."] are displayed, and it is operated such that the operator can select any one of the character sizes. The character icon images of [Good day.] are displayed to be smaller gradually.

In this embodiment, the display screen of the display unit 29 is classified into eight display regions and by using the four display regions thereof, the scroll image 29a' relating to the display character selection is displayed. The display pitch of the scroll image 29a' for the display is P1. When assuming that the screen length of the display unit 29 is to be "L" [mm], the one display region has a length of approximately L/8 mm. For example, when assuming that the screen length "L" of the display unit 29 is to be 40 mm, one display region is 5 mm and the display pitch P1 is 5 mm. With respect to the display pitch P1=5 mm, in a case in which quantity "x" of the selection items housable in one screen is maximum quantity Max or less, for example, S1=4 mm is set for the amount of slide Sx of the key-top 14.

On the contrary, in the display unit 29 shown in FIG. 9B, a scroll image 29b is displayed by a display pitch P2. In this embodiment, there is shown a case in which the display pitch P2 shown in FIG. 9B is set as P2=P1/2 as compared with the display pitch P1 shown in FIG. 9A. In this case, selection items becomes a lot as compared with the application display relating to the display character selection or the like in FIG. 9A and there is assumed an input processing in which phone numbers of the partners are to be searched from a phone number registration column. In this phone number registration column, for example, display columns such as an incoming call register, an outgoing call register, an outgoing call frequency and the like are provided and phone numbers are displayed together with the partner names.

According to the example of the screen length "L" of the display unit 29 shown in FIG. 9A, the screen can be changed over to a screen as shown in FIG. 9B in which the one display region is 2.5 mm and the display pitch P2 is 2.5 mm. In this embodiment, with respect to the display pitch P2=2.5 mm, there is shown a case in which the quantity "x" of the selection items housable in one screen exceeds the maximum quantity Max and, for example, S2=2 mm is set for the amount of slide Sx of the key-top 14. Thus, it becomes possible to set the amount of slide Sx in the slide operation of the key-top 14 so that the amount of slide Sx can be set as Sx=S1, S2 in response to the quantity of the selection items displayed within one screen of the display unit 29. Of course, it is also allowed to set the amount of slide Sx of the key-top 14 arbitrarily based on the length of the electrical detection area (3) of the sensor 13 and all quantity of the selection items existing in the scroll direction.

When the control system is constituted in this manner, following adjustment can be realized: in a case in which the slide operation speed of the operator's finger 30*a* is quick when retrieving information, the display pitch Px of the scroll image 29*b*' in the display unit is set narrow; and on the contrary, in a case in which the slide operation speed of the operator's finger 30*a* is slow, the display pitch Px of the scroll image 29*a*' in the display unit is set wide. Consequently, in a case where there exist a plurality of information retrieval objects and in case of being apart from the aimed scroll image, the scroll images are transferred so as to be skipped roughly and when approaching to the aimed scroll image, it becomes possible to execute the search so as to transfer the scroll images slowly.

FIGS. 10A to 10C show an operation example of the input device 10. In this embodiment, there is shown a case in which the input device 10 is operated by the operator's left hand and the key-top 14 having an arc convex shape which becomes thicker along the sliding direction from one portion of the operation surface of the lower housing 11*b* and also which becomes thinner toward the other portion of the operation surface thereof is used. An electrostatic capacitance sheet member is used for the sensor 13 and in this embodiment, the detection area in which the slide position of the operator's finger 30*a* is detected by the sensor 13 is set so as to be wider than the operation area which is slide-operated by the operator's finger 30*a* at the key-top 14.

In FIG. 10A, first, the operator presses his thumb of the left hand at the upper portion of the operation region (1) of the input device 10. Next, the operator's finger 30*a* is slided from one portion of the operation surface of the lower housing 11*b* along the sliding direction. At that time, in the lower housing 11*b*, it becomes a state in which the operator's finger 30*a* slides on the detection area (3) in the sensor 13.

When the operator continues the slide operation on the protrusion area (2) of the exposed portion of the key-top 14 by the operator's finger 30*a*, the operator's finger traces upward from the upward start portion "X" and reaches a peak region of the key-top 14 shown in FIG. 10B. Further, when the slide operation on the protrusion area (2) is continued, the operator's finger is traced downward toward the other portion of the operation surface and reaches a downward end portion "Y" of the key-top 14 shown in FIG. 10C.

In this embodiment, during a period in which slide-operation is performed from FIGS. 10A to 10C, the sensor 13 detects the slide position of the operator's finger 30*a* and outputs a position detection signal #S1 to the control unit 15. Thus, in response to the slide operation by the operator's finger 30*a*, it is possible to present, in addition to a slide operation feeling of becoming thicker in an arc shape along the sliding direction from one portion of the operation surface of the lower housing 11*b*, a slide operation feeling of becoming thinner in an arc shape toward the other portion of the operation surface thereof. Furthermore, there can be provided a non-rotary side jog tool or the like which has a structure different from that of a rotary side jog tool in the past and in which an operation feeling approximately similar as that of the rotary side jog tool can be obtained.

Figure 11:
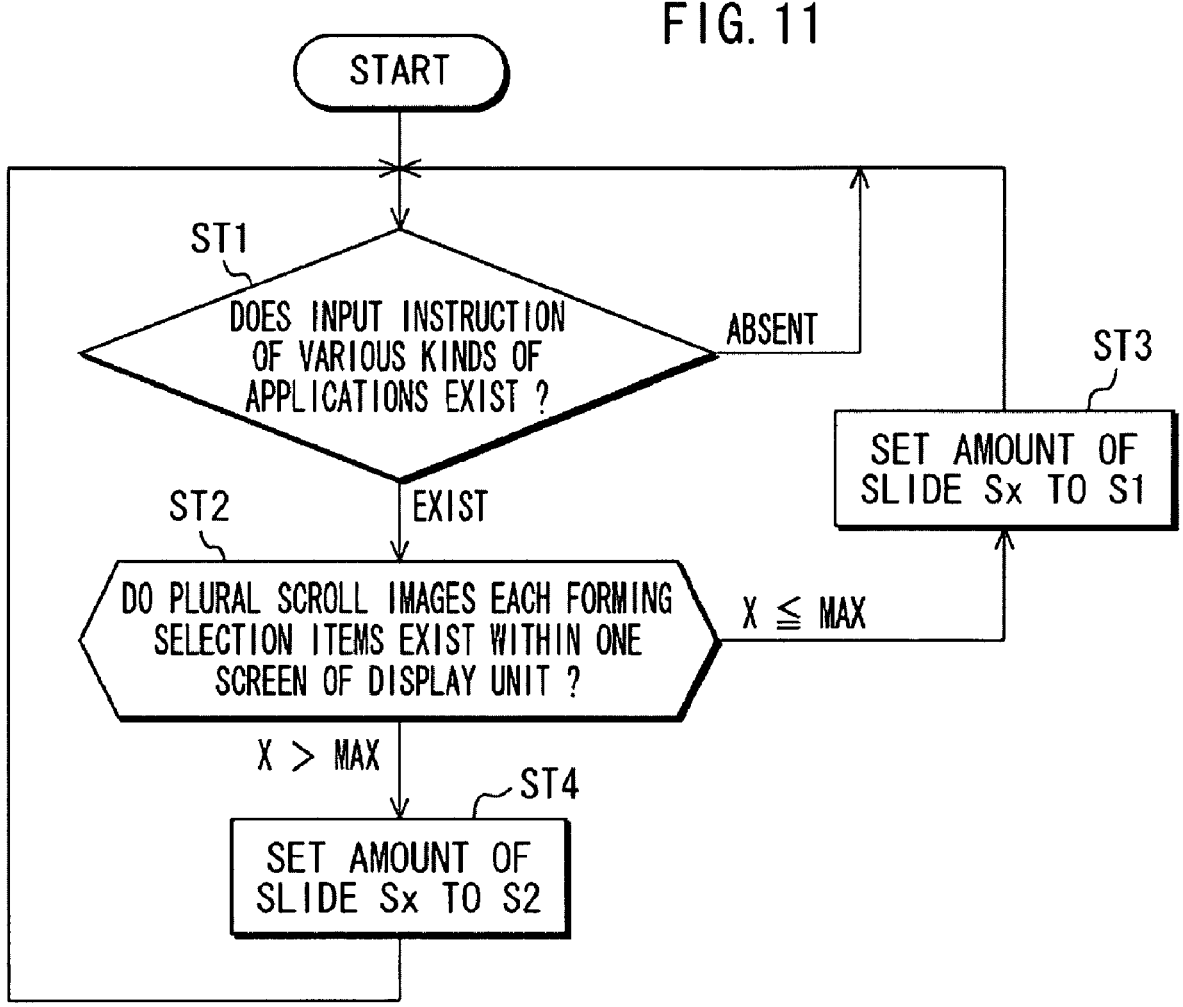
FIG. 11 is a flowchart showing a setting example (fixed value selection) of the amount of slide Sx in the input device 10.

FIG. 11 shows a setting example (fixed value selection) of the amount of slide Sx in the input device 10. In this embodiment, as shown in FIGS. 9A and 9B, the amount of slide Sx of the key-top 14 is set so as to be S1=4 mm in a case where the quantity "x" of the selection items housable within one screen of the display unit 29 is maximum quantity Max or less and the amount of slide Sx of the key-top 14 is set so as to be S2=2 mm in a case where the quantity "x" exceeds the maximum quantity Max of the selection items housable within one screen.

By making these as a setting condition, the control unit 15 waits for input instructions of various kinds of applications in step ST1 of a flowchart shown in FIG. 11. At that time, the operator operates, for example, to instruct an input to a display of the scroll image 29*b*', through the input device 10, for appointing the application relating to the display character selection or the like having a fewer selection item, an application of a phone number registration column having many selection items as compared with the application display relating to the display character selection, or the like. When there is no input for appointing an application, the control unit 15 continues waiting for input instructions of appointing various kinds of applications.

When there exists an input appointing various kinds of applications in the control unit 15, the operation shifts to step ST2 where the control unit 15 judges whether or not the scroll image 29*a*', 29*b*' or the like forming a selection item within one screen of the display unit 29 exists by plural items. With respect to the judgment at that time, it is detected how many selection items exist in the scroll direction. According to the display example of the scroll image 29*a*' as shown in FIG. 9A, maximum (Max) 8 of selection items are rendered to be displayable by a display pitch of 5 mm within one screen of the display unit 29 and the previous display example shows a case in which the quantity "x" of the selection items existing in the scroll direction is four items.

In this judgment result, when the quantity "x" of the selection items existing in the scroll direction is maximum quantity Max or less, the operation shifts to step ST3 where the control unit 15 sets the amount of slide Sx so as to be S1=4 mm and controls the display unit 29 to display the selection items. At that time, the display unit 29 receives the display control from the control unit 15 and displays the scroll image 29*a*' as shown in FIG. 9A. Thereafter, the operation returns to the step ST1.

When the quantity "x" of the above-mentioned selection items exceeds the maximum quantity Max, the operation shifts to step ST4 where the control unit 15 sets the amount of slide Sx so as to be S2=2 mm and controls the display unit 29 so as to change over the display of the selection items. At that time, the display unit 29 receives the display control from the control unit 15 and changes over its screen, for example, from the scroll image 29*a*' having the display pitch P1 as shown in FIG. 9A to the scroll image 29*b*' having the display pitch P2 as shown in FIG. 9B to display it. Thereafter, the operation returns to the step ST1. Thus, in response to the quantity "x" of the selection items displayed within one screen of the display unit 29, it becomes possible to set the amount of slide Sx in the slide operation of the key-top 14 so as to be S1 or S2.

Figure 12:
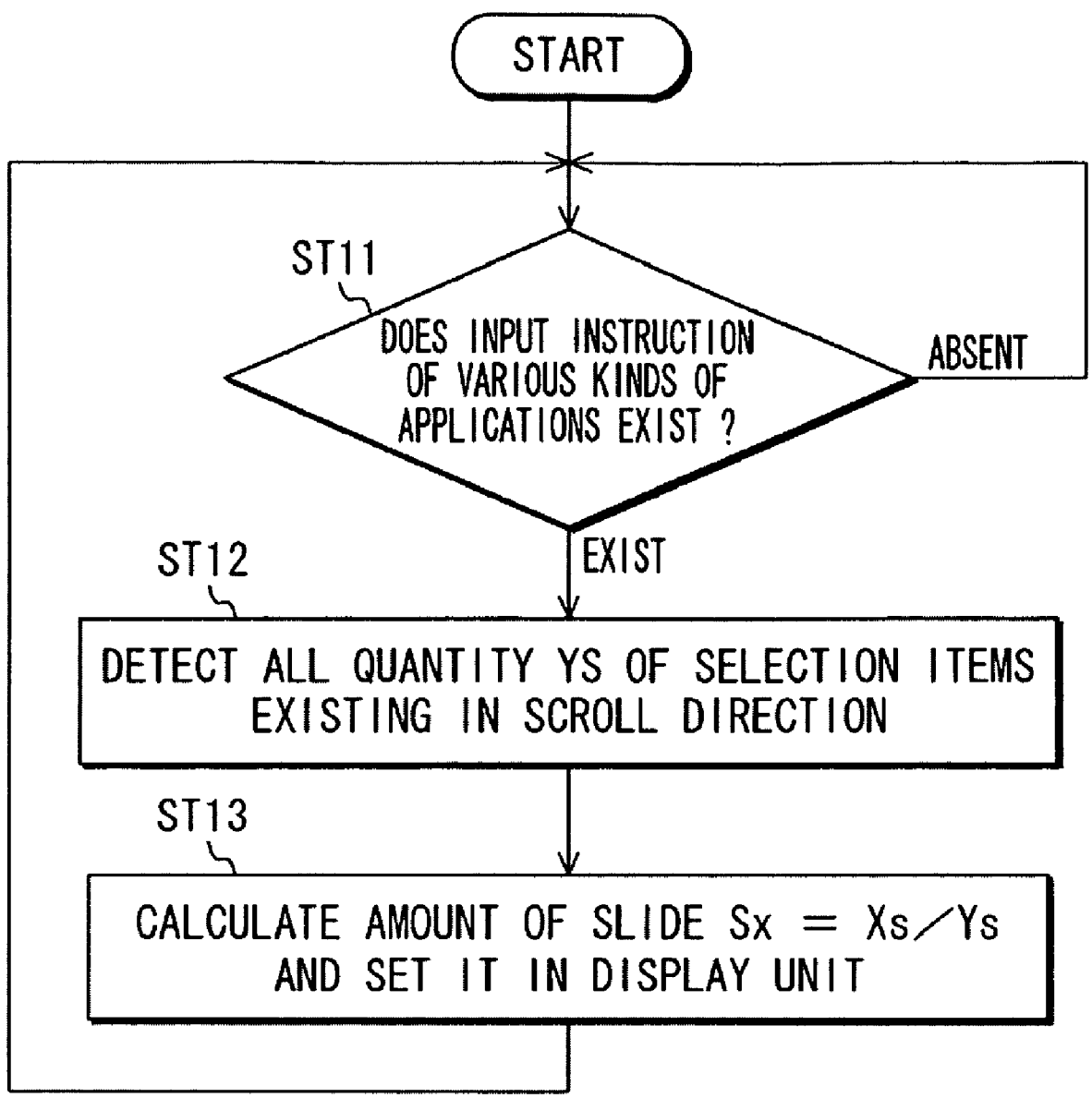
FIG. 12 is a flowchart showing a setting example (setting value is variable) of the amount of slide Sx in the input device 10.

FIG. 12 shows another setting example (setting-value is variable) of the amount of slide Sx in the input device 10. In this embodiment, a length of the electrical detection area (3) of the sensor 13 is rendered to be Xs [mm].

By making this as a setting condition of the amount of slide Sx, the control unit 15 waits for input instructions of various kinds of applications in step ST11 of a flowchart shown in FIG. 12. At that time, the operator operates, for example, to instruct an input to a display of the scroll image 29*a*', 29*b*' or the like, through the input device 10, for appointing the application relating to the display character selection or the like having a fewer selection item, an application of a phone number registration column or the like having many selection items as compared with the application display relating to the display character selection, or the like. When there is no input for appointing an application, the control unit 15 continues waiting for input instructions of various kinds of applications.

When there exists an input appointing various kinds of applications in the control unit 15, the operation shifts to step ST12 where the control unit 15 detects all the quantity "Ys" of the selection items existing in the scroll direction. In this embodiment, it is detected how many selection items exist in the scroll direction. For example, the memory in which the selection items relating to the application are stored is searched and all the quantity "Ys" of the selection items existing in the scroll direction are read out.

Thereafter, the operation shifts to step ST13 where the control unit 15 calculates the amount of slide Sx of the key-top 14 and sets it to the display unit 29. In this embodiment, when assuming that all the quantity of the selection items existing in the scroll direction is to be Ys and assuming that the length of the electrical detection area (3) of the sensor 13 is to be Xs [mm], the control unit 15 calculates Xs/Ys and sets the amount of slide Sx in the display unit 29 so as to be Sx=Xs/Ys. Thereafter, the operation returns to the step ST11. Thus, based on the length Xs of the electrical detection area (3) of the sensor 13 and all the quantity Ys of the selection items existing in the scroll direction, it becomes possible to set the amount of slide Sx of the key-top 14 arbitrarily.

In this manner, in an embodiment of the mobile phone 101, the input device 10 as the first embodiment is provided. Then, in a case in which information is inputted by the slide operation in one direction depending on the operator's finger 30a, in addition to the slide operation feeling of becoming thicker along the sliding direction from one portion of the operation surface of the lower housing 11b in response to the slide operation depending on the operator's finger 30a which operates the input device 10, it is possible to present the slide operation feeling of becoming thinner toward the other portion of the operation surface thereof.

Consequently, it becomes possible to provide a non-rotary side jog tool or the like which has a structure that is different from a rotary side jog tool in the past and which obtains the operation feeling approximately similar to such a side jog tool. Furthermore, miniaturization of the key-top 14, thinner fabrication of the electrostatic capacitance sheet and the operability thereof can be improved, so that it is possible to attempt the lowering of malfunction, cost-down and the simplification of manufacturing process of the input device 10.

In this embodiment, although a case where the key-top 14 is provided on the left side of the lower housing 11b as shown in FIG. 3, has been described, of course, it is not limited to this; it is also allowed for the key-top 14 and an operation unit of another key top or the like mentioned hereinafter to be provided on the operation surface of the right side portion of the lower housing 11b, on the operation surface on the upper or lower side thereof, on the operation surface on the front or rear surface side or the like. Further, it is also allowed for the operation unit to be provided on the operation surface of the left or right side portion of the upper housing 11a, on the operation surface of the upper or lower side thereof, on the operation surface of the front or rear surface side thereof or the like. It is needless to say that a similar effect is obtained also with respect to a case in which the operation unit is provided on the right side of the lower housing 11b, on the upper housing 11a or the like.

[Embodiment 2]

Figure 13:
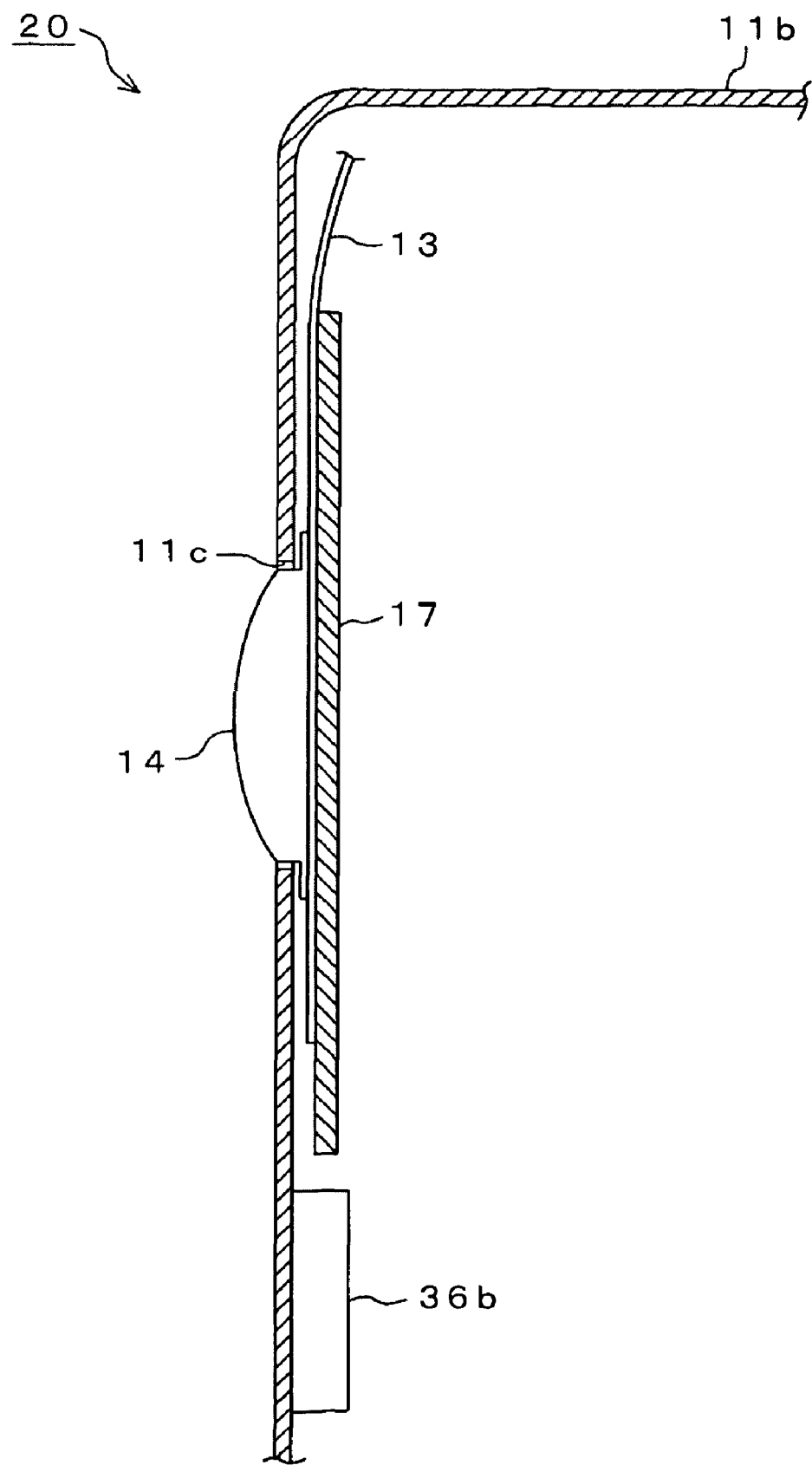
FIG. 13 is a cross-section diagram of an input device 20 as a second embodiment, showing an internal configuration thereof.
Figure 14:
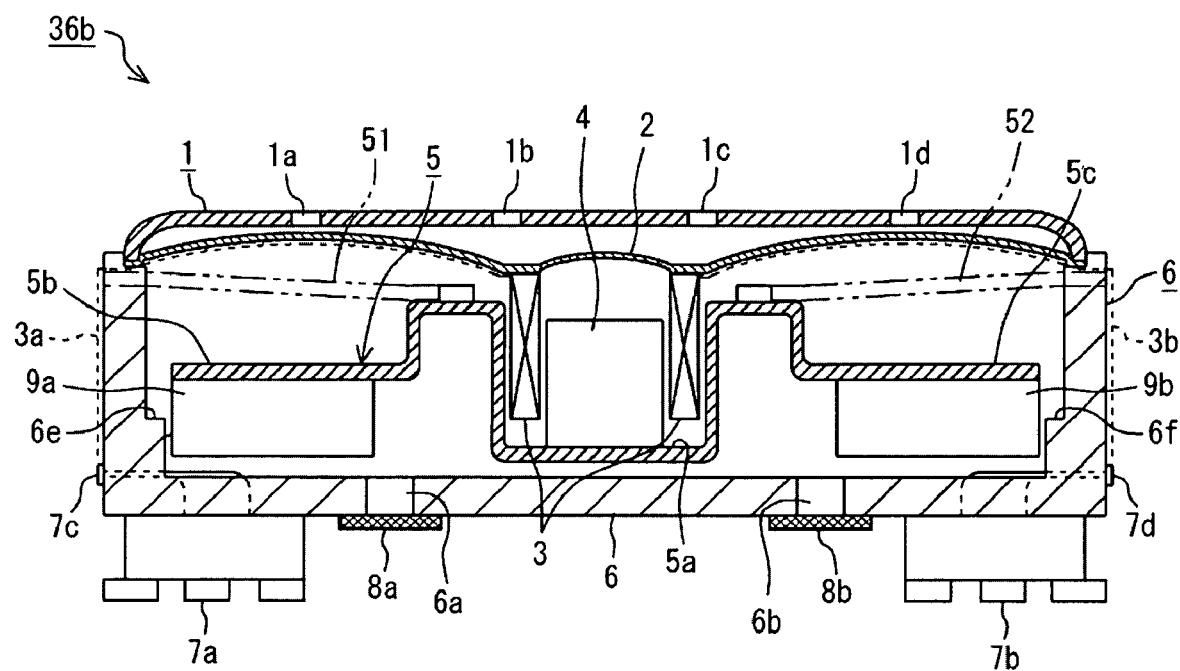
FIG. 14 is a cross-section diagram of a speaker 36b having actuator function, as seen from the front side, showing a configuration thereof.

FIG. 13 shows an internal configuration of an input device 20 as a second embodiment. In this embodiment, a speaker 36b with actuator function which constitutes a function of a vibration body is provided at the input device 20 shown in FIG. 13 and it is constituted such that a vibration is generated with respect to the slide position of the operator's finger 30a, which is detected by the sensor 13. For the speaker 36b, a vibration body which compatibly uses a speaker function is used as shown in FIG. 14. The speaker 36b is, for example, mounted at a portion on the inside of the lower housing 11b and near the arrangement position of the key-top 14.

FIG. 14 shows a configuration of the speaker 36b with the actuator function, seen from the front side thereof. The speaker 36b shown in FIG. 14 has an actuator function which can generate a sense of touch other than the speaker function. This speaker 36b is applicable to an information processing device, a mobile phone, a mobile terminal device or the like which present sense of touch to the operator when inputting information by selecting an icon from the contents of the display screen for the input item selection.

The speaker 36b includes a housing portion 6 and a lid member 1 is engaged therewith after component parts are built-in. With respect to the size of the housing portion 6, the length is around 15 [mm], the width is around 5 [mm] and the height is around 3 [mm]. The lid member 1 is provided with opening portions at predetermined regions. In this embodiment, the lid member 1 has four opening portions 1a, 1b, 1c, 1d such that the sound leaks out therefrom. For example, a resin molded part is used for the lid member 1.

A yoke 5 is arranged in the housing portion 6. The yoke 5 has a concave portion 5a of a bottomed cylindrical shape, which is arranged freely movably in the housing portion 6. For example, the yoke 5 is movably supported by two spring coils 51, 52 of a flat-type waveform shape in the housing portion 6.

In this embodiment, one end of the spring coil 51 is joined with one edge portion of the concave portion 5a of the yoke 5 and the other end thereof is fixed at one upper edge of the housing portion 6. One end of the spring coil 52 is joined with the other edge portion of the concave portion of the yoke 5 and the other end thereof is fixed at the other upper edge of the housing portion 6. In this embodiment, the shape of the spring member for supporting the vibration system elastically is made to be in a flat-type waveform shape.

A magnet 4 (permanent magnet) is fixed at the bottom portion of the yoke 5 which is movably supported in the housing portion 6. For example, neodymium having a cylindrical shape is used for the magnet 4. A movable coil 3 (voice coil) is movably arranged around the magnet 4. The coil 3 includes a winding axis portion. It is configured such that an audio signal, a vibration generating signal or the like is supplied to the coil 3.

A vibration plate 2 is mounted on one side of the above-mentioned winding axis portion of the coil 3 and the outer edge region thereof is made to be sandwiched by the lid member 1 and the housing portion 6. Also, leader electrodes 7a, 7b are provided on the outside of the bottom surface of the housing portion 6 and they are connected to the coil 3 inside the housing portion 6. An audio signal, a vibration generating signal and the like are inputted to the leader electrodes 7a, 7b.

Also, the housing portion 6 has, for example, two opening portions 6a, 6b between the two leader electrodes 7a, 7b which are provided on the outside of the bottom surface of the housing portion 6 and at the bottom surface portion thereof. Mesh seals 8a, 8b are pasted on the bottom surface of the housing portion 6 over these two opening portion 6a, 6b. The mesh seal 8a covers the opening portion 6a and also, the mesh seal 8b covers the opening portion 6b. The function of these mesh seals 8a, 8b is to secure a breath function on the inside and on the outside of the housing portion 6.

The leader electrode 7a includes a terminal 7c and the leader electrode 7b includes a terminal 7d, and they are connected to the leader wires 3a, 3b of the coil 3 on the side wall of the housing portion 6. For example, the one leader wire 3a pulled out from the coil 3 reaches the outer edge portion by passing through the rear surface of the one side of the vibration plate 2, is taken out to the outside from the upper edge of the housing portion 6, is shifted downward the side wall, reaches the terminal 7c and is connected to the leader electrode 7a. Similarly, the other leader wire 3b pulled out from the coil 3 reaches the outer edge portion by passing through the rear surface of the other side of the vibration plate 2, is taken out to the outside from the upper edge of the housing portion 6, is shifted downward the side wall, reaches the terminal 7d and is connected to the leader electrode 7b.

It should be noted that the yoke 5 includes a left arm 5b and a right arm 5c other than the concave portion 5a of the bottomed cylindrical shape. There are joined weights 9a, 9b on the lower surfaces of the left arm 5b and the right arm 5c. There is joined the weight 9b also on the lower surface of the right arm 5c by using adhesive. There is joined the weight 9a on the lower surface of the left arm 5b of the weights 9a, 9b by using adhesive. There is joined the weight 9b also on the lower surface of the right arm 5c by using adhesive. Each of the weights of the weights 9a, 9b is, for example, around 0.597 [g]. Each thickness of these weights 9a, 9b is in the vicinity of 2 mm and is approximately equal to the distance of a space reaching from the lower surface of each of the left arm 5b and the right arm 5c to the bottom surface of the housing portion 6. There are provided very narrow gaps between the lower surfaces of the weights 9a, 9b and the bottom surface of the housing portion 6. This is because strokes (spaces) between the upper and lower portions of the yoke 5 in the direction of coil winding axis portion is to be secured while securing the weights of the weights 9a, 9b.

In this manner, according to the input device 20 as the second embodiment, the speaker 36b with an actuator function is mounted, so that it is possible to generate vibrations by the speaker 36b with respect to the slide position of the operator's finger 30a at a time of the input operation or at a time of the input determination, thereby enabling the sense of touch to be presented with respect to the operator's finger 30a.

In this embodiment, although a case where the key-top 14 is provided on the left side of the lower housing 11b as shown in FIG. 13, of course, it is not limited to this; it is needless to say that a similar effect is obtained also with respect to a case where the key-top is provided on the right side of the lower housing 11b.

[Embodiment 3]

Figure 15:
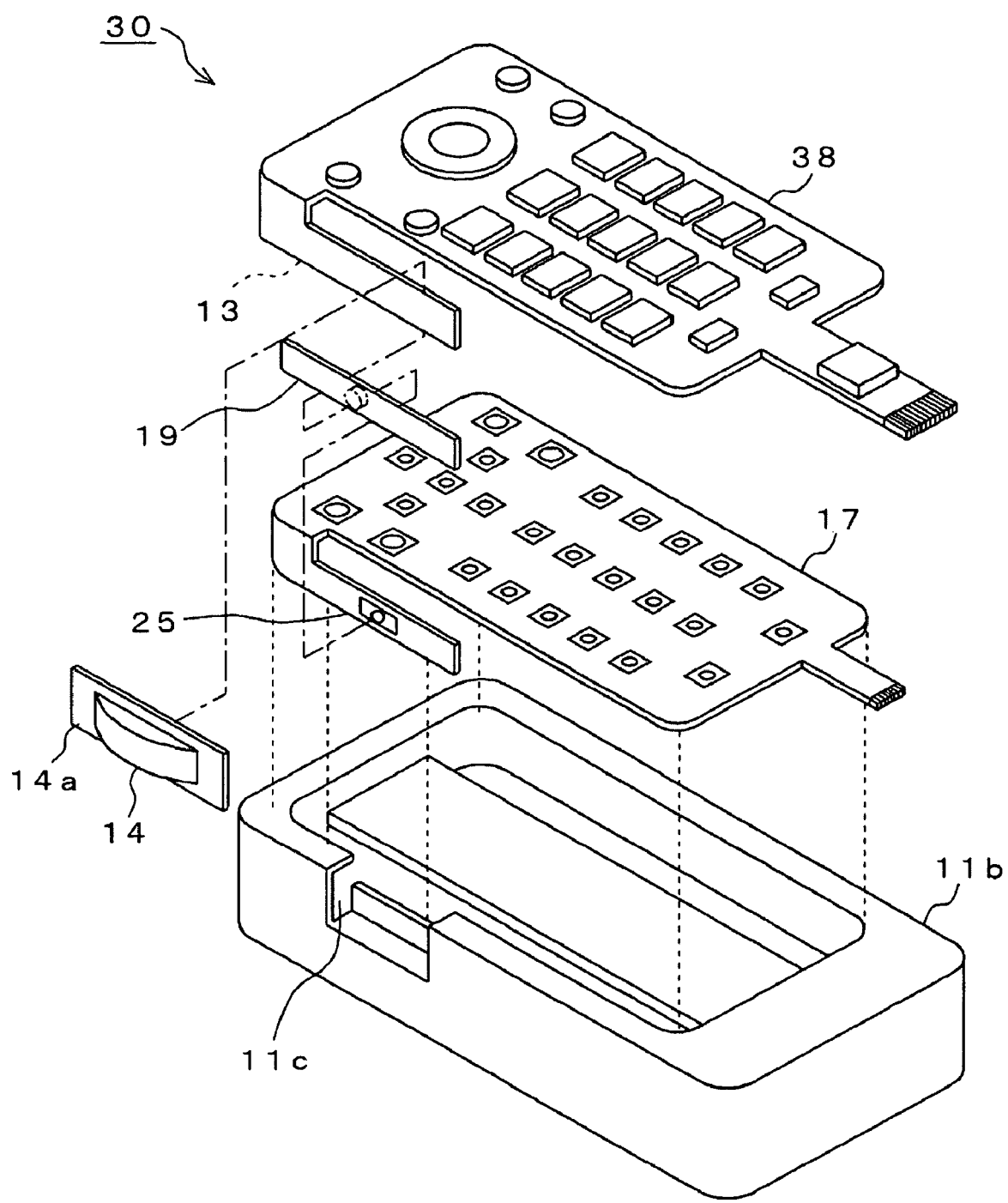
FIG. 15 is an exploded perspective view of an input device 30 as a third embodiment, showing a configuration thereof.

FIG. 15 shows a configuration of an input device 30 as a third embodiment. In this embodiment, a dome switch 25 constituting one example of a switch portion is provided and is operated so as to be turned on or/and off by the press-in operation of the key-top 14. To the dome switch 25, a portion of the circuit board 17 or a portion of a detection electrode of an electrostatic capacitance sheet member as explained in an eighteenth embodiment is applied.

The input device 30 shown in FIG. 15 is added with a pusher piece 19 of a rectangular shape and a dome switch 25 of a hemisphere shape with respect to the input device 20 previously explained. According to the input device 30, the key-top 14 is built-in at the opening portion 11c of the lower housing 11b.

For the key-top 14, for example, a part molded by injecting PC (polycarbonate) resin, PC+ABS resin or the like into a die modeled with an arc convex shape is used. In this embodiment, the key-top 14 is molded and thereafter, an UV (ultraviolet) coating is applied. For example, a solution for improving abrasion resistance is applied on the operation surface of the key-top 14. Thereafter, ultraviolet rays are illuminated and the painted surface is cured. Thus, it is possible to improve the abrasion resistance of the operation surface of the key-top 14.

Also, for the lower housing 11b, for example, a part molded by injecting PC (polycarbonate) resin, PC+ABS resin or the like into a die modeled with an opening portion 11c is used.

In case of forming the lower housing 11b by metal, an aluminum plate, a magnesium plate or a stainless plate such as a SUS 304 is used and by processing one of these members depending on press processing, deep drawing processing or extrusion processing, there is formed the lower housing 11b including the opening portion 11c at a predetermined position. In this embodiment, the key-top 14 is combined by directing the non-operation surface thereof toward the inside of the lower housing 11b and the brim shaped flange 14a of the key-top 14 is hooked on the inside of the lower housing 11b surrounding the opening portion 11c. This enables the key-top 14 to be prevented from being slipped out of the opening portion 11c.

On the inside of the key-top 14, the sensor 13, the pusher piece 19, the dome switch 25, and circuit board 17 are arranged in this order. The sensor 13 is formed, for example, continuously with an operation panel 38 of a key-top array system which forms ten-keys of numerals [0] to [9], a symbol [*] key, a symbol [#] key and the like on the operation panel 18. The individual key of the operation panel 38 has a rectangular shape. The operation panel 38 is constituted, for example, such that a silicon rubber is formed by injecting a silicon resin or the like into a die which forms ten-keys of numerals [0] to [9], a symbol [*] key, a symbol [#] key and the like and thereafter, an electrostatic capacitance sheet or a pressure detecting sheet is pasted on that silicon rubber. The pusher piece 19 is arranged so as to be sandwiched between the sensor 13 and the side portion of the circuit board 17. For the circuit board 17, there is used a board in which, for example, a metal dome is formed on a flexible wiring board and a water-proof and dust-proof sheet is pasted on the upper portion thereof.

In this embodiment, the pusher piece 19 has a length approximately equal to the detection area (3) of the sensor 13. This is accomplished in order to hold (line) the sensor 13 of the electrostatic capacitance sheet member or the like in a stable posture on the plane of the pusher piece 19. The circuit board 17 is mounted with the dome switch 25. The dome switch 25 is constituted by a switch portion 25a and a cover member 25b. The switch portion 25a is constituted by a spring member and an electrode member, and the cover member 25b is constituted by an insulation member.

The dome switch 25 is, for example, turned on by being pressed-into with the finger 30a or the like strongly against the biasing force of the spring member. When releasing the finger 30a from the dome switch 25, the key-top 14 attaches to the lower housing 11b surrounding the opening portion 11c by the biasing force of the spring member. There are mounted on the circuit board 17 with a plurality of key switches forming ten-keys of numerals [0] to [9] of the operation panel 18, a symbol [*] key, a symbol [#] key and the like other than the dome switch 25.

Figure 16:
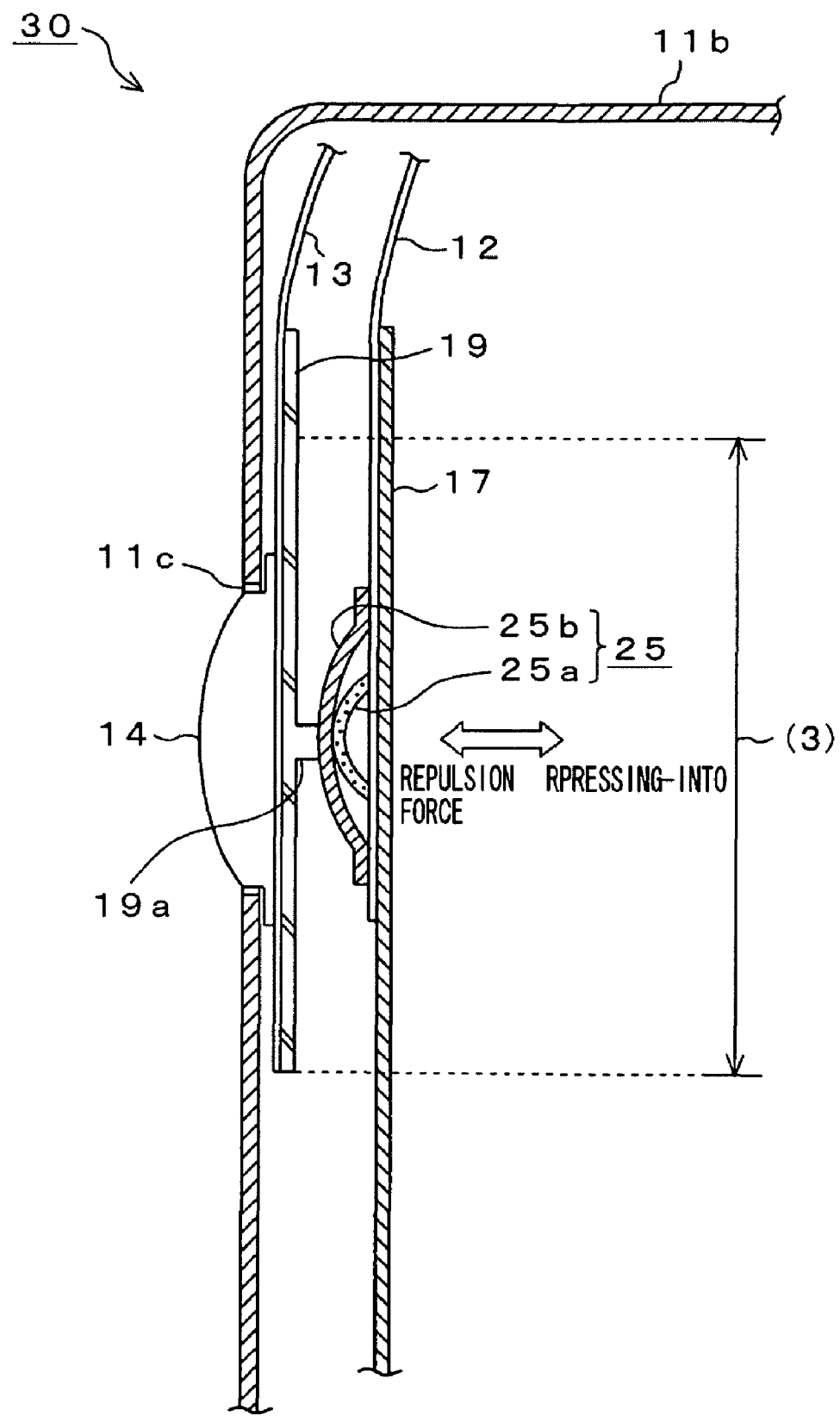
FIG. 16 is a cross-section diagram of the input device 30, seen from upper surface, showing a configuration thereof and a function example thereof.

FIG. 16 shows a configuration of the input device 30 and the function example thereof, seen from the upper surface thereof. According to the input device 30 shown in FIG. 16, a protrusion portion 19a is provided approximately at the center region of the pusher piece 19. The protrusion portion 19a forms, for example, a cylindrical shape having a predetermined protrusion length and is arranged at a position in which the dome switch 25 of the circuit board 17 can be pushed down by the tip portion thereof and a press-in operation is carried out in the arrow direction by the key-top 14. In the drawing, the circuit board 17 is provided with a print wiring 12, the wiring is formed from the dome switch 25 to the control unit 15 (see FIG. 8) and a switch signal for turning on or/and off is transmitted electrically. FIG. 10 should be referred to with respect to an operation example of the input device 30.

In this manner, according to the input device 30 relating to the third embodiment, it is constituted such that the dome switch 25 pushed down through the key-top 14, the sensor 13 and the pusher piece 19 is provided at the side portion of the circuit board 17 and the key-top 14 is to be press-in operated after the information selection of the scroll image 29a', 29b' or the like. Consequently, by turning on or/and off the dome switch 25, it becomes possible also for the unrotary key-top 14 to be applied to a determination key when determining the input.

In this embodiment, although a case where the key-top 14 is provided on the left side of the lower housing 11b as shown in FIG. 16 has been described, of course, it is not limited to this; it is needless to say that a similar effect is obtained also with respect to a case where the operation unit is provided on the right side of the lower housing 11b.

[Embodiment 4]

Figure 17:
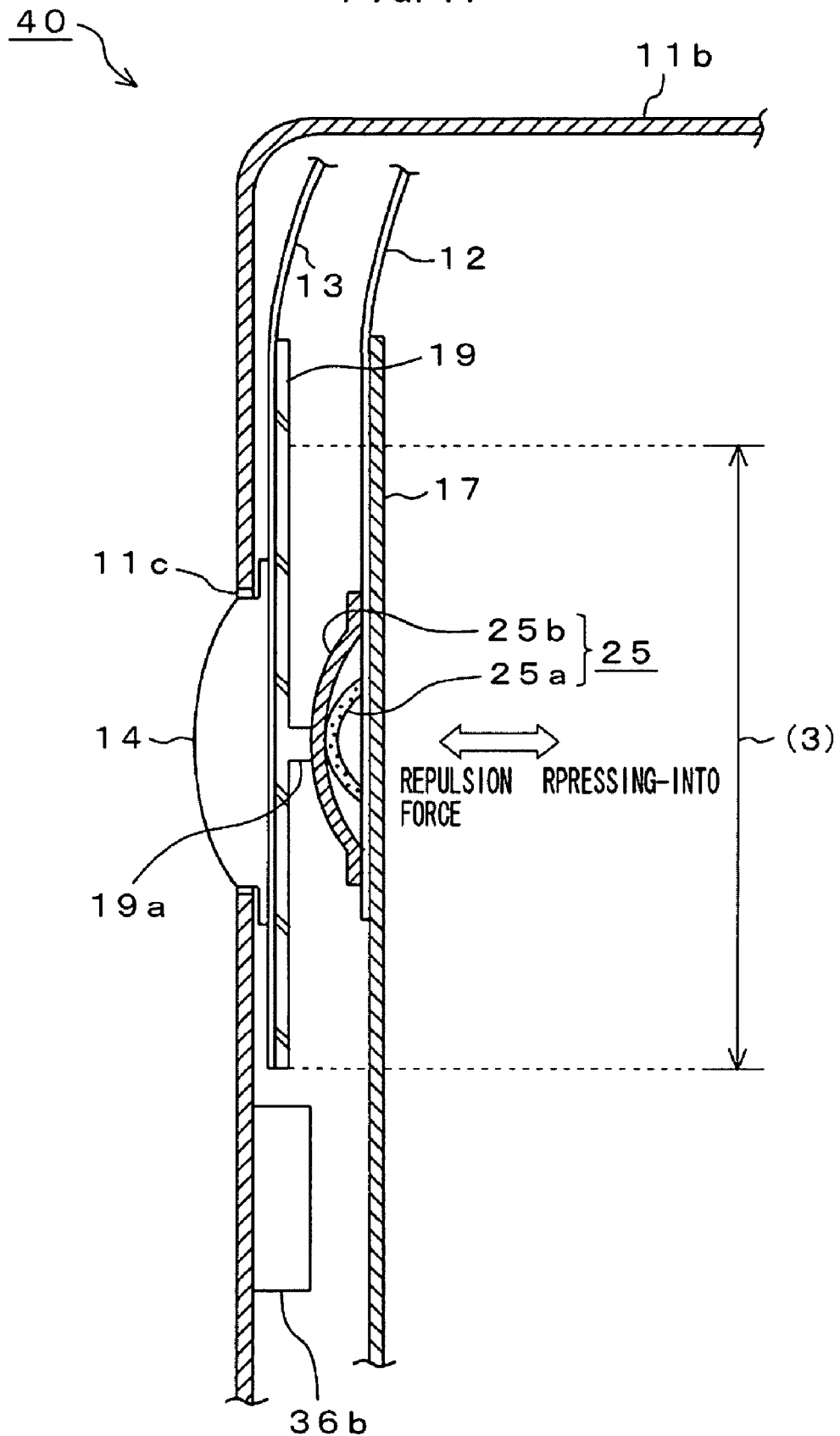
FIG. 17 is a cross-section diagram of an input device 40 as a fourth embodiment, showing an internal configuration thereof.

FIG. 17 shows an internal configuration of the input device 40 as a fourth embodiment. In this embodiment, it is constituted such that the speaker 36b with an actuator function as explained in the second embodiment is provided in the input device 40 shown in FIG. 17 and vibrations are generated with respect to the slide position of the operator's finger 30a, which is detected by the sensor 13. For the speaker 36b, a vibration body which compatibly uses a speaker function is used as shown in FIG. 14. The speaker 36b is, for example, mounted at a portion on the inside of the lower housing 11b of the input device 40 and near the arrangement position of the key-top 14. With respect to other component parts, they are similar as those of the first to third embodiments, so that the explanation thereof will be omitted. FIG. 10 should be referred to with respect to an operation example of the input device 40.

In this manner, according to the input device 40 as the fourth embodiment, the speaker 36b with an actuator function is mounted with respect to the input device 30 relating to the third embodiment, so that it is possible, similarly as the second embodiment, to generate vibrations by the speaker 36b with respect to the slide position of the operator's finger 30a at a time of the input operation or at a time of the input determination and it becomes possible to present the sense of touch with respect to the operator's finger 30a.

In this embodiment, although a case where the key-top 14 is provided on the left side of the lower housing 11b as shown in FIG. 17 has been described, of course, it is not limited to this; it is needless to say that a similar effect is obtained also with respect to a case where the key-top is provided on the right side of the lower housing 11b.

[Embodiment 5]

Figure 18:
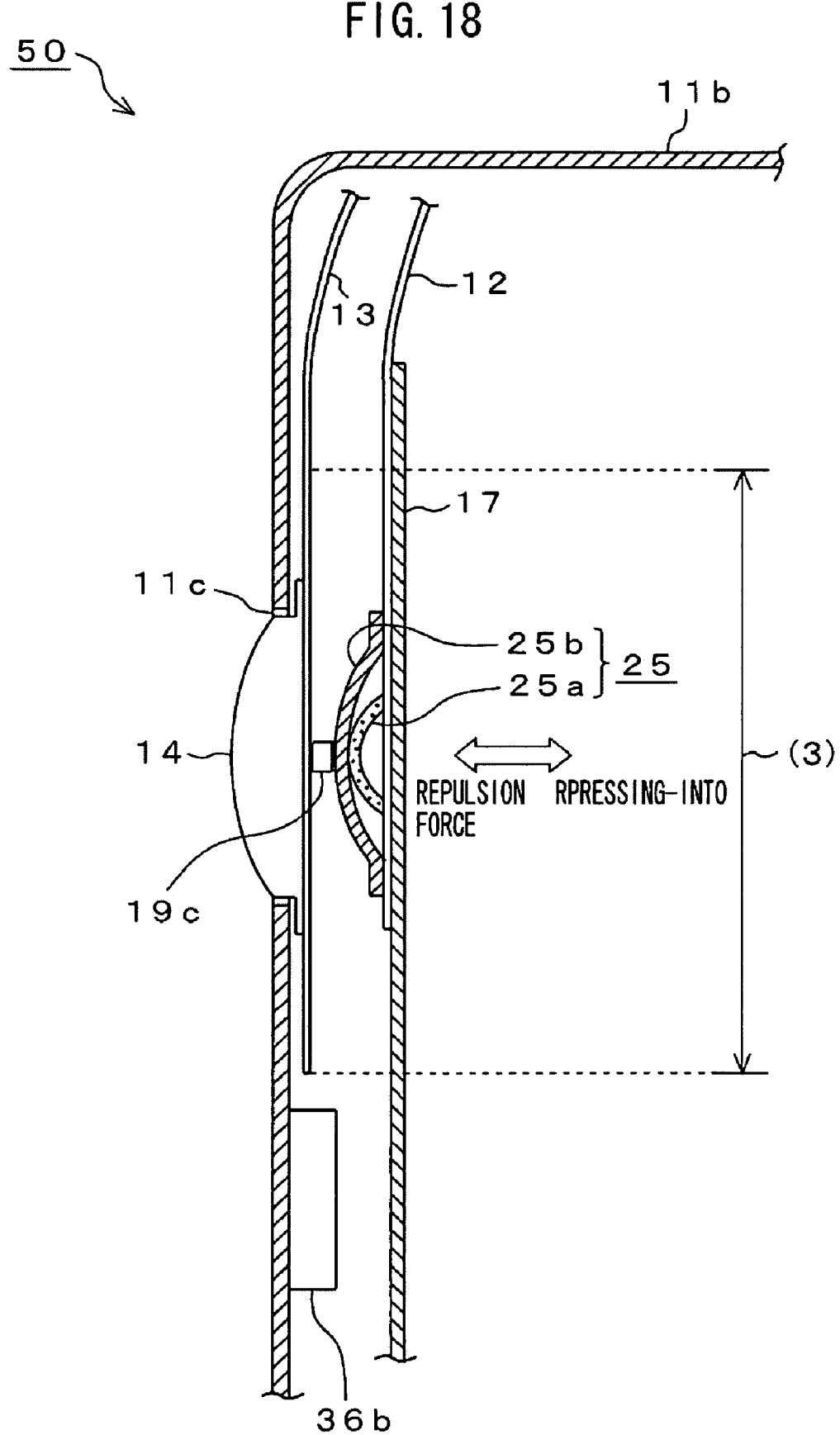
FIG. 18 is a cross-section diagram of an input device 50 as a fifth embodiment, showing an internal configuration thereof.

FIG. 18 shows an internal configuration of an input device 50 as a fifth embodiment. In this embodiment, a protrusion member 19c is to be mounted later on instead of the pusher piece 19. The input device 50 shown in FIG. 18 is constituted such that the rectangular-shaped pusher piece 19 is eliminated from the input device 40 previously explained and the protrusion member 19c is to be arranged instead thereof.

On the inside of the key-top 14, there are arranged the sensor 13, the protrusion member 19c, the dome switch 25 and circuit board 17 in this order. The protrusion member 19c is arranged so as to be sandwiched between the sensor 13 and the side portion of the circuit board 17. In this embodiment, the protrusion member 19c is constituted, for example, so as to be pasted by adhesive approximately at the center region of the detection area (3) of the sensor 13. It is needless to say that the protrusion member 19c may be integrally molded in the forming process of the sensor 13.

This method is employed based on a fact that while the sensor 13 of the electrostatic capacitance sheet member has lined at the plane region of the pusher piece 19 in the third embodiment, the lining member can be omitted when the bending strength or the like of the plane of the electrostatic capacitance sheet member or the like can be adequately maintained. With respect to other component parts, they are similar as those of the first to fourth embodiments, so that the explanation thereof will be omitted. FIG. 10 should be referred to with respect to an operation example of the input device 50.

In this manner, according to the input device 50 relating to the fifth embodiment, it is constituted such that the key-top 14, the sensor 13 and the dome switch 25 pushed down through the protrusion member 19c are provided at the side portion of the circuit board 17 and the key-top 14 is press-in operated after the information selection of the scroll image 29a', 29b' or the like. Consequently, by turning on or/and off the dome switch 25, it becomes possible also for the unrotary key-top 14 to be applied to a determination key when determining the input. Furthermore, the protrusion member 19c is mounted later on with respect to the sensor 13, so that it becomes possible to reduce the number of parts and parts cost.

In this embodiment, although a case where the key-top 14 is provided on the left side of the lower housing 11b as shown in FIG. 18 has been described of course, it is not limited to this; it is needless to say that a similar effect is obtained also with respect to a case where the key-top is provided on the right side of the lower housing 11b.

[Embodiment 6]

Figure 19:
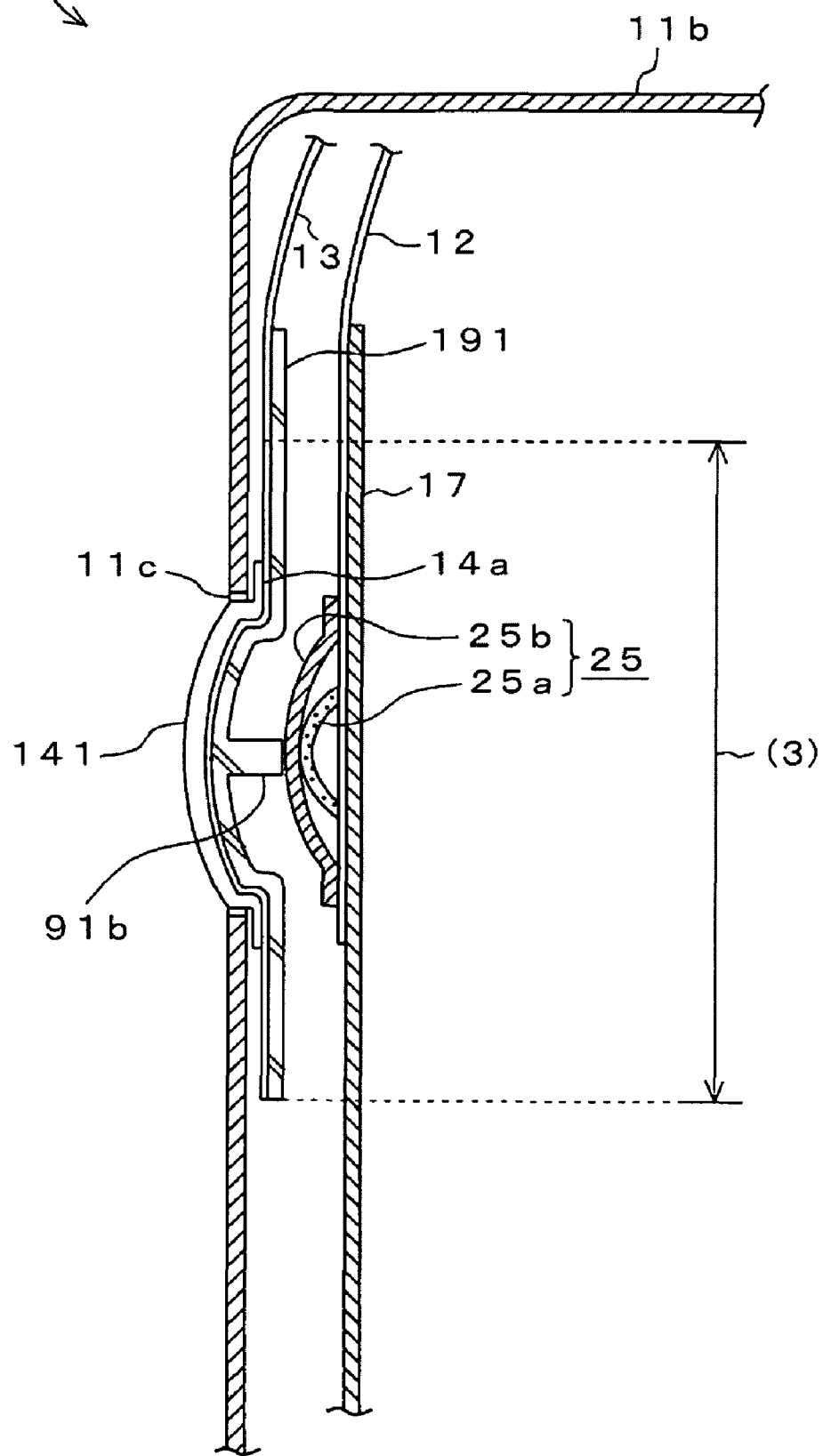
FIG. 19 is a cross-section diagram of an input device 60 as a sixth embodiment, showing an internal configuration thereof.

FIG. 19 shows an internal configuration of an input device 60 as a sixth embodiment. In this embodiment, there is provided with a key-top 141 having a rear surface of a concave shape instead of the key-top 141 whose rear surface is flat shaped and there is provided with a pusher piece 191 of an insertion type from the rear-surface of the key-top, which has a rear surface of a concave shape instead of the pusher piece 19.

According to the input device 60 shown in FIG. 19, the operation surface of the key-top 141 has the same arc convex shape as the key-top shape shown in FIG. 3 to FIG. 18, but the rear surface thereof has a concave shape. In this embodiment, for the pusher piece 191, a part formed with a convex shape so as to be insertable to the concave portion of the rear surface of the key-top 141 is used. For example, by sealing a resin into a die modeled with the inside concave shape of the key-top 141, the pusher piece 191 which is formed with the convex shape thereof is formed. There is provided approximately at the center region of the pusher piece 191 with a protrusion portion 91b similarly as the pusher piece 19.

Also in the input device 60, the key-top 141 is built in at the opening portion 11c of the lower housing 11b. At that time, similarly as the third embodiment, the key-top 141 is combined by directing the non-operation surface thereof toward the inside of the lower housing 11b and the brim shaped flange 14a of the key-top 141 is hooked on the inside of the lower housing 11b surrounding the opening portion 11c. This enables the key-top 141 to be prevented from being slipped out of the opening portion 11c.

At the concave portion on the inside of the key-top 141, there are arranged the sensor 13, the pusher piece 191, the dome switch 25 and circuit board 17 in this order. The protrusion portion 91b of the pusher piece 191 is arranged at a position so that it can press the sensor 13. The pusher piece 191 is arranged in the concave portion on the inside of the key-top 141 so as to be along the sensor 13. Also in this embodiment, the pusher piece 191 has a length approximately equal to the detection area (3) of the sensor 13. With respect to the function of the dome switch 25, it has been explained in the third embodiment, so that the explanation thereof will be omitted. It is needless to say that the speaker 36b with an actuator function, which is not shown, may be provided. FIG. 10 should be referred to with respect to an operation example of the input device 60.

In this manner, according to the input device 60 relating to the sixth embodiment, it is constituted such that the key-top 141, the sensor 13 and the dome switch 25 pushed down through the pusher piece 191 are provided at the side portion of the circuit board 17 and the key-top 141 is press-in operated after the information selection of the scroll image 29a', 29b' or the like. Consequently, by turning on or/and off the dome switch 25, it becomes possible also for the unrotary key-top 141 whose rear surface forms a concave shape to be applied to a determination key when determining the input. In a case where an adequate space (separation distance) is difficult to be secured between the inside surface of the lower housing 11b and the circuit board 17, this structure functions advantageously and has a large essence for contributing to the compactification of the input device 60.

In this embodiment, although a case where the key-top 141 is provided on the left side of the lower housing 11b as shown in FIG. 19 has been described, of course, it is not limited to this; it is needless to say that a similar effect is obtained also with respect to a case where the key-top is provided on the right side of the lower housing 11b.

[Embodiment 7]

Figure 20:
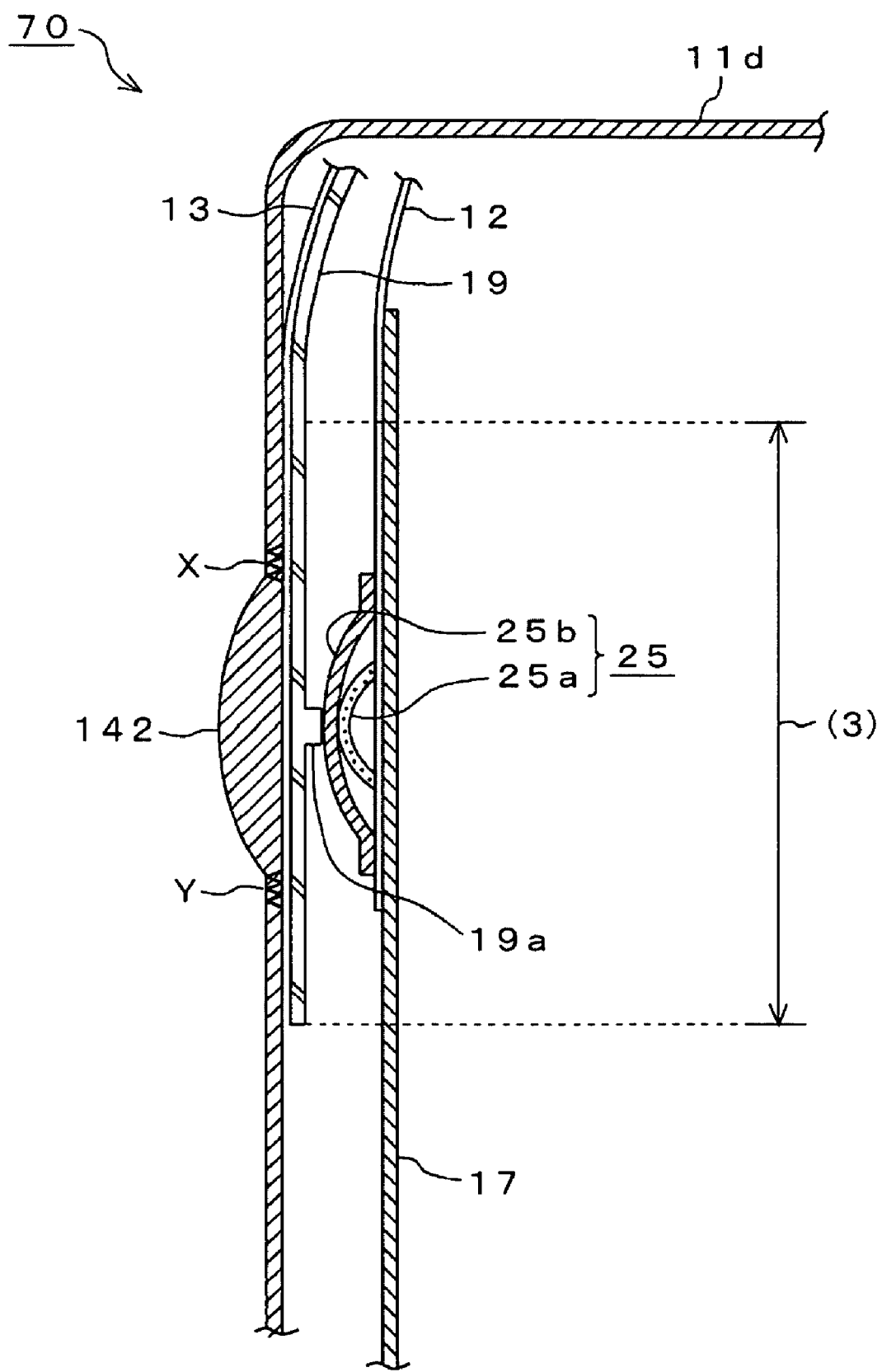
FIG. 20 is a cross-section diagram of an input device 70 as a seventh embodiment, showing an internal configuration thereof.

FIG. 20 shows an internal configuration of an input device 70 as a seventh embodiment. In this embodiment, the lower housing 11d and the key-top 142 whose rear surface is flat shaped are formed by being molded integrally instead of the key-top 14 whose rear surface is flat shaped.

The input device 70 shown in FIG. 20 includes a lower housing 11d with a key-top whose rear surface is flat shaped. According to the lower housing 11d, the operation surface of the key-top 142 has the same arc convex shape as the key-top shape shown in FIG. 3 to FIG. 18, but the main body thereof is integrally molded with the lower housing 11d. For example, by sealing a resin into a die modeled with the lower housing 11d and the key-top 142, the lower housing 11d with a key-top of an arc convex shape is integrally molded.

In this embodiment, a structure in which the key-top 142 is movable to the inside direction of the lower housing 11d is employed in order to press-into the dome switch 25. For example, the vicinity of the upward start portion "x" and the vicinity of the downward end portion "Y" of the key-top 142 are processed in bellows-shapes. It is enough if the portions processed in bellows-shapes are set accordingly in response to the strength of the resin material constituting the lower housing 11d. Thus, the airtight structure and the pressing-into structure of the key-top 142 are made compatible.

Also in this embodiment, on the inside of the key-top 142, there are arranged the sensor 13, the pusher piece 19, the dome switch 25 and circuit board 17 in this order. For the sensor 13, a sensor explained in the third embodiment is used. The pusher piece 19 is arranged so as to be sandwiched between the sensor 13 and the side portion of the circuit board 17. It should be noted with respect to the structure and the function of the dome switch 25, they have been explained in the third embodiment, so that the explanation thereof will be omitted. It is needless to say that the speaker 36b with an actuator function, which is not shown, may be provided. FIG. 10 should be referred to with respect to an operation example of the input device 70.

In this manner, according to the input device 70 as the seventh embodiment, the lower housing 11d and the key-top 142 whose rear surface is flat shaped are molded integrally instead of the key-top 14 whose rear surface is flat shaped. Consequently, the assembly of the input device 70 becomes simple as compared with the method in which the key-top 14, 141 or the like is built in at the opening portion 11c of the lower housing 11b as explained in the first to sixth embodiments. Thus, it becomes possible to provide the input device 70 abundant in water-resistance.

Furthermore, the key-top 142 may be press-in-operated after the information selection of the scroll image 29a', 29b' or the like. Consequently, by turning on or/and off the dome switch 25, it becomes possible also for the unrotary key-top 142 forming an airtight shape of the rear surface thereof to be applied to a determination key when determining the input.

In this embodiment, although a case where the key-top 142 is provided on the left side of the lower housing 11d as shown in FIG. 20 has been described, of course, it is not limited to this; it is needless to say that a similar effect is obtained also with respect to a case where the key-top is provided on the right side of the lower housing 11d.

[Embodiment 8]

Figure 21:
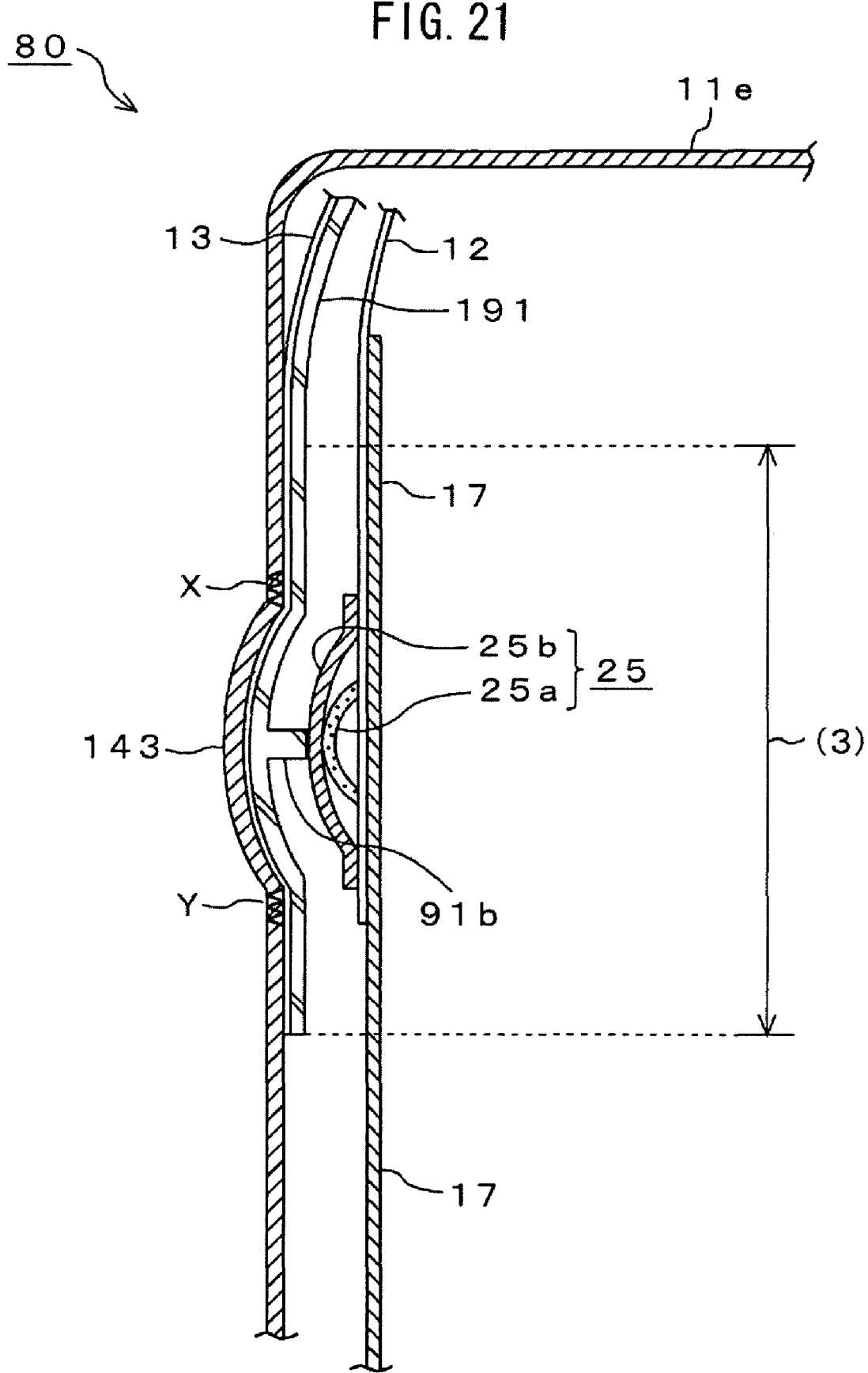
FIG. 21 is a cross-section diagram of an input device 80 as an eighth embodiment, showing an internal configuration thereof.

FIG. 21 shows an internal configuration of an input device 80 as an eighth embodiment. In this embodiment, it is constituted such that the lower housing 11e and a key-top 143 having a rear surface of a concave shape are molded integrally instead of the key-top 142 whose rear surface is flat shaped.

The input device 80 shown in FIG. 21 includes a lower housing 11e with a key-top having a rear surface of a concave shape. According to the lower housing 11e, the operation surface of the key-top 143 has the same arc convex shape as the key-top shape shown in FIG. 3 to FIG. 18, but the rear surface thereof has a concave shape. In this embodiment, for the pusher piece 191, a part formed with a convex shape so as to be insertable to the concave portion of the rear surface of the key-top 143 is used. For example, by sealing a resin into a die modeled with the inside concave shape of the key-top 143, the pusher piece 191 which is formed with the convex shape thereof is formed. A protrusion portion 91b similarly as the pusher piece 19 is provided approximately at the center region of the pusher piece 191.

Also in the input device 80, a structure in which the key-top 143 is movable to the inside direction of the lower housing 11e is employed in order to press-into the dome switch 25. For example, the vicinity of the upward start portion "X" and the vicinity of the downward end portion "Y" of the key-top 143 are processed in bellows-shapes. It is enough if the portions processed in bellows-shapes are set accordingly in response to the strength of the resin material constituting the lower housing 11e. Thus, the airtight structure and the pressing-into structure of the key-top 143 are made compatible.

At the concave portion on the inside of the key-top 143, there are arranged the sensor 13, the pusher piece 191, the dome switch 25 and circuit board 17 in this order. The protrusion portion 91b of the pusher piece 191 is arranged at a position so that it can press the sensor 13. The pusher piece 191 is arranged in the concave portion on the inside of the key-top 143 so as to be along the sensor 13. Also in this embodiment, the pusher piece 191 has a length approximately equal to the detection area (3) of the sensor 13. With respect to the function of the dome switch 25, it has been explained in the third embodiment, so that the explanation thereof will be omitted. It is needless to say that the speaker 36*b* with an actuator function, which is not shown, may be provided. FIG. 10 should be referred to with respect to an operation example of the input device 80.

In this manner, according to the input device 80 relating to the eighth embodiment, it is constituted such that the lower housing 11*e* and a key-top 143 having a rear surface of a concave shape are molded integrally instead of the key-top 142 whose rear surface is flat shaped.

Consequently, the assembly of the input device 80 becomes simple as compared with the method in which the key-top 14, 141 or the like is built in at the opening portion 11*c* of the lower housing 11*b* as explained in the first to seventh embodiments. This enables to be provided the input device 80 of airtight structure abundant in water-resistance.

Furthermore, the key-top 143 may be press-in-operated after the information selection of the scroll image 29*a'*, 29*b'* or the like. Consequently, by turning on or/and off the dome switch 25, it becomes possible also for the unrotary key-top 143 forming an airtight shape of the rear surface thereof to be applied to a determination key when determining the input. Further, when an adequate space (separation distance) is difficult to be secured between the inside surface of the lower housing 11*e* and the circuit board 17, this structure functions advantageously and has a large essence for contributing to the compactification of the input device 80.

In this embodiment, although a case where the key-top 143 is provided on the left side of the lower housing 11*e* as shown in FIG. 21 has been described, of course, it is not limited to this; it is needless to say that a similar effect is obtained also with respect to a case where the key-top is provided on the right side of the lower housing 11*e*.

[Embodiment 9]

Figure 22A:
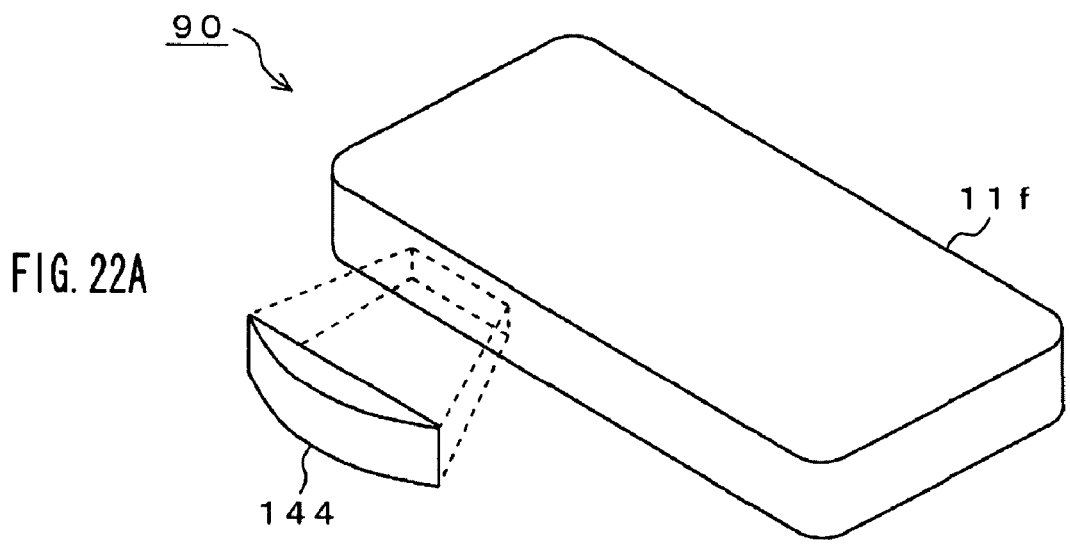
FIG. 22A is a perspective view of an input device 90 as a ninth embodiment, showing an appearance example.
Figure 22B:
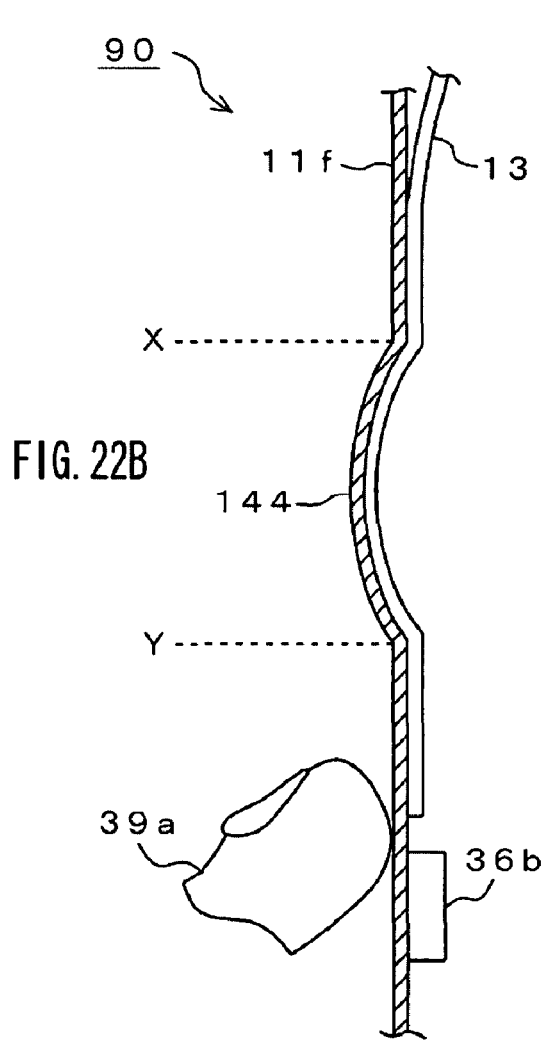
FIGS. 22B and 22C are cross-section diagrams each showing the internal configuration thereof.
Figure 22C:
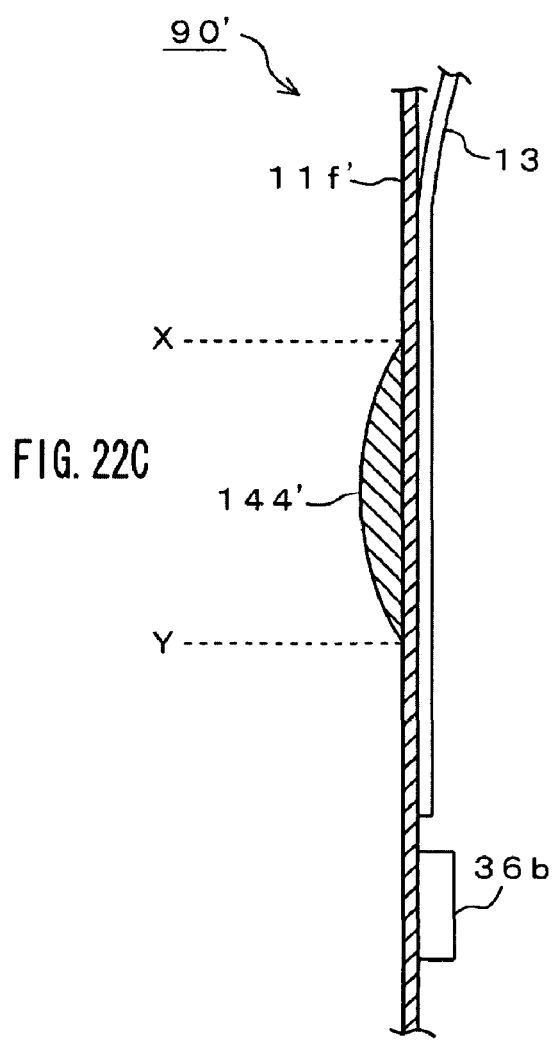

FIG. 22A shows an appearance example of an input device 90 as a ninth embodiment and FIGS. 22B and 22C show an internal configuration thereof.

In this embodiment, it is constituted such that the lower housing 11*f* and a key-top 144 having a rear surface of a concave shape are molded integrally instead of the key-top 143 whose rear surface is flat shaped and which has been explained in the eighth embodiment. The dome switch 25 and the pusher piece 191 are eliminated.

The input device 90 shown in FIG. 22A includes a lower housing 11*f* with a key-top having a rear surface of a concave shape. According to the lower housing 11*f*, the operation surface of the key-top 144 has the same arc convex shape as the key-top shape shown in FIG. 3 to FIG. 18, but the rear surface thereof has a concave shape as shown in FIG. 22B. For example, by sealing a resin into a die for the lower housing, which is modeled with an arc convex shape which becomes the key-top 144, the lower housing 11*f* having a convex shape for the portion thereof is formed.

In this embodiment, the sensor 13 is arranged at the concave portion on the inside of the key-top 144. Thus, it is possible to form the input device 90 including the key-top 144 as an airtight structure. Also, it is constituted such that the speaker 36*b* with an actuator function as shown in FIG. 14 is provided on the inside of the lower housing 11*f* and at a position near the key-top 144 so that sense of touch can be presented to the operator's finger 30*a*.

In the airtight structure mentioned above, there is employed a method in which a portion of the lower housing 11*f* is protruded in an arc convex shape, but as shown in FIG. 22C, it is also allowed to employ a structure in which the lower housing 11*f'* and the key-top 144' of an arc convex shape are fabricated separately and the key-top 144' is pasted on the side surface of the lower housing 11*f'*. For example, the key-top 144' is bonded on the side surface of the lower housing 11*f'* by using an UV cure resin or the like. Thus, it is possible to form the input device 90' including the key-top 144' as an airtight structure. FIG. 10 should be referred to with respect to an operation example of the input devices 90, 90'.

In this manner, according to the input device 90 relating to the ninth embodiment, it is constituted such that the lower housing 11*f* and a key-top 144 having a rear surface of a concave shape are molded integrally instead of the key-top 142 whose rear surface is flat shaped and which has been explained in the seventh embodiment.

Consequently, the assembly of the input device 90 becomes simple as compared with the method in which the key-top 14, 141 or the like is built in at the opening portion 11*c* of the lower housing 11*b* as explained in the first to sixth embodiments. Thus, it becomes possible to provide the input device 90 of airtight structure abundant in water-resistance. Of course, as shown in FIG. 22C, it is also allowed to employ a structure in which the key-top 144 of an arc convex shape is pasted on the flat side surface of the lower housing 11*f*. When an adequate space (separation distance) is difficult to be secured between the inside surface of the lower housing 11*f* and the circuit board 17, which is not shown, this structure functions advantageously and has a large essence for contributing to the compactification of the input devices 90, 90'. It should be noted that by eliminating the dome switch 25, it is possible to omit the bellows-shaping process in the vicinity of the upward start portion "X" and in the vicinity of the downward end portion "Y" of the key-top 144, 144'.

In this embodiment, although a case where the key-top 144 or the like is provided on the left side of the lower housing 11*f* as shown in FIG. 22 has described, of course, it is not limited to this; it is needless to say that a similar effect is obtained also with respect to a case where the key-top is provided on the right side of the lower housing 11*f*.

[Embodiment 10]

Figure 23A:
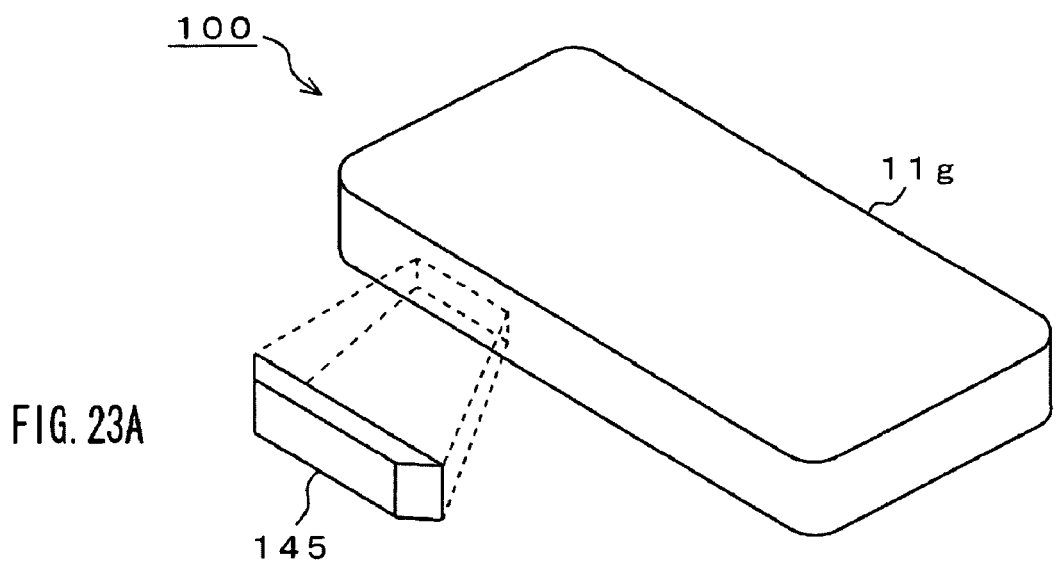
FIG. 23A is a perspective view of an input device 100 as a tenth embodiment, showing an appearance example.
Figure 23B:
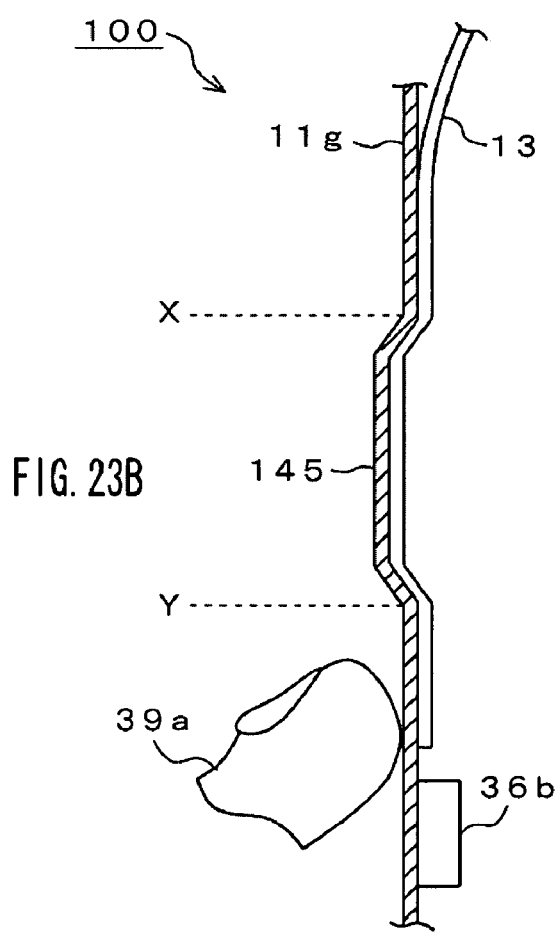
FIGS. 23B and 23C are cross-section diagrams each showing the internal configuration thereof.
Figure 23C:
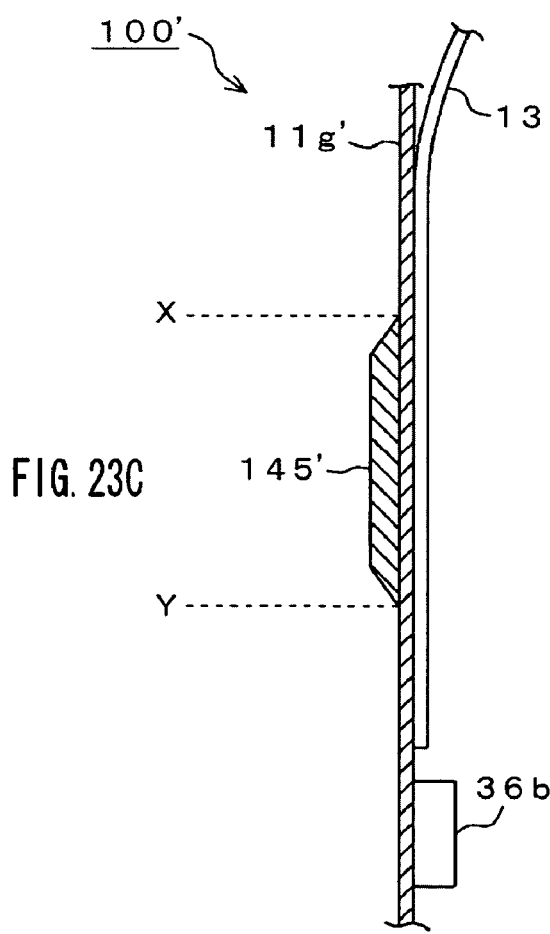

FIGS. 23A to 23C show a configuration of an input device 100 as a tenth embodiment.

In this embodiment, it is constituted such that the lower housing 11*g* and a key-top 145 having a front surface of a trapezoidal shape are molded integrally instead of the key-top 144 of an arc convex shape which has been explained in the ninth embodiment. The dome switch 25 and the pusher piece 191 are eliminated.

The input device 100 shown in FIG. 23A includes a lower housing 11*g* with a key-top having a front surface of a trapezoidal shape and also having a rear surface of a concave shape. According to the lower housing 11*g*, the operation surface of the key-top 145 has a trapezoidal shape that is different from the key-top shapes shown in FIG. 3 to FIG. 21 and the rear surface thereof has a concave shape as shown in FIG. 23B. For example, by sealing a resin into a die for the lower housing, which is modeled with an inside trapezoidal shape which becomes the key-top 145, the lower housing 11*g* having a convex shape for the portion thereof is formed.

Also in this embodiment, the sensor 13 is arranged at the concave portion on the inside of the key-top 145. Thus, it is possible to form the input device 100 including the key-top 145 as an airtight structure. Also, it is constituted such that the speaker 36*b* with an actuator function as shown in FIG. 14 is provided on the inside of the lower housing 11*g* and at a position near the key-top 145 so that sense of touch can be presented to the operator's finger 30*a*.

In the above-mentioned airtight structure, a method in which a portion of the lower housing 11*g* is protruded in a trapezoidal shape is employed, but as shown in FIG. 23C, it is also allowed to employ a structure in which the lower housing 11*g*' and the key-top 145' of a trapezoidal shape are fabricated separately and the key-top 145' is pasted on the side surface of the lower housing 11*g*'. For example, the key-top 145' is bonded on the side surface of the lower housing 11*g*' by using an UV cure resin or the like. Thus, it is possible to form the input device 100' including the key-top 145' as an airtight structure. FIG. 10 should be referred to with respect to an operation example of the input devices 100, 100'.

In this manner, according to the input device 100 relating to the tenth embodiment, the lower housing 11*g* and a key-top 145 having a front surface of a trapezoidal shape are molded integrally instead of the key-top 144 of an arc convex shape which has been explained in the ninth embodiment.

Consequently, the assembly of the input device 100 becomes simple as compared with the method in which the key-top 14, 141 or the like is built in at the opening portion 11*c* of the lower housing 11*b* as explained in the first to sixth embodiments. Thus, it becomes possible to provide the input device 100 of airtight structure abundant in water-resistance. Of course, as shown in FIG. 23C, it is also allowed to employ a structure in which the key-top 145' of a trapezoidal shape is pasted on the flat side surface of the lower housing 11*g*'. When an adequate space (separation distance) is difficult to be secured between the inside surface of the lower housing 11*g*' and the circuit board 17, which is not shown, this structure functions advantageously and has a large essence for contributing to the compactification of the input devices 100, 100'. It should be noted that by eliminating the dome switch 25, it is possible to omit the bellows-shaping process in the vicinity of the upward start portion "X" and in the vicinity of the downward end portion "Y" of the key-top 145, 145'.

In this embodiment, although a case where the key-top 145 or the like is provided on the left side of the lower housing 11*g* as shown in FIG. 23 has been described, of course, it is not limited to this; it is needless to say that a similar effect is obtained also with respect to a case where the key-top is provided on the right side of the lower housing 11*g*.

[Embodiment 11]

Figure 24A:
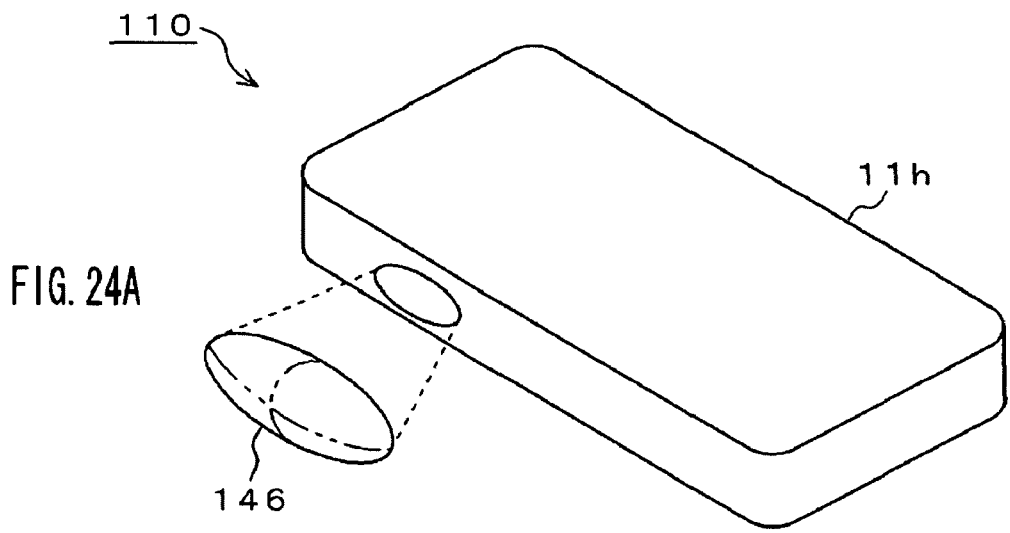
FIG. 24A is a perspective view of an input device 110 as a eleventh embodiment, showing an appearance example.
Figure 24B:
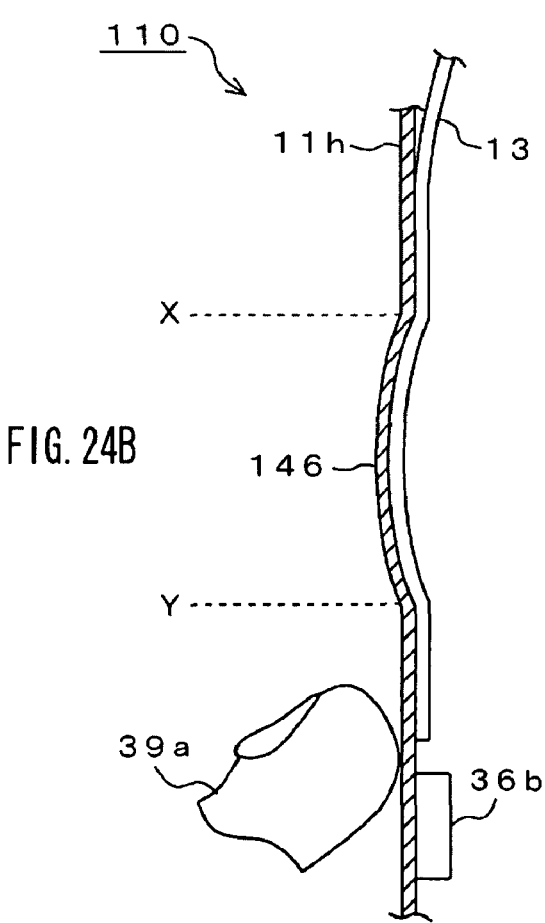
FIGS. 24B and 24C are cross-section diagrams each showing the internal configuration thereof.
Figure 24C:
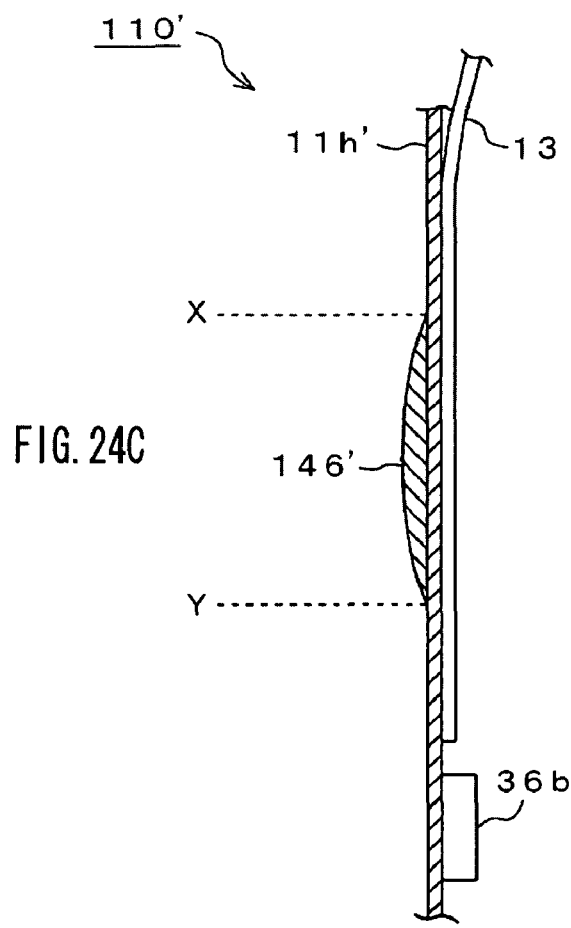

FIGS. 24A to 24C show a configuration of an input device 110 as an eleventh embodiment.

In this embodiment, it is constituted such that the lower housing 11*h* and a key-top 146 having a front surface of a slug dome shape are molded integrally instead of the key-top 145 of a trapezoidal shape which has been explained in the tenth embodiment. The dome switch 25 and the pusher piece 191 are eliminated.

The input device 110 shown in FIG. 24A includes a lower housing 11*h* with a key-top having a front surface of a slug dome shape and also having a rear surface of a concave shape. According to the lower housing 11*h*, the operation surface of the key-top 146 has a slug dome shape that is different from the key-top shapes shown in FIG. 3 to FIG. 23 and the rear surface thereof has a concave shape as shown in FIG. 24B. For example, by sealing a resin into a die for the lower housing, which is modeled with an inside slug dome shape which becomes the key-top 146, the lower housing 11*h* having a convex shape for the portion thereof is formed.

Also in this embodiment, the sensor 13 is arranged at the concave portion on the inside of the key-top 146. Thus, it is possible to form the input device 110 including the key-top 146 as an airtight structure. Also, it is constituted such that the speaker 36*b* with an actuator function as shown in FIG. 14 is provided on the inside of the lower housing 11*h* and at a position near the key-top 146 so that sense of touch can be presented to the operator's finger 30*a*.

In the above-mentioned airtight structure, there is employed a method in which a portion of the lower housing 11*h* is protruded in a trapezoidal shape, but as shown in FIG. 24C, it is also allowed to employ a structure in which the lower housing 11*h*' and the key-top 146' of a trapezoidal shape are fabricated separately and the key-top 146' is pasted on the side surface of the lower housing 11*h*'. For example, the key-top 146' is bonded on a side surface of the lower housing 11*h*' by using an UV cure resin or the like. Thus, it is possible to form the input device 110' including the key-top 146' as an airtight structure. FIG. 10 should be referred to with respect to an operation example of the input devices 110, 110'.

In this manner, according to the input device 110 relating to the eleventh embodiment, it is constituted such that the lower housing 11*h* and a key-top 146 having a front surface of a slug dome shape are molded integrally instead of the key-top 145 of a trapezoidal shape which has been explained in the tenth embodiment.

Consequently, the assembly of the input device 110 becomes simple as compared with the method in which the key-top 14, 141 or the like is built in at the opening portion 11*c* of the lower housing 11*b* as explained in the first to sixth embodiments. Thus, it becomes possible to provide the input device 110 of airtight structure abundant in water-resistance. Of course, as shown in FIG. 24C, it is also allowed to employ a structure in which the key-top 146' having a front surface of a slug dome shape is pasted on the flat side surface of the lower housing 11*h*. When an adequate space (separation distance) is difficult to be secured between the inside surface of the lower housing 11*h* and the circuit board 17, which is not shown, this structure functions advantageously and has a large essence for contributing to the compactification of the input devices 110, 110'. It should be noted that by eliminating the dome switch 25, it is possible to omit the bellows-shaping process in the vicinity of the upward start portion "X" and in the vicinity of the downward end portion "Y" of the key-top 146, 146'.

In this embodiment, although a case where the key-top 146 or the like is provided on the left side of the lower housing 11*h* as shown in FIG. 24 has been described, of course, it is not limited to this; it is needless to say that a similar effect is obtained also with respect to a case where the key-top is provided on the right side of the lower housing 11*h*.

[Embodiment 12]

Figure 25A:
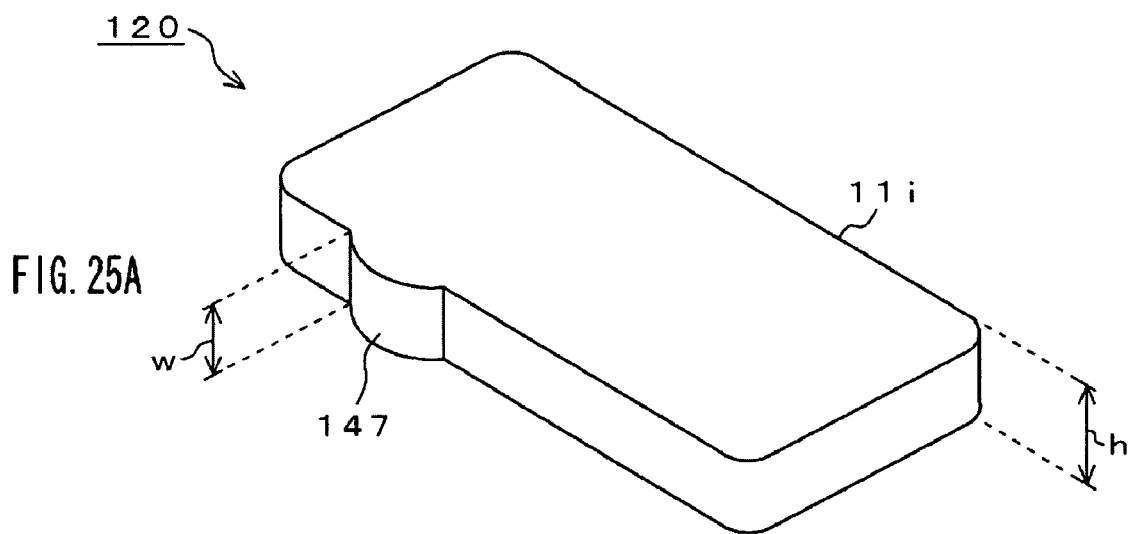
FIG. 25A is a perspective view of an input device 120 as a twelfth embodiment, showing an appearance example.
Figure 25B:
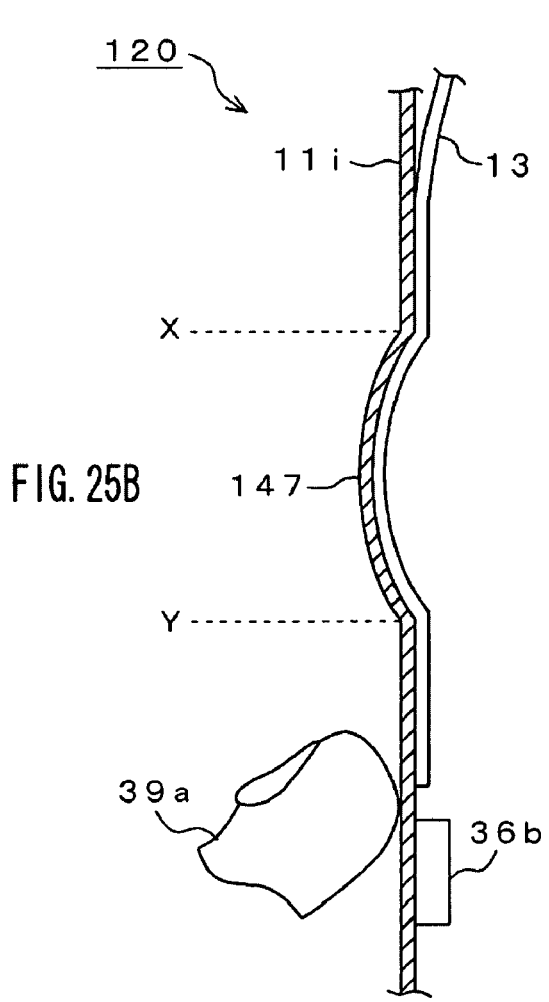
FIGS. 25B and 25C are cross-section diagrams each showing the internal configuration thereof.
Figure 25C:
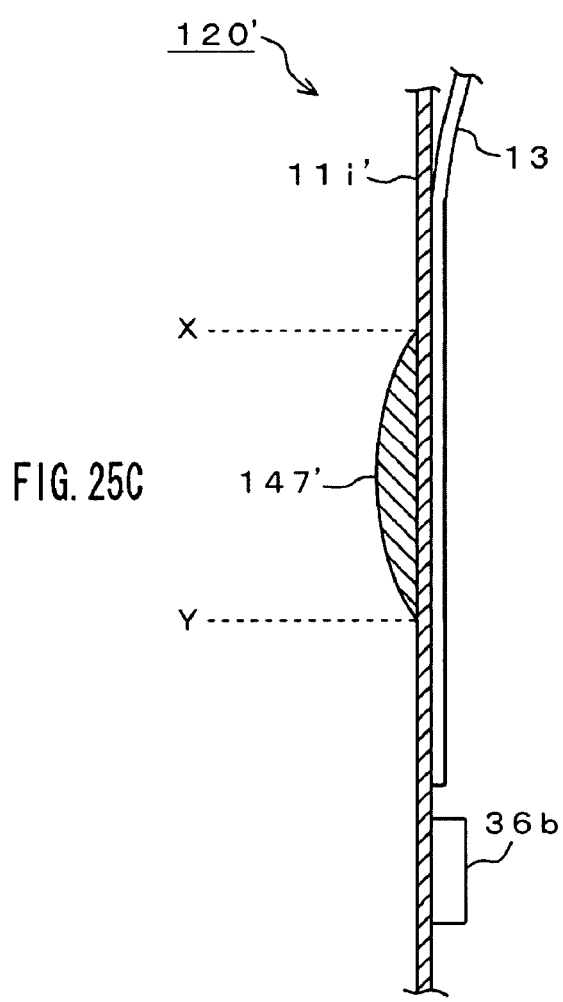

FIGS. 25A to 25C show a configuration of an input device 120 as a twelfth embodiment.

In this embodiment, it is constituted such that the lower housing 11*i* and a key-top 147 having a front surface of a semi-cylindrical dome shape are molded integrally instead of the key-top 146 having a front surface of a slug dome shape, which has been explained in the eleventh embodiment. The dome switch 25 and the pusher piece 191 are eliminated.

The input device 120 shown in FIG. 25A includes a lower housing 11*i* with a key-top having a front surface of a semi-cylindrical dome shape and also having a rear surface of a concave shape. According to the lower housing 11*i*, the operation surface of the key-top 147 has a semi-cylindrical dome shape that is different from the key-top shapes shown in FIG. 3 to FIG. 24. In this embodiment, when assuming, with respect to the key-top 147, that the width thereof is "w" and the height of the lower housing 11*i* is "h", such a relation as w=h is established. The rear surface of the key-top 147 has a concave shape as shown in FIG. 25B. For example, by sealing a resin into a die for the lower housing, which is modeled with an inside semi-cylindrical dome shape which becomes the key-top 147 having width "w", the lower housing 11i having height "h" and having a convex shape for the portion thereof is formed.

Also in this embodiment, the sensor 13 is arranged at the concave portion on the inside of the key-top 147. Thus, it is possible to form the input device 120 including the key-top 147 as an airtight structure. Also, it is constituted such that the speaker 36b with an actuator function as shown in FIG. 14 is provided on the inside of the lower housing 11i and at a position near the key-top 147 so that sense of touch can be presented to the operator's finger 30a.

In the above-mentioned airtight structure, there is employed a method in which a portion of the lower housing 11i is protruded in a semi-cylindrical dome shape, but as shown in FIG. 25C, it is also allowed to employ a structure in which the lower housing 11i' and the key-top 147' of a semi-cylindrical dome shape are fabricated separately and the key-top 147' is pasted on the side surface of the lower housing 11i'. For example, the key-top 147' is bonded on the side surface of the lower housing 11i' by using an UV cure resin or the like. Thus, it is possible to form the input device 120' including the key-top 147' as an airtight structure. FIG. 10 should be referred to with respect to an operation example of the input devices 120, 120'.

In this manner, according to the input device 120 relating to the twelfth embodiment, it is constituted such that the lower housing 11i and a key-top 147 having a front surface of a semi-cylindrical dome shape are molded integrally instead of the key-top 146 of a slug dome shape which has been explained in the eleventh embodiment.

Consequently, the assembly of the input device 120 becomes simple as compared with the method in which the key-top 14, 141 or the like is built in at the opening portion 11c of the lower housing 11b as explained in the first to sixth embodiments. Thus, it becomes possible to provide the input device 120 of airtight structure abundant in water-resistance. Of course, as shown in FIG. 25C, it is also allowed to employ a structure in which the key-top 147' having a front surface of a semi-cylindrical dome shape is pasted on the flat side surface of the lower housing 11i'. when an adequate space (separation distance) is difficult to be secured between the inside surface of the lower housing 11i and the circuit board 17, which is not shown, this structure functions advantageously and has a large essence for contributing to the compactification of the input devices 120, 120'. It should be noted that by eliminating the dome switch 25, it is possible to omit the bellows-shaping process in the vicinity of the upward start portion "X" and in the vicinity of the downward end portion "Y" of the key-top 147, 147'.

In this embodiment, although a case where the key-top 147 or the like is provided on the left side of the lower housing 11i as shown in FIG. 25 has been described, of course, it is not limited to this; it is needless to say that a similar effect is obtained also with respect to a case where the key-top is provided on the right side of the lower housing 11i.

[Embodiment 13]

Figure 26A:
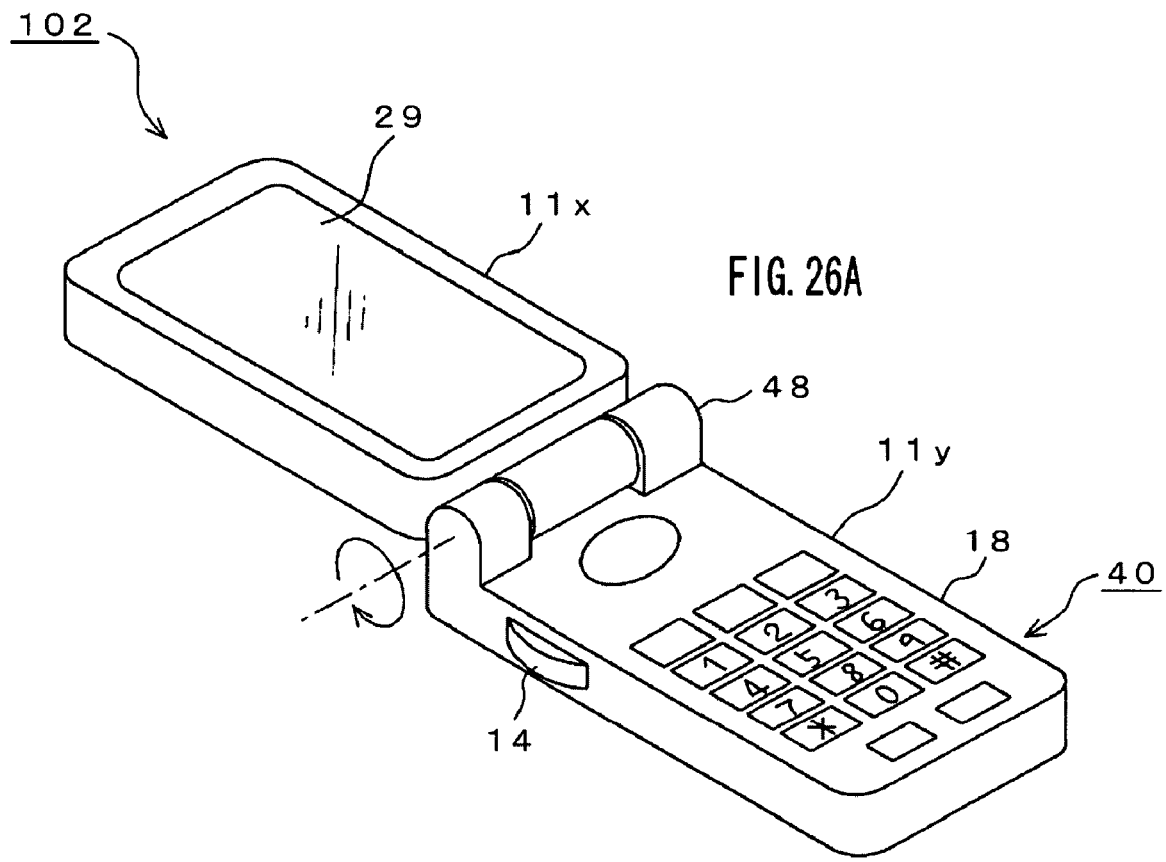
FIGS. 26A and 26B are perspective views of a mobile phone 102 as a thirteenth embodiment, showing a configuration thereof.
Figure 26B:
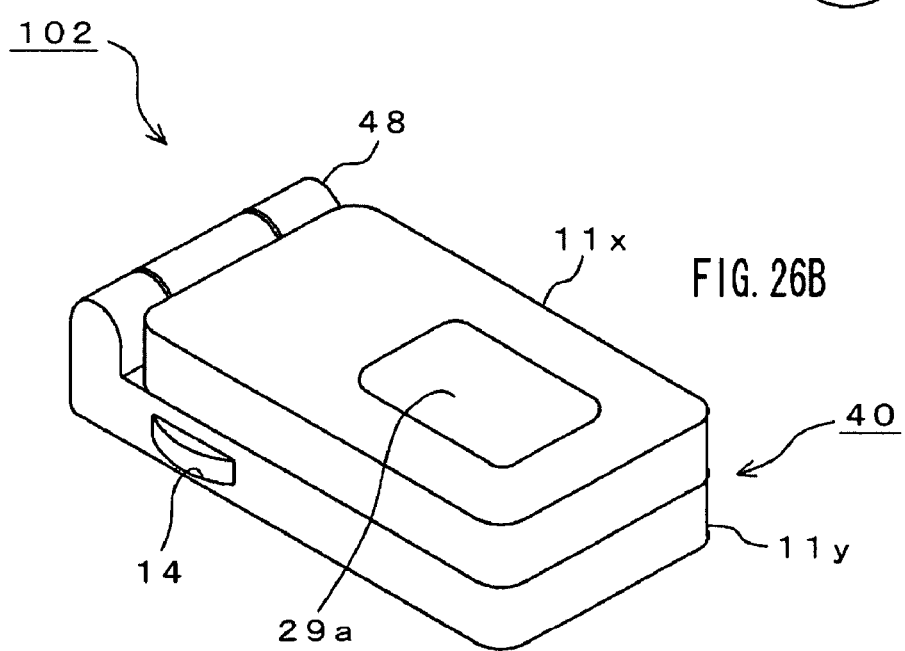

FIGS. 26A and 26B show a configuration of a mobile phone 102 as a thirteenth embodiment.

The mobile phone 102 shown in FIG. 26A constitutes one example of an electronic apparatus and includes a housing structure of a slide-type folding mechanism (Cram manner). The mobile phone 102 is constituted of an upper housing 11x and a lower housing 11y, and the upper housing 11x and the lower housing 11y are engaged freely rotatably by a hinge 48 (one axis). The input device 10 to the input device 120 explained in the first to twelfth embodiments are applied to the lower housing 11y. It is needless to say that any one of the input device 20 to the input device 120 explained in the second to twelfth embodiments may be applied to the mobile phone 101 explained in the first embodiment.

The mobile phone 102, as shown in FIG. 26B, has a lid-closing housing structure of the operation surface such that the upper housing 11x covers the operation surface on the lower housing 11y. In this embodiment, in a state of closing the upper housing 11x, there is provided on the closing surface thereof with a monitor 29a whose size is smaller than that of the display unit 29 and, for example, when utilizing the camera function of the mobile phone 102, the monitor 29a displays a subject image as a finder window portion.

The upper housing 11x is provided, similarly as the mobile phone 101 explained in the first embodiment, with the display unit 29 having a predetermined size on which a wait screen image, the phone number of the partner side or the like is displayed. A liquid crystal display monitor is used for the display unit 29. The lower housing 11y is provided, for example, with the input device 40 that is operated by the slide operation of the operator's finger 30a so as to input information.

The input device 40 includes the operation surface at an upper portion and a side portion and an operation panel 18 in which a ten-key of numerals [0] to [9], a symbol [*] key, a symbol [#] key and the like are arranged is included on the upper portion operation surface. The lower housing 11y is provided with the sensor 13 for detecting the slide position of the operator's finger 30a. The key-top 14 is provided so as to cover the entire surface of this sensor 13 and is slide-operated along the operation surface of the lower housing 11y. The key-top 14 is constituted so as to include a convex shape which becomes thicker along the sliding direction from one portion of the operation surface of the lower housing 11y and also which becomes thinner toward the other portion of the operation surface thereof (see FIG. 17).

Figure 27:
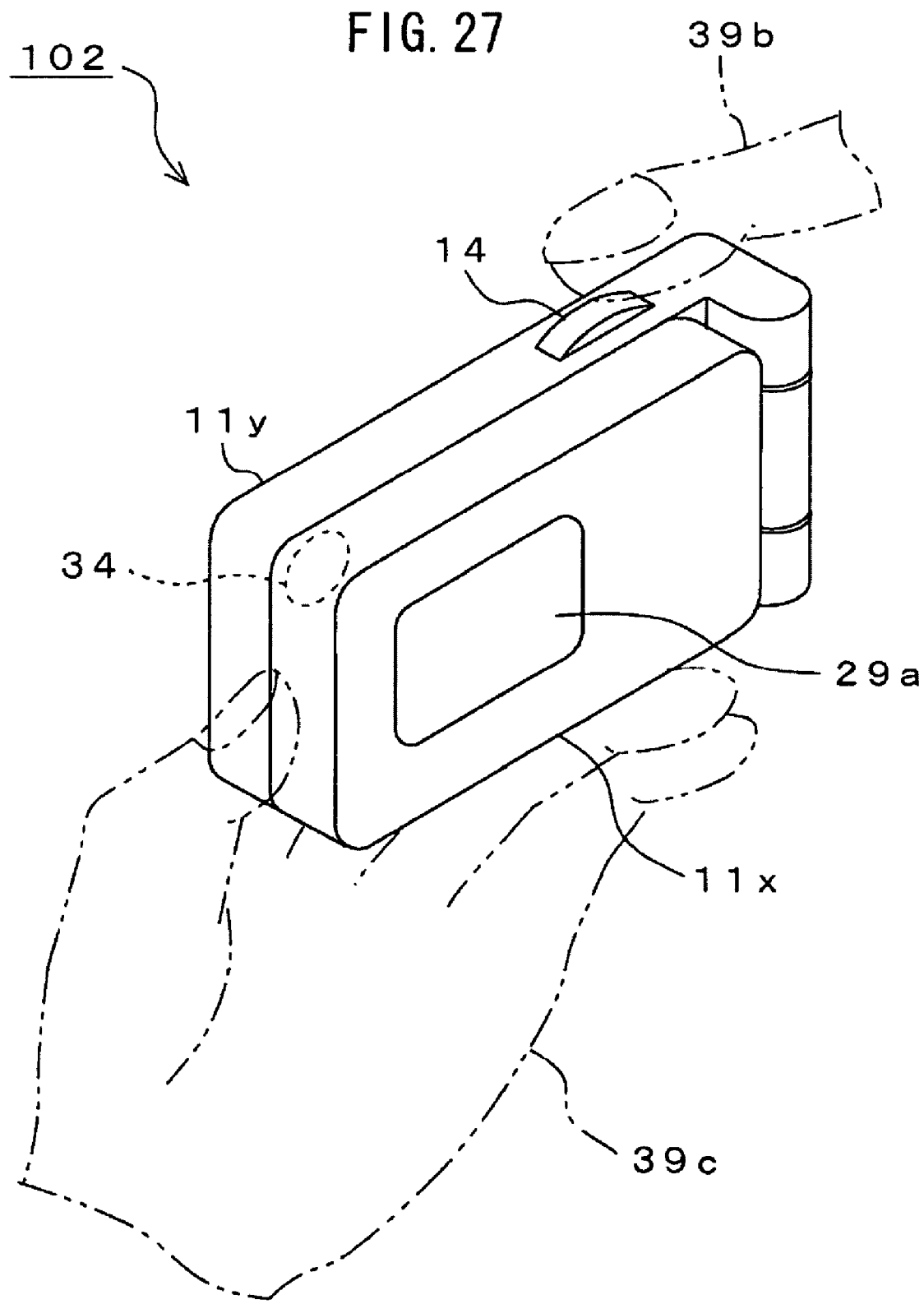
FIG. 27 is a perspective view of the mobile phone 102 showing a handling example on an occasion of imaging.

FIG. 27 shows a handling example on an occasion of taking a picture by the mobile phone 102. A camera 34 is arranged on the bottom surface of the lower housing 11y of the mobile phone 102 shown in FIG. 27. In this embodiment, when the mobile phone 102 is made to be in a state of lid-closing housing of the operation surface and the subject is imaged by utilizing the camera function thereof, the operator holds the mobile phone by his left hand 39c so as to direct the operation surface of the key-top 14 upward. Then, it is possible to use the key-top 14 such that the forefinger 39b of the operator's right hand executes a zoom-in slide operation or activates the shutter. The key-top 14 is not limited to the shutter function but can be used also for an image scaling process or a focus adjustment as various kinds of adjustment keys.

In this manner, according to the mobile phone 102 relating to the thirteenth embodiment, there is provided any one of the first to twelfth input devices 10 to 120 relating to the present embodiment, so that in addition to the slide operation feeling of becoming thicker along the sliding direction from one portion of the operation surface of the lower housing 11y with respect to the slide operation depending on the operator's finger 39b which operates the mobile phone 102, it is possible to present the slide operation feeling of becoming thinner toward the other portion of the operation surface thereof. Furthermore, when operating the shutter, it becomes possible to present sense of touch by the speaker 36b with an actuator function.

Consequently, it becomes possible to provide a non-rotary side jog tool or the like which has a structure that is different from a rotary side jog tool in the past and which obtains the operation feeling approximately similar to such a side jog tool. Furthermore, miniaturization and operability of the mobile phone 102 can be improved, so that it is possible to attempt the lowering of malfunction, cost-down and the simplification of manufacturing process of the mobile phone 102.

It should be noted, in case of utilizing a music player function of the mobile phone 102, that the monitor 29*a* is constituted as a musical composition selection window portion such that images of titles, names of musicians and the like are scroll-displayed and it becomes possible to execute the scroll-operation or the volume adjustment of the reproduced sound depending on the key-top 14.

In this embodiment, although a case where the key-top 14 is provided on the left side of the lower housing 11*y* as shown in FIG. 26 has been described, of course, it is not limited to this; it is needless to say that a similar effect is obtained also with respect to a case where the key-top is provided on the right side of the lower housing 11*y*.

[Embodiment 14]

Figure 28A:
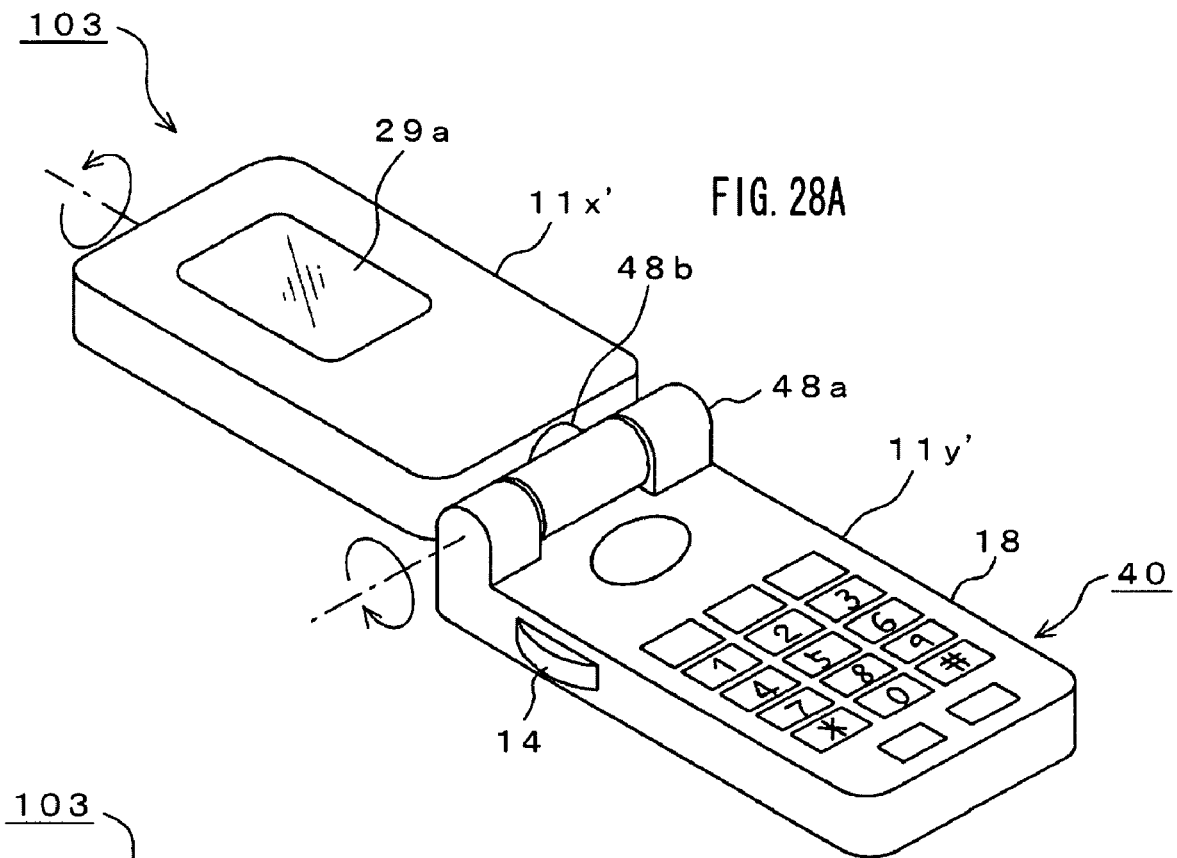
FIGS. 28A and 28B are perspective views of a mobile phone 103 as a fourteenth embodiment, showing a configuration.
Figure 28B:
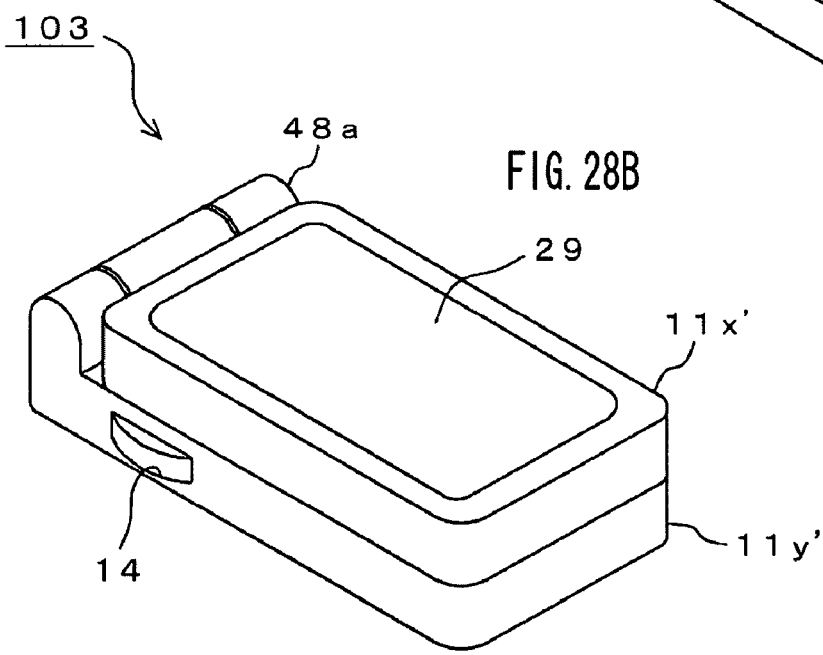

FIGS. 28A and 28B show a configuration of a mobile phone 103 as a fourteenth embodiment.

The mobile phone 103 shown in FIG. 28A constitutes one example of an electronic apparatus and includes a housing structure of a two-axis hinge type folding mechanism. The mobile phone 103 contains an upper housing 11*x'* and a lower housing 11*y'*, and the upper housing 11*x'* and the lower housing 11*y'* are engaged freely rotatably by two hinges 48*a*, 48*b* (two axes). The hinge 48*a* engages the upper housing 11*x'* and the lower housing 11*y'* freely in open and in close similarly as the thirteenth embodiment. The hinge 48*b* is arranged so as to be perpendicular to the hinge 48*a* and engages the upper housing 11*x'* rotatably with respect to the lower housing 11*y'*. Any one of the input device 10 to the input device 120 explained in the first to twelfth embodiments may be applied to the lower housing 11*y'*.

The upper housing 11*x'* is provided, similarly as the mobile phone 101 explained in the first embodiment, with the display unit 29 having a predetermined size on which a wait screen image, the phone number of the partner side or the like is displayed. A liquid crystal display monitor is used for the display unit 29. With respect to the mobile phone 103, there is employed a first lid-closing housing structure of the operation surface such that the upper housing 11*x'* directing the monitor 29*a* upward covers the operation surface on the lower housing 11*y'* (see FIG. 26B) and a second lid-closing housing structure of the operation surface as shown in FIG. 28B such that the upper housing 11*x'* directing the display unit 29 upward covers the operation surface on the lower housing 11*y'*.

In this embodiment, in a state of closing the upper housing 11*x'* which directs the display unit 29 upward, the monitor 29*a* faces the closing surface thereof. For example, when utilizing one-segment television function of the mobile phone 103, the display unit 29 displays a broadcasting program as a television receiving screen. The lower housing 11*y'* is provided, for example, with the input device 40 that is operated so as to input information according to the slide operation of the operator's finger 30*a*.

The input device 40 includes the operation surface at an upper portion and a side portion and an operation panel 18 in which a ten-key of numerals [0] to [9], a symbol [*] key, a symbol [#] key and the like are arranged is included on the upper portion operation surface. The sensor 13 for detecting the slide position of the operator's finger 30*a* is provided in the lower housing 11*y'*. The key-top 14 is provided so as to cover the entire surface of this sensor 13 which is slide-operated along the operation surface of the lower housing 11*y'*. The key-top 14 has a convex shape which becomes thicker along the sliding direction from one portion of the operation surface of the lower housing 11*y'* and also which becomes thinner toward the other portion of the operation surface thereof (see FIG. 17).

Figure 29:
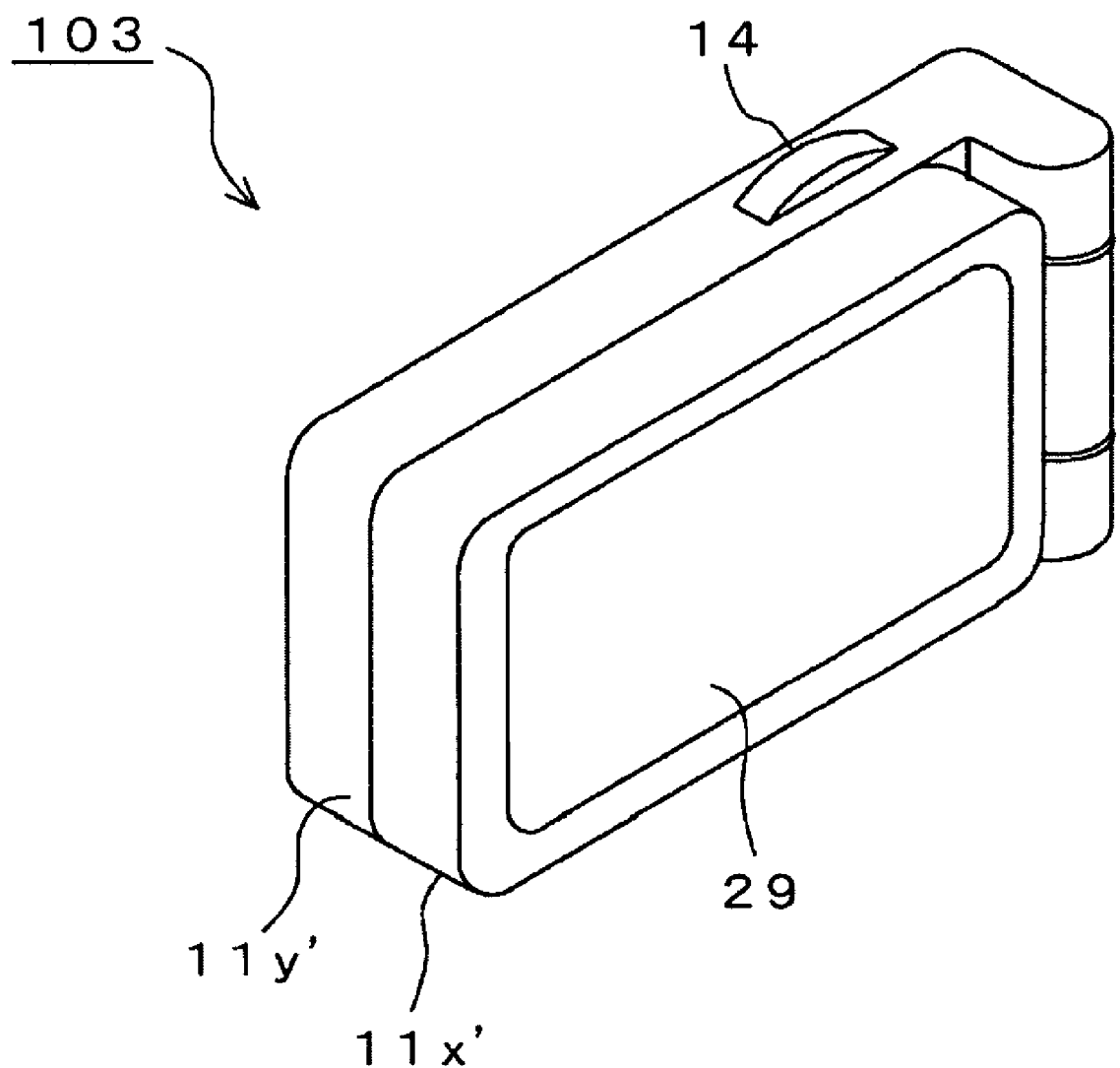
FIG. 29 is a perspective view of the mobile phone 103, showing a handling example on an occasion of viewing a television.

FIG. 29 shows a handling example of the mobile phone 103 when viewing a broadcasting program. In the mobile phone 103 shown in FIG. 29, the mobile phone 103 is in a state of the second lid-closing housing of the operation surface and when a broadcasting program is received by utilizing the television receiving function thereof, the mobile phone is placed on a desk or the like, which is not shown, so as to direct the operation surface of the key-top 14 upward. This enables the key-top 14 to be used so as to carry out slide-operation of channel selection or to fixedly-set a determination of the channel selection or the like by the forefinger of the operator's right hand or the like. The key-top 14 can be used also as a key for audio volume adjustment other than a channel selection key. Of course, the key-top 14 may be also used as a character input operation key or an input candidate selection determination key in case of having a telephone call to a partner, in case of receiving a telephone call from a partner or when making an email.

In this manner, according to the mobile phone 103 relating to the fourteenth embodiment, there is provided any one of the first to twelfth input devices 10 to 120 as embodiments, so that in addition to the slide operation feeling of becoming thicker along the sliding direction from one portion of the operation surface of the lower housing 11*y'* in response to the slide operation depending on the operator's finger 39*b* which operates the mobile phone 103, it is possible to present the slide operation feeling of becoming thinner toward the other portion of the operation surface thereof. Furthermore, on an occasion of the channel selection determination operation, it becomes possible to present sense of touch by the speaker 36*b* with an actuator function.

Consequently, it becomes possible to provide a non-rotary side jog tool or the like which has a structure that is different from a rotary side jog tool in the past and which obtains the operation feeling approximately similar to such a side jog tool. Furthermore, miniaturization and operability of the mobile phone 103 can be improved, so that it is possible to attempt the lowering of malfunction, cost-down and the simplification of manufacturing process of the mobile phone 103.

In this embodiment, although a case where the key-top 14 is provided on the left side of the lower housing 11*y'* as shown in FIG. 28 has been described, of course, it is not limited to this; it is needless to say that a similar effect is obtained also with respect to a case where the key-top is provided on the right side of the lower housing 11*y'*.

[Embodiment 15]

Figure 30:
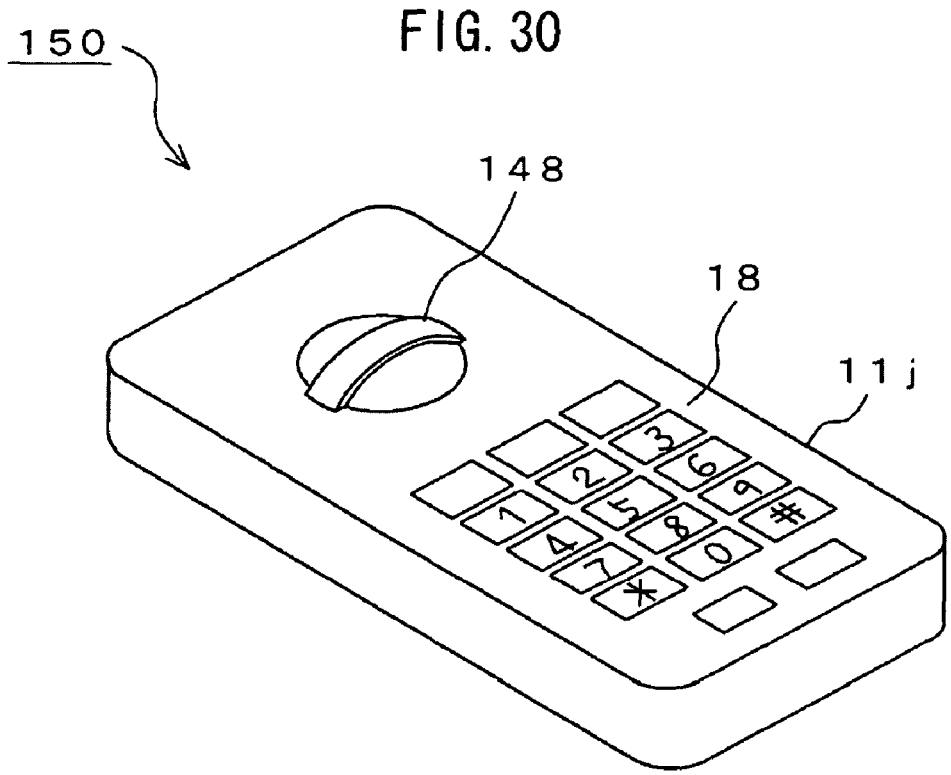
FIG. 30 is a perspective view of an input device 150 as a fifteenth embodiment, showing a configuration thereof.

FIG. 30 shows a configuration of an input device 150 as a fifteenth embodiment. In this embodiment, instead of the key-tops 14, 141 to 146 for the arrangement on the housing side surface, which have various kinds of shapes and are explained in the first to twelfth embodiments, an operation panel 18 of a lower housing 11*j* and a key-top 148 having a convex shape of spherical single horizontal-line are molded integrally.

The input device 150 shown in FIG. 30 includes the lower housing 11*j* with a key-top having a convex shape of spherical single horizontal-line. The upper portion of the lower housing 11*j* is made as an operation surface and an operation panel 18 in which a ten-key of numerals [0] to [9], a symbol [*] key, a symbol [#] key and the like are arranged is included on the upper portion operation surface. According to the lower housing 11*j*, the operation surface of the key-top 148 protuberates in a convex shape of spherical single horizontal-line that is different from the key-top shapes shown in FIG. 3 to FIG. 24. The key-top 148 has predetermined height and width. With respect to a structure on the inside of the key-top 148 of the lower housing 11*j*, the structure of the sensor 13 as shown in FIG. 20, FIG. 21 or FIG. 22B is employed (see FIG. 20, FIG. 21 or FIG. 22B).

For example, by sealing a resin into a die for the lower housing, which is modeled with the convex shape of spherical single horizontal-line which becomes the key-top 148, ten-keys of numerals [0] to [9], a symbol [*] key, a symbol [#] key and the like, which become the operation panel 18, the lower housing 11*j* is formed so as to form a convex shape at the portion thereof. Thus, it is possible to form the input device 150 including the key-top 148 as an airtight structure. Also, it is constituted such that the speaker 36*b* with an actuator function as shown in FIG. 14 is provided on the inside of the lower housing 11*j* and at a position near the key-top 148 so that sense of touch can be presented to the operator's finger 30*a*.

In this embodiment, the key-top 148 is slide-operated along the convex shape of spherical single horizontal-line. Thus, in addition to the slide operation feeling of becoming thicker along the convex shape of spherical single horizontal-line from one portion of the operation surface of the lower housing 11*j* in response to the slide operation depending on the operator's finger 30*a*, it is possible to present the slide operation feeling of becoming thinner in an arc convex shape toward the other portion of the operation surface thereof.

In this manner, according to the input device 150 relating to the fifteenth embodiment, the operation panel 18 of the lower housing 11*j* and the key-top 148 having a convex shape of spherical single horizontal-line are molded integrally. Consequently, it becomes possible to provide the input device 150 of airtight structure abundant in water-resistance. Furthermore, the assembly of the input device 150 becomes simple as compared with the method in which the key-top 148 with an arc convex shape of spherical single horizontal-line and the operation panel forming the ten-keys of numerals [0] to [9], the [*] key, the [#] key and the like are assembled separately.

In this embodiment, although a case where the key-top 148 is provided on the front surface side of the lower housing 11*j* as shown in FIG. 30 has been described, of course, it is not limited to this; it is needless to say that a similar effect is obtained also with respect to a case where the key-top is provided on the rear surface side of the lower housing 11*j*.

[Embodiment 16]

Figure 31:
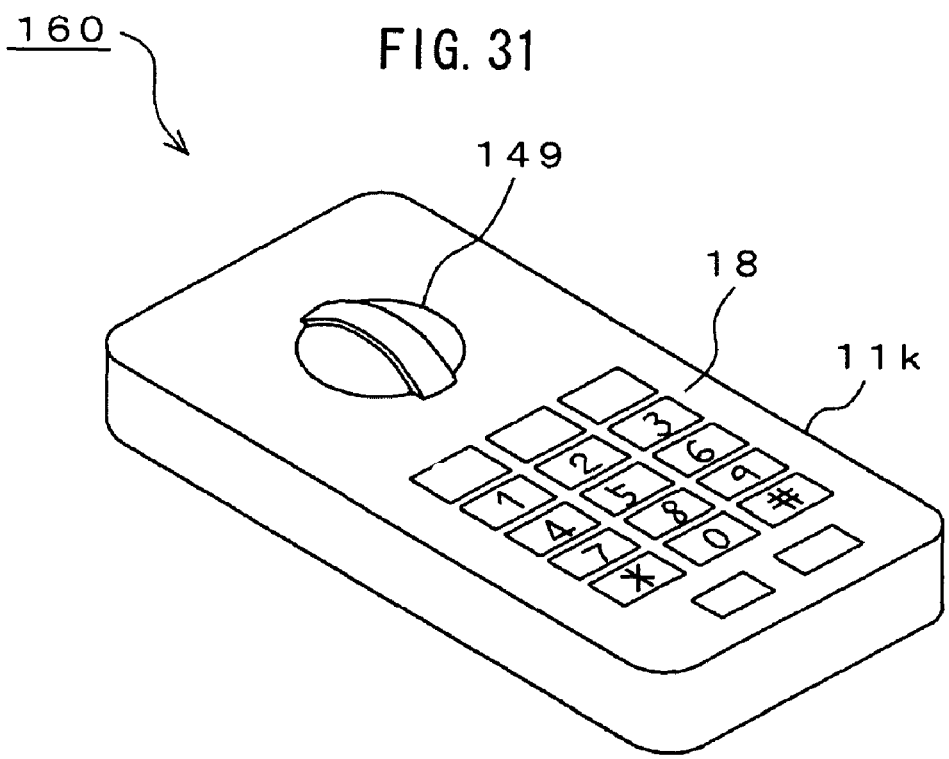
FIG. 31 is a perspective view of an input device 160 as a sixteenth embodiment, showing a configuration thereof.

FIG. 31 shows a configuration of an input device 160 as a sixteenth embodiment. In this embodiment, instead of the key-tops 14, 141 to 146 for the arrangement on the housing side surface, which have various kinds of shapes and are explained in the first to twelfth embodiments, an operation panel 18 of a lower housing 11*k* and a key-top 149 having a convex shape of spherical single vertical-line are molded integrally.

The input device 160 shown in FIG. 31 includes the lower housing 11*k* with a key-top having a convex shape of spherical single vertical-line. The upper portion of the lower housing 11*k* is made as an operation surface and an operation panel 18 in which a ten-key of numerals [0] to [9], a symbol [*] key, a symbol [#] key and the like are arranged is included on the upper portion operation surface. According to the lower housing 11*k*, the operation surface of the key-top 149 protuberates in a convex shape of spherical single vertical-line that is different from the key-top shape shown in FIG. 30. The key-top 149 has predetermined height and width. With respect to the structure on the inside of the key-top 149 of the lower housing 11*k*, the structure of the sensor 13 as shown in FIG. 20, FIG. 21 or FIG. 22B is employed (see FIG. 20, FIG. 21 or FIG. 22B).

For example, by sealing a resin into a die for the lower housing, which is modeled with the convex shape of spherical single vertical-line which becomes the key-top 149, ten-keys of numerals [0] to [9], a symbol [*] key, a symbol [#] key and the like, which become the operation panel 18, the lower housing 11*k* is formed so as to form a convex shape at the portion thereof. Thus, it is possible to form the input device 160 including the key-top 149 as an airtight structure. Also, it is constituted such that the speaker 36*b* with an actuator function as shown in FIG. 14 is provided on the inside of the lower housing 11*k* and at a position near the key-top 149 so that sense of touch can be presented to the operator's finger 30*a*.

In this embodiment, the key-top 149 is slide-operated along the convex shape of spherical single vertical-line. Thus, in addition to the slide operation feeling of becoming thicker along the convex shape of spherical single vertical-line from one portion of the operation surface of the lower housing 11*k* in response to the slide operation depending on the operator's finger 30*a*, it is possible to present the slide operation feeling of becoming thinner in an arc convex shape toward the other portion of the operation surface.

In this manner, according to the input device 160 relating to the sixteenth embodiment, the operation panel 18 of the lower housing 11*k* and the key-top 149 having a convex shape of spherical single vertical-line are molded integrally. Consequently, it becomes possible to form the input device 160 as airtight structure abundant in water-resistance. Furthermore, the assembly of the input device 160 becomes simple as compared with the method in which the key-top 149 with a convex shape of spherical single vertical-line and the operation panel forming the ten-keys of numerals [0] to [9], the [*] key, the [#] key and the like are assembled separately.

In this embodiment, although a case where the key-top 149 is provided on the front surface side of the lower housing 11*k* as shown in FIG. 31 has been described, of course, it is not limited to this; it is needless to say that a similar effect is obtained also with respect to a case where the operation unit is provided on the rear surface side of the lower housing 11*k*.

[Embodiment 17]

Figure 32:
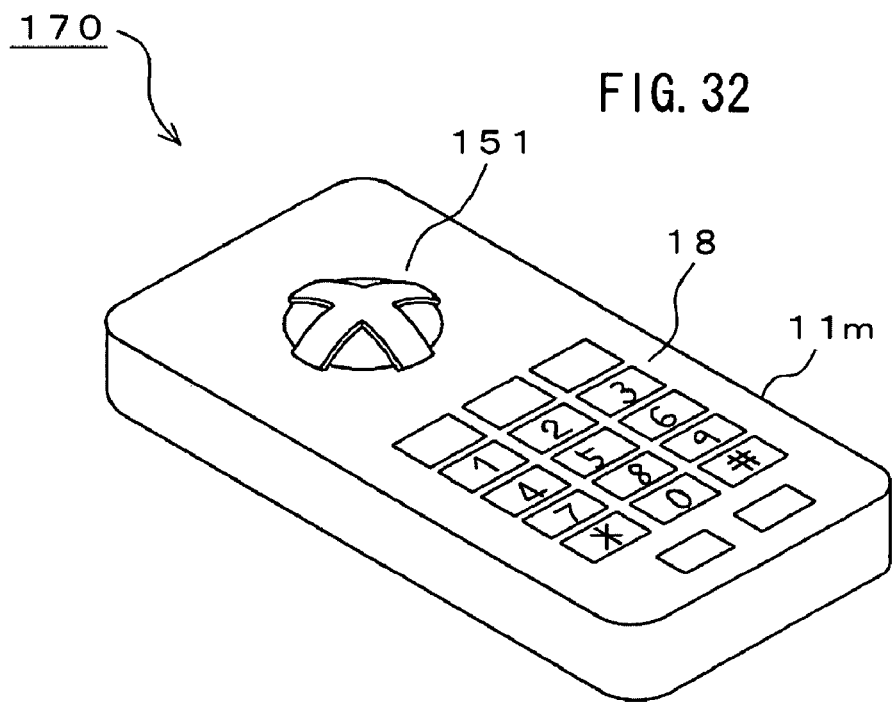
FIG. 32 is a perspective view of an input device 170 as a seventeenth embodiment, showing a configuration thereof.

FIG. 32 shows a configuration of an input device 170 as a seventeenth embodiment. In this embodiment, instead of the key-tops 14, 141 to 146 for the arrangement on the housing side surface, which have various kinds of shapes and are explained in the first to twelfth embodiments, an operation panel 18 of a lower housing 11*m* and a key-top 151 having a convex shape of a spherical cross are molded integrally.

The input device 170 shown in FIG. 32 includes the lower housing 11*m* with a key-top having a convex shape of a spherical cross. The upper portion of the lower housing 11*m* is made as an operation surface and an operation panel 18 in which a ten-key of numerals [0] to [9], a symbol [*] key, a symbol [#] key and the like are arranged is included on the upper portion operation surface. According to the lower housing 11*m*, the operation surface of the key-top 151 protuberates in a convex shape of a spherical cross that is different from the key-top shape shown in FIG. 31. With respect to the structure on the inside of the key-top 151 of the lower housing 11*m*, the structure of the sensor 13 as shown in FIG. 20, FIG. 21 or FIG. 22B is employed (see FIG. 20, FIG. 21 or FIG. 22B).

For example, by sealing a resin into a die for the lower housing, which is modeled with the convex shape of a spherical cross which becomes the key-top 151, ten-keys of numerals [0] to [9], a symbol [*] key, a symbol [#] key and the like, which become the operation panel 18, the lower housing 11*m* is formed so as to form a convex shape at the portion thereof. Thus, it is possible to form the input device 170 including the key-top 151 as an airtight structure. Also, it is constituted such that the speaker 36*b* with an actuator function as shown in FIG. 14 is provided on the inside of the lower housing 11*m* and at a position near the key-top 151 so that sense of touch can be presented to the operator's finger 30*a*.

In this embodiment, the convex shape of a spherical cross of the key-top 151 has a shape crossing the convex shape of spherical single horizontal-line shown in FIG. 30 and the convex shape of spherical single vertical-line shown in FIG. 31. The key-top 151 is slide-operated along the convex shape of spherical single horizontal-line or/and slide-operated along the convex shape of spherical single vertical-line which intersects with that horizontal-line. Thus, in response to the slide operation depending on the operator's finger 30*a*, in addition to the slide operation feeling of becoming thicker along the convex shape of spherical single horizontal-line from one portion of the operation surface of the lower housing 11*m*, it is possible to present the slide operation feeling of becoming thinner in an arc convex shape toward the other portion of the operation surface. Further, in addition to the slide operation feeling of becoming thicker along the convex shape of spherical single vertical-line from one portion of the operation surface of the lower housing 11*m*, it is possible to present the slide operation feeling of becoming thinner in an arc convex shape toward the other portion of the operation surface.

In this manner, according to the input device 170 relating to the seventeenth embodiment, the operation panel 18 of the lower housing 11*m* and the key-top 151 having a convex shape of a spherical cross are molded integrally. Consequently, it becomes possible to provide the input device 170 of airtight structure abundant in water-resistance. Furthermore, the assembly of the input device 170 becomes simple as compared with the method in which the key-top 151 with a convex shape of a spherical cross and the operation panel forming the ten-keys of numerals [0] to [9], the [*] key, the [#] key and the like are assembled separately. Also, the structure is different from the cross key in the past and an approximately similar operation feeling as that of the cross key can be obtained, and it becomes possible to apply the key-top 151 with a convex shape of a spherical cross as an information selection key for selecting information.

In this embodiment, although a case where the key-top 151 is provided on the front surface side of the lower housing 11*m* as shown in FIG. 32, of course, it is not limited to this; it is needless to say that a similar effect is obtained also with respect to a case where the key-top is provided on the rear surface side of the lower housing 11*m*.

[Embodiment 18]

Figure 33:
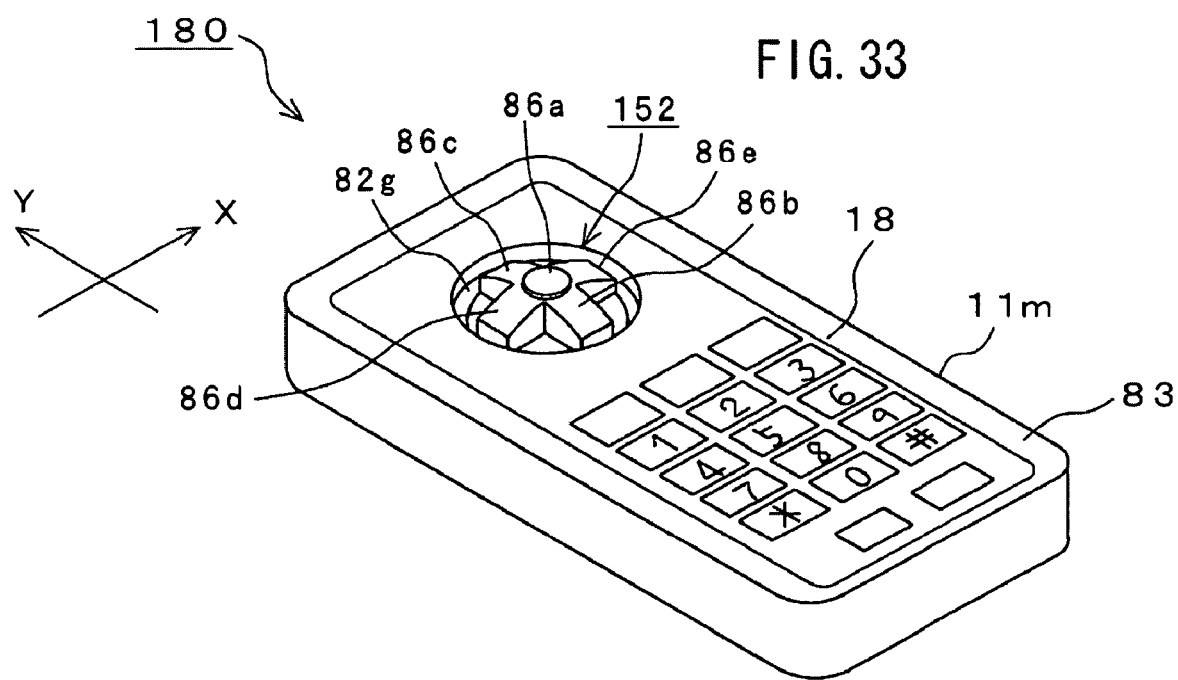
FIG. 33 is a perspective view of an input device 180 as an eighteenth embodiment, showing a configuration thereof.

FIG. 33 shows a configuration of an input device 180 as an eighteenth embodiment. In this embodiment, instead of the key-tops 14, 141 to 146 for the arrangement on the housing side surface, which have various kinds of shapes and are explained in the first to twelfth embodiments, an operation panel 18 and a key-top 152 having a convex shape of a three-dimensional cross are to be molded integrally. The key-top 152 is slide-operated along the three-dimensional cross shape and also, pushdown-operation is executed by a key part 86*a* at the center thereof and by key parts 86*b* to 86*e* in the cross shaped region.

In this embodiment, the key-top 152 is constituted of five key parts 86*a* to 86*e*. The key part 86*a* has a cylindrical shape, is arranged at the center portion of the key-top 152 and is used, for example, as an application determination key. The key parts 86*b* to 86*e* have predetermined three-dimensional shapes and are arranged centering around the key part 86*a* in the cross direction (vertical (Y) direction and horizontal (X) direction) with the arrangement angle 90°.

The key part 86*b* is used, for example, as a scroll & determination key when scrolling an image to the lower side direction of a display screen which is not shown. The key part 86*c* is similarly used as a scroll & determination key when scrolling an image to the upper side direction of the display screen. The key part 86*d* is similarly used as a scroll & determination key when scrolling an image to the left side direction of the display screen. The key part 86*e* is similarly used as a scroll & determination key when scrolling an image to the right side direction of the display screen.

Similarly as the third embodiment, the key-top 152 is engaged freely movably with respect to the pushdown direction with respect to an opening portion 82*g* of the operation panel 18 as a reference, has a convex shape which becomes thicker in a cross shape along the sliding direction from one side of the operation surface of the operation panel 18 and also which becomes thinner toward the other side of the operation surface, and is slide-operated in a cross shape along the operation surface of the operation panel 18.

The input device 180 shown in FIG. 33 is constituted of the lower housing 11*m* with a frame body and an operation panel 18 with a key-top having a convex shape of a three-dimensional cross and inputs information by a slide operation depending on the operator's finger or the like. The lower housing 11*m* includes a frame body 83 and the operation panel 18 is mounted at a portion defined by this frame body 83.

This operation panel 18 includes an operation surface arranged with ten-keys of numerals [0] to [9], a symbol [*] key, a symbol [#] key and the like. According to the lower housing 11*m*, the key-top 152 is provided on the operation surface and it protuberates in a convex shape of a three-dimensional cross that is different from the key-top shape shown in FIG. 32. With respect to the sensor sheet structure on the downward side of this key-top 152, an electrode structure used compatibly for the pattern is employed, which is different from the structure of the sensor 13 as shown in FIG. 20, FIG. 21 or FIG. 22B (see FIG. 34 to FIG. 37).

For example, by sealing a resin into a die for the operation panel molding, which is modeled with the convex shape of a three-dimensional cross which becomes the key-top 152, ten-keys of numerals [0] to [9], a symbol [*] key, a symbol [#] key and the like, which become the operation panel 18, the operation panel 18 is formed so as to form a convex shape at the portion thereof. Thus, it is possible to form the input device 180 including the key-top 152 composed of the five key parts 86*a* to 86*e* as an airtight structure. Also, it is constituted such that the speaker 36*b* with an actuator function as shown in FIG. 14 is provided on the inside of the lower housing 11*n* and at a position near the key-top 152 and sense of touch can be presented to the operator's finger 30*a*.

Figure 34:
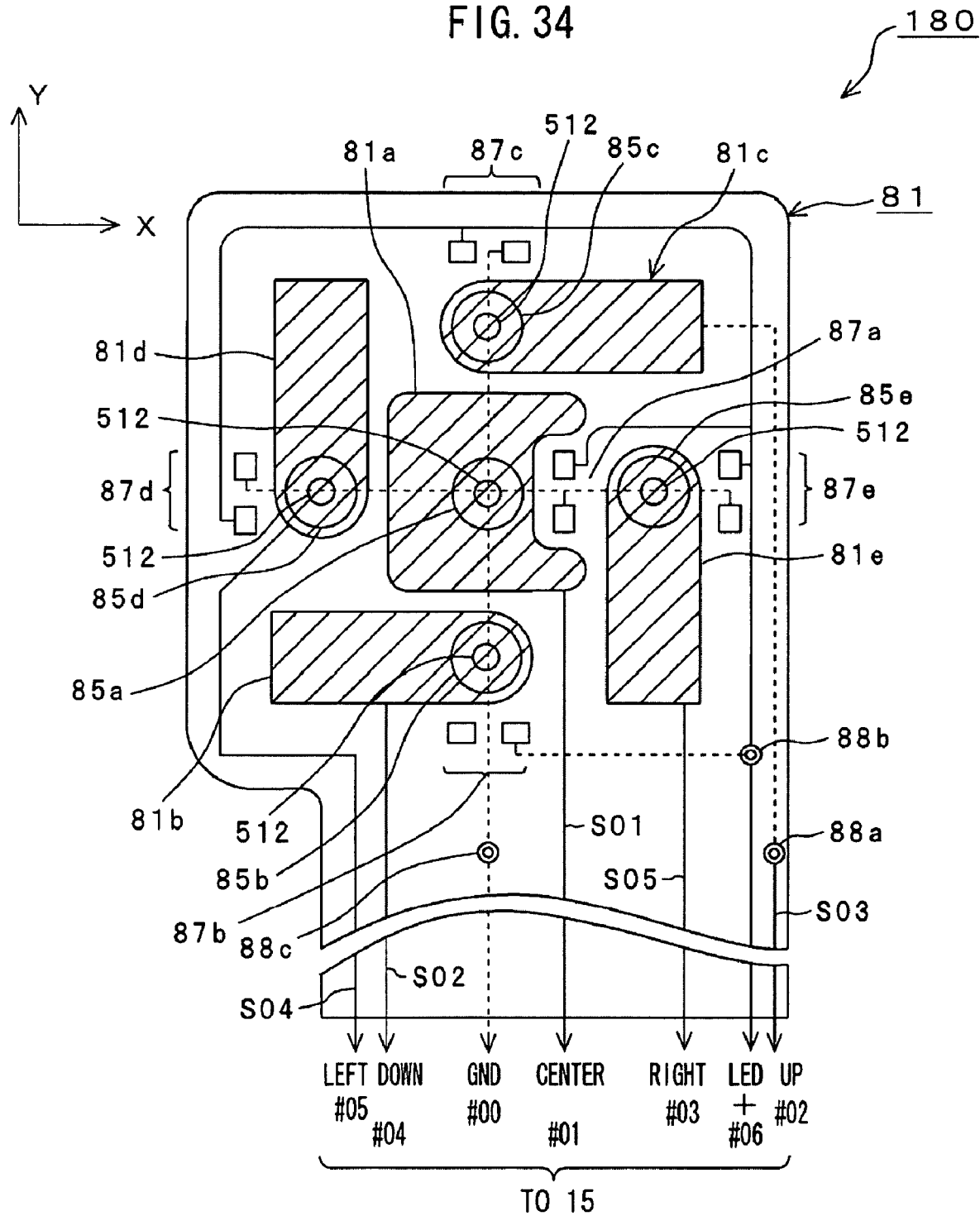
FIG. 34 is a plan view of a FPC board 81 mounted an electrostatic sensor sheet, showing a configuration thereof.

FIG. 34 shows a configuration of an FPC board 81 mounted with an electrostatic sensor sheet. In this embodiment, in the input device 180, a flexible electrostatic sensor sheet mounting board (hereinafter, simply referred to as FPC board 81) as shown in FIG. 34 is used, which constitutes one example of the electrostatic capacitance sheet member. The FPC board 81 has three through-holes 88*a* to 88*c* and five sensor sheets 81*a* to 81*e*, which become one example of sheet shaped detection electrodes. Electrostatic capacitance sheet is used for each of the sensor sheets 81*a* to 81*e* and detects the slide position of the operator's finger 30*a* or the like (see FIG. 36) to output a position detection signal #S1.

In this embodiment, the detection electrodes of the sensor sheets 81*a* to 81*e* have half-round and half-rectangular shapes in which there are included semicircles at one ends and rectangles at the other ends, and portions thereof, in this embodiment, the semicircular shaped regions thereof protuberate in dome shapes. The sensor sheet 81*a* is derived by a wiring pattern #01 (center) on the front surface of the FPC board 81. The sensor sheet 81*b* is derived by a wiring pattern #04 (down) on the front surface of the FPC board 81. The sensor sheet 81*c* is derived by a wiring pattern #02 (up) from the rear surface of the FPC board 81 through the through-hole 88*a*. The sensor sheet 81*d* is derived by a wiring pattern #05 (left) on the front surface of the FPC board 81. The sensor sheet 81*e* is derived by a wiring pattern #03 (right) on the front surface of the FPC board 81.

The detection electrode region of the above-mentioned sensor sheet 81*a* protuberating in a dome shape constitutes a contact electrode on the movable side of the dome switch 85*a* (hereinafter, referred to as metal dome portion 511). Also a region of another sensor sheet 81*b* is similarly made to be the metal dome portion 511 constituting a contact electrode on the movable side of the dome switch 85*b*. A region of the sensor sheet 81*c* is made to be the metal dome portion 511 constituting a contact electrode on the movable side of the dome switch 85*c*. A region of the sensor sheet 81*d* is made to be the metal dome portion 511 constituting a contact electrode on the movable side of the dome switch 85*d*. A region of the sensor sheet 81*e* is made to be the metal dome portion 511 constituting a contact electrode on the movable side of the dome switch 85*e*.

In case of detecting the trace in the Y direction in this embodiment, the arithmetic calculation system of the control unit 15 or the like executes center-of-gravity calculation by detecting the output levels of the sensor sheets 81*b*, 81*a*, 81*c*, which are transmitted through the wiring patterns #02, #01, #04. In case of detecting the trace in the X direction, the control unit 15 or the like executes the center-of-gravity calculation by detecting the output levels of the sensor sheets 81*d*, 81*a*, 81*e*, which are transmitted through the wiring patterns #05, #01, #03.

In case of detecting the trace in the X-Y directions in this embodiment, the control unit 15 or the like executes the above-mentioned two arithmetic calculations simultaneously. Also, in case of detecting the trace in the rotation direction, the control unit 15 or the like executes center-of-gravity calculation by detecting the output levels of the sensor sheets 81*b* through 81*e*, which are transmitted through the wiring patterns #02, #03, #04, #05 and thereafter, the value obtained by the center-of-gravity calculation is converted into phase.

On one surface (front surface) of the FPC board 81, the sheet shaped sensor sheets 81*a* to 81*e* including the regions protuberating in dome shapes are provided and at the same time, on the inside of the region protuberating in a dome shape in the sensor sheet 81*a*, a contact electrode 512 of the fixed side, which constitutes the dome switch 85*a*, is provided. On the other surface (rear surface) of the FPC board 81, a wiring pattern #00 (GND) is provided which is derived from the contact electrode 512 of the fixed side of the dome switch 85*a* through the through-hole 88*c*.

Similarly, on the inside of the region protuberating in a dome shape in the sensor sheet 81*b*, the contact electrode 512 of the fixed side, which constitutes the dome switch 85*b*, is provided and it is connected to the contact electrode 512 of the fixed side of the above-mentioned dome switch 85*a* and connected to the wiring pattern #00 (GND) through the through-hole 88*c*. On the inside of the region protuberating in a dome shape in the sensor sheet 81*c*, the contact electrode 512 of the fixed side, which constitutes the dome switch 85*c*, is provided and it is connected to the contact electrode 512 of the fixed side of the above-mentioned dome switch 85*a* and connected to the wiring pattern #00 (GND) through the through-hole 88*c*.

On the inside of the region protuberating in a dome shape in the sensor sheet 81*d*, the contact electrode 512 of the fixed side, which constitutes the dome switch 85*d*, is provided and it is connected to the contact electrode 512 of the fixed side of the above-mentioned dome switch 85*a* and connected to the wiring pattern #00 (GND) through the through-hole 88*c*. On the inside of the region protuberating in a dome shape in the sensor sheet 81*e*, the contact electrode 512 of the fixed side, which constitutes the dome switch 85*e*, is provided and it is connected to the contact electrode 512 of the fixed side of the above-mentioned dome switch 85*a* and connected to the wiring pattern #00 (GND) through the through-hole 88*c*.

In a case in which [determination] is operation-inputted by the five dome switches 85*a* to 85*e* of up/down, right/left and center, by the deformation of the metal dome portions 511 in the dome switches 85*a* to 85*e*, the wiring pattern #00 (GND) and the wiring pattern #02 (up) are connected, the wiring pattern #00 (GND) and the wiring pattern #04 (down) are connected, the wiring pattern #00 (GND) and the wiring pattern #05 (left) are connected, the wiring pattern #00 (GND) and the wiring pattern #03 (right) are connected or the wiring pattern #00 (GND) and the wiring pattern #01 (center) are connected. The wiring patterns #01 to #05 are connected to the control unit 15 and respective trace detection signals S01 to S05 of the sensor sheets 81*a* to 81*e* are outputted to the control unit 15.

In this embodiment, on the front surface side of the FPC board 81, there are arranged five LED devices 87*a* to 87*e*. The LED device 87*a* is provided on the right side of the dome switch 85*a* on the front surface side of the FPC board 81. Similarly, the LED device 87*b* is provided on the lower side of the dome switch 85*b*, the LED device 87*c* is provided on the upper side of the dome switch 85*c*, the LED device 87*d* is provided on the left side of the dome switch 85*d* and the LED device 87*e* is provided on the right side of the dome switch 85*e*.

In this embodiment, the contact electrode 512 on the fixed side of the dome switch 85*a* is connected with a minus side electrode for mounting the LED device 87*a* on the front surface of the FPC board 81. Similarly, the contact electrode 512 on the fixed side of the dome switch 85*b* is connected with the minus side electrode for mounting the LED device 87*b*. The contact electrode 512 on the fixed side of the dome switch 85*c* is connected with the minus side electrode for mounting the LED device 87*c*. The contact electrode 512 on the fixed side of the dome switch 85*d* is connected with the minus side electrode for mounting the LED device 87*d*. The contact electrode 512 on the fixed side of the dome switch 85*e* is connected with the minus side electrode for mounting the LED device 87*e*.

The four plus side electrodes of the LED devices 87*a*, 87*c* to 87*e* are connected to a wiring pattern #06 (LED+) and derived therefrom on the front surface of the FPC board 81. One plus side electrode of the LED device 87*b* is connected to the wiring pattern #06 (LED+) through the through-hole 88*b* from the rear surface of the FPC board 81. The LED devices 87*a*, 87*c* to 87*e* are lit by applying a predetermined voltage between the wiring pattern #06 and the wiring pattern #00.

Depending on such electrodes' structure, it becomes possible to provide the FPC board 81 in which the sensor sheets 81*a* to 81*e* for trace detection and the contact electrodes on the movable sides of the dome switches 85a to 85e are integrated. It should be noted that, with respect to a detection sensitivity example of the input device 180, Japanese Patent Application No. 2007-246071 whose title is [input device and electronic apparatus].

Figure 35:
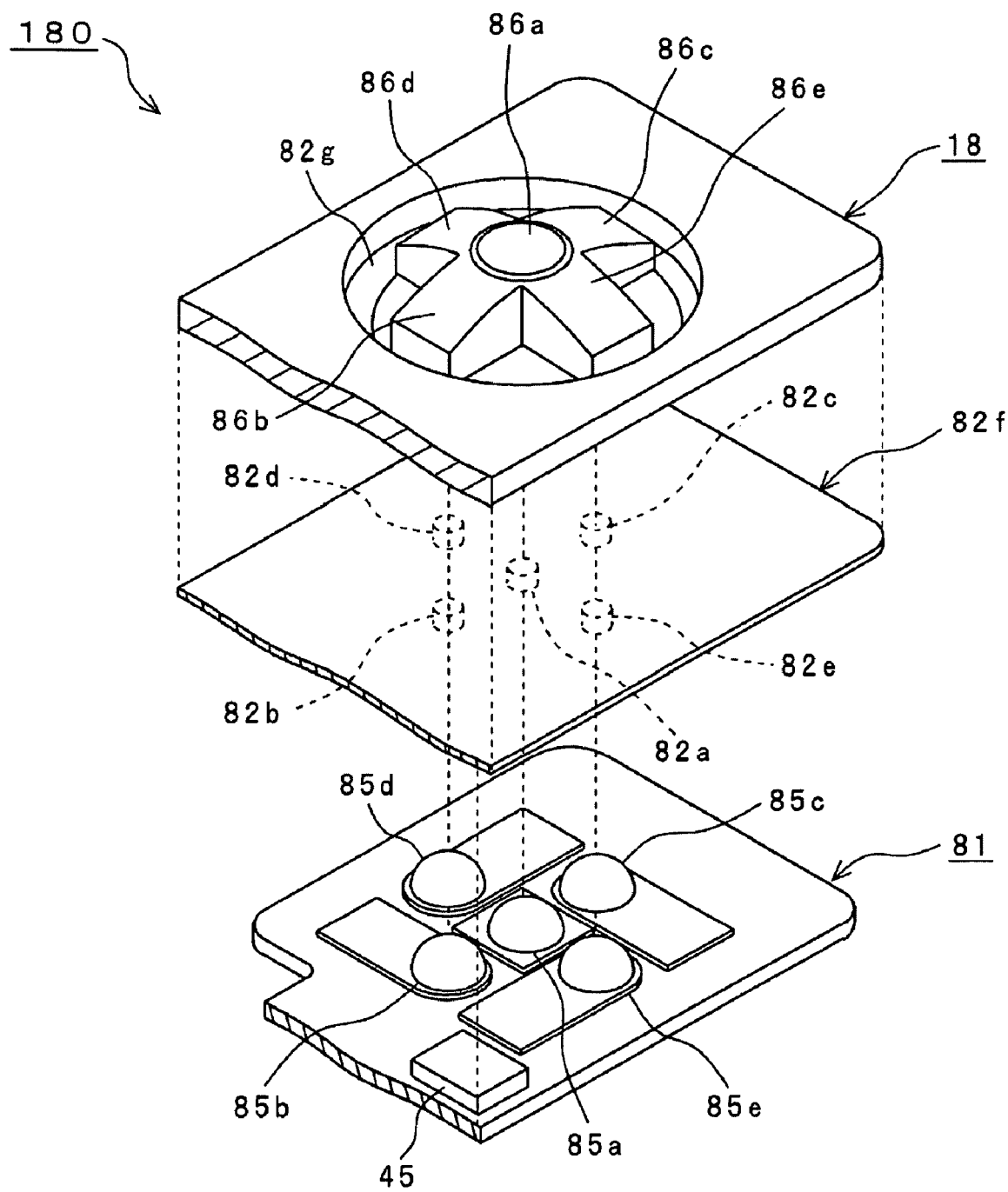
FIG. 35 is a perspective view of the input device 180, showing an assembly example thereof.

FIG. 35 shows an assembly example of the input device 180. In this embodiment, by focusing attention on a fact that both of the electrode patterns for trace detection in the sensor sheets 81a to 81e for realizing trace function and the metal dome portions 511 in the dome switch 85a and the like for realizing ON/OFF function are formable with metal, an electrode structure in which the metal dome portions 511 of the dome switch 85a and the like are compatibly used as the sensor sheets 81a to 81e for trace detection is employed.

By making these as manufacturing and assembling conditions, first, an operation panel 18 shown in FIG. 35 is prepared. The operation panel 18 is formed, for example, by sealing a resin into a die for the operation panel molding, which is modeled with the convex shape of a three-dimensional cross which becomes the key-top 152, ten-keys of numerals [0] to [9], a symbol [*] key, a symbol [#] key and the like, which become the operation panel 18, so as to form the portion of the key-top 152 to be convex shaped.

The die for the operation panel molding is designed such that the key-top 152 includes the five key parts 86a to 86e. The key part 86a has a cylindrical shape, is arranged at the center portion of the key-top 152 and is used, for example, as an application determination key. The key parts 86b to 86e are designed so as to have predetermined three-dimensional shapes and to have arrangement angles 90° in the XY directions centering around the key part 86a. It should be noted that the key-top 152 in which the key part 86a and the pusher piece 82a are integrally molded from the beginning by the same resin raw material or the like may be also used. It is all the same also with respect to other key parts 86b to 86e.

If such an operation panel 18 can be prepared, a rubber sheet portion 82f is prepared. The rubber sheet portion 82f forms dielectric of the electrostatic sensor sheet. A silicon rubber is used for the rubber sheet portion 82f. In this embodiment, on the rubber sheet portion 82f, a center portion of the key-top 152, that is, the key part 86a and the four key parts 86b to 86e around the key part 86a are arranged in a cross shape. The rubber sheet portion 82f has respective convex shaped pusher pieces 82a to 82e on its non-operation surface side corresponding to the key parts 86a through 86e.

In this embodiment, the pusher piece 82a is mounted corresponding to the key part 86a. Similarly, the pusher piece 82b is to be mounted corresponding to the key part 86b, the pusher piece 82c is to be mounted corresponding to the key part 86c, the pusher piece 82d is to be mounted corresponding to the key part 86d and the pusher piece 82e is to be mounted corresponding to the key part 86e.

When the rubber sheet portion 82f is prepared, the FPC board 81 is prepared. The FPC board 81 is used in which five dome switches 85a, 85b, 85c, 85d, 85e for pushdown operation and the metal dome portions 511 of these dome switches 85a to 85e that are compatibly usable for the electrode patterns for trace detection of the sensor sheets 81a to 81e are used. On the FPC board 81, an IC device 45 for a driver and the five LED devices 87a, 87b, 87c, 87d, 87e as shown in FIG. 34 are mounted, in addition to the sensor sheets 81a to 81e.

When the operation panel 18, the rubber sheet portion 82f and the FPC board 81 are prepared, first, the FPC board 81 is mounted on the lower housing 11n shown in FIG. 33. For the lower housing 11n, a metal made housing or a resin made housing is prepared. Thereafter, positioning of the rubber sheet portion 82f and the operation panel 18 is executed on the FPC board 81, and the rubber sheet portion 82f and the operation panel 18 are layered in sequence.

At that time, the five pusher pieces 82a to 82e mounted on the rubber sheet portion 82f, the five key parts 86a to 86e of the key-top 152 and the five dome switches 85a to 85e are mounted after executing the positioning thereof. For example, the pusher piece 82a of the rubber sheet portion 82f and the dome switch 85a are position-adjusted, the pusher piece 82b and the dome switch 85b are position-adjusted, the pusher piece 82c and the dome switch 85c are position-adjusted, the pusher piece 82d and the dome switch 85d are position-adjusted and the pusher piece 82e and the dome switch 85e are position-adjusted.

By doing like this, it is possible with excellent reproducibility to sandwich the rubber sheet portion 82f in the above-mentioned positioning state between the operation panel 18 provided with the five key parts 86a to 86e and the FPC board 81 provided with the five dome switches 85a to 85e. By fixing the operation panel 18 in this state on the frame body 83 of the lower housing 11n, the input device 180 as shown in FIG. 33 is completed.

FIG. 36 shows an internal configuration of the input device 180. The input device 180 shown in FIG. 36 includes the FPC board 81 and the FPC board 81 includes the sheet shaped sensor sheets 81a to 81e for detecting the slide position of the operator's finger 30a and outputting the position detection signal #S1. The key-top 152 is combined on the FPC board 81 with the rubber sheet portion 82f intervening.

The key-top 152 has five key parts 86a to 86e and also, forms a convex shape of a three-dimensional cross having predetermined height and width. The rubber sheet portion 82f is provided so as to cover the entire surfaces of the sensor sheets 81a to 81e. The key-top 152 is slide-operated along the convex shape of the three-dimensional cross or/and is push-down-operated. The electrode patterns for trace detection of the sensor sheets 81a to 81e are patterns which compatibly include the metal dome portions 511 of the dome switches 85a to 85e.

In this embodiment, the key part 86a is operated at the time of input operation so as to push down the dome switch 85a for being ON. Similarly, the key part 86b is operated so as to push down the dome switch 85b for being ON. The key part 86c is operated so as to push down the dome switch 85c for being ON. The key part 86d which is not shown in FIG. 36 is operated so as to push down the dome switch 85d for being ON. Similarly, the key part 86e which is not shown is operated so as to push down the dome switch 85e for being ON.

In this embodiment, the detection area for detecting the slide position of the operator's finger 30a by the sensor sheets 81a to 81e is set to be wider than the operation area slide-operated in the key-top 152 by the operator's finger 30a. By doing like this, with respect to the slide operation by the operator's finger 30a, it is possible to include the right/left operation surface and the up/down operation surface of the operation panel 18, which encloses the convex shaped key-top 152, within the slide operation region. It becomes possible for the key-top 152 of this shape to smoothly set the retrieval pitch of the scroll key when retrieving various kinds of information and the zoom adjustment pitch when adjusting the zooming amount of the optical lens at the time of camera start-up.

Thus, in response to the slide operation depending on the operator's finger 30a, in addition to the slide operation feeling of becoming thicker along one arc shape of the convex shape of a three-dimensional cross from one portion of the operation surface of the lower housing 11n, it is possible to present the slide operation feeling of becoming thinner along the same arc shape toward the other portion of the operation surface. Further, in addition to the slide operation feeling of becoming thicker along the other arc shape from one portion of the operation surface of the lower housing 11n, it is possible to present the slide operation feeling of becoming thinner in the same arc shape toward the other portion of the operation surface. It should be noted that in the drawing, a term, "ta" indicates a distance between components, which forms a distance between the rubber sheet portion 82f and the sensor sheet 81d or the like and "ta" is around 0.27 mm. By employing such an electrode structure, it becomes possible to realize thinner fabrication of the input device 180.

Figure 37A:
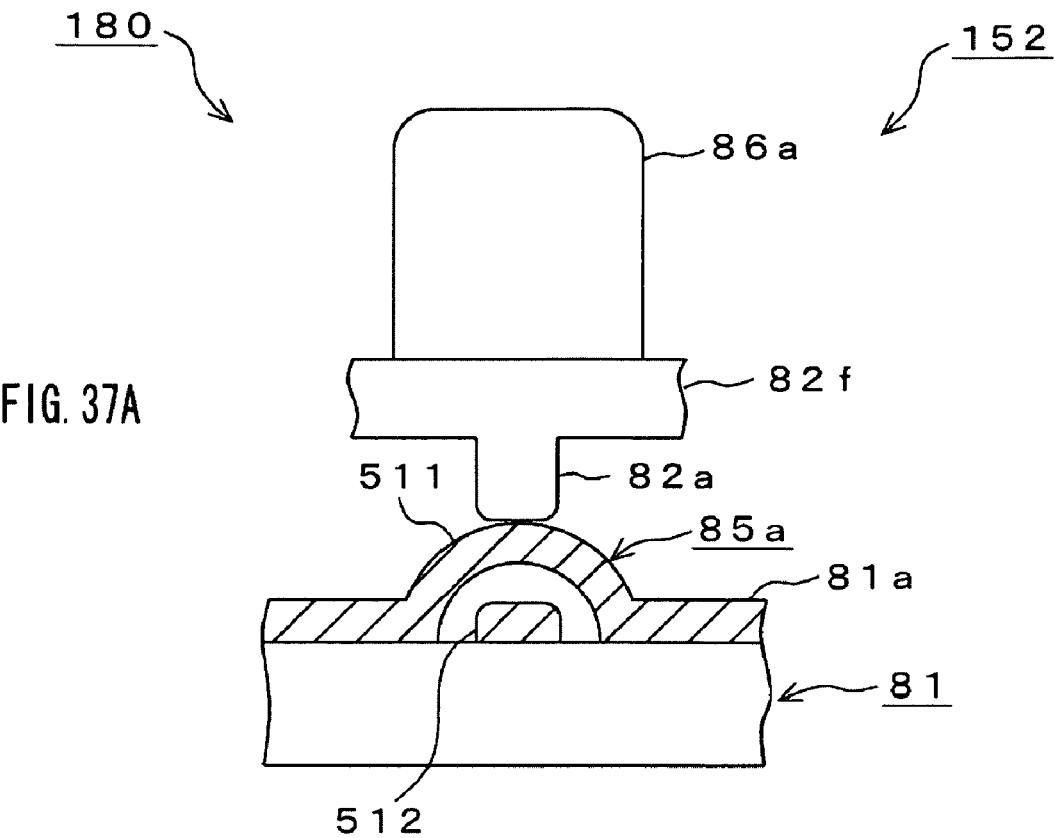
FIGS. 37A and 37B are cross-section diagrams showing a working example of a dome switch 85a or the like in the input device 180.
Figure 37B:
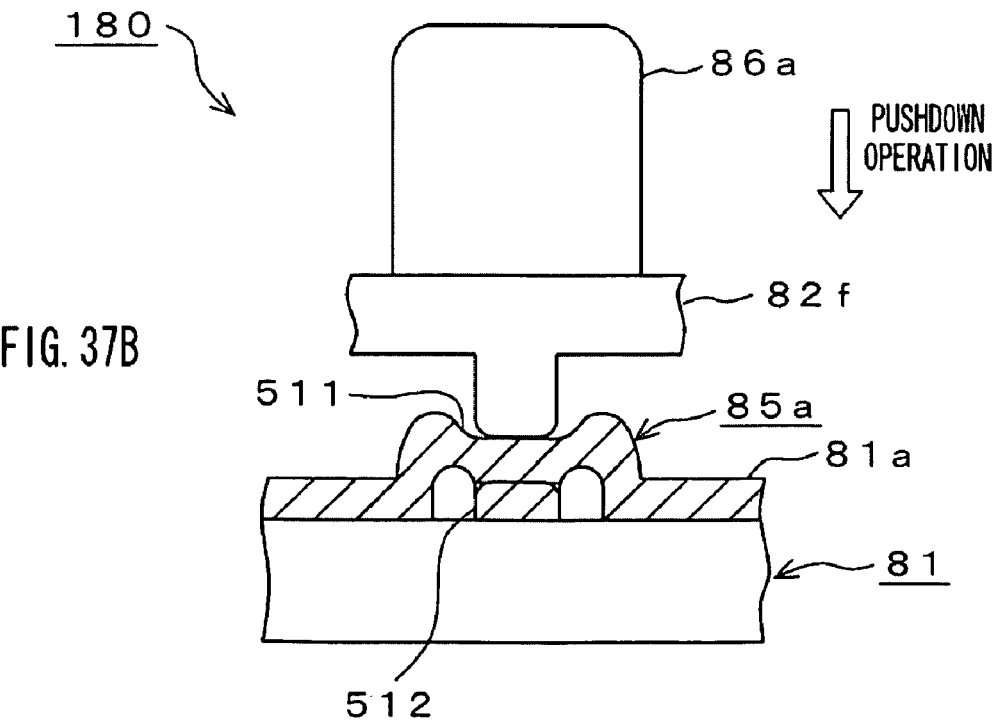

The following will describe an operation example of the dome switch 85a or the like in the input device 180. FIGS. 37A and 37B show the operation example of the dome switch 85a or the like. The dome switch 85a shown in FIG. 37A is in a state of OFF. This state shows a case where the metal dome portion 511 constituting the contact electrode on the movable side is apart with respect to the contact electrode 512 on the fixed side of the FPC board 81 in the dome switch 85a or the like and an insulation state is held electrically between both the contact points.

The dome switch 85a shown in FIG. 37B is in a state of ON. This state occurs based on a result of an operation in which the key part 86a is pushdown and operated so as to turn on the dome switch 85a. According to this ON state, the metal dome portion 511 of the dome switch 85a or the like is deformed with respect to the contact electrode 512 on the fixed side of the FPC board 81, the contact electrode on the movable side thereof contacts with the contact electrode 512 on the fixed side and a conductive state is maintained electrically between both the contact points.

Similarly, the key part 86b is operated so as to push down the dome switch 85b for being ON. The key part 86c is operated so as to push down the dome switch 85c for being ON. The key part 86d is operated so as to push down the dome switch 85d for being ON. The key part 86e is operated so as to push down the dome switch 85e for being ON. When employing the above-mentioned electrode structure, miniaturization of the input device 180 is attempted and it becomes possible to realize the cost reduction of the electronic apparatus such as the mobile phone and simplification of the manufacturing process based on a fact that the bending process or the like of the FPC board can be deleted.

In this manner, according to the input device 180 relating to the eighteenth embodiment, the operation panel 18 of the lower housing 11n and the key-top 152 having a convex shape of a three-dimensional cross are molded integrally. Consequently, it becomes possible to provide the input device 180 of airtight structure abundant in water-resistance. Furthermore, the assembly of the input device 180 becomes simple as compared with the method in which the key-top 152 with a convex shape of a three-dimensional cross and the operation panel forming the ten-keys of numerals [0] to [9], the [*] key, the [#] key and the like are assembled separately. Also, the structure is different from the cross key in the past and an approximately similar operation feeling as that of the cross key can be obtained, and the key-top 152 with a convex shape of a three-dimensional cross can be applied to an information selection key for selecting information.

It should be noted that the key-tops 141 to 143 and 148 to 152 mentioned above can be utilized for the function of the key-top 14 of the first embodiment, and the key-top 144 to 147 can be utilized for the function of the key-top 14 of the first embodiment excluding the dome switch function.

In this embodiment, although a case where the key-top 152 is provided on the front surface side of the lower housing 11n as shown in FIG. 33 has been described, of course, it is not limited to this; it is needless to say that a similar effect is obtained also with respect to a case where the operation unit is provided on the rear surface side of the lower housing 11n.

Figure 38A:
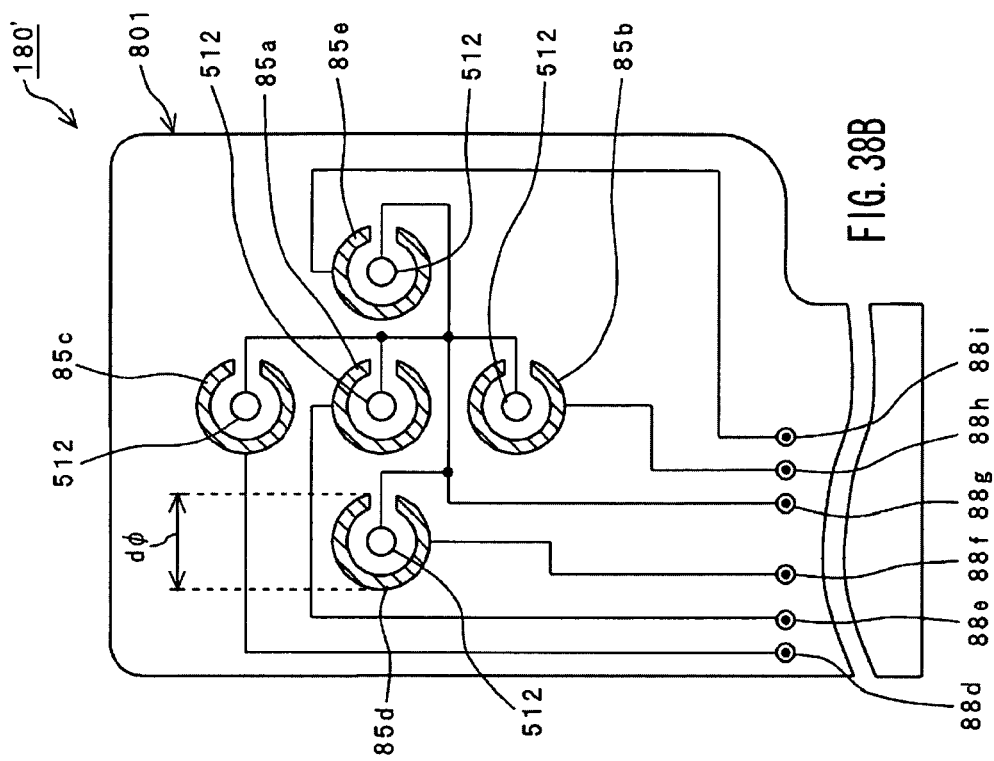
FIGS. 38A and 38B are plan views of a FPC board 801 as a modified example, showing constitution examples of the front and the back thereof.
Figure 38B:
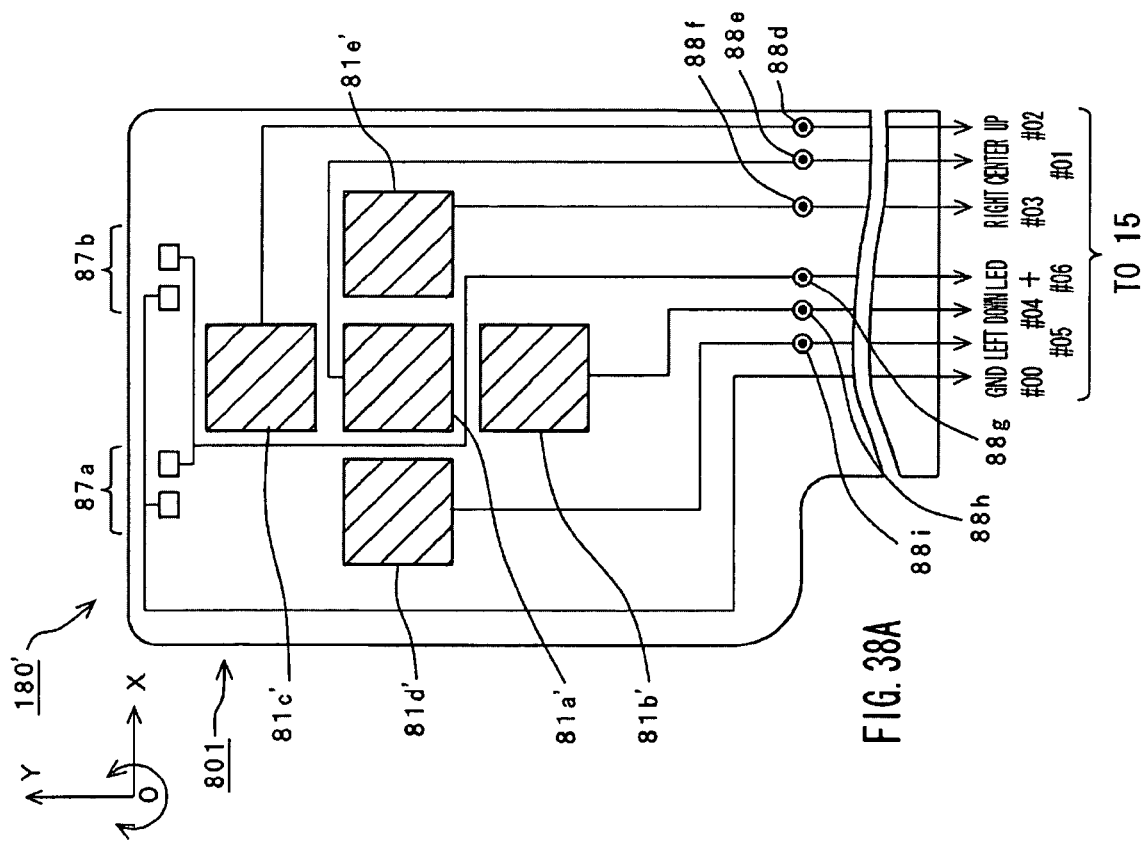

The following will describe an input device 180' as a modified example. FIGS. 38A and 38B show a configuration of the front and the back of a FPC board 801 as the modified example. In this modified example, the FPC board 801 has six through-holes 88d to 88i and by focusing attention on a fact that different electrode patterns are formable at the front and the back of the FPC board 801, sensor sheets 81a' to 81e' are arranged on the front surface of the FPC board 801 and the dome switches 85a to 85e are arranged on the rear surface thereof. Then, the input device 180' is configured on the assumption that the metal dome portions 511 of the respective dome switches 85a to 85e are mounted in reverse directions with respect to the operation surface.

Also in this embodiment, a flexible electrostatic sensor sheet mounting board as shown in FIGS. 38A and 38B (hereinafter, simply referred to as FPC board 801) is used in the input device 180'. On the front surface side of the sheet shaped FPC board 801 shown in FIG. 38A, the sensor sheets 81a' to 81e' for trace detection are arranged and the sensor sheets 81a' to 81e' constitute electrostatic sensor sheets. The sensor sheets 81a' to 81e' provided on the front surface of the FPC board 801 detect the slide position of the operator's finger 30a or the like to the key-top 152 to output the position detection signal #S1 (see FIG. 42).

In this embodiment, each of the detection electrodes of the sensor sheets 81a' to 81e' has a square shape in which all the side lengths are equal. In this embodiment, the detection electrodes not protuberate as those seen in the eighteenth embodiment. The sensor sheet 81a' is derived from the wiring pattern #01 (center) on the front surface of the FPC board 801. The sensor sheet 81b' is derived from the wiring pattern #04 (down) on the front surface of the FPC board 801. The sensor sheet 81c' is derived from the wiring pattern #02 (up) on the front surface of the FPC board 801.

The sensor sheet 81d' is derived from the wiring pattern #05 (left) on the front surface of the FPC board 801. The sensor sheet 81e' is derived from the wiring pattern #03 (right) on the front surface of the FPC board 801. The wiring pattern #01 to #05 are connected to the control unit 15 and the respective trace detection signals S01 to S05 of the sensor sheets 81a' to 81e' are outputted to the control unit 15. The position detection signal #S1 is, for example, a logical sum output value of the trace detection signals S01 to S05.

In this embodiment, when detecting the trace in the Y direction, the arithmetic calculation system of the control unit 15 or the like executes center-of-gravity calculation by detecting the output levels of the sensor sheets 81b', 81a', 81c', which are transmitted through the wiring patterns #02, #01, #04. When detecting the trace in the X direction, the control unit 15 or the like executes the center-of-gravity calculation by detecting the output levels of the sensor sheets 81d', 81a', 81e', which are transmitted through the wiring patterns #05, #01, #03 (see FIG. 44).

In this embodiment, when detecting the trace in the X-Y directions, the control unit 15 executes the above-mentioned two arithmetic calculations simultaneously. Also, when detecting the trace in the rotation direction, the control unit 15 executes center-of-gravity calculation by detecting the output levels of the sensor sheets 81b' through 81e', which are transmitted through the wiring patterns #02, #03, #04, #05 and thereafter, the value obtained by the center-of-gravity calculation is converted into phase.

On the rear surface side of the FPC board 801 shown in FIG. 38B, five dome switches 85a to 85e are arranged. Each of the dome switches 85a to 85e includes a metal dome portion 511 having a diameter dϕ in which, for example, dϕ=around 2.8 mm. The metal dome portions 511 constitute contact electrodes on the respective movable sides of the dome switches 85a to 85e and the lower surfaces of the dome shaped regions form C-shapes.

On the rear surface of the FPC board 801, the contact electrode 512 of the fixed side which constitutes the dome switch 85a is arranged in the metal dome portion 511 protuberating in a dome shape in the dome switch 85a. Also in other dome switches 85b to 85e, fixed side contact electrodes 512 are arranged similarly. The fixed side contact electrode 512 of each of the dome switches 85a to 85e is wired on the rear surface side of the FPC board 801 by passing through a space between the open-end terminals of the lower C-shape region of the metal dome portion 511. The respective contact electrodes 512 of the fixed sides thereof are connected to each other and connected to the wiring pattern #06 (LED+) that is derived to the front surface side through the through-hole 88g.

The metal dome portion 511 which constitutes a movable side contact electrode in the dome switch 85a is connected to the wiring pattern #01 (center) which is derived from the rear surface side of the FPC board 801 to the front surface side thereof through the through-hole 88e. The metal dome portion 511 which constitutes a movable side contact electrode in the dome switch 85b is connected to the wiring pattern #04 (down) which is derived from the rear surface side of the FPC board 801 to the front surface side thereof through the through-hole 88h. The metal dome portion 511 which constitutes a movable side contact electrode in the dome switch 85c is connected to the wiring pattern #02 (up) which is derived from the rear surface side of the FPC board 801 to the front surface side thereof through the through-hole 88d.

The metal dome portion 511 which constitutes a movable side contact electrode in the dome switch 85d is connected to the wiring pattern #05 (left) which is derived from the rear surface side of the FPC board 801 to the front surface side thereof through through-hole 88i. The metal dome portion 511 which constitutes a movable side contact electrode in the dome switch 85e is connected to the wiring pattern #03 (right) which is derived from the rear surface side of the FPC board 801 to the front surface side thereof through the through-hole 88f.

In a case in which [determination] is inputted by the five dome switches 85a to 85e of up/down, right/left and center, by the deformation of the metal dome portions 511 in the dome switches 85a to 85e, the wiring pattern #00 (GND) and the wiring pattern #02 (up) are connected, the wiring pattern #00 (GND) and the wiring pattern #04 (down) are connected, the wiring pattern #00 (GND) and the wiring pattern #05 (left) are connected, the wiring pattern #00 (GND) and the wiring pattern #03 (right) are connected or the wiring pattern #00 (GND) and the wiring pattern #01 (center) are connected.

In this embodiment, on the front surface side of the FPC board 801, two LED devices 87a, 87b are arranged. The LED devices 87a, 87b are provided on the upper portion side of the dome switch 85c on the front surface side of the FPC board 801. The minus side electrodes of the LED devices 87a, 87b are connected to the wiring pattern #00 (GND) and the plus side electrodes thereof are connected to the wiring pattern #06 (LED+). The LED devices 87a, 87b are lit by applying a predetermined voltage between the wiring pattern #06 and the wiring pattern #00.

Depending on such electrode structure, it becomes possible to provide the FPC board 801 in which the sensor sheets 81a' to 81e' for trace detection and the contact electrodes on the movable sides of the dome switches 85a to 85e are separated for the front surface side and for the rear surface side. It should be noted that a detection sensitivity example of the input device 180' refers to Japanese Patent Application No. 2007-246071 whose title is [input device and electronic apparatus]. It should also be noted that the pattern for the trace detection of the sensor sheets 81a' to 81e' may be any one of the patterns shown in FIGS. 39A to 39E.

Figure 39A:
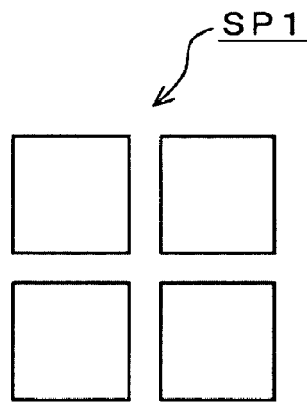

FIGS. 39A to 39E show configurations of other patterns for trace detection which are applicable to the input devices 180, 180' and the like. A pattern SP1 for trace detection shown in FIG. 39A is constituted by four pieces of sensor sheets each of which has a square shape. The four pieces of sensor sheets are arranged one-by-one in the first to fourth quadrants of the coordinate system thereof under the key-top 152.

Figure 39B:
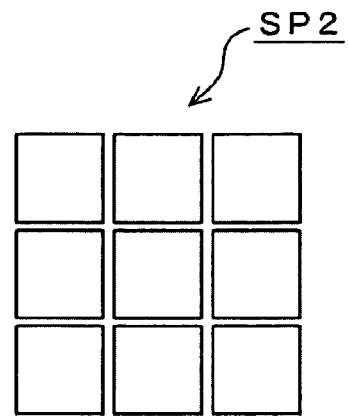
Figure 39C:
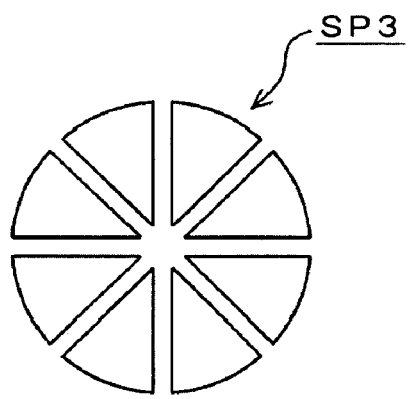

A pattern SP2 for trace detection shown in FIG. 39B is constituted by nine pieces of sensor sheets each of which has a square shape. The nine pieces of sensor sheets are arranged in a matrix form and in parallel crosses under the key-top 152. A pattern SP3 for trace detection shown in FIG. 39C is constituted by eight pieces of sensor sheets each of which has a sectoral shape. The eight pieces of sensor sheets are arranged in a circular shape under the key-top 152.

Figure 39D:
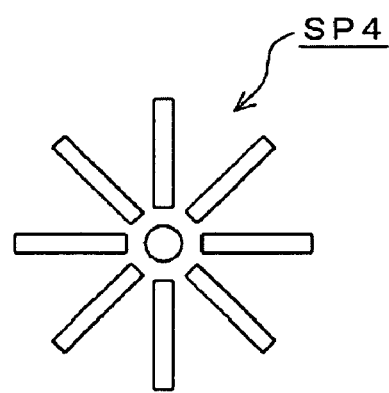

A pattern SP4 for trace detection shown in FIG. 39D is constituted by eight pieces of sensor sheets each of which has a rectangular shape and one piece of sensor sheet having a circular shape. The eight pieces of sensor sheets are arranged in a circular shape and in a radial direction at the circumference of the sensor sheet having a circular shape under the key-top 152.

Figure 39E:
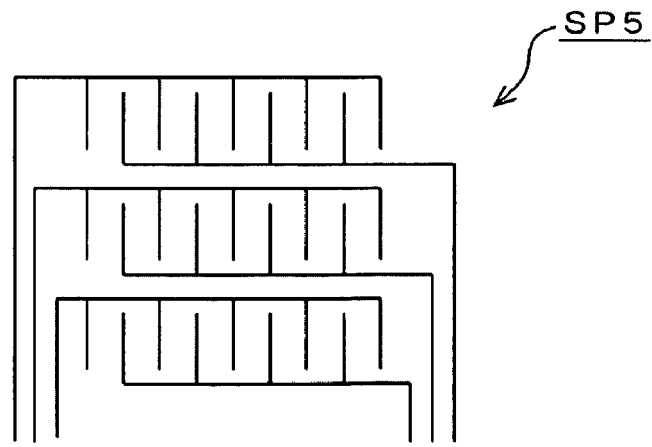

A pattern SP5 for trace detection shown in FIG. 39E is constituted by six pieces of sensor sheets each of which has a comb shape. The comb shaped regions of the two pieces of sensor sheets are meshed so as to form three pairs of mesh patterns and it is constituted such that these three pairs of mesh patterns are arranged adjacently. Depending also on these configurations, it becomes possible to detect the slide position of the operator's finger 30a or the like. It is needless to say that these patterns SP1 to SP5 for trace detection may be applied to the patterns of the contact electrodes of the dome switches 85.

Figure 40:
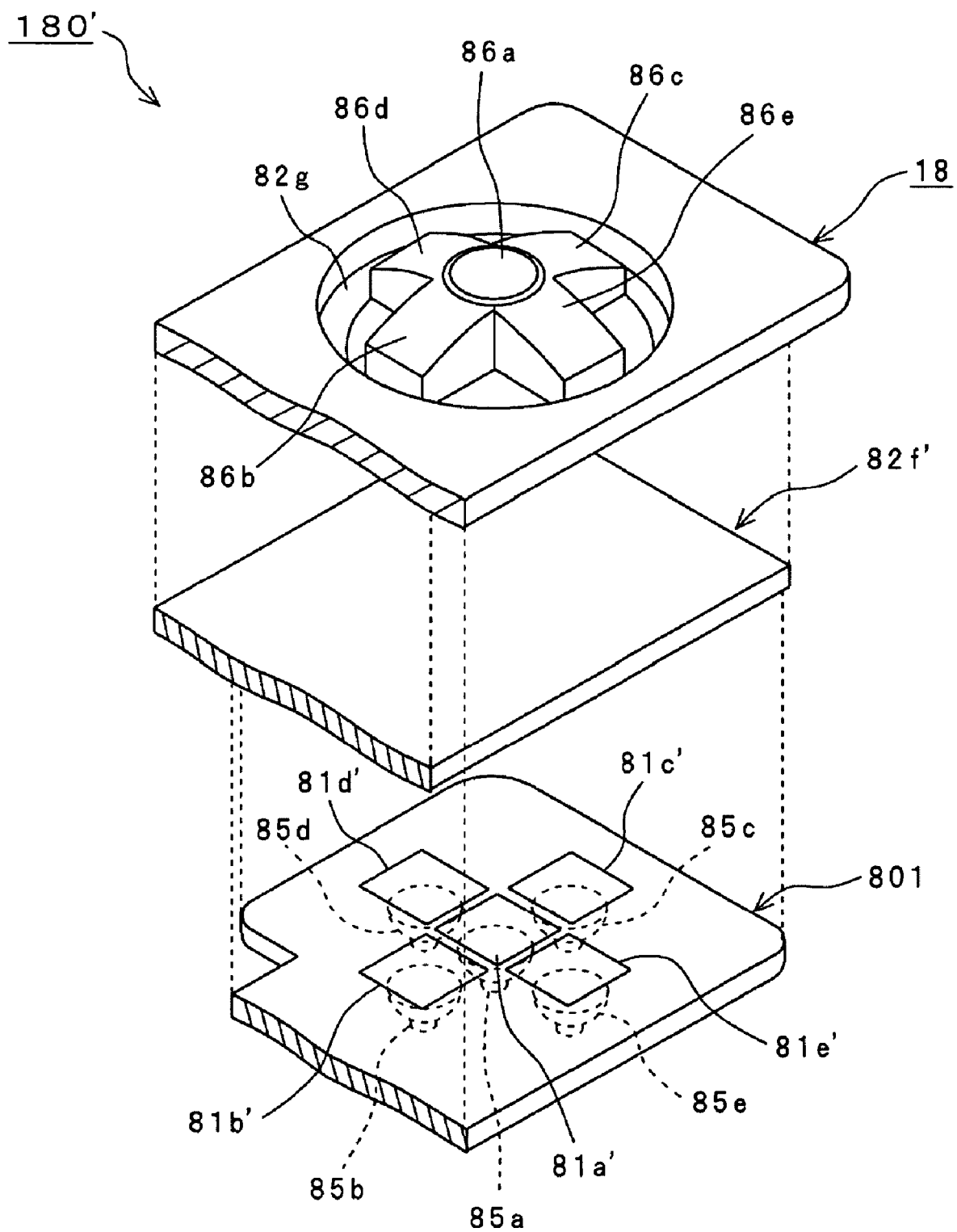
FIG. 40 is a perspective view the input device 180' as a modified example, showing an assembly example thereof.

FIG. 40 shows an assembly example of the input device 180' as a modified example. In this modified example, by focusing attention on a fact that different electrode patterns are formable on the front and the back of the FPC board 801, sensor sheets 81a' to 81e' are arranged on the front surface side of the FPC board 801 and the dome switches 85a to 85e are arranged on the rear surface side thereof. Then, the input device 180' is configured on the assumption that the metal dome portions 511 of the respective dome switches 85a to 85e are mounted in reverse directions with respect to the operation surface.

By making these as manufacturing and assembling conditions, first, an operation panel 18 shown in FIG. 40 is prepared. With respect to the operation panel 18, it has been explained in the eighteenth embodiment by including the key-top 152, so that the explanation thereof will be omitted.

When such an operation panel 18 is prepared, a rubber sheet portion 82f is prepared. The rubber sheet portion 82f forms dielectric of the electrostatic sensor sheet. A silicon rubber is used for the rubber sheet portion 82f. In this embodiment, the pusher piece is provided downward the dome switch 85a or the like, so that an attachment process of the pusher piece 82a or the like corresponding to the key part 86a or the like and a forming process of integration will be omitted.

When the rubber sheet portion 82f' is prepared, the FPC board 81 is prepared. In this embodiment, on the front surface side of the FPC board 801, there are arranged five places of the sensor sheets 81a' to 81e' in which the electrode patterns for trace detection are formed. On the front surface side of the FPC board 801, other than the sensor sheets 81a' to 81e', an IC device 45 for a driver and the LED devices 87a, 87b as shown in FIG. 38A are mounted.

On the rear surface side of the FPC board 801, the metal dome portion 511 constituting the movable side contact electrode and the contact electrode 512 on the fixed side are formed, and the five dome switches 85a to 85e are arranged. Protrusion portions corresponding to the pusher pieces are provided downward the respective dome switches 85a to 85e. For example, a protrusion portion 82a' is formed downward the metal dome portion 511 of the dome switch 85a, a protrusion portion 82b' is formed downward the metal dome portion 511 of the dome switch 85b, a protrusion portion 82c' is formed downward the metal dome portion 511 of the dome switch 85c, a protrusion portion 82d' is formed downward the metal dome portion 511 of the dome switch 85d and a protrusion portion 82e' is formed downward the metal dome portion 511 of the dome switch 85e.

When the operation panel 18, the rubber sheet portion 82f' and the FPC board 801 are prepared, first, the FPC board 801 is mounted on the lower housing 11n as shown in FIG. 33. For the lower housing 11n, a metal made housing or a resin made housing is prepared. In this embodiment, the lower housing 11n is attached with the protrusion portions 82a' to 82e' and further, there is provided a plane portion 89 which is firm to the extent that the respective metal dome portions 511 of the dome switches 85a to 85e are deformed. Then, positioning of the rubber sheet portion 82f' and the operation panel 18 is executed on the FPC board 801, and the rubber sheet portion 82f and the operation panel 18 are layered in sequence.

By doing like this, it is possible with excellent reproducibility to sandwich the rubber sheet portion 82f' in the above-mentioned positioning state between the operation panel 18 provided with the five key parts 86a to 86e and the FPC board 801 provided with the five dome switches 85a to 85e. By fixing the operation panel 18 in this state on the frame body 83 of the lower housing 11n, the input device 180' is completed (see FIG. 33).

Figure 41:
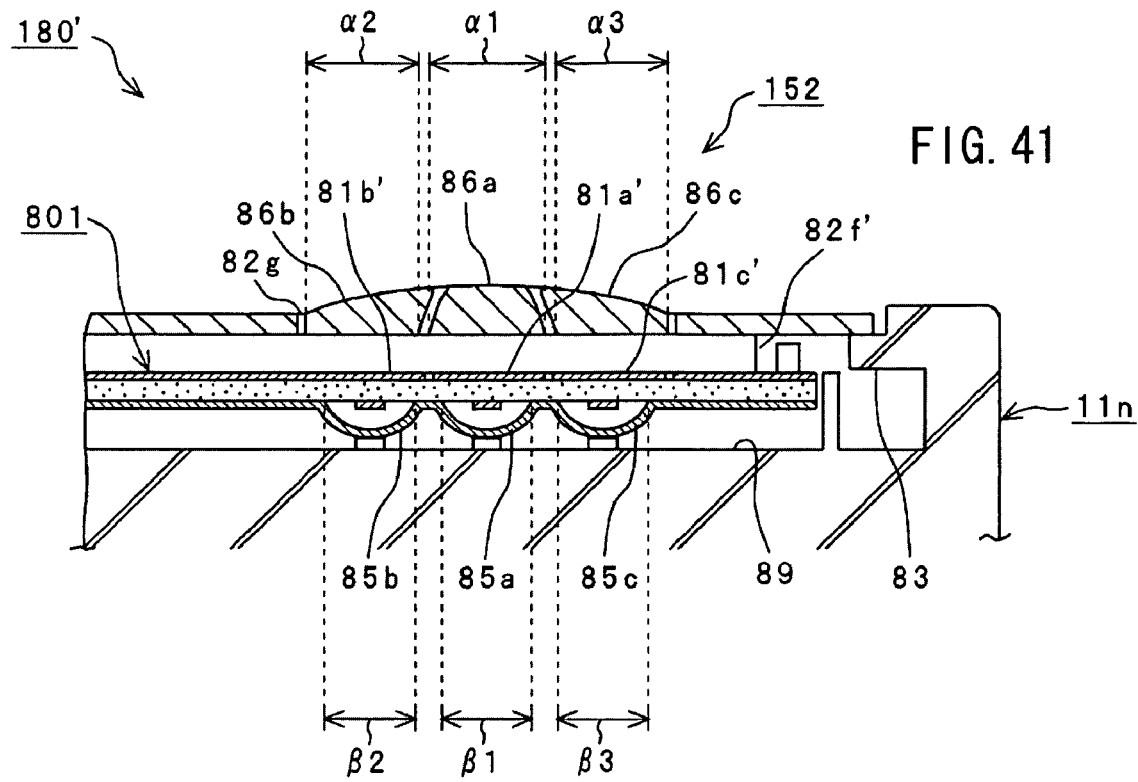

FIG. 41 shows a relation example between the width of each of the individual key parts 86a to 86c of the key-top 152 and the width of each of the dome switches 85a to 85c or the like. The input device 180' shown in FIG. 41 includes the FPC board 801 and on the front surface side thereof, the sensor sheets 81a' to 81e' as shown in FIG. 40 are arranged, and on the rear surface side thereof, the dome switches 85a to 85e are arranged. The key-top 152 is combined on the FPC board 801 with the rubber sheet portion 82f' intervening.

The key-top 152 has five key parts 86a to 86e and also, forms a convex shape of a three-dimensional cross having predetermined height and width. The rubber sheet portion 82f' is provided so as to cover the entire surfaces of the sensor sheets 81a' to 81e', which are not shown. The key-top 152 is slide-operated along the convex shape of the three-dimensional cross or/and is pushdown-operated.

Also in this embodiment, the detection area for detecting the slide position of the operator's finger 30a by the sensor sheets 81a' to 81e' is set to be wider than the operation area slide-operated in the key-top 152 by the operator's finger 30a. By doing like this, in response to the slide operation by the operator's finger 30a, it is possible to include the right/left operation surface and the up/down operation surface of the operation panel 18, which enclose the convex shaped key-top 152, within the slide operation region.

In this embodiment, further, when the width of the key part 86a of the key-top 152 shown in FIG. 41 is assumed to be α1 and the width of the dome switch 85a is assumed to be β1, there is set such a relation as α1>β1 between the width α1 of the key part 86a and the width β1 of the dome switch 85a. Similarly, when the width of the key part 86b is assumed to be α2 and the width of the dome switch 85b is assumed to be β2, there is set such a relation as α2>β2 between the width α2 of the key part 86b and the width β2 of the dome switch 85b. When the width of the key part 86c is assumed to be α3 and the width of the dome switch 85c is assumed to be β3, there is set such a relation as α3>β3 between the width α3 of the key part 86c and the width β3 of the dome switch 85c.

In this manner, when such a relation as α1>β1 is set between the width α1 of the key part 86a and the width β1 of the dome switch 85a, the push-into force is transmitted from the key part 86a to the dome switch 85a through the rubber sheet portion 82f' with good reproducibility, and it is possible to deform the metal dome portion 511 thereof and it becomes possible to execute the ON and OFF operation with good accuracy. It is set similarly also with respect to other key parts 86b to 86e and dome switches 85b to 85e, so that it is possible also in the dome switches 85b to 85e to deform the metal dome portions 511 thereof respectively and it becomes possible to execute the ON and OFF operation with good accuracy.

Figure 42:
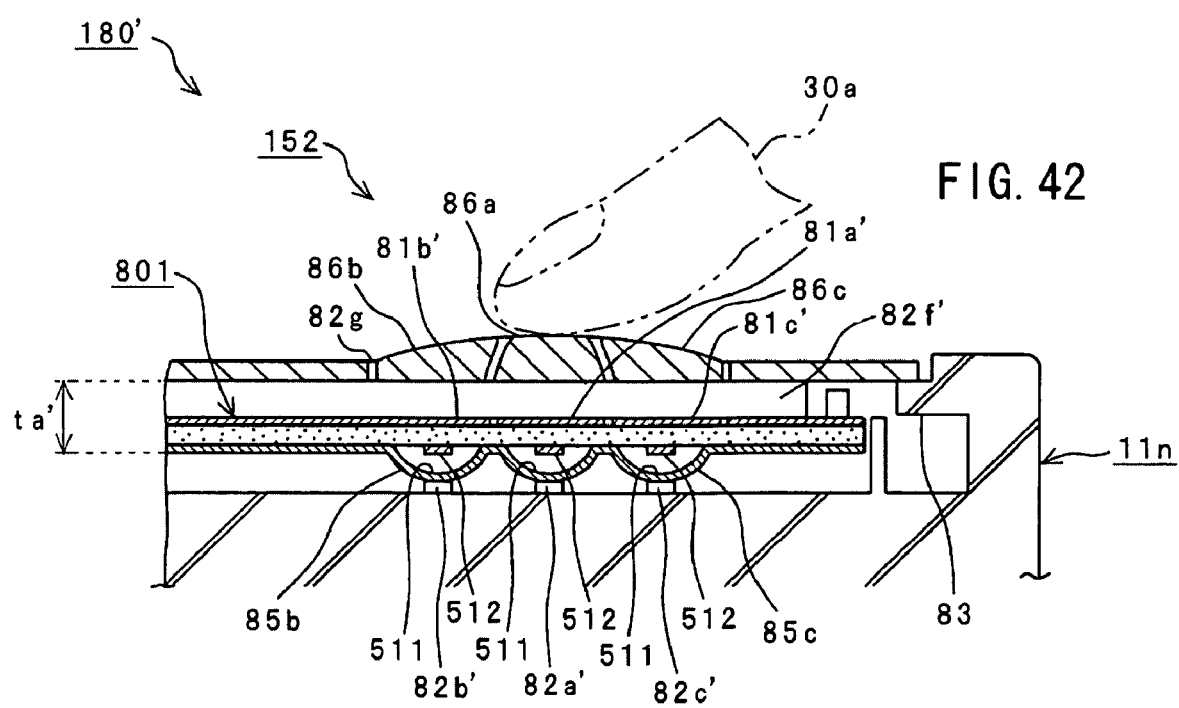
FIG. 42 is a cross-section diagram of the input device 180', showing an internal configuration.

FIG. 42 shows an internal configuration of the input device 180'. The input device 180' shown in FIG. 42 includes the FPC board 801 which has the sheet shaped sensor sheets 81a' to 81e' for detecting the slide position of the operator's finger 30a to output the position detection signal #S1.

In this embodiment, the key part 86a operates at the time of input operation so as to push down the dome switch 85a for being ON (see FIG. 43). Similarly, the key part 86b operates so as to push down the dome switch 85b for being ON. The key part 86c operates so as to push down the dome switch 85c for being ON. The key part 86d, which is not shown in FIG. 42, operates so as to push down the dome switch 85d for being ON. Similarly, the key part 86e, which is not shown, operates so as to push down the dome switch 85e for being ON.

Thus, in response to the slide operation depending on the operator's finger 30a, in addition to the slide operation feeling of becoming thicker along one arc shape of the convex shape of a three-dimensional cross from one portion of the operation surface of the lower housing 11n, it is possible to present the slide operation feeling of becoming thinner along the same arc shape toward the other portion of the operation surface thereof. Further, in addition to the slide operation feeling of becoming thicker along another arc shape from one portion of the operation surface of the lower housing 11n, it is possible to present the slide operation feeling of becoming thinner in the same arc shape toward the other portion of the operation surface. It should be noted in the drawing that a term, "ta'" is a distance between components, which forms a distance between the rubber sheet portion 82f' and the sensor sheet 81d' and ta' is around 0.27 mm. By employing such an electrode structure, it becomes possible to realize thinner fabrication of the input device 180'.

Figure 43A:
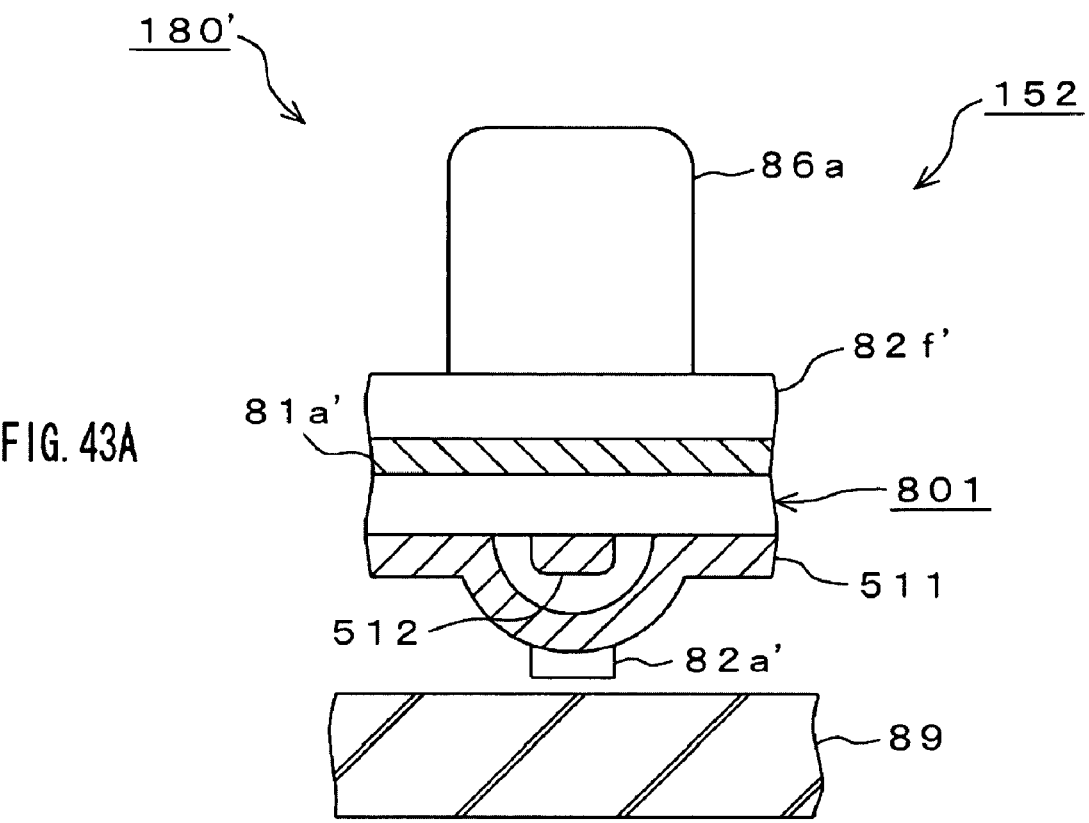
FIGS. 43A and 43B are cross-section diagrams showing a working example of a dome switch 85a or the like in the input device 180'.
Figure 43B:
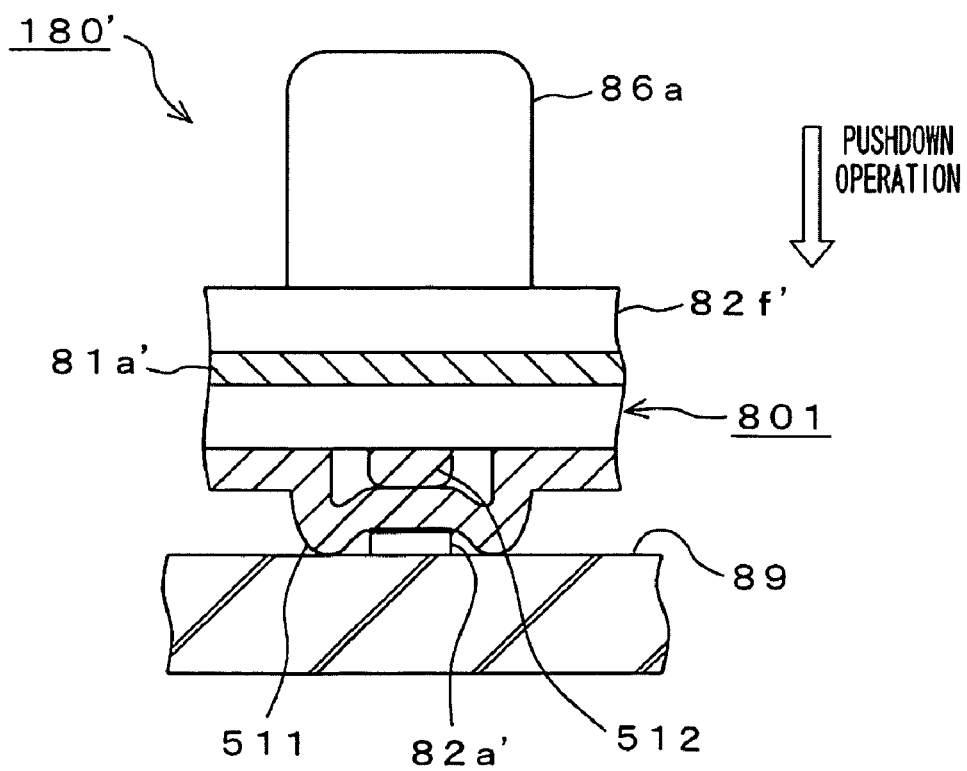

The following will describe an operation example of the dome switch 85a or the like of the input device 180'. FIGS. 43A and 43B show the operation example of the dome switch 85a or the like. The dome switch 85a shown in FIG. 43A is in a state of OFF. This state shows a case where the metal dome portion 511 constituting the contact electrode on the movable side is apart with respect to the contact electrode 512 on the fixed side of the FPC board 801 in the dome switch 85a or the like and an insulation state is held electrically between both the contact points.

The dome switch 85a shown in FIG. 43B is in a state of ON. This state occurs based on a result of an operation in which the key part 86a is pushdown and operates so as to turn on the dome switch 85a. According to this ON state, in the dome switch 85a or the like, the protrusion portion 82a' of the metal dome portion 511 is attached to the firm plane portion 89 in the lower housing 11n with respect to the contact electrode 512 on the fixed side of the FPC board 801 and the metal dome portion 511 is deformed, the contact electrode on the movable side thereof contacts with the contact electrode 512 on the fixed side and a conductive state is maintained electrically between both the contact points.

Similarly, the key part 86b operates so as to push down the dome switch 85b for being ON. The key part 86c operates so as to push down the dome switch 85c for being ON. The key part 86d operates so as to push down the dome switches 85d for being ON. The key part 86e operates so as to push down the dome switch 85e for being ON. When employing the above-mentioned electrode structure, miniaturization of the input device 180' is attempted and it becomes possible to realize the cost reduction of the electronic apparatus of the mobile phone or the like and simplification of the manufacturing process based on a fact that the bending process or the like of the FPC board can be deleted.

Figure 44A:
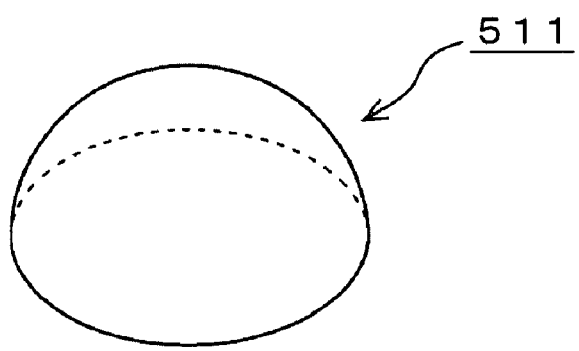
FIGS. 44A to 44C are perspective views of metal dome portions 511 and 511a relating to an electrode/wiring intersection structure example, showing shape examples thereof.
Figure 44B:
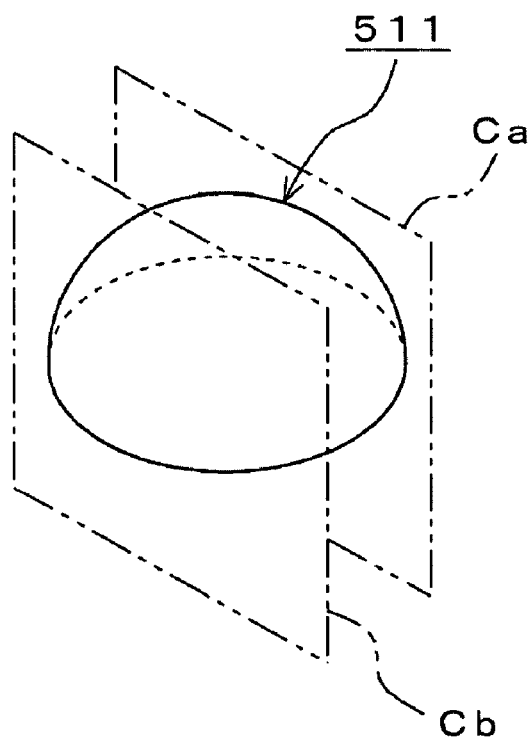
Figure 44C:
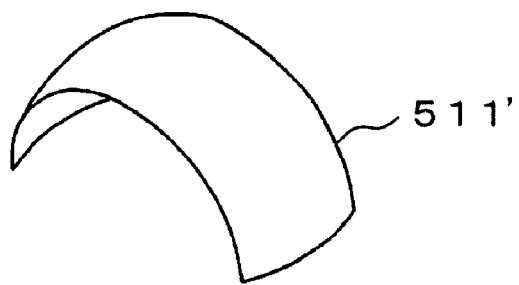

The following will describe an electrode/wiring intersection structure example of the metal dome portion 511 which forms the movable side contact electrode of the dome switch 85a or the like and the contact electrode 512 on the fixed side thereof, with reference to FIGS. 44A to 44C. In this embodiment, the metal dome portion 511 and the wiring pattern crossing the metal dome portion 511' are wired so as to pass through positions which essentially do not contact with the metal dome portion 511, the metal dome portion 511' and the like on an occasion of a non-pushdown operation. FIG. 44A shows a shape example of the metal dome portion 511 applied to the FPC board 801 shown in FIG. 41. The metal dome portion 511 shown in FIG. 44A has a hemisphere shape.

As shown in FIG. 34, when the metal dome portion 511 exists on the front surface side of the FPC board 81 and the contact electrode 512 of the fixed side on the inside thereof is derived from the rear surface side of the FPC board 81, there is no fear about a problem of wire breakage of a wiring pattern. However, as shown in FIG. 38B, when the metal dome portion 511 which forms a movable side contact electrode of the dome switch 85a or the like and the contact electrode 512 of the fixed side thereof coexist within the same plane on the rear surface side of the FPC board 801, there is a fear that shear stress may be applied with respect to the wiring pattern caused by the push force of the key-top 152 or the like to the downward direction on an occasion of an input operation.

Then, in this embodiment, it is constituted, in order to employ an electrode/wiring intersection structure, such that both the side terminal portions of the metal dome portion 511 in the hemisphere shape are cut off. FIG. 44B shows a cut example of the metal dome portion 511. According to the cut example of the metal dome portion 511 shown in FIG. 44B, both the side terminal portions of the movable side contact electrode of the dome switch 85a or the like which includes a dome-shape-protuberating region are cut off by making cut-off surfaces Ca, Cb as references.

FIG. 44C shows a shape example of the metal dome portion 511' of a side cut type. According to the dome switch 85a' of a side cut type shown in FIG. 44C, the metal dome portion 511' forming a contact electrode on the movable side thereof forms a cut-shape in which both the side terminal portions of the dome shaped region are cut off.

The metal dome portion 511' of the side cut type having this cut-shape in which both the side terminal portions are cut off is mounted on the rear surface side of the FPC board 801. At that time, the fixed side contact electrode 512 is arranged in the pushdown projection region of the metal dome portion 511' and electrical wiring is performed such that the wiring pattern extending from the contact electrode 512 is arranged at one side end portion of the metal dome portion 511' of the side cut type and also in an region other than the pushdown projection region thereof.

When employing such an electrode/wiring intersection structure, the metal dome portion 511' may avoid a case where it presents shear stress with respect to the wiring pattern on an occasion of an input operation. As a result thereof, it becomes possible to prevent the wire breakage of the wiring pattern extending from the contact electrode 512 on the fixed side of the FPC board 801. It is needless to say that the method for preventing the wire breakage of the wiring pattern is not limited to this; it is also allowed for the width of the wiring pattern crossing the pushdown projection region of the metal dome portion 511' to be widened so as to become thick locally as compared with other wiring regions. By doing like this, push force is applied to the wiring pattern which is widened in the pushdown projection region of the metal dome portion 511', but it becomes possible to improve the pattern shearing strength as compared with the wiring pattern which is not widened.

Also, with respect to the wiring pattern crossing the metal dome portion 511' or the like, it is also allowed to arrange the wiring pattern on the FPC board 801 along an imaginary circular shape which connects a C-shaped open portion of the metal dome portion 511' thereof in a circular shape in a form in which the wiring pattern is quasi-circumscribed with (or not perpendicular to) the imaginary circle. By doing like this, push force is applied to the wiring pattern arranged along the imaginary circular shape in the pushdown projection region of the metal dome portion 511', but the contact portion between the edge region of the metal dome portion 511' and the inclined intersection region of the wiring pattern becomes long as compared with the wiring pattern extending in a straight line shape from the contact electrode 512, so that it becomes possible to improve the pattern shearing strength.

Figure 45:
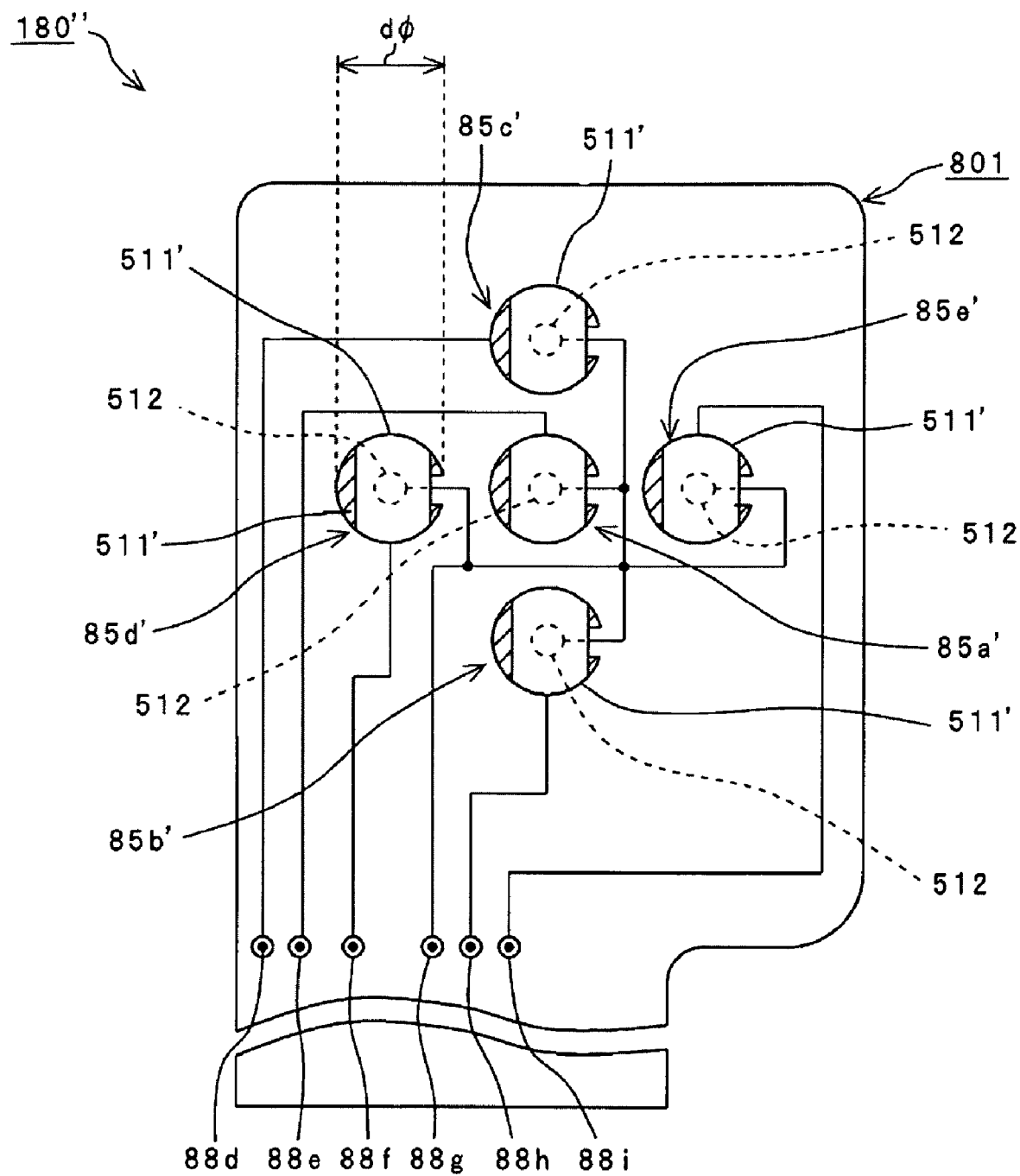
FIG. 45 is a plan view of an input device 180" as a modified example, showing an arrangement example of dome switches 85a1 to 85e1 therein.

FIG. 45 shows an arrangement example of dome switches 85a' to 85e' in an input device 180". According to an input device 180" shown in FIG. 45, in order to prevent the pattern wire breakage, an electrode/wiring intersection structure in which the wiring pattern #00 of the ground (GND) terminal is wired all around, to avoid the ground region of the metal dome portion 511', is employed in the FPC board 801.

On the rear surface side of the FPC board 801 shown in FIG. 45, five pieces of dome switches 85a' to 85e' are arranged. There are included metal dome portions 511' which are side-cut. The metal dome portion 511' is one which is cut off for both the side terminal portions of the metal dome portion 511 having diameter dφ around dφ=2.8 mm, which has been shown in the dome switch 85a or the like (see FIG. 44C). This is because the disconnection of the wiring pattern #00 or the like by the shearing is prevented. The metal dome portions 511' constitute contact electrodes on the respective movable sides of the dome switches 85a' to 85e' and the lower surfaces of the dome shaped regions form C-shapes.

On the rear surface of the FPC board 801, the contact electrode 512 of the fixed side which constitutes the dome switch 85a' is provided in the metal dome portion 511' protuberating in a dome shape of the dome switch 85a'. Also in other dome switches 85b' to 85e', fixed side contact electrodes 512 are provided similarly. The fixed side contact electrodes 512 of the respective dome switches 85a' to 85e' are wired on the rear surface side of the FPC board 801 by passing through the space between the open-end terminals of the C-shape region in the lower surface of each of the metal dome portions 511'. The contact electrodes 512 of the respective fixed sides thereof are connected mutually and connected to the wiring pattern #06 (LED+) derived to the front surface side through the through-hole 88g.

The metal dome portion 511' which constitutes a movable side contact electrode in the dome switch 85a' is connected to the wiring pattern #01 (center) which is derived from the rear surface side of the FPC board 801 to the front surface side thereof through the through-hole 88e. The metal dome portion 511' which constitutes a movable side contact electrode in the dome switch 85b' is connected to the wiring pattern #04 (down) which is derived from the rear surface side of the FPC board 801 to the front surface side thereof through the through-hole 88h. The metal dome portion 511' which constitutes a movable side contact electrode in the dome switch 85c' is connected to the wiring pattern #02 (up) which is derived from the rear surface side of the FPC board 801 to the front surface side thereof through the through-hole 88d.

The metal dome portion 511' which constitutes a movable side contact electrode in the dome switch 85d' is connected to the wiring pattern #05 (left) which is derived from the rear surface side of the FPC board 801 to the front surface side thereof through through-hole 88i. The metal dome portion 511' which constitutes a movable side contact electrode in the dome switch 85e' is connected to the wiring pattern #03 (right) which is derived from the rear surface side of the FPC board 801 to the front surface side thereof through the through-hole 88f.

In a case in which [determination] is inputted by the five dome switches 85a' to 85e' of up/down, right/left and center, by the deformation of the metal dome portion 511' in the dome switches 85a' to 85e', the wiring pattern #00 (GND) and the wiring pattern #02 (up) are connected, the wiring pattern #00 (GND) and the wiring pattern #04 (down) are connected, the wiring pattern #00 (GND) and the wiring pattern #05 (left) are connected, the wiring pattern #00 (GND) and the wiring pattern #03 (right) are connected or the wiring pattern #00 (GND) and the wiring pattern #01 (center) are connected (see FIG. 38A).

In this manner, according to the input device 180", the above-mentioned electrode/wiring intersection structure is included, so that it becomes possible to ease the shear stress loaded on the wiring pattern #00 of the FPC board 801 by the pushdown operation of the metal dome portion 511'.

Figure 46:
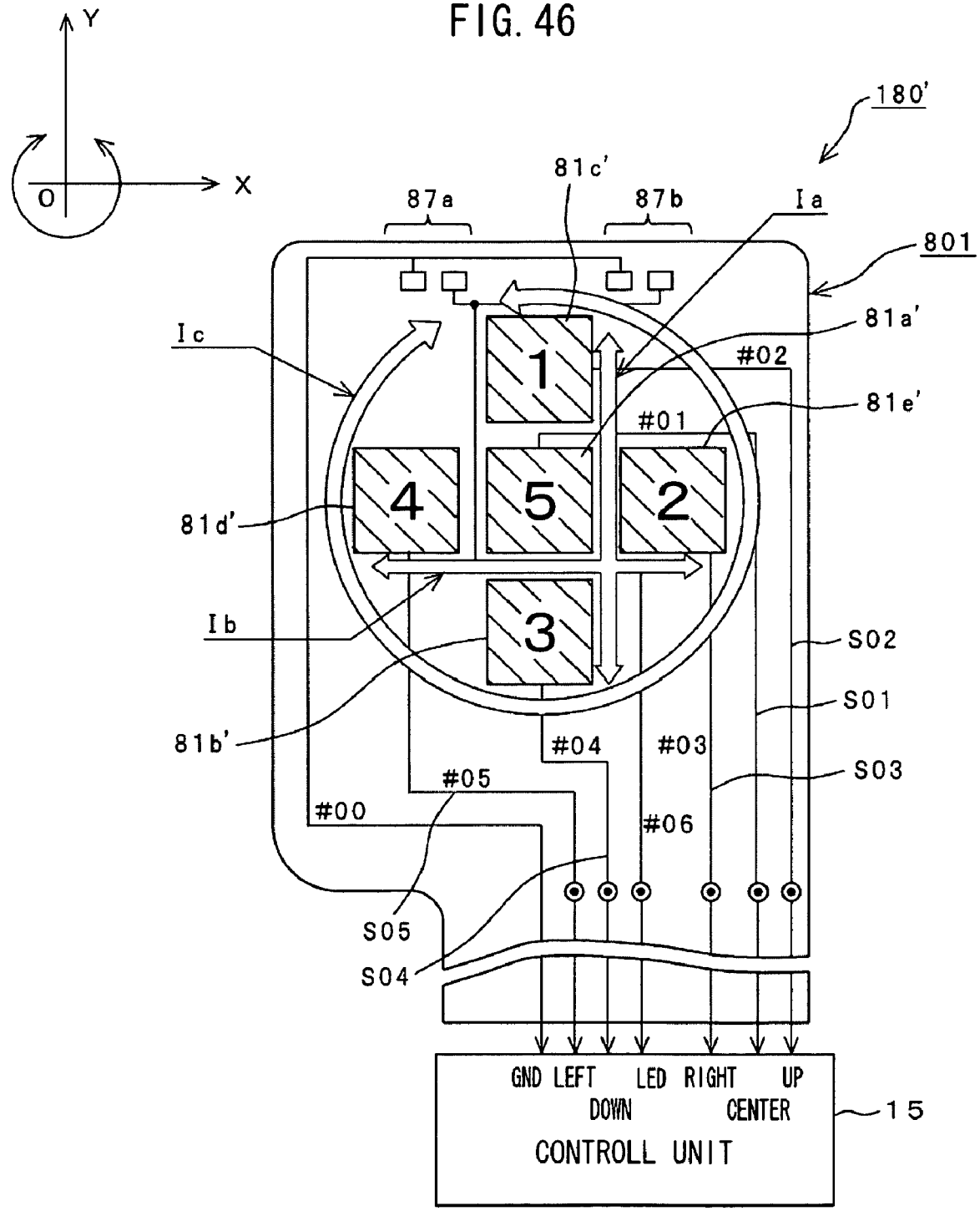
FIG. 46 is plan view of the input device 180', showing a working example on an occasion of a trace detection.

FIG. 46 shows an operation example on an occasion of a trace detection of the input device 180'. The wiring pattern #01 to #05 shown in FIG. 46 are connected to the control unit 15 and the respective trace detection signals S01 to S05 of the sensor sheets 81a' to 81e' are outputted to the control unit 15. In the drawing, an outline type arrow indicates a trace direction on the key-top 152 shown in FIG. 40. In this modified example, there are provided with a vertical trace mode, a horizontal trace mode and a disk trace mode.

An outline type arrow Ia in the vertical direction shown in FIG. 46 indicates a slide operation direction at a time of a vertical trace mode and corresponds to the trace detection range thereof. Here, when assuming that the trace detection area of the sensor sheet 81a' is [5], the trace detection area of the sensor sheet 81b' is [3], the trace detection area of the sensor sheet 81c' is [1], the trace detection area of the sensor sheet 81d' is [4] and the trace detection area of the sensor sheet 81e' is [2] and the vertical trace mode is set, the control unit 15 calculates the center of gravity on detection sensitivity between the respective neighboring electrode patterns in the order of [1→5→3] or in the order of the reverse direction [3→5→1] thereof.

For example, the sensor sheet 81c' outputs the trace detection signal S02 to the control unit 15 through the wiring pattern #02. The sensor sheet 81a' outputs the trace detection signal S01 to the control unit 15 through the wiring pattern #01. The sensor sheet 81b' outputs the trace detection signal S04 to the control unit 15 through the wiring pattern #04. The control unit 15 calculates detection sensitivity between electrode patterns and executes the calculation of center of gravity based on the trace detection signal S02 from the sensor sheet 81c', the trace detection signal S01 from the sensor sheet 81a' and the trace detection signal S04 from the sensor sheet 81b'. This enables the position of the operator's finger 30a or the moving direction and the amount of movement of the finger 30a to be detected at the time of the vertical trace mode.

An outline type arrow Ib in the horizontal direction shown in FIG. 46 indicates a slide operation direction at a time of the horizontal trace mode and corresponds to the trace detection range thereof. When this horizontal trace mode is set, the control unit 15 calculates the center of gravity on the detection sensitivity between the respective neighboring electrode patterns in the order of [4→5→2] or in the order of the reverse direction [2→5→4] thereof.

For example, the sensor sheet 81d' outputs the trace detection signal S05 to the control unit 15 through the wiring pattern #05. The sensor sheet 81a' outputs the trace detection signal S01 to the control unit 15 through the wiring pattern #01. The sensor sheet 81e' outputs the trace detection signal S03 to the control unit 15 through the wiring pattern #03. The control unit 15 calculates the detection sensitivity between electrode patterns and executes the calculation on the center of gravity based on the trace detection signal S05 from the sensor sheet 81d', the trace detection signal S01 from the sensor sheet 81a' and the trace detection signal S03 from the sensor sheet 81e'. Thus, at the time of the horizontal trace mode, it becomes possible to detect the position of the operator's finger 30a or the moving direction and the amount of movement of the finger 30a. The vertical trace mode and the horizontal trace mode, as described above, in which tracing is executed on the key-top 152 in a cross shape are, hereinafter, referred to as a cross jog mode collectively.

Also, an outline type arrow Ic in the circular direction shown in FIG. 46 indicates a slide operation direction at a time of the disk trace mode and corresponds to the trace detection range thereof. When this disk trace mode is set, the control unit 15 calculates the center of gravity on the detection sensitivity between the respective neighboring electrode patterns for in the order of [1→2→3→4→1] or in the order of the reverse direction [1→4→3→2→1] thereof.

For example, the sensor sheet 81c' outputs the trace detection signal S02 to the control unit 15 through the wiring pattern #02. The sensor sheet 81e' outputs the trace detection signal S03 to the control unit 15 through the wiring pattern #03. The sensor sheet 81b' outputs the trace detection signal S04 to the control unit 15 through the wiring pattern #04. The sensor sheet 81d' outputs the trace detection signal S05 to the control unit 15 through the wiring pattern #05.

The control unit 15 calculates detection sensitivity between electrode patterns and executes the calculation on the center of gravity based on the trace detection signal S02 from the sensor sheet 81c', the trace detection signal S03 from the sensor sheet 81e', the trace detection signal S04 from the sensor sheet 81b' and the trace detection signal S05 from the sensor sheet 81d'. At a time of such a disk trace mode in which tracing is executed so as to rotate 360° on the key-top 152, it becomes possible to detect the position of the operator's finger 30a or the moving direction and the amount of movement of the finger 30a. The above-mentioned disk trace mode is, hereinafter, referred to as a disk jog mode.

Figures 47A, 47B:
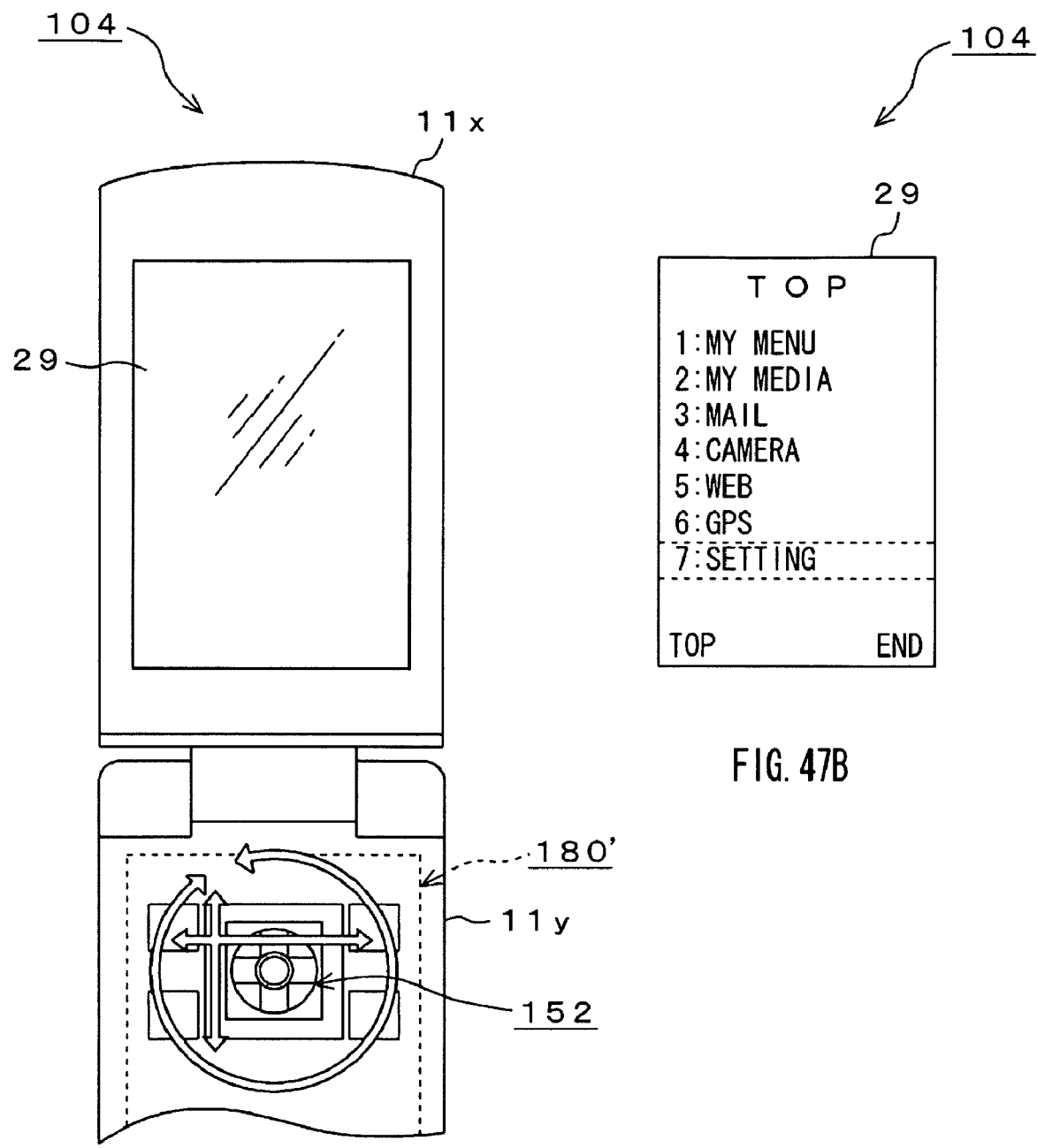
FIGS. 47A and 47B are explanatory diagrams of a mobile phone 104, showing a configuration and a display example of the operation screen thereof.

FIGS. 47A and 47B show a configuration of a mobile phone 104 and a display example of the operation screen thereof. The mobile phone 104 shown in FIG. 47A constitutes one example of an electronic apparatus and is constituted of an upper housing 11x and a lower housing 11y of a folding mechanism. The upper housing 11x is provided with a display unit 29 on which an input operation image of a TOP screen or the like for setting various kinds of modes is displayed.

The input device 180' as shown in FIG. 38 is mounted on the lower housing 11y and information is inputted by a slide operation depending on the operator's finger 30a. The lower housing 11y is provided with an operation panel 18 having the operation surface. The operation panel 18 is provided with a key-top 152 which is provided so as to cover the entire surface of each of the sensor sheets 81a' to 81e' as shown in FIG. 40 and the key-top 152 is slide-operated along the operation surface of the lower housing 11y. The key-top 152 has a convex shape which becomes thicker along the sliding direction from one portion of the operation surface of the lower housing 11y and also which becomes thinner toward the other portion of the operation surface.

The input device 180' includes the FPC board 801 as shown in FIG. 40 and sensor sheets 81a' to 81e' which detect a slide position of the operator's finger 30a and output a position detection signal #S1 and trace detection signals S01 to S05 is mounted thereon. The FPC board 801 includes dome switches 85a to 85e which are turned on or/and off by a press-in operation of the operator's finger 30a to the key-top 152 (see FIG. 41).

The following will describe a relation example of the input device 180' and application. According to the mobile phone 104 shown in FIG. 47A, as shown in an outline type arrow, it is trace-operated in a 360° trace operation or/and in a cross shape on the operation panel 18. The mobile phone 104 is used so as to select any one of the operation modes from the TOP screen in response to the preference of the user. In this embodiment, a trace mode is fixed to a cross jog mode or a disk jog mode by executing the following setting operation. The user can operate various kinds of applications by a trace mode determined by the user himself.

FIG. 47B shows a display example of the Top screen in the display unit 29. On the display unit 29 shown in FIG. 47A, a character image of [Top] which is a name of the Top screen and at the same time, character icon images relating to [1: my menu, 2: my media, 3: mail, 4: camera, 5: WEB, 6: GPS, 7: setting] are displayed. In this embodiment, when the [7: setting] is selected, character color or the like is inverted. Character icon images of [Top], [End] and the like are displayed on the downward of the display screen.

Figure 48A:
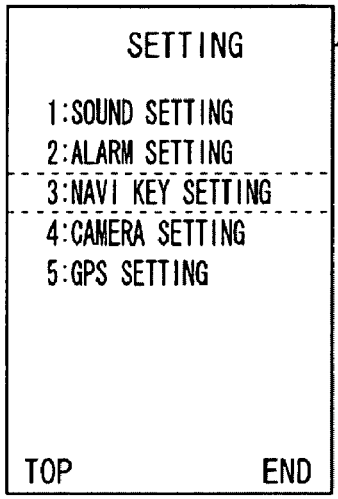
FIGS. 48A to 48D are state transition diagrams each showing mode setting examples in a display unit 29.

FIGS. 48A to 48D show mode setting examples in the display unit 29. FIG. 48A shows a display example of a setting screen in the display unit 29. In this embodiment, the [7: setting] is selected in the display unit 29 shown in FIG. 47B, so that the display is changed over to the [setting] screen as shown in FIG. 48A. On this [setting] screen, character icon images relating to [1: sound setting, 2: alarm setting, 3: navi Key setting, 4: camera setting, 5: GPS setting] are displayed. Character icon images of [Top], [End] and the like are displayed on the downward of the display screen.

Figure 48B:
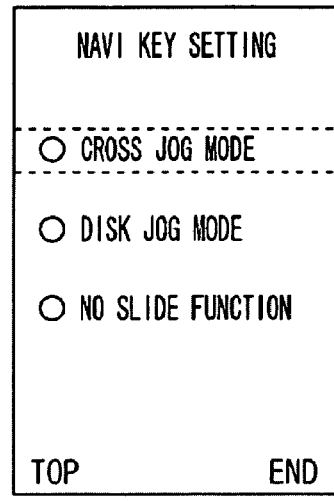

FIG. 48B shows a navi-Key setting example in the display unit 29. In this embodiment, the [3: navi-Key setting] is selected in the display unit 29 shown in FIG. 48A, so that the display is changed over to the navi-Key setting screen as shown in FIG. 48B. On the navi-Key setting screen, character icon images relating to [cross jog mode, disk jog mode, no slide function] are displayed.

Figure 48C:
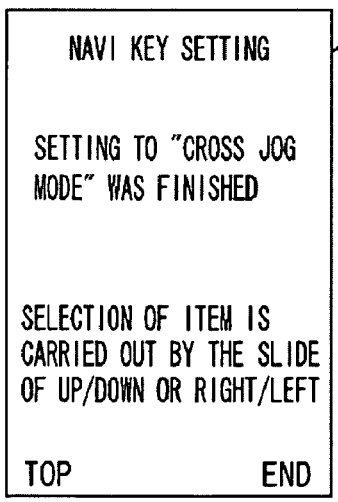

FIG. 48C shows a setting example of a cross jog mode in the navi-Key setting screen. In this embodiment, when the [cross jog mode] is selected in FIG. 48B, character color of the [cross jog mode] is reverse displayed. At the same time, the display in the navi-Key setting screen shown in FIG. 48C is changed over to a character image of the [it is set as a cross jog mode]. A character image of [selection of item is executed by the upward/downward or right/left slide] is displayed on the downward of this character image. It should be noted that character icons of [Top], [End] and the like are displayed on the downward of the display screen.

Figure 48D:
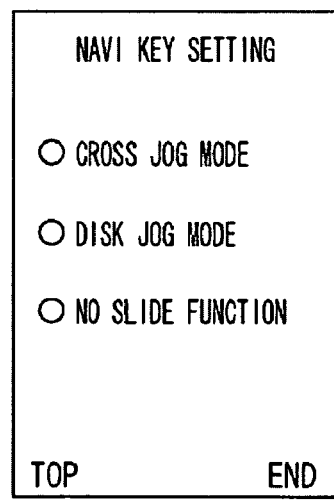

FIG. 48D shows a termination display example at the time of the navi-Key setting in the display unit 29. In this embodiment, when a character icon image of the [End] shown in FIG. 48C is selected, the display is changed over to the navi-Key setting screen shown in FIG. 48C and at the same time, character color of the [cross jog mode] in the corresponding setting screen returns to the original display color. Thus, the setting of the cross jog mode is completed. It should be noted that when the mode setting is changed, character icon images of [Top], [End] and the like on the downward of the display screen is selected.

Figure 49A:
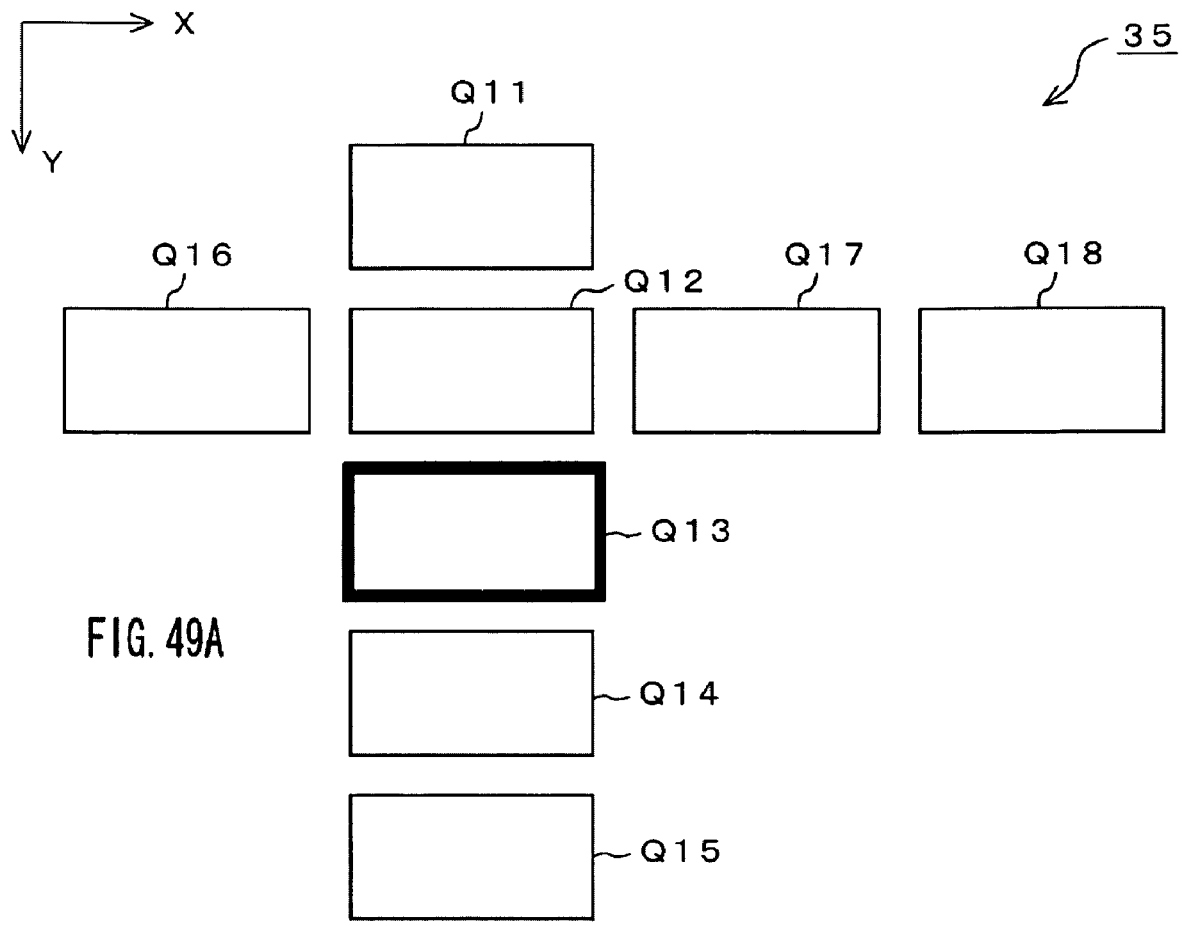
FIGS. 49A and 49B are explanatory diagrams each showing an input operation example in a cross jog mode.
Figure 49B:
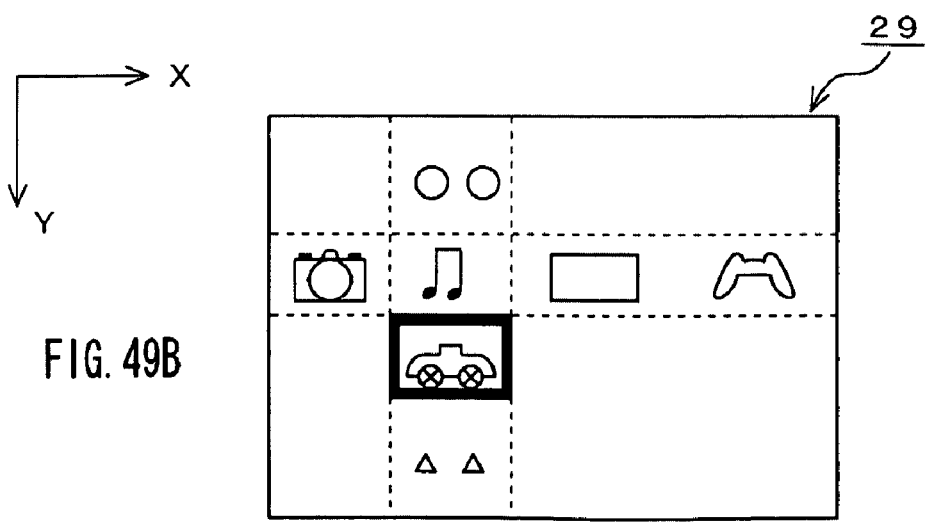

FIGS. 49A and 49B show an input operation example in the cross jog mode. FIG. 49A shows a configuration of application for cross jog mode. The application for cross jog mode is constituted of information relating to a plurality of input operation images which are scrolled in the vertical direction and information relating to a plurality of input operation images which are scrolled in the horizontal direction.

Figure 68:
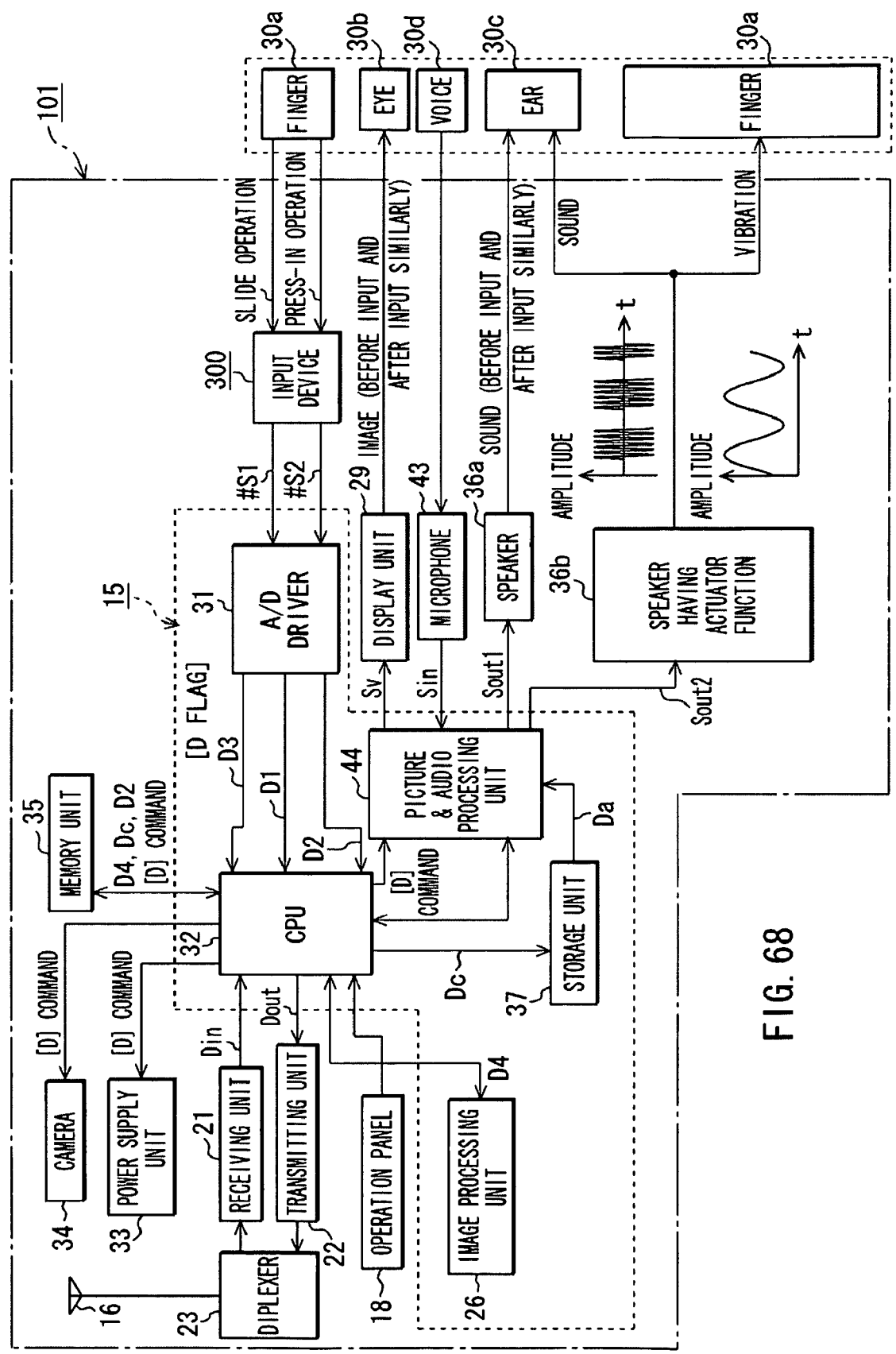
FIG. 68 is a block diagram showing a configuration of a control system of the mobile phone 101 or the like and its feeling feedback function example.

Pieces of information Q11 to Q15 which relate to five input operation images and pieces of information Q16 to Q18 relating to three input operation images, as shown in FIG. 49A, are expanded in the memory space of a memory unit 35 or the like as shown in FIG. 68 and these input operation images are scrolled in the vertical direction or those are scrolled in the horizontal direction. In the cross jog mode, scroll is operated so as to allow for intersecting the output of the pieces of information Q11 to Q15 relating to the input operation image of the vertical direction and the output of the pieces of information Q16 to Q18 relating to the input operation image of the horizontal direction. In the drawing, the piece of information Q13 relating to the input operation image surrounded by thick line is information relating to an image selected by determining an input operation with pushdown-operation of a dome switch 85b or the like of a key-top 152 or the like. Here, the application is executed based on the piece of information Q13 relating to the selected image.

FIG. 49B shows a display example of a UI design screen for cross jog mode. According to the display example of the UI (user interface) design screen for cross jog mode, the pieces of information Q11 to Q15 relating to the input operation image of the vertical direction, and the pieces of information Q16 to Q18 relating to the input operation image of the horizontal direction or the like are read out of a memory unit 35 shown in FIG. 49A and a plurality of icon images which are scrolled in the vertical direction and a plurality of icon images which are scrolled in the horizontal direction are displayed on the same screen of the display unit 29 based on these pieces of information Q11 to Q18.

It is scroll operated so as to intersect a plurality of icon images of the vertical direction and a plurality of icon images of the horizontal direction. In the drawing, icon image surrounded by thick line is an icon image selected by determining the input operation with pushdown-operation of a dome switch 85*b* or the like of the key-top 152 or the like. Here, the application is executed based on the piece of information relating to the selected icon image.

According to the above-mentioned example, it is a case in which the trace mode is changed automatically by each application or a presently selected UI design screen. In this case, the user does not determine the trace mode individually and it is set automatically corresponding to a state of the UI design screen that the trace mode is about to operate, so that the scroll operation can be executed intuitively.

According to this trace mode automatic setting function, a gyro sensor or the like is provided in the cross jog mode and it is detected that a handling method of the electronic apparatus of the mobile phone 104 or the like is changed. When an application screen is reversed in response to the detection information thereof, naturally a detection mode also executes the reversal from a vertical trace mode to a horizontal trace mode or the reversal from the horizontal trace mode to the vertical trace mode or the like and corresponds to the improvement of input operability.

Figure 50A:
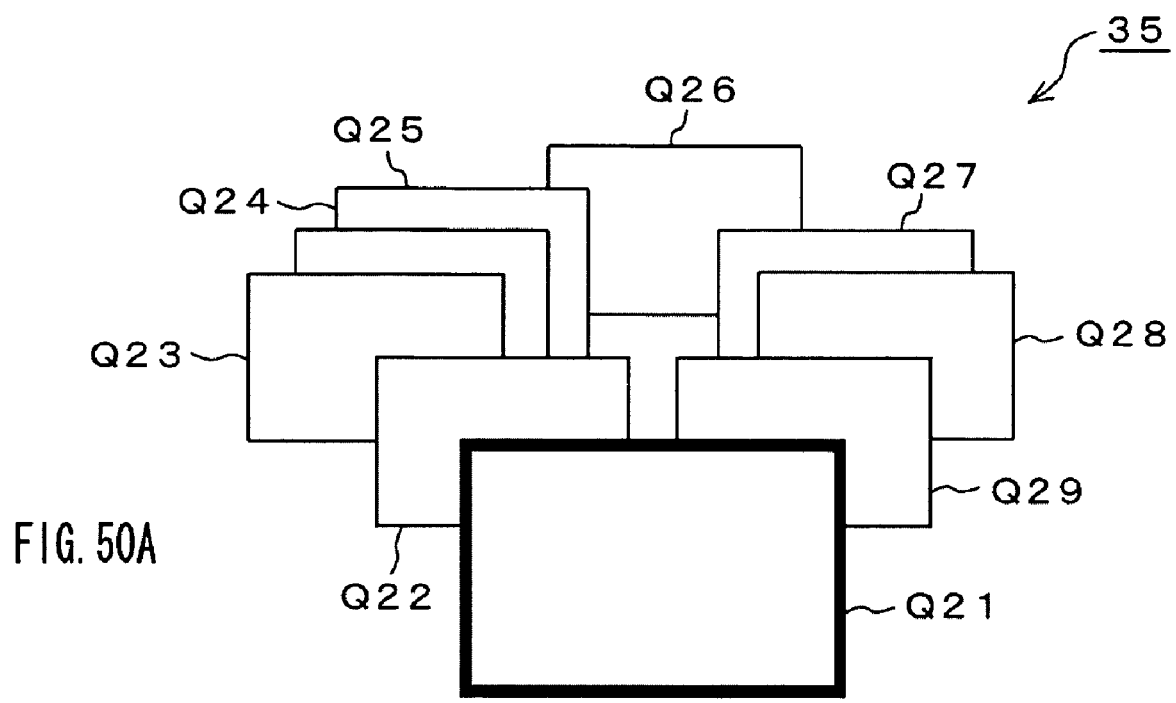
FIGS. 50A and 50B are explanatory diagrams each showing an input operation example in a disk jog mode.
Figure 50B:
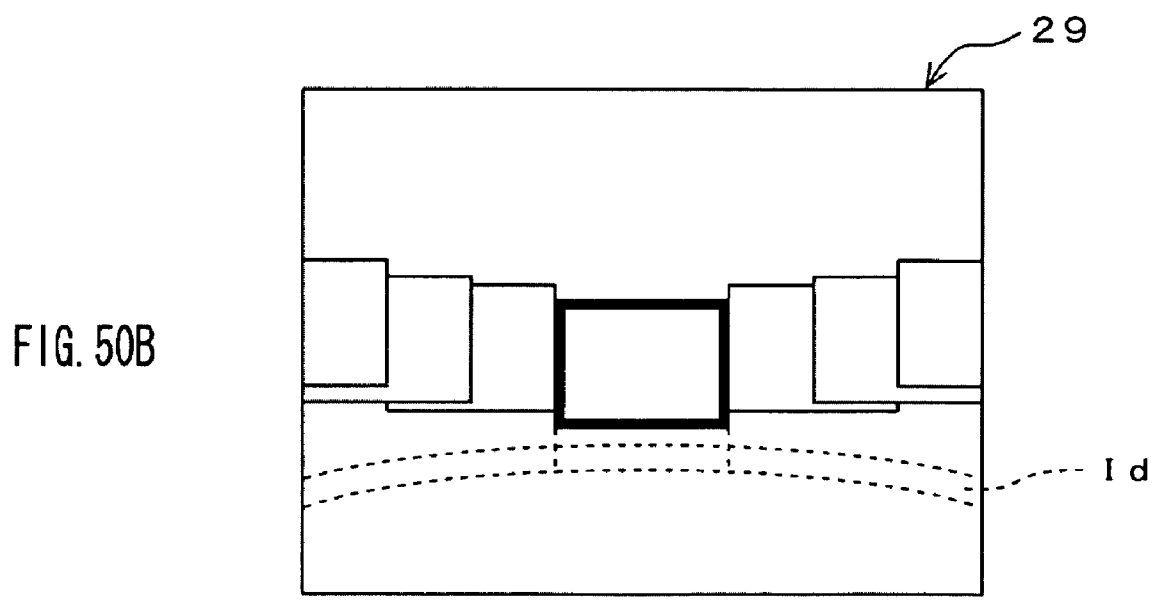

FIGS. 50A and 50B show an input operation example in the disk jog mode. FIG. 50A shows a configuration of an application for disk jog mode. The application for disk jog mode is constituted of pieces of information relating to a plurality of input operation images which are scrolled in the circular direction.

Pieces of information Q21 to Q29 relating to nine input operation images shown in FIG. 50A is expanded in the memory space of a memory unit 35 or the like as shown in FIG. 68 and these input operation images are scrolled in the direction to which a circle is drawn. In the disk jog mode, the pieces of information Q21 to Q29 relating to input operation images scrolled in the circular direction are outputted, for example, clockwise or counterclockwise and a scroll operation becomes possible. In the drawing, the piece of information relating to an input operation image surrounded by thick line is information relating to an image selected by determining an input operation with pushdown-operation by a dome switch 85*b* or the like of the key-top 152 or the like. Here, the application is executed based on the piece of information relating to the selected image.

FIG. 50B shows a display example of a UI design screen for the disk jog mode. According to the display example of the UI design screen for disk jog mode, the pieces of information Q21 to Q29, as shown in FIG. 50A, relating to input operation images of the direction to which a circle is drawn are read out of a memory unit 35 and a plurality of icon images which are scrolled in the circular direction are displayed on the same screen of the display unit 29 based on these pieces of information Q21 to Q29. A term, "Id" shown in FIG. 50B is, for example, the region on which a title or the like of the application is displayed.

In the disk jog mode, a plurality of icon images scrolled in the circular direction, for example, are displayed clockwise or counterclockwise and a scroll operation becomes possible. In the drawing, an icon image surrounded by thick line is an icon image selected by determining an input operation with pushdown-operation by a dome switch 85*b* or the like of the key-top 152 or the like. Here, the application is executed based on the piece of information relating to the selected icon image.

Figure 51:
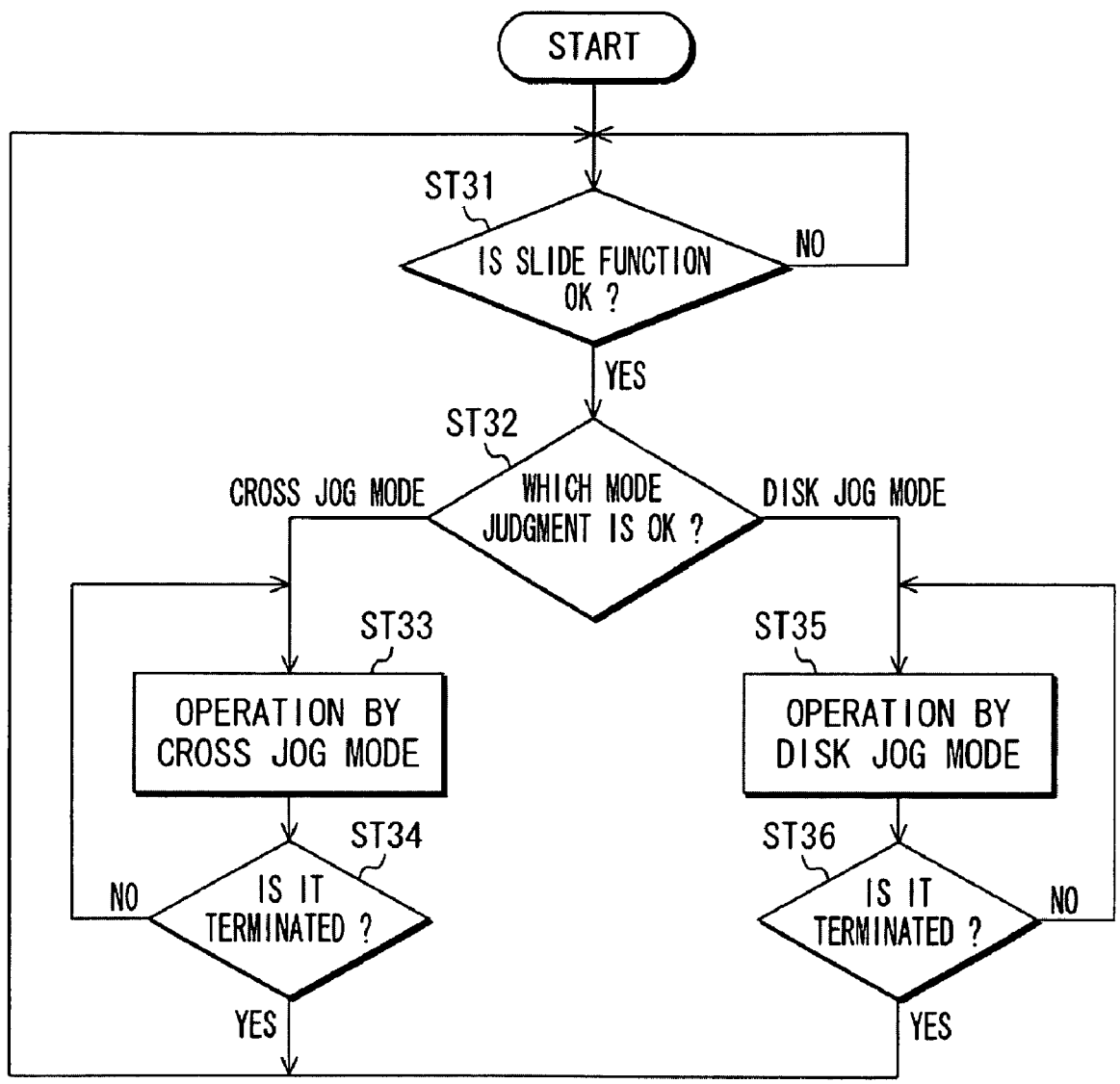
FIG. 51 is a flowchart showing an auto setting example of a trace mode in the input device 180'.

FIG. 51 shows an auto setting example of a trace mode in an input device 180'. In this embodiment, identification information for mode judgment is described in the image information for displaying the application for cross jog mode beforehand and similarly, identification information is described in the image information for displaying the UI design image for cross jog mode.

Also, similarly, identification information is described in the image information for displaying the application for disk jog mode and similarly, identification information is described in the image information for displaying the UI design image for disk jog mode. A case in which the above-mentioned control unit 15 extracts the identification information and automatically sets a trace mode based on the identification information is cited as an example. When the input operation based on the application or the UI design image is terminated, end information is outputted from the input device 180' to the control unit 15.

By making these be conditions, in step ST31 of a flowchart shown in FIG. 51, the control unit 15 waits input (detection) of information showing whether a slide function is turned on or off (hereinafter, referred to as ON-information or OFF-information). The ON-information of the slide function is set by the control unit 15 on the navi-Key setting screen shown in FIG. 48B. When the ON-information of the slide function is inputted, the operation shifts to step ST32. When the ON-information of the slide function is not inputted, a processing is waited until the ON-information of the slide function is detected.

In the step ST32, the control unit 15 judges a trace mode corresponding to an application or a UI design screen. Concerning a judgment reference at that time, the identification information which is described in the image information for displaying each application or presently selected UI design screen beforehand is detected and the trace mode corresponding to the identification information is decoded (detected). For example, the control unit 15 branches the control corresponding to a case in which a result that the identification information which is described in the image information for displaying the application beforehand or the identification information or the like which is described in the image information for displaying the UI design image beforehand is decoded shows a cross jog mode. Further, it branches the control corresponding to a case in which the identification information which is described in the image information for displaying the application beforehand or the identification information or the like which is described in the image information for displaying the UI design image shows a disk jog mode.

If it is judged that the identification information relating to the application or the identification information or the like relating to the UI design image shows a [cross jog mode], then the operation shifts to step ST33 where the control unit 15 executes an input operation based on the application or the UI design image by the cross jog mode.

Thereafter, the operation shifts to step ST34 where the control unit 15 judges termination of the input operation based on the application or the UI design image. At that time, if the input operation is terminated based on the application or the UI design image, end information of the OFF-information or the like of the slide function is outputted to the control unit 15 from the input device 180' that the user operates. If this end information is not detected, then the operation returns to the step ST33 where the control unit 15 continues the above-mentioned input operation based on the application or the UI design image by the cross jog mode. If the end information is detected, then the slide function is rendered OFF and the OFF-information is outputted to the control unit 15, so that the operation returns to the step ST31 where the control unit 15 waits input (detect) of the ON-information of the slide function.

In the above-mentioned step ST32, if it is judged that the identification information relating to the application or the identification information or the like relating to the UI design image shows a [disk jog mode], the operation shifts to step ST35 where the control unit 15 executes the input operation based on the application or the UI design image by the disk jog mode. Thereafter, the operation shifts to step ST36 where the control unit 15 judges termination of the input operation based on the application or the UI design image.

At that time, if the input operation is terminated based on the application or the UI design image, then end information of the OFF-information or the like of the slide function is outputted to the control unit 15 from the input device 180' that the user operates. If this end information is not detected, then the operation returns to the step ST35 where the control unit 15 continues the above-mentioned input operation based on the application or the UI design image by the disk jog mode. If the end information is detected, then the slide function is rendered OFF and the OFF-information is outputted to the control unit 15, so that the operation returns to the step ST31 where the control unit 15 waits input (detect) of the ON-information of the slide function.

In this manner, according to the input device 180' for a modified example, it becomes possible to set either one of a cross jog mode or a disk jog mode automatically. It becomes possible to execute the input operation based on the application or the UI design image by the automatic set cross jog mode or disk jog mode.

[Embodiment 19]

Figure 52A:
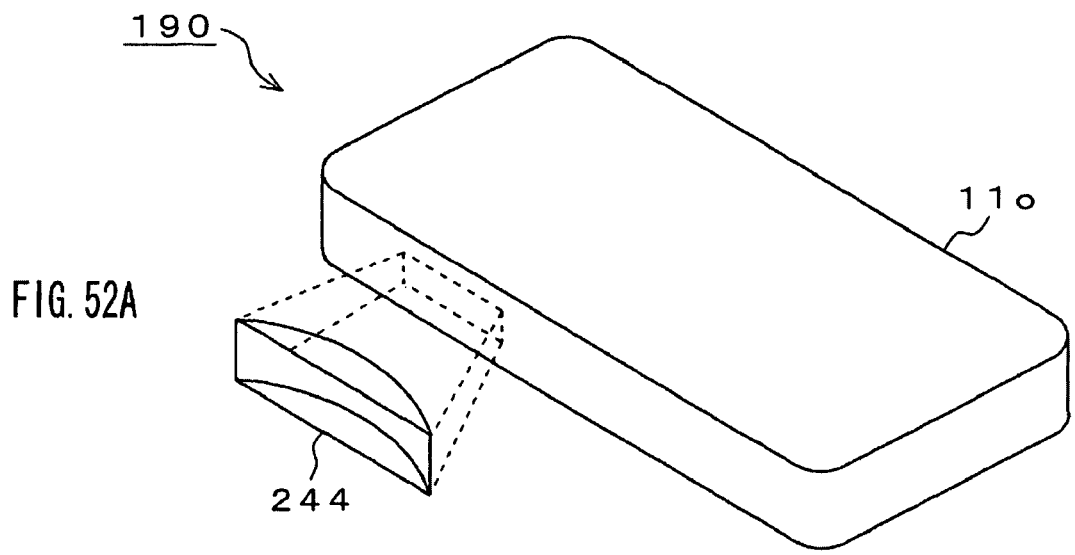
FIG. 52A is a perspective view of an input device 190 as a nineteenth embodiment, showing an appearance example thereof.
Figure 52B:
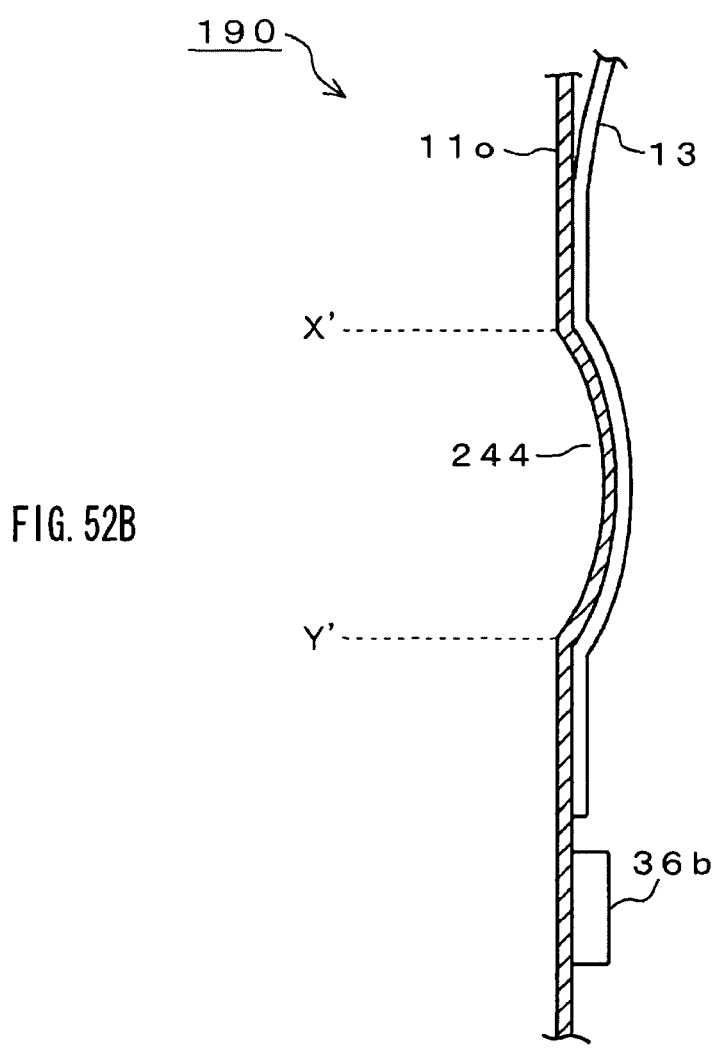
FIG. 52B is a cross-section diagram thereof showing the internal configuration thereof.

FIG. 52A shows an appearance example of an input device 190 as a nineteenth embodiment and FIG. 52B shows its internal configuration.

In this embodiment, a lower housing 11o and a key-top 244 having a reverse arc concave shape are integrally molded instead of the key-top 144 of the convex shape explained in the ninth embodiment. A dome switch 25 and a pusher piece 19 will be omitted. When the dome switch 25 is applied to the input device 190, it is enough if a pressure detecting sheet member is used for the sensor 13 instead of an electrostatic capacitance sheet member.

The input device 190 shown in FIG. 52A includes a lower housing 11o with a key-top having a convex shape on a rear surface thereof. According to the lower housing 11o, with respect to the operation surface of the key-top 244, the rear surface thereof has a convex shape as shown in FIG. 52B.

In this embodiment, the reverse arc concave shape of the key-top 244 forms a bottomed reverse arc having a predetermined depth and aperture width. For example, the key-top 244 has a concave shape which is dug-down along the sliding direction from one portion of the operation surface of the lower housing 11o and also which is dug-up toward the other portion of the operation surface thereof. In order to obtain such a shape, a lower housing 11o may be formed with the portion having a concave shape by injecting a resin into a die molded with a reverse arc convex shape which becomes a key-top 244. A key-top 244 is formed in the region which covers the entire surface of a sensor 13.

Also in this embodiment, a sensor 13 is disposed on the inside of a concave portion of the key-top 244 and operates so as to detect a slide position of the operator's finger 30a. An electrostatic capacitance sheet member is used for the sensor 13 and detects a slide position of the operator's finger 30a to output a position detection signal #S1. A pressure detecting sheet member is used for the sensor 13 other than the electrostatic capacitance sheet member and detects a pressure of the slide position of the operator's finger 30a to output a pressure detection signal.

In this embodiment, the operation surface of the key-top 244 is constituted by material that is different from material of the lower housing 11o and when surface roughness of the material constituting the key-top 244 is substituted as "A" and surface roughness of the material constituting the lower housing 11o is substituted as "B", such a relation as A<B is set between the surface roughness A and the surface roughness B. As constituting like this, it becomes possible to execute the slide operation of the portion which is dug-down along the sliding direction from one portion of the operation surface and also which is dug-up toward the other portion of the operation surface smoothly as compared with the slide operation on the operation surface of the lower housing 11o, and it becomes possible to select information easily by the slide operation of the operator's finger 30a. Thus, it is possible to form the input device 190 including the key-top 244 as an airtight structure.

The key-top 244 is slide-operated along the operation surface of the lower housing 11o and also is slide-operated along the bottomed arc convex shape thereof. By doing like this, in addition to the slide operation feeling of being dug-down in an arc shape along the sliding direction from one portion of the operation surface of the lower housing 11o in response to the slide operation by the operator's finger 30a, it is possible to present the arc shaped slide operation feeling of being dug-up toward the other portion of the operation surface thereof. Consequently, it becomes possible to provide a non-rotary side jog tool or the like which has a reverse structure of the non-rotary side jog tool or the like of the first input device 10. The key-top 244 of this shape is applicable as a scroll key when retrieving various kinds of information and as an information selection key of a volume key and the like when adjusting audio volume.

Also, a speaker 36b with actuator function as shown in FIG. 14 is provided at the position which is on the inside of the lower housing 11o and which is near the key-top 244, and on an occasion of the input determination, it is possible to generate vibration with respect to the slide position of the operator's finger 30a by a vibration body, thereby enabling a sense of touch to be presented to the operator's finger 30a.

FIGS. 53A to 53C show an operation example of the input device 190. Also in this embodiment, the detection area (3) in which a slide position of the operator's finger 30a is detected by the sensor 13 is set to be wider than the concave-portion region (2) in the key-top 244 which is slide-operated by the operator's finger 30a.

In this embodiment, the input device 190 is operated by a left hand and the key-top 244 having a concave shape which is dug-down along the sliding direction from one portion of the operation surface of the lower housing 11o and also which is dug-up toward the other portion of the operation surface is used. An electrostatic capacitance sheet member is used for the sensor 13 and a case in which the detection area that detects a slide position of the operator's finger 30a by the sensor 13 is set to be wider than the operation area which is slide-operated by the key-top 244 depending on the operator's finger 30a is cited as an example.

In FIG. 53A, first, an operator presses a thumb of left hand on an upper portion of the operation region (1) of the input device 190. Next, the operator's finger 30a is slided along the sliding direction from one portion of the operation surface of the lower housing 11b. At that time, in the lower housing 11b, the operator's finger 30a slides on the detection area (3) in the sensor 13.

When the operator's finger 30a continues the slide operation in the concave-portion region (2)' of an exposed portion of the key-top 244, the operator's finger digs-down from a downward start portion "X'" and reaches the hole bottom region of the key-top 244 shown in FIG. 53B. Further, when the slide operation is continued in the concave-portion region (2)', the operator's finger digs-up toward the other portion of the operation surface and reaches an upward end portion "Y'" of the key-top 244 shown in FIG. 53C.

In this embodiment, while slide-operating from FIG. 53A to FIG. 53C is performed, the sensor 13 detects the slide position of the operator's finger 30a to output the position detection signal #S1 to the control unit 15. Thus, in addition to the slide operation feeling of being dug-down in an arc shape along the sliding direction from one portion of the operation surface of the lower housing 11b in response to the slide operation by the operator's finger 30a, it is possible to present the arc shaped slide operation feeling of being dug-up toward the other portion of the operation surface. Furthermore, it becomes possible to provide a non-rotary side jog tool or the like whose structure is different from the rotary side jog tool in the past and by which unique operation feeling which does not exist in such a side jog tool is obtained.

In this manner, according to the input device 190 relating to the nineteenth embodiment, the lower housing 11o and the key-top 244 having the reverse arc concave shape are integrally molded instead of the key-top 144 of the rear surface flat shape explained in the ninth embodiment.

Consequently, assembly of the input device 190 in a mobile phone or the like becomes simple as compared with a method in which the key-top 24, 141 or the like is built in the opening portion 11c of the lower housing 11b as explained in the first to the sixth embodiments. Furthermore, the detection area (3) of the sensor 13 is set to be wider than the concave portion region (2)' of the key-top 244, so that it is possible to include in the slide operation region one portion of the operation surface of the lower housing 11o and the other portion of the operation surface, which sandwiches the key-top 244 of the concave shape with respect to the sliding operation by the operator's finger 30a. Thus, it becomes possible to provide a mobile phone or the like including the input device 190 of an airtight structure to which water-resistance is abundant.

In this embodiment, although a case where the key-top 244 is provided on the right side of the lower housing 11o as shown in FIG. 52 has been described, of course, it is not limited to this. A similar effect is obtained with respect to a case where the key-top is provided on the left side of the lower housing 11o.

[Embodiment 20]

Figure 54A:
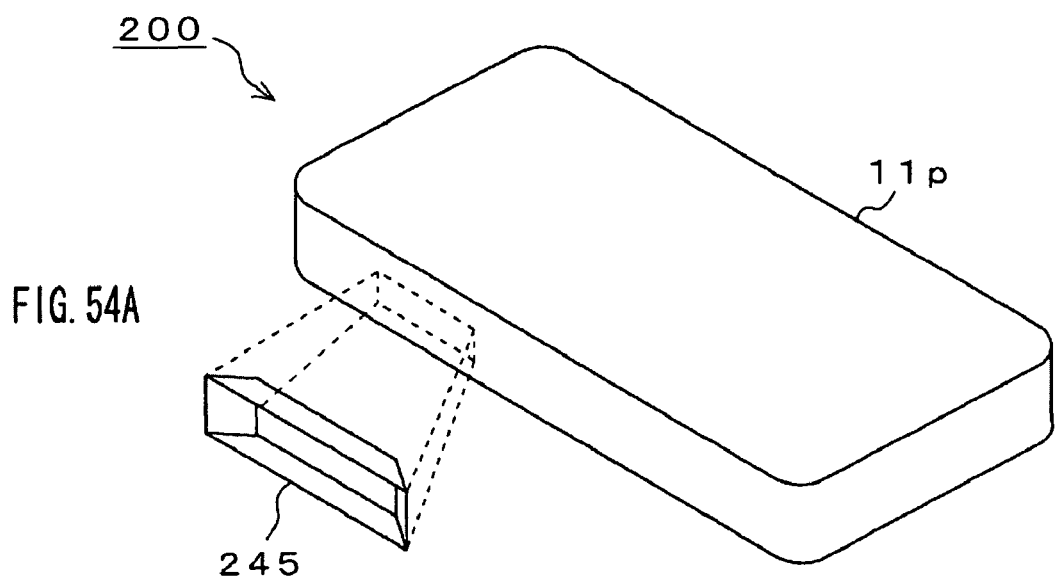
FIG. 54A is a perspective view of an input device 200 as a twentieth embodiment, showing an appearance example thereof.
Figure 54B:
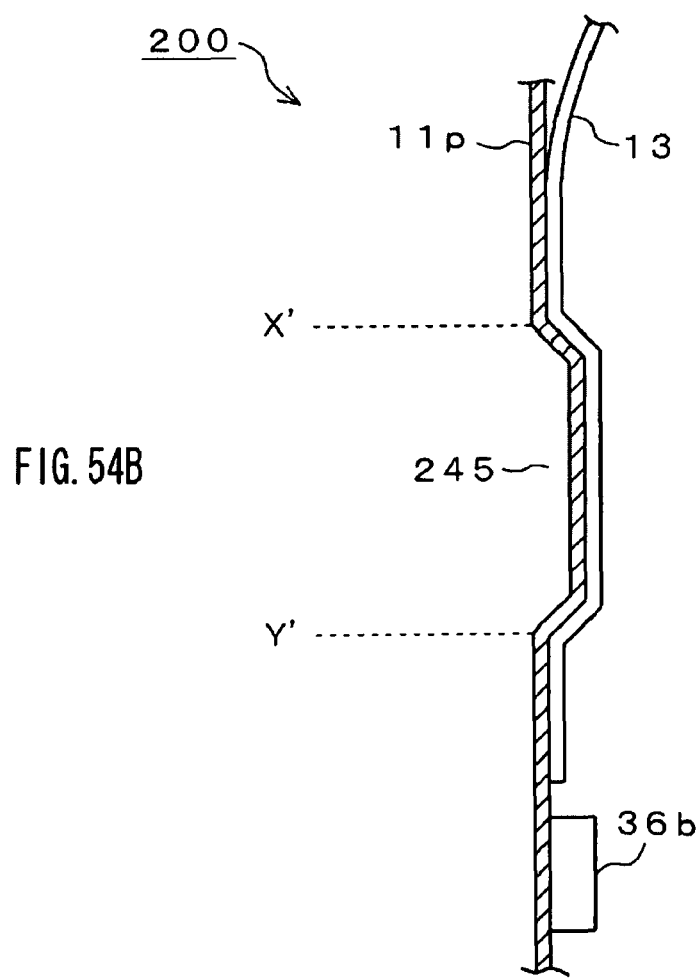
FIG. 54B is a cross-section diagram thereof, showing the internal configuration thereof.

FIGS. 54A and 54B show a configuration of an input device 200 as a twentieth embodiment.

In this embodiment, a lower housing 11p and a key-top 245 having a reverse trapezoid concave shape are integrally molded instead of the key-top 244 of the reverse arc concave shape explained in the nineteenth embodiment. A dome switch 25 and a pusher piece 19 will be omitted. When the dome switch 25 is applied to the input device 200, it is enough if a pressure detecting sheet member is used for the sensor 13 instead of the electrostatic capacitance sheet member.

The input device 200 shown in FIG. 54A includes a lower housing 11p with a key-top having a reverse trapezoid concave shape and also a convex shape on a rear surface thereof. According to the lower housing 11p, the operation surface of the key-top 245 has the reverse trapezoid concave shape that is different from the key-top shapes shown in FIG. 3 to FIG. 53 and the rear surface thereof has a convex shape as shown in FIG. 54B. For example, by injecting a resin to a die for the lower housing which is modeled with an inside reverse trapezoidal shape which becomes the key-top 245, the lower housing 11p having the concave shape is formed.

Also in this embodiment, a sensor 13 is disposed on the inside of the concave portion of the key-top 245. Thus, it is possible to form the input device 200 including the key-top 245 as an airtight structure. The key-top 245 is slided along a concave shape which is dug-down along the sliding direction from one portion of the operation surface of the lower housing 11p and also which is dug-up toward the other portion of the operation surface. Also, a speaker 36b with actuator function as shown in FIG. 14 is provided at a position which is on the inside of the lower housing 11p and which is near the key-top 245 and presents sense of touch to the operator's finger 30a. It should be noted that with respect to an operation example of the input device 200, FIG. 53 is referred.

In this manner, according to the input device 200 relating to the twentieth embodiment, the lower housing 11p and the key-top 245 having the reverse trapezoid concave shape are integrally molded instead of the key-top 244 of the arc convex shape explained in the nineteenth embodiment.

Consequently, assembly of the input device 200 becomes simple as compared with a method in which the key-top 14, 141 or the like is built in the opening portion 11c of the lower housing 11b as explained in the first to the sixth embodiments. Thus, it becomes possible to provide the input device 200 of an airtight structure to which water-resistance is abundant. It should be noted that it is possible to eliminate a bellows-shape process in the vicinity of the downward start portion "X'" and in the vicinity of the upward end portion "Y'" of the key-top 245 by eliminating a dome switch 25.

In this embodiment, although a case where the key-top 245 is provided on the right side of the lower housing 11p as shown in FIG. 54 has been described, of course, it is not limited to this. A similar effect is obtained with respect to a case where the key-top is provided on the left side of the lower housing 11p.

[Embodiment 21]

Figure 55A:
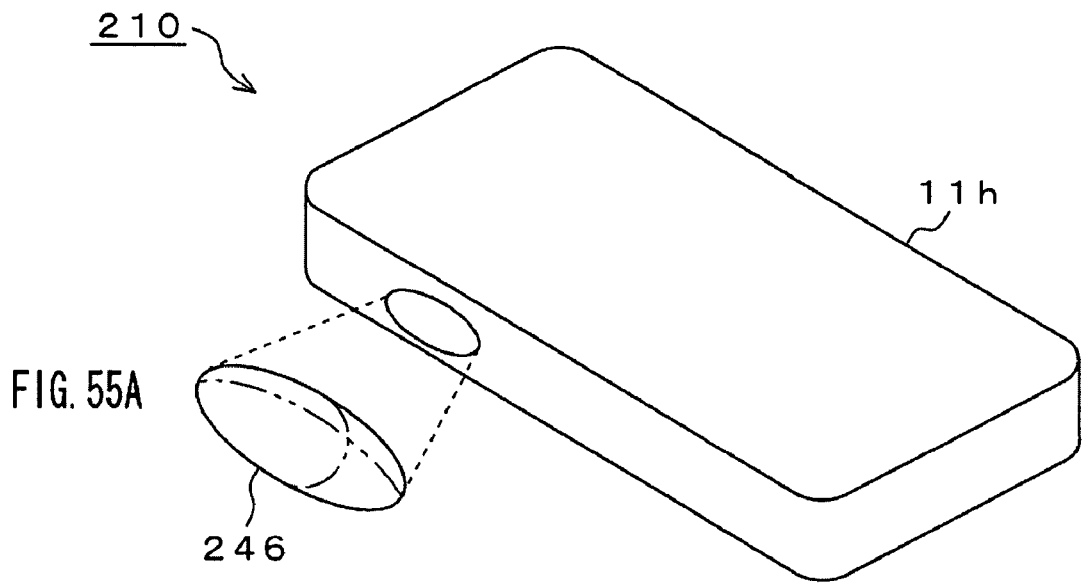
FIG. 55A is a perspective view of an input device 210 as a twenty-first embodiment, showing an appearance example thereof.
Figure 55B:
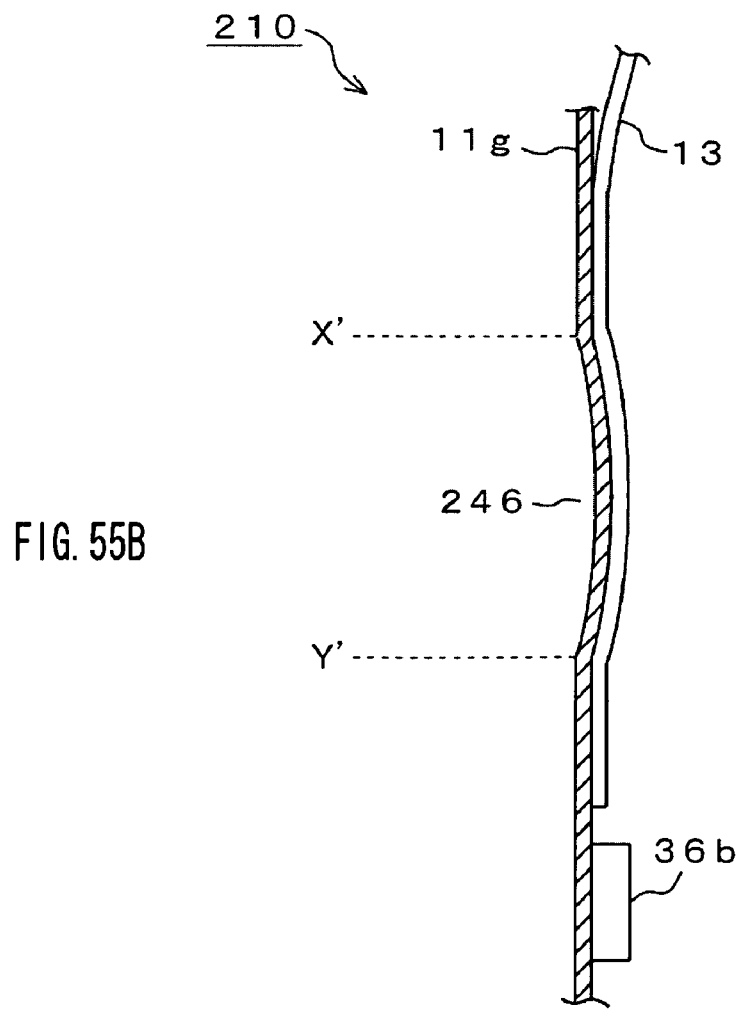
FIG. 55B is a cross-section diagram thereof, showing the internal configuration thereof.

FIGS. 55A and 55B show a configuration of an input device 210 as a twenty-first embodiment.

In this embodiment, a lower housing 11q and a key-top 246 having a long concave shape are integrally molded instead of the key-top 245 of the reverse trapezoid concave shape explained in the twentieth embodiment. A dome switch 25 and a pusher piece 19 will be omitted. When the dome switch 25 is applied to the input device 210, it is enough if a pressure detecting sheet member is used for the sensor 13 instead of the electrostatic capacitance sheet member.

The input device 210 shown in FIG. 55A includes a lower housing 11q with a key-top having a long concave shape and also a convex shape on a rear surface thereof. According to the lower housing 11q, the operation surface of the key-top 246 has the long concave shape that is different from the key-top shapes shown in FIG. 3 to FIG. 55 and the rear surface thereof has a convex shape as shown in FIG. 55B. For example, by injecting a resin to a die for the lower housing which is modeled with a long concave shape which becomes the key-top 246, the lower housing 11q having the concave shape is formed.

Also in this embodiment, a sensor 13 is disposed on the inside of the concave portion of the key-top 246. Thus, it is possible to form the input device 210 including the key-top 246 as an airtight structure. The input device 210 is operated by a left hand and the key-top 246 is slide-operated along a concave shape which is dug-down along the sliding direction from one portion of the operation surface of the lower housing 11q and also which is dug-up toward the other portion of the operation surface thereof. Also, a speaker 36b with actuator function as shown in FIG. 14 is provided at a position which is on the inside of the lower housing 11q and which is near the key-top 246 and can present sense of touch to the operator's finger 30a. It should be noted that with respect to the operation example of the input device 210, FIG. 53 is referred.

In this manner, according to the input device 210 relating to the twenty-first embodiment, the lower housing 11q and the key-top 246 having the long concave shape are integrally molded instead of the key-top 245 of the reverse trapezoid concave shape explained in the twentieth embodiment.

Consequently, assembly of the input device 210 becomes simple as compared with a method in which the key-top 14, 141 or the like is built in the opening portion 11c of the lower housing 11b as explained in the first to the sixth embodiments. Thus, it becomes possible to provide the input device 210 of an airtight structure to which water-resistance is abundant. It should be noted that it is possible to eliminate a bellows-shape process in the vicinity of the downward start portion "X'" and in the vicinity of the upward end portion "Y'" of the key-top 246 by eliminating a dome switch 25.

In this embodiment, although a case where the key-top 246 is provided on the right side of the lower housing 11q as shown in FIG. 55 has been described, of course, it is not limited to this; it is needless to say that a similar effect is obtained with respect to a case where the key-top is provided on the left side of the lower housing 11q.

[Embodiment 22]

Figure 56A:
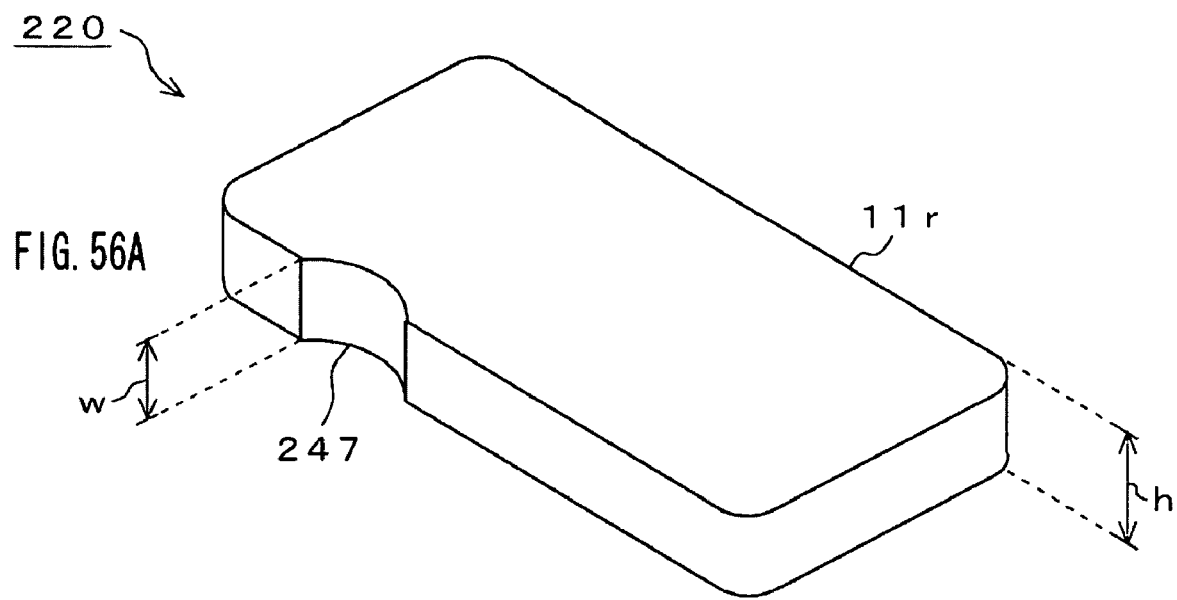
FIG. 56A is a perspective view of an input device 220 as a twenty-second embodiment, showing an appearance example thereof.
Figure 56B:
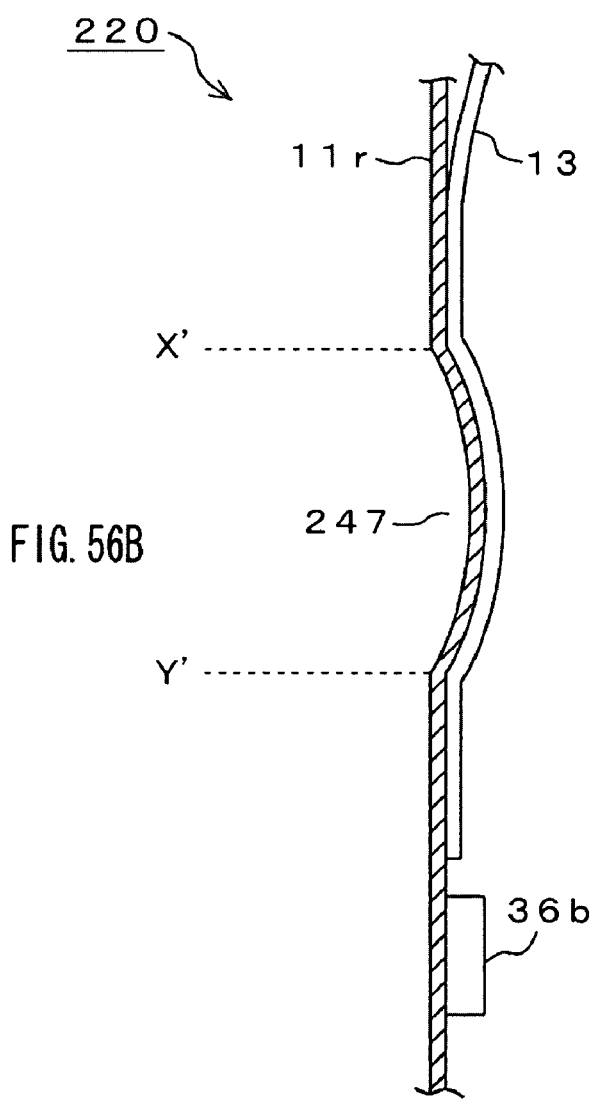
FIG. 56B is a cross-section diagram thereof, showing the internal configuration thereof.

FIGS. 56A and 56B show a configuration of an input device 220 as a twenty-second embodiment.

In this embodiment, a lower housing 11r and a key-top 247 having a reverse semi-cylindrical shape are integrally molded instead of the key-top 246 of the long concave shape explained in the twenty-first embodiment. A dome switch 25 and a pusher piece 19 will be omitted. When a press-in function is applied by the key-top 247, it is enough if a pressure detecting sheet member is used for the sensor 13 instead of an electrostatic capacitance sheet member.

The input device 220 shown in FIG. 56A includes a lower housing 11r with a key-top having a reverse semi-cylindrical shape and also a convex shape on rear surface. According to the lower housing 11r, the operation surface of the key-top 247 has the reverse semi-cylindrical shape that is different from the key-top shapes shown in FIG. 3 to FIG. 55. In this embodiment, when the key-top 247 whose width is substituted as "w" and a height of the lower housing 11r is substituted as "h", such a relation as w=h is formed. The rear surface of the key-top 247 has a convex shape as shown in FIG. 56B. For example, by injecting a resin to a die for the lower housing which is modeled with a semi-cylindrical dome shape which becomes a key-top 247 of width "w", the lower housing 11r of height "h" having the concave shape is formed.

Also in this embodiment, a sensor 13 is disposed on the inside of the concave portion of the key-top 247. Thus, it is possible to form the input device 220 including the key-top 247 as an airtight structure. The key-top 247 is slide-operated along a concave shape which is dug-down along the sliding direction from one portion of the operation surface of the lower housing 11r and also which is dug-up toward the other portion of the operation surface thereof. Also, a speaker 36b with an actuator function as shown in FIG. 14 is provided at a position which is on the inside of the lower housing 11r and which is near the key-top 247 and presents sense of touch to the operator's finger 30a. It should be noted that with respect to the operation example of the input device 220, FIG. 53 is referred.

In this manner, according to the input device 220 relating to the twenty-second embodiment, the lower housing 11r and the key-top 247 having the reverse semi-cylindrical shape are integrally molded instead of the key-top 246 of the long concave shape explained in the twenty-first embodiment.

Consequently, assembly of the input device 220 becomes simple as compared with a method in which the key-top 14, 141 or the like is built in the opening portion 11c of the lower housing 11b as explained in the first to the sixth embodiments. Thus, it becomes possible to provide the input device 220 of an airtight structure to which water-resistance is abundant. It should be noted that it is possible to eliminate a bellows-shape process in the vicinity of the downward start portion "X'" and in the vicinity of the upward end portion "Y'" of the key-top 247 by eliminating a dome switch 25.

In this embodiment, although a case where key-top 247 is provided on the right side of the lower housing 11r as shown in FIG. 56 has been described, of course, it is not limited to this. A similar effect is obtained with respect to a case where the key-top is provided on the left side of the lower housing 11r.

[Embodiment 23]

Figure 57:
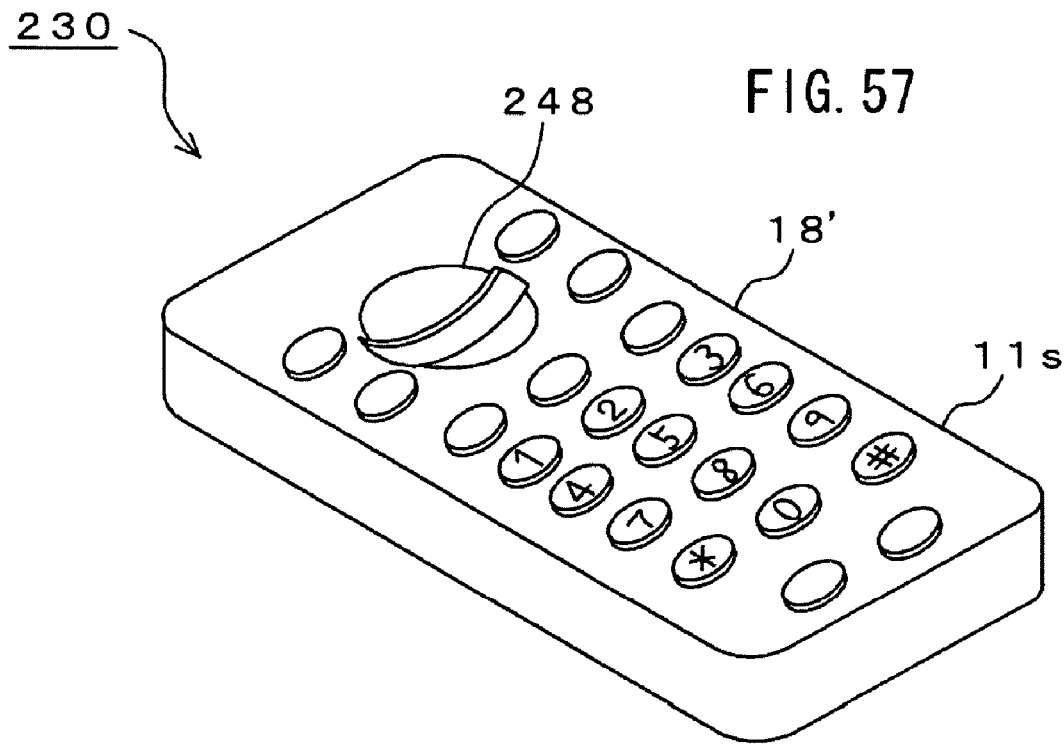
FIG. 57 is a perspective view of an input device 230 as a twenty-third embodiment, showing a configuration thereof.

FIG. 57 shows a configuration of an input device 230 as a twenty-third embodiment. In this embodiment, instead of the key-tops 14, 141 to 146 for the housing side surface arrangement including various kinds of shapes explained in the first to the twelfth embodiments, an operation panel 18' of a lower housing 11s and a key-top 248 having a concave shape of hemispheric inner surface single horizontal-line are integrally molded.

The input device 230 shown in FIG. 57 includes a lower housing 11s with a key-top having a concave shape of hemispheric inner surface single horizontal-line. An upper portion of the lower housing 1 is the operation surface and an operation panel 18' in which a ten-key of numerals [0] to [9], a symbol [*] key, a [#] symbol key and the like are arranged is provided on the upper portion operation surface. In this embodiment, an individual key has an elliptical shape.

Figure 58:
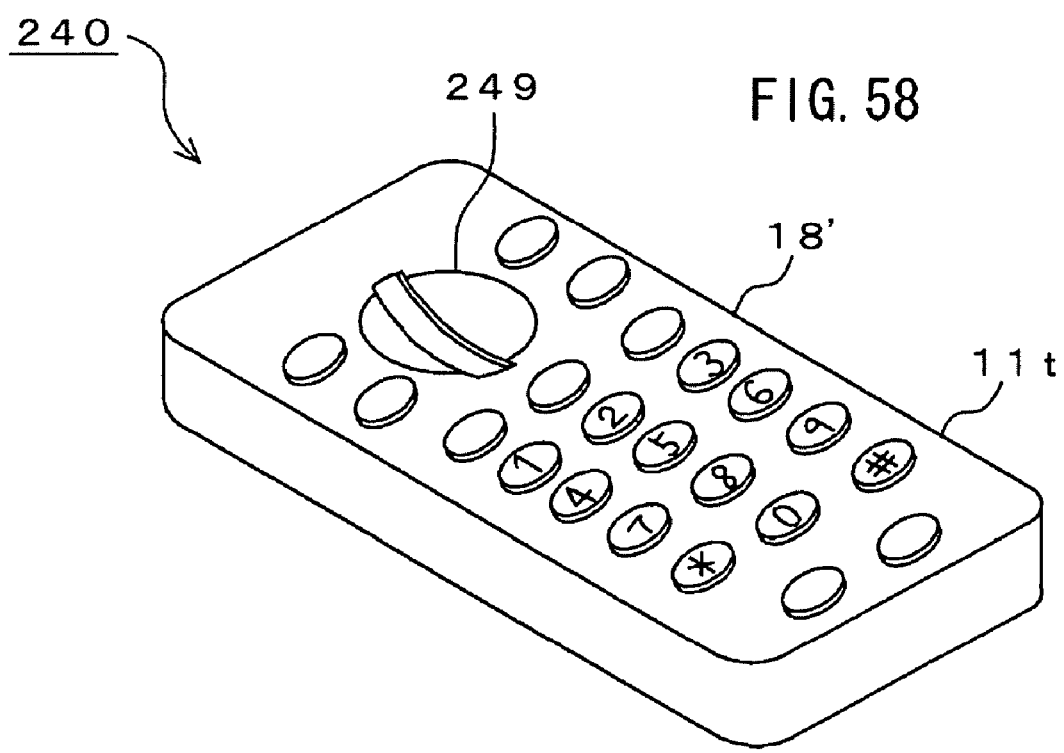
FIG. 58 is a perspective view of an input device 240 as a twenty-fourth embodiment, showing a configuration thereof.

According to the lower housing 11s, the operation surface of the key-top 248 is curved in the concave shape of hemispheric inner surface single horizontal-line that is different from the key-top shapes shown in FIG. 3 to FIG. 58. The key-top 248 forms a bottomed hemispheric concave shape having a predetermined depth and aperture width. With respect to a structure on the inside of the key-top 248 of the lower housing 11s, a structure of the sensor 13 as shown in FIG. 52, FIG. 55 or FIG. 55B is employed (see FIG. 52, FIG. 55 or FIG. 55B). When a press-in function by the key-top 248 is applied, it is enough if a pressure detecting sheet member is used for the sensor 13 instead of the electrostatic capacitance sheet member.

The lower housing 11s having the concave shape is formed, for example, by injecting a resin in a die for the lower housing which is modeled with a concave shape of hemispheric inner surface single horizontal-line which becomes a key-top 248 and a ten-key of numerals [0] to [9], a symbol [*] key, a [#] symbol key and the like which become an operation panel 18'. Thus, the operation panel 18' of the ten-key and the like and the key-top 248 are integrally molded and it is possible to form the input device 230 including the key-top 248 as an airtight structure. The key-top 248 is slide-operated along a concave shape which is dug-down along the sliding direction from one portion of the operation surface of the lower housing 11s also which is dug-up toward the other portion of the operation surface thereof. Also, a speaker 36b with an actuator function as shown in FIG. 14 is provided at a position which is on the inside of the lower housing 11s and which is near the key-top 248 and can present sense of touch to the operator's finger 30a.

In this embodiment, the key-top 248 is slide-operated along the concave shape of hemispheric inner surface single horizontal-line (one orbit of the bottomed hemispheric concave shape). Thus, in addition to the slide operation feeling of being dug-down in an arc shape along one orbit of the shape of hemispheric inner surface from one portion of the operation surface of the lower housing 11s in response to the slide operation by the operator's finger 30a, it is possible to present the slide operation feeling of being dug-up in an arc shape toward the other portion of the operation surface thereof. Consequently, it is a structure which is different from the cross key in the past and unique operation feeling which does not exist in the cross key is obtained, thereby enabling the key-top 248 of the shape to be applied as an image information selection key for selecting information.

In this manner, according to the input device 230 relating to the twenty-third embodiment, the operation panel 18' of the lower housing 11s and the key-top 248 having the concave shape of hemispheric inner surface single horizontal-line are integrally molded. Consequently, it becomes possible to provide the input device 230 of an airtight structure to which water-resistance is abundant. Furthermore, assembly of the input device 230 becomes simple as compared with a method in which the key-top 248 of the concave shape of hemisphere inner surface single horizontal-line arc and the operation panel which forms a ten-key of numerals [0] to [9], a symbol [*] key, a [#] symbol key and the like are assembled separately.

In this embodiment, although a case where the key-top 248 is provided on the front surface side of the lower housing 11s as shown in FIG. 57 has been described, of course, it is not limited to this. A similar effect is obtained with respect to a case where the key-top is provided on the rear surface side of the lower housing 11s.

[Embodiment 24]

FIG. 58 shows a configuration of an input device 240 as a twenty-fourth embodiment. In this embodiment, instead of the key-tops 14, 141 to 146 for the housing side surface arrangement including various kinds of shapes explained in the first to the twelfth embodiments, an operation panel 18' of a lower housing 11t and a key-top 249 having a concave shape of hemispheric inner surface single vertical-line are integrally molded.

The input device 240 shown in FIG. 58 includes a lower housing 11t with a key-top having a concave shape of hemispheric inner surface single vertical-line. An upper portion of the lower housing 11t is the operation surface and an operation panel 18' in which a ten-key of numerals [0] to [9], a symbol [*] key, a [#] symbol key and the like are arranged is provided on the upper portion operation surface. According to the lower housing 1 it, the operation surface of the key-top 249 is different from the key-top shape shown in FIG. 57 and is curved in the concave shape of hemispheric inner surface single vertical-line. The key-top 249 has a predetermined depth and aperture width. With respect to a structure on the inside of the key-top 249 of the lower housing 11t, a structure of the sensor 13 as shown in FIG. 52, FIG. 55 or FIG. 55B is employed (see FIG. 52, FIG. 55 or FIG. 55B). When a press-in function by the key-top 249 is applied, it is enough if a pressure detecting sheet member is used for the sensor 13 instead of the electrostatic capacitance sheet member.

The lower housing 11t having the concave shape, for example, by injecting a resin in a die for the lower housing which is modeled with a concave shape of hemispheric inner surface single vertical-line which becomes a key-top 249 and a ten-key of numerals [0] to [9], a symbol [*] key, a [#] symbol key and the like which become an operation panel 18'. Thus, it is possible to form the input device 240 including the key-top 249 as an airtight structure. The key-top 251 is slide-operated along a concave shape which is dug-down along the sliding direction from one portion of the operation surface of the lower housing 11t and also which is dug-up toward the other portion of the operation surface thereof. Also, a speaker 36b with an actuator function as shown in FIG. 14 is provided at a position which is on the inside of the lower housing 11t and which is near the key-top 249 and can present sense of touch to the operator's finger 30a.

In this embodiment, the key-top 249 is slide-operated along the concave shape of hemispheric inner surface single vertical-line. Thus, in addition to the slide operation feeling of being dug-down in an arc shape along the concave shape of hemispheric inner surface single vertical-line (one orbit of the hemispheric concave shape) from one portion of the operation surface of the lower housing 11t in response to the slide operation by the operator's finger 30a, it is possible to present the slide operation feeling of being dug-up in a concave shape toward the other portion of the operation surface thereof. Consequently, it is a structure which is different from the cross key in the past and unique operation feeling which does not exist in the cross key is obtained, thereby the key-top 249 of the shape to be applied as an image information selection key for selecting information.

In this manner, according to the input device 240 relating to the twenty-fourth embodiment, the operation panel 18' of the lower housing 11t and the key-top 249 having the concave shape of hemispheric inner surface single vertical-line are integrally molded. Consequently, it becomes possible to provide the input device 240 of an airtight structure to which water-resistance is abundant. Furthermore, assembly of the input device 240 becomes simple as compared with a method in which the key-top 249 of the concave shape of hemispheric inner surface single vertical-line and the operation panel which forms a ten-key of numerals [0] to [9], a symbol [*] key, a [#] symbol key and the like are assembled separately.

In this embodiment, although a case where the key-top 249 is provided on the front surface side of the lower housing 11t as shown in FIG. 58 has been described, of course, it is not limited to this. A similar effect is obtained with respect to a case where the key-top is provided on the rear surface side of the lower housing 11t.

[Embodiment 25]

Figure 59:
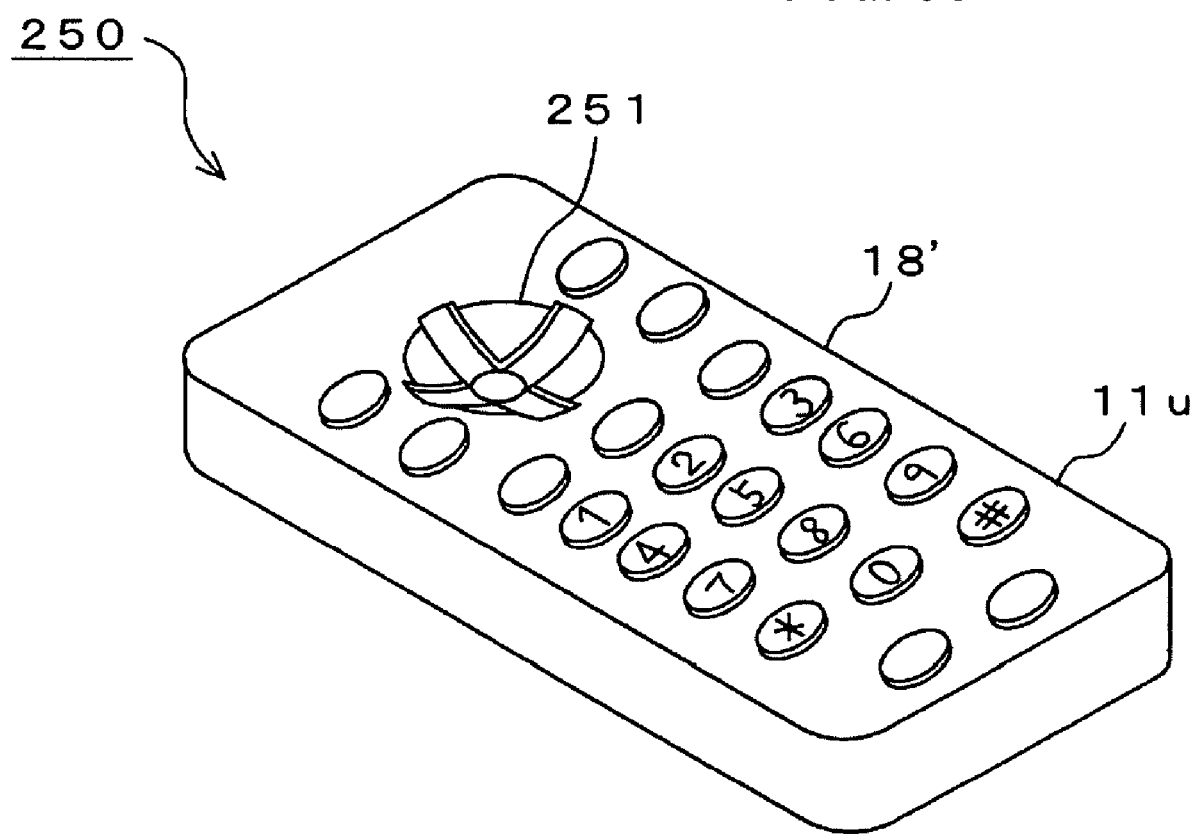
FIG. 59 is a perspective view of an input device 250 as a twenty-fifth embodiment, showing a configuration thereof.

FIG. 59 shows a configuration of an input device 250 as a twenty-fifth embodiment. In this embodiment, instead of the key-tops 14, 141 to 146 for the housing side surface arrangement including various kinds of shapes explained in the first to the twelfth embodiments, an operation panel 18' of a lower housing 11u and a key-top 251 having a concave shape of hemispheric inner surface cross are integrally molded.

The input device 250 shown in FIG. 59 includes a lower housing 11u with a key-top having a concave shape of hemispheric inner surface cross. An upper portion of the lower housing 11u is the operation surface and an operation panel 18' in which a ten-key of numerals [0] to [9], a symbol [*] key, a [#] symbol key and the like are arranged is provided on the upper portion operation surface.

According to the lower housing 11u, the operation surface of the key-top 251 is different from a key-top shape shown in FIG. 58 and is curved in the concave shape of hemispheric inner surface cross. With respect to a structure on the inside of the key-top 251 of the lower housing 11*u*, a structure of the sensor 13 as shown in FIG. 52, FIG. 55 or FIG. 55B is employed (see FIG. 52, FIG. 55 or FIG. 55B). When a press-in function is applied by the key-top 251, it is enough if a pressure detecting sheet member is used for the sensor 13 instead of an electrostatic capacitance sheet member.

The lower housing 11*u* having the concave shape is formed, for example, by injecting a resin in a die for the lower housing which is modeled with a concave shape of hemispheric inner surface cross which becomes a key-top 251 and a ten-key of numerals [0] to [9], a symbol [*] key, a [#] symbol key and the like which become an operation panel 18'. Thus, it is possible to form the input device 250 including the key-top 251 as an airtight structure. The key-top 251 is slide-operated along a concave shape which is dug-down along the sliding direction from one portion of the operation surface of the operation panel 18' and also which is dug-up toward the other portion of the operation surface. Also, a speaker 36*b* with an actuator function as shown in FIG. 14 is provided at a position which is on the inside of the lower housing 11*u* and which is near the key-top 251 and can present sense of touch to the operator's finger 30*a*.

In this embodiment, the concave shape of hemispheric inner surface cross of the key-top 251 includes a shape in which the concave shape of hemispheric inner surface single horizontal-line shown in FIG. 57 and the concave shape of hemispheric inner surface single vertical-line shown in FIG. 58 are intersected. The key-top 251 is slide-operated along the concave shape of hemispheric inner surface single horizontal-line or/and is slide-operated along the concave shape of hemispheric inner surface single vertical-line intersected with this.

In this manner, according to the input device 250 relating to the twenty-fifth embodiment, the operation panel 18' of the lower housing 11*u* and the key-top 251 having the concave shape of plane cross are integrally molded.

Consequently, in response to the slide operation by the operator's finger, in addition to the slide operation feeling of being dug-down in an arc shape along the concave shape of hemispheric inner surface single horizontal-line (one orbit of the hemispheric concave shape) from one portion of the operation surface of the lower housing 11*u*, it is possible to present the slide operation feeling of being dug-up in an arc convex shape toward the other portion of the operation surface thereof. Further, in addition to the slide operation feeling of being dug-down in an arc shape along the other orbit intersected with the concave shape of hemispheric inner surface single horizontal-line (one orbit of the hemispheric concave shape) from one portion of the operation surface of the lower housing 11*u*, it is possible to present the slide operation feeling of being dug-up in the concave shape of hemispheric inner surface single vertical-line toward the other portion of the operation surface.

Thus, it becomes possible to provide the input device 250 of an airtight structure to which water-resistance is abundant. Furthermore, assembly of the input device 250 becomes simple as compared with a method in which the key-top of the plane cross convex shape in the past and the operation panel which forms a ten-key of numerals [0] to [9], a symbol [*] key, a [#] symbol key and the like are assembled separately.

Figure 60:
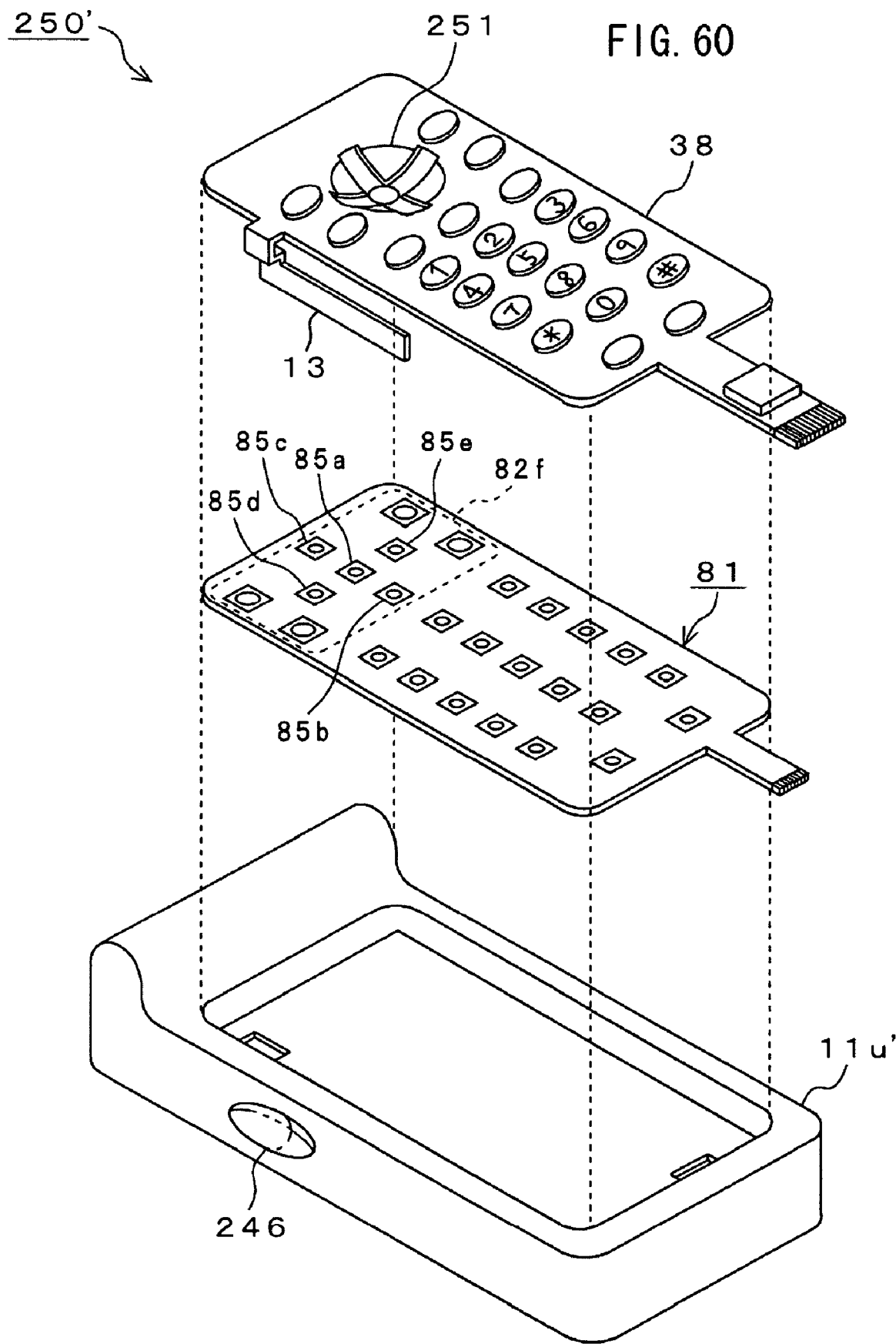
FIG. 60 is an exploded perspective view of an input device 250' as a modified example, showing a configuration thereof.

FIG. 60 shows a configuration of an input device 250' for a modified example. In this embodiment, dome switches 85*a* to 85*e* are provided on an FPC board 81 and operate so as to be turned on or/and off by a press-in operation of the key-top 251. According to the input device 250' shown in FIG. 60, it is assembled so that the FPC board 81 is disposed in a lower housing 11*u'* and from the upper portion thereof, a key-top array type operation panel 38 is overlaid.

In this embodiment, the key-top 246 having the long concave shape as shown in FIG. 55 is formed and also the lower housing 11*u'* including a hinge mechanism is used. The lower housing 11*u'* is molded by injecting a PC (polycarbonate) resin, a PC+ABS resin or the like into a die which is modeled with a hinge mechanism and a long shape for key-top. In this embodiment, the key-top 246 is molded and thereafter, an UV (ultraviolet ray) coating is applied thereto. For example, a solution for improving abrasion resistance is applied to the operation surface of the key-top 246. Thereafter, ultraviolet rays are illuminated to and the painted surface is cured. Thus, it is possible to improve abrasion resistance of the operation surface of the key-top 246.

When the lower housing 11*u'* is formed by a metal, the lower housing 11*u'* including the key-top 246 is formed at a predetermined position by using an aluminum plate, a magnesium plate, a stainless plate of a SUS 304 or the like and by applying a press processing, a deep drawing processing or an extrusion processing to these members. The sensor 13 and the FPC board 81 are arranged in this order on the inside of the key-top 246. The sensor 13, for example, is formed in continuation of an operation panel 38 which forms a ten-key of numerals [0] to [9], a symbol [*] key, a [#] symbol key and the like.

On the operation surface of the operation panel 38, a ten-key portion of numerals [0] to [9], a symbol [*] key, a [#] symbol key and the like are provided, and a key-top 251 is integrally molded with the ten-key portion or the like. The operation panel 38 is formed, for example, by injecting a predetermined resin or the like into a die which forms a key-top 251, a ten-key portion or the like. Also, a rubber sheet portion 82*f* with pusher pieces 82*a* to 82*e* is arranged on the FPC board 81 with switch function in a state in which sensor sheets 81*a'* to 81*e'* are sandwiched therebetween.

The FPC board 81 is constituted by including sheet shaped sensor sheets 81*a* to 81*e* (not shown) which detect a slide position of the operator's finger 30*a* to output a position detection signal #S1. The FPC board 81 has a sheet shape. On one surface of the FPC board 81, there are provided sheet shaped sensor sheets 81*a* to 81*e* each including the dome-shape-protuberating region and at the same time, fixed side contact electrodes which constitute dome switches 85*a* to 85*e* are respectively provided on the inside of the dome-shape-protuberating regions. On the other surface of the FPC board 81, there is provided a wiring pattern which is derived from the fixed side contact electrodes of the dome switches 85*a* to 85*e* through through-holes which are not shown (see FIG. 34).

The sensor sheets 81*a* to 81*e* are provided on the downward side of the rubber sheet portion 82*f*. Also in this embodiment, a portion of each of the sensor sheets 81*a* to 81*e* is protuberated in a dome shape and the dome-shape-protuberating regions of the sensor sheets 81*a* to 81*e* constitute the dome switches 85*a* to 85*e*. The movable side contact electrodes in the dome switches 85*a* to 85*e* are constituted of metal dome portions 511. Other than the dome switches 85*a* to 85*e*, a ten-key of numerals [0] to [9], and a plurality of key switches including a symbol [*] key and a [#] symbol key, which constitute the operation panel 38, are mounted on the FPC board 81.

Figure 61:
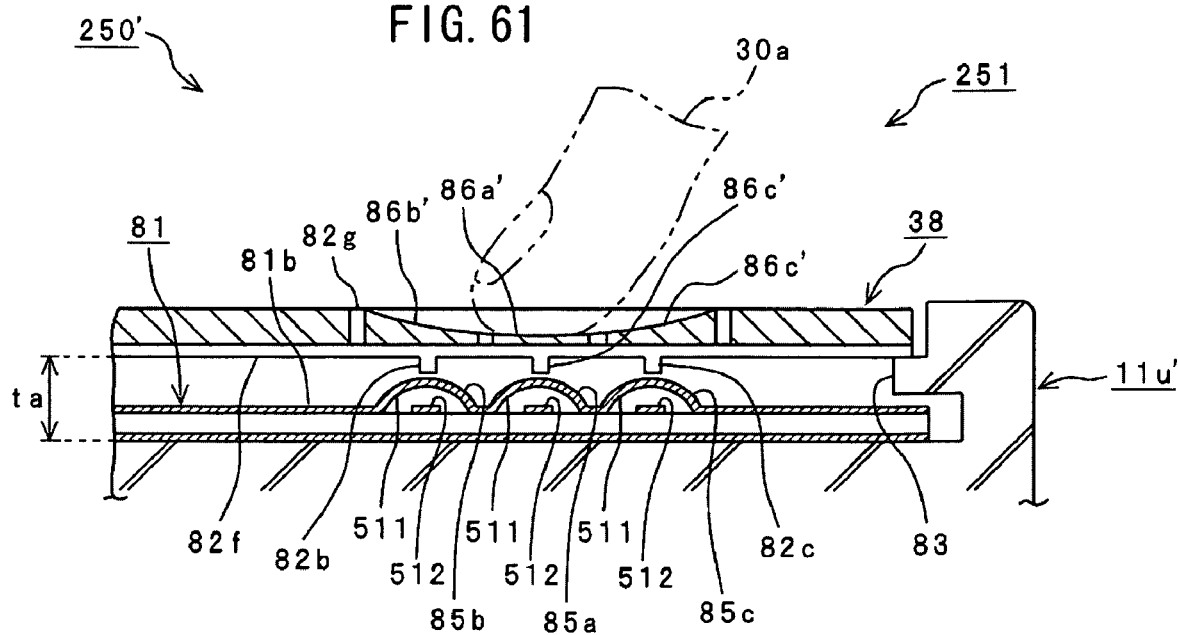
FIG. 61 is a cross-section diagram of the input device 250', showing an internal configuration thereof.

When the input device 250' is constituted in this manner, it becomes possible to provide the FPC board 81 with switch function in which the sensor sheets 81*a* to 81*e* for trace detection and the dome switches 85*a* to 85*e* are integrated (see FIG. 61). With respect to a working example of the dome switch 85a, FIG. 43 is referred.

FIG. 61 shows an internal configuration of an input device 250'. The input device 250' shown in FIG. 61 includes the FPC board 81 and the FPC board 81 includes sensor sheets 81a to 81e which detect a slide position of the operator's finger 30a to output a position detection signal #S1. A key-top 251 is combined on the FPC board 81 by intervening a rubber sheet portion 82f.

The key-top 251 has five key parts 86a' to 86e' (86d' and 86e' are not shown) and also forms a concave shape having a predetermined depth and width. For example, the key-top 251 has a concave surface hemispheric cross shape which is dug-down along the sliding direction from one portion of the operation surface of a housing and also which is dug-up toward the other portion of the operation surface thereof.

The rubber sheet portion 82f is provided so as to cover the entire surface of each of the sensor sheets 81a to 81e. The key-top 251 is slide-operated along a hemispheric concave shape or/and is pushdown-operated. The electrode pattern for trace detection of the sensor sheets 81a to 81e is provided compatibly with the metal dome portions 511 of the dome switches 85a to 85e. The dome switch 85a or the like is turned on, for example, by pressing it strongly by the finger 30a or the like so as to overcome a biasing force of spring effect of the metal dome portion 511. When the finger 30a is released from the key-top 251, the key-top 251 returns by the biasing force of spring effect of the metal dome portion 511 and the dome switch 85a is turned off.

In this embodiment, a key part 86a' operates so as to push the dome switch 85a down on an occasion of an input operation to turn it on. Similarly, a key part 86b' operates so as to push the dome switch 85b down to turn it on. A key part 86c' operates so as to push the dome switch 85c down to turn it on. A key part 86d', which is not shown in FIG. 61, operates so as to push the dome switch 85d down to turn it on. Similarly, a key part 86e', which is not shown, operates so as to push the dome switch 85e down to turn it on.

In this embodiment, the detection area in which the slide position of the operator's finger 30a is detected by the sensor sheets 81a to 81e is set to be wider than the operation area in the key-top 251 which is slide-operated by the operator's finger 30a. By doing like this, it is possible to include in the slide operation region the right/left operation surfaces and the up/down operation surfaces of an operation panel 18, which surround the key-top 251 of the concave shape in response to the slide operation by the operator's finger 30a. With respect to the key-top 251 of this shape, it becomes possible to smoothly set a retrieval pitch of a scroll key when retrieving various kinds of information and a zoom adjustment pitch when the zooming amount of an optical lens is adjusted at the time of camera start-up.

Thus, in response to the slide operation by the operator's finger, in addition to the slide operation feeling of being dug-down in an arc shape along the concave shape of hemispheric inner surface single horizontal-line (one orbit of the hemispheric concave shape) from one portion of the operation surface of the lower housing 11u', it is possible to present the slide operation feeling of being dug-up in an arc convex shape toward the other portion of the operation surface thereof. Further, in addition to the slide operation feeling of being dug-down in an arc shape along another orbit intersected with the concave shape of hemispheric inner surface single horizontal-line (one orbit of the hemispheric concave shape) from one portion of the operation surface of the lower housing 11u', it is possible to present the slide operation feeling of being dug-up in the concave shape of hemispheric inner surface single vertical-line toward the other portion of the operation surface. It should be noted that in the drawing, a term, "ta" indicates a distance between the rubber sheet portion 82f and the sensor sheet 81a or the like and the distance "ta" is around 0.27 mm. By employing such a electrode structure, it becomes possible to make thinner fabrication of the input device 250'.

Figure 62:
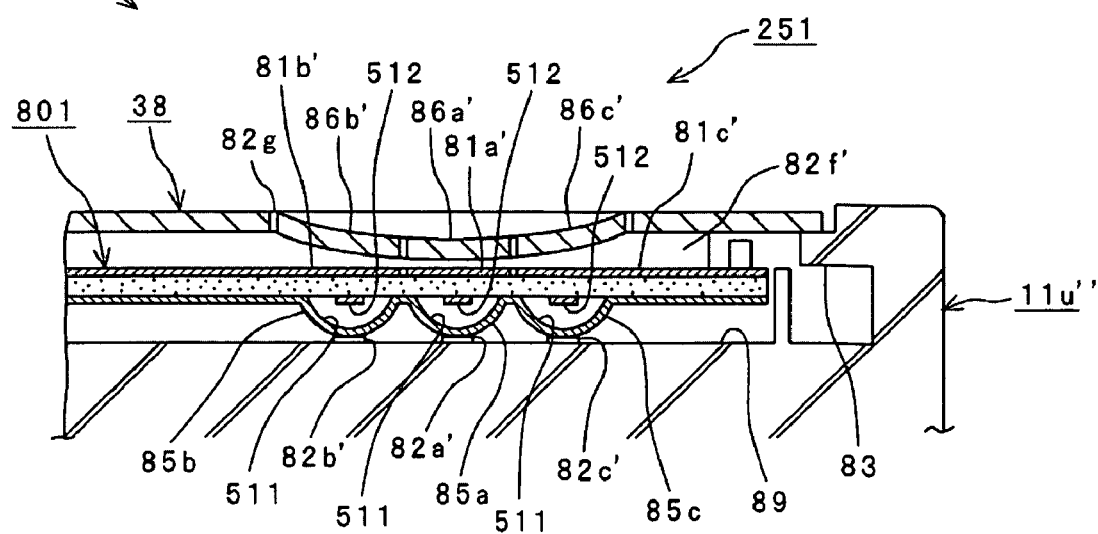
FIG. 62 is a cross-section diagram of an input device 250" as a modified example, showing an internal configuration thereof.

FIG. 62 shows an internal configuration of an input device 250" as a further modified example. The input device 250" shown in FIG. 62 as the further modified example constitutes one example of an electronic apparatus and detects a slide position of the operator's finger 30a to output a position detection signal #S1 and at the same time, detects a trace operation to output trace detection signals S01 to S05 (see FIG. 46). The input device 250" includes a sheet shaped FPC board 801. On the front surface side of the sheet shaped FPC board 801, sensor sheets 81a' to 81e' shown in FIG. 40 (however, 81d' and 81e' are not shown in the drawing) are arranged and on the rear surface side thereof, dome switches 85a to 85e are arranged. A key-top 251 is combined on the FPC board 801 by intervening a rubber sheet portion 82f'. The sensor sheets 81a' to 81e' detect a slide position to the key-top 251 and outputs a position detection signal #S1.

The key-top 251 has five key parts 86a' to 86e' and also forms a concave shape of hemispheric inner surface cross having a predetermined depth and width. The key-top 251 is constituted by including a concave shape which is dug-down along the sliding direction from one portion of the operation surface of an operation panel 38 and also which is dug-up toward the other portion of the operation surface thereof. The rubber sheet portion 82f' is provided so as to cover the entire surface of each of the sensor sheets 81a' to 81e'. The key-top 251 is slide-operated along the concave surface hemispheric cross shape or/and is pushdown-operated.

Also in this embodiment, the operation panel 38 and the key-top 251 constituting the lower housing 11u" are integrally molded. Also, the detection area in which the slide position of the operator's finger 30a is detected by the sensor sheets 81a' to 81e' is set to be wider than the operation area which is slide-operated by the operator's finger 30a depending on the key-top 251. By doing like this, it is possible to include in the slide operation region the right/left operation surfaces and the up/down operation surfaces of the operation panel 38, which surrounds the concave shaped key-top 251 with respect to the slide operation by the operator's finger 30a.

The FPC board 801 is constituted by including dome switches 85a to 85e which turned on or/and off by an press-in operation to the key-top 251 by the operator's finger 30a. On the other surface of the FPC board 801, metal dome portions 511 constituting the dome switches 85a to 85e which is protuberated in a dome shape are respectively provided and at the same time, fixed side contact electrodes constituting the dome switches 85a to 85e are respectively provided on the inside of the dome-shape-protuberating regions with being apart by a predetermined distance. The metal dome portions 511 constitute contact electrodes on the movable side.

Also in this embodiment, the metal dome portion 511 of each of the dome switches 85a to 85e under the FPC board 801 has a C-shape (at its upper surface of the dome shaped region) and each of the fixed side contact electrodes of the dome switches 85a to 85e is wired by passing through it between the open-end terminals of the C-shaped region (see FIG. 45). It should be noted that as the metal dome portion 511 which constitutes the movable side contact electrode of each of the dome switches 85a to 85e, it is also allowed to use the metal dome portion 511' which forms a cut-shape in which both the side terminal portions of the dome shaped region as explained in FIG. 44C are cut.

Figure 63:
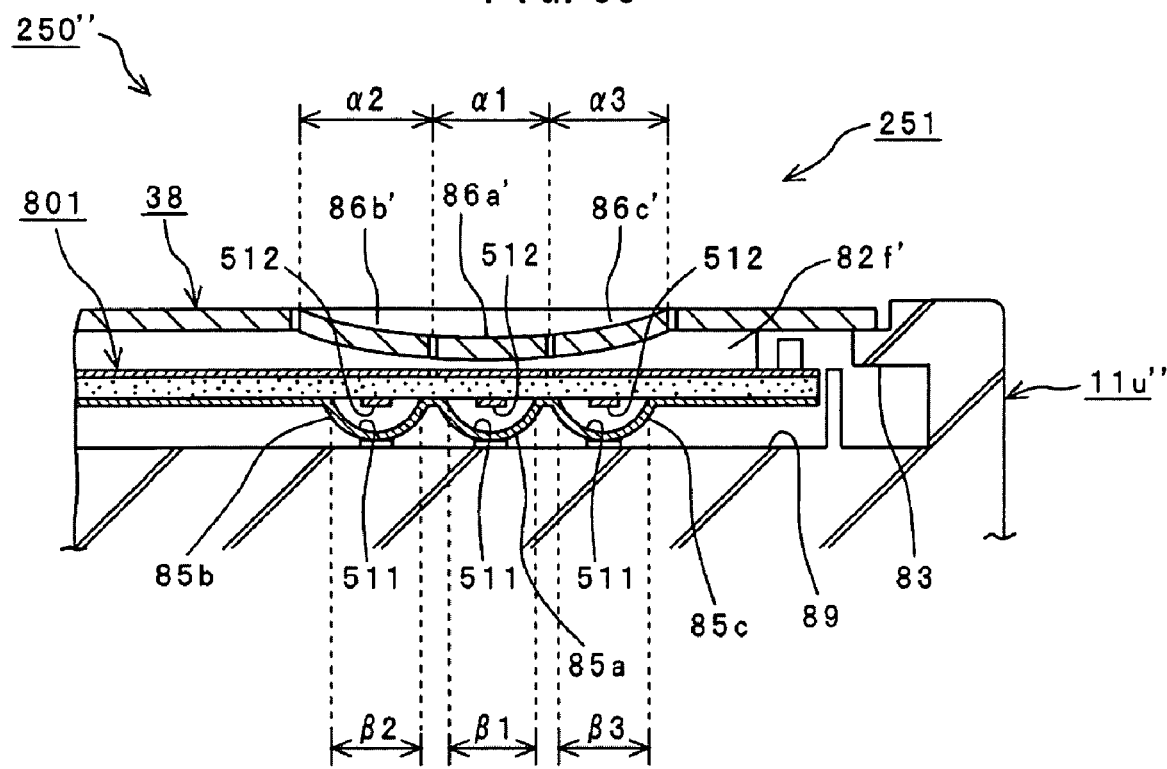
FIG. 63 is a cross-section diagram of the input device 250''', showing a relation example of width of each key part of a key-top 251 and width of each dome switch.

FIG. 63 shows a relation example of the width of respective key parts 86a' to 86c' of the key-top 251 and the width of respective dome switches 85a to 85c or the like. Also in this embodiment, when the width of a key part 86a' of the key-top 251 shown in FIG. 63 is substituted as α1 and the width of the dome switch 85a is substituted as β1, such a relation as α1>β1 is set between the width α1 of the key part 86a' and the width β1 of the dome switch 85a. Similarly, when the width of a key part 86b' is substituted as α2 and the width of the dome switch 85b is substituted as ⊕2, such a relation as α2>β2 is set between the width α2 of the key part 86b' and the width β2 of the dome switch 85b. When the width of a key part 86c' is substituted as α3 and the width of the dome switch 85c is substituted as β3, such a relation as α3>β3 is set between the width α3 of the key part 86c and the width β3 of the dome switch 85c.

As mentioned above, when such a relation as α1>β1 is set between the width α1 of the key part 86a' and the width β1 of the dome switch 85a, a push force is transmitted with good reproducibility to the dome switch 85a from the key part 86a' through the rubber sheet portion 82f so that the metal dome portion 511 thereof can be bent. Further, it becomes possible to execute the ON and OFF operations with good accuracy. This is similarly set with respect to other key parts 86b' to 86e' and other dome switches 85b to 85e, so that in the dome switches 85b to 85e, each of the metal dome portions 511 thereof can be also bent, thereby enabling the ON and OFF operations to be executed with good accuracy.

According to the input device 250' as the modified example in this manner, the key-top 251 is slide-operated along a concave shape of hemispheric inner surface single horizontal-line or/and is slide-operated along a concave shape of hemispheric inner surface single vertical-line intersected with this. Further, the dome switches 85a to 85e are respectively turned on or/and off by a press-in operation of the key-top 251. Thus, after the information selection, it is possible to turn on or/and off the dome switches 85a to 85e by press-in-operating the key-top 251, which may be applied to a determination key when the input is determined.

Consequently, the structure that is different from the cross key in the past is obtained and the unique operation feeling which does not exist in such a cross key is obtained. It also becomes possible for the key-top 251 of the shape to widely set a retrieval pitch of a scroll key when retrieving various kinds of information and a audio volume adjustment pitch of a volume key and the like when adjusting audio volume.

In this embodiment, although each case where the key-top 251 is provided on the front surface side of the lower housing 11u, 11u' or 11u" as shown in FIG. 59 to FIG. 63 has been described, of course, it is not limited to these; it is needless to say that a similar effect is obtained with respect to a case where the key-top is provided on the rear surface side of the lower housing 11u.

[Embodiment 26]

Figure 64:
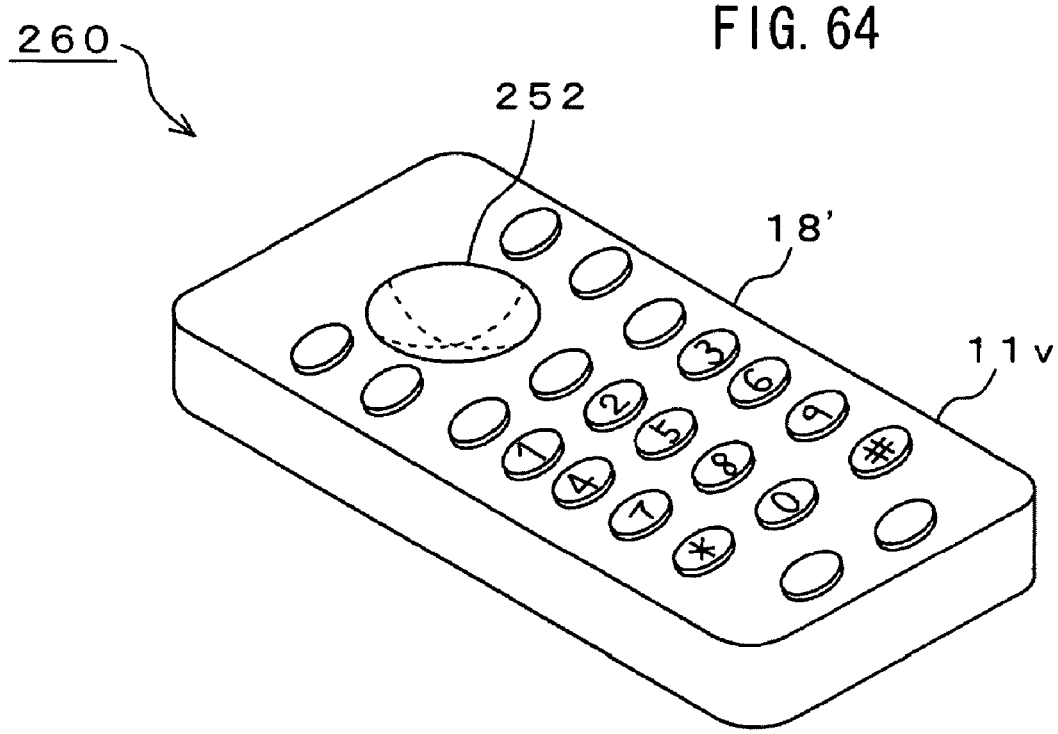
FIG. 64 is a perspective view of an input device 260 as a twenty-sixth embodiment, showing a configuration thereof.

FIG. 64 shows a configuration of an input device 260 as a twenty-sixth embodiment. In this embodiment, an operation panel 18' of a lower housing 11 and a key-top 252 having a concave shape of hemispheric inner surface are integrally molded, instead of the key-tops 14, 141 to 146 for the housing side surface arrangement including various kinds of shapes explained in the first to the twelfth embodiments.

The input device 260 shown in FIG. 64 includes a lower housing 11v with a key-top having a concave shape of hemispheric inner surface. An upper portion of the lower housing 11v is the operation surface and on the upper portion operation surface thereof, the operation panel 18' on which a ten-key of numerals [0] to [9], a symbol [*] key, a [#] symbol key and the like are arranged is provided. An individual key of the operation panel 18' has an elliptical shape. According to the lower housing 11v, the operation surface of the key-top 252 is different from the key-top shape shown in FIG. 59 and is curved in the concave shape of hemispheric inner surface. With respect to a structure on the inside of the key-top 252 of the lower housing 11v, a structure of the sensor 13 shown in FIG. 52, FIG. 55 or FIG. 55B is employed (see FIG. 52, FIG. 55 or FIG. 55B). When a press-in function by the key-top 252 is applied, it is enough if a pressure detecting sheet member is used for the sensor 13 instead of the electrostatic capacitance sheet member.

By injecting a resin to a die for the lower housing which is modeled with, for example, a concave shape of hemispheric inner surface which becomes a key-top 252 and a ten-key of numerals [0] to [9], a symbol [*] key, a [#] symbol key and the like which become an operation panel 18' having concave shape, the lower housing 11v is formed. Thus, it is possible to form the input device 260 including the key-top 252 as an airtight structure. Also, a speaker 36b with an actuator function as shown in FIG. 14 is provided on a position which is on the inside of the lower housing 11v and which is near the key-top 252, and can present a sense of touch to the operator's finger 30a.

In this embodiment, the concave shape of hemispheric inner surface of the key-top 252 has a predetermined depth and aperture width. The key-top 252 is slide-operated along one orbit of the concave shape of hemispheric inner surface or/and is slide-operated along the other orbit intersected with the orbit. Thus, in response to the slide operation by the operator's finger, in addition to the slide operation feeling of being dug-down in an arc shape along one orbit of the concave shape of hemispheric inner surface from one portion of the operation surface of the lower housing 11v, it is possible to present the slide operation feeling of being dug-up in an arc shape toward the other portion of the operation surface thereof. Then, in addition to the slide operation feeling of being dug-down in an arc shape along the other orbit intersected with one orbit of the concave shape of hemispheric inner surface from one portion of the operation surface of the lower housing 11v, it is possible to present the slide operation feeling of being dug-up in an arc shape along the other portion of the operation surface thereof.

In this manner, according to the input device 260 relating to the twenty-sixth embodiment, the operation panel 18' of the lower housing 11v and the key-top 252 having the concave shape of hemispheric inner surface is integrally molded. Consequently, it becomes possible to provide the input device 260 of an airtight structure to which water-resistance is abundant. Furthermore, assembly of the input device 260 becomes simple as compared with a method in which the key-top 252 of the concave shape of hemispheric inner surface and the operation panel which forms a ten-key of numerals [0] to [9], a symbol [*] key, a [#] symbol key are assembled separately. Also, a structure which is different from the cross key in the past is obtained and unique operation feeling which does not exist in the cross key is obtained. Further, the key-top 252 of the concave shape of hemispheric inner surface can is applied to an image information selection key for selecting information. For example, it becomes possible to realize the slide operation of the key-top 252 to one direction or plural directions, the information selection by a press-in operation to one direction and the determination operation thereof.

In this embodiment, although a case where the key-top 252 is provided on the front surface side of the lower housing 11v as shown in FIG. 64 has been described, of course, it is not limited to this; it is needless to say that a similar effect is obtained with respect to a case where the key-top is provided on the rear surface side of the lower housing 11v.

[Embodiment 27]

Figure 65:
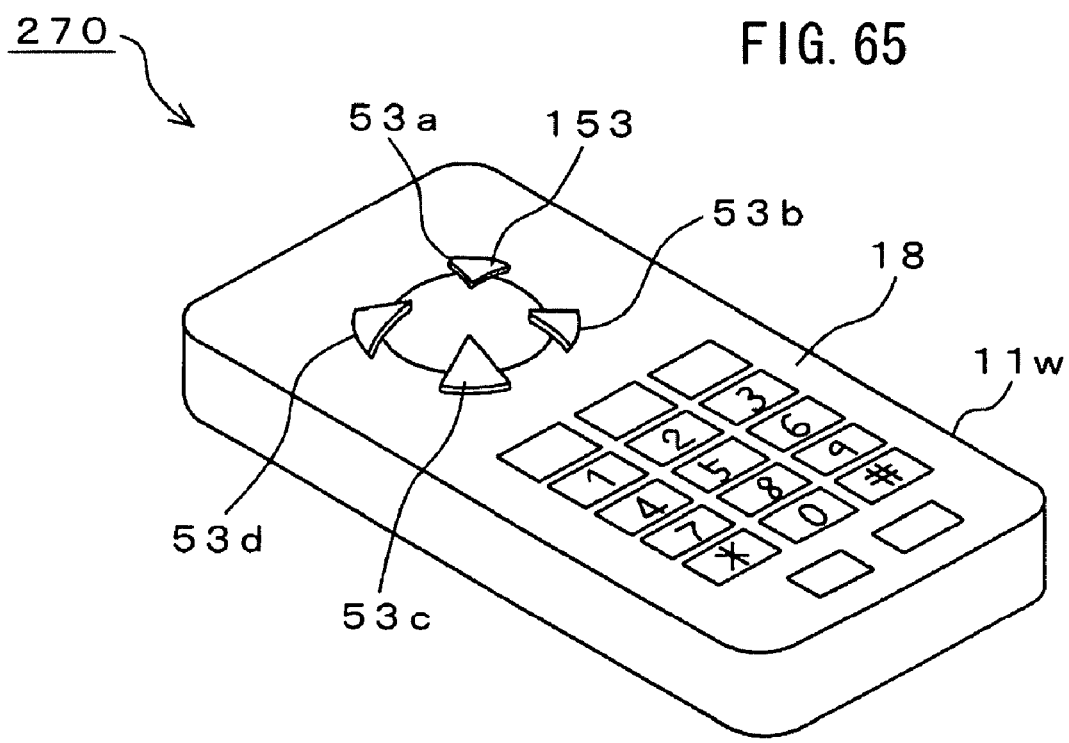
FIG. 65 is a perspective view of an input device 270 as a twenty-seventh embodiment, showing a configuration thereof.

FIG. 65 shows a configuration of an input device 270 as a twenty-seventh embodiment. In this embodiment, an operation panel 18 of a lower housing 11w and a key-top 153 having a convex shape of hemispheric outer surface cross are integrally molded, instead of the key-top 152 having the hemispheric concave shape explained in the eighteenth embodiment.

The input device 270 shown in FIG. 65 includes a lower housing 11w with a key-top having a convex shape of hemispheric outer surface cross. An upper portion of the lower housing 11w is the operation surface and on the upper portion operation surface, the operation panel 18 on which a ten-key of numerals [0] to [9], a symbol [*] key, a [#] symbol key and the like are arranged is provided. According to the lower housing 11w, the operation surface of the key-top 153 is different from the key-top shape shown in FIG. 64 and is protuberated in the convex shape of hemispheric outer surface cross. With respect to a structure on the inside of the key-top 153 of the lower housing 11w, a structure of the sensor 13 as shown in FIG. 20, FIG. 21 or FIG. 22B is employed (see FIG. 20, FIG. 21 or FIG. 22B).

By injecting a resin to a die for the lower housing which is modeled with a convex shape of hemispheric outer surface cross which becomes a key-top 153 and a ten-key of numerals [0] to [9], a symbol [*] key, a [#] symbol key and the like which become an operation panel 18, the lower housing 11w having the convex shape is formed. Thus, it is possible to form the input device 270 including the key-top 153 as an airtight structure. Also, the speaker 36b with an actuator function as shown in FIG. 14 is provided on a position which is on the inside of the lower housing 11w and which is at a position near the key-top 252, and can present a sense of touch to the operator's finger 30a.

In this embodiment, the key-top 153 forms the convex shape of hemispheric outer surface cross having a predetermined height and width. Touch marks 53a to 53d (key marks) of a ginkgo's leaf shape (approximately triangle) are provided crosswise on the key-top 153. The key-top 153 is slide-operated along one orbit of the convex shape of hemispheric outer surface cross or/and is slide-operated along the other orbit intersected with the orbit. Further, four touch marks 53a to 53d are pressed individually. The press-in region is operated so as to press the peak region of the key-top 153 in addition to four touch marks 53a to 53d.

Thus, in response to the slide operation by the operator's finger, in addition to the slide operation feeling of becoming thicker in an arc shape along one orbit of the convex shape of hemispheric outer surface cross from one portion of the operation surface of the lower housing 11w, it is possible to present the slide operation feeling of becoming thinner in an arc shape toward the other portion of the operation surface. Further, in addition to the slide operation feeling of becoming thicker in an arc shape along the other orbit intersected with one orbit of the convex shape of hemispheric outer surface cross from the other portion of the operation surface of the lower housing 11w, it is possible to present the slide operation feeling of becoming thinner in an arc shape along the other portion of the operation surface.

Further, vibration is transmitted from the speaker 36b with an actuator function as shown in FIG. 14 to the key-top 153 by the press-in operation of any one of the four touch marks 53a to 53d or the peak region of the key-top 153, thereby enabling sense of touch to be presented to the operator's finger.

In this manner, according to the input device 270 relating to the twenty-seventh embodiment, the operation panel 18' of the lower housing 11w and the key-top 153 having the convex shape of hemispheric outer surface cross are integrally molded. Consequently, it becomes possible to provide the input device 270 of an airtight structure to which water-resistance is abundant. Furthermore, assembly of the input device 270 becomes simple as compared with a method in which the key-top 153 of the convex shape of hemispheric outer surface cross and the operation panel which forms a ten-key of numerals [0] to [9], a symbol [*] key, a [#] symbol key are assembled separately. Also, the structure which is different from a cross key in the past is obtained and unique operation feeling which does not exist in such a cross key is obtained. The key-top 153 of the convex shape of hemispheric outer surface cross can be applied to an image information selection key for selecting information.

In this embodiment, although a case where the key-top 153 is provided on the front surface side of the lower housing 11w as shown in FIG. 65 has been described, of course, it is not limited to this. A similar effect is obtained with respect to a case where the key-top is provided on the rear surface side of the lower housing 11w.

[Embodiment 28]

Figure 66:
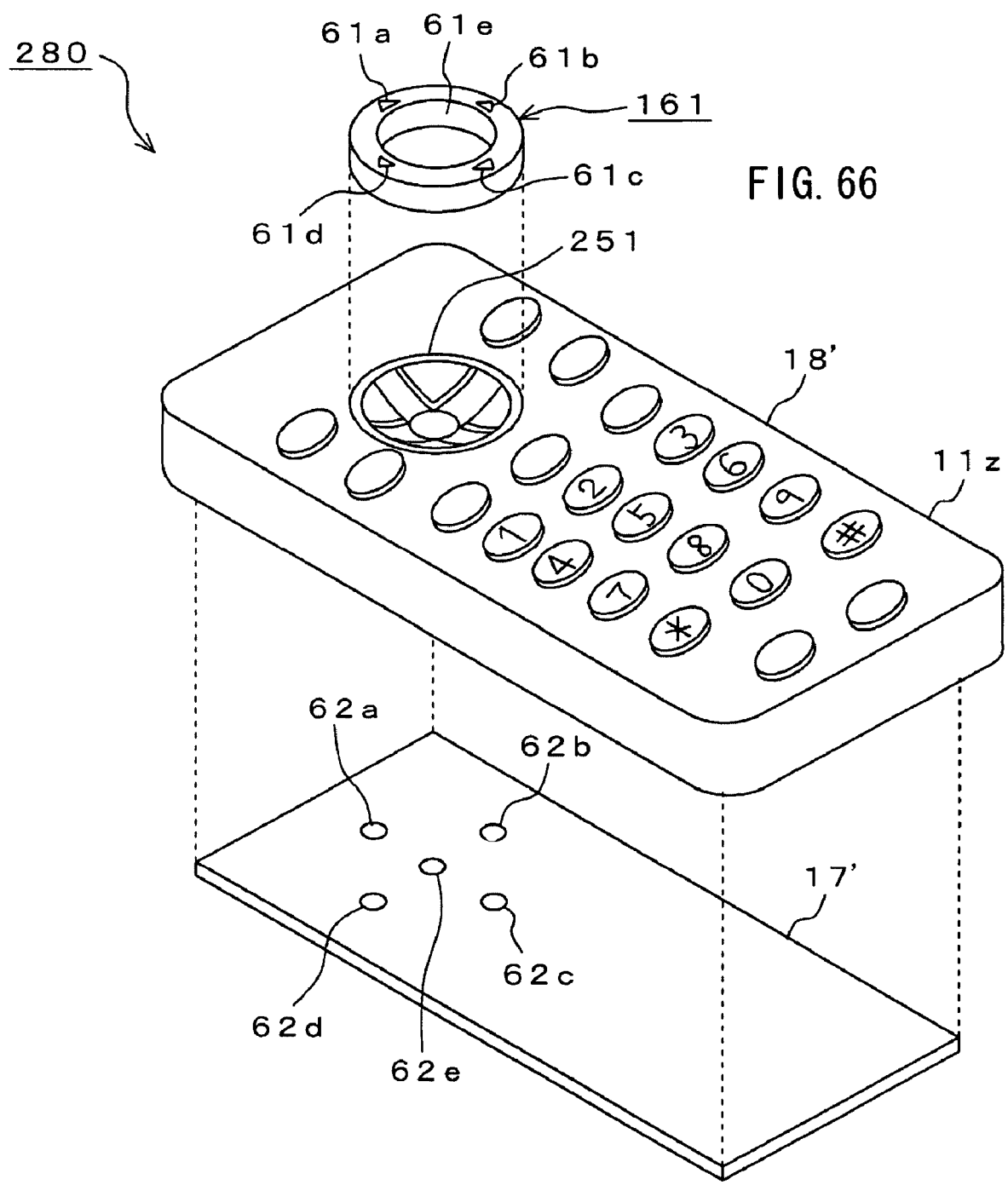
FIG. 66 is an exploded perspective view of an input device 280 as a twenty-eighth embodiment, showing a configuration thereof.

FIG. 66 shows a configuration of an input device 280 as a twenty-eighth embodiment. In the input device 280 shown in FIG. 66, a photoconductive member 161 is added to the input device 250 shown in FIG. 59. In this embodiment, the input device 280 includes a lower housing 11z with a key-top of a concave shape of hemispheric inner surface cross. An upper portion of the lower housing 11z is the operation surface and on the upper portion operation surface thereof, an operation panel 18' on which a ten-key of numerals [0] to [9], a symbol [*] key, a [#] symbol key and the like are arranged is provided. According to the lower housing 11z, the operation surface of the key-top 251 is different from the input device 250 shown in FIG. 59 and the photoconductive member 161 is arranged around the key-top 251. The lower housing 11z is obtained by die-injection-molding a polycarbonate (PC) resin or a ABS resin.

The photoconductive member 161 forms a cylindrical ring shape having an opening portion 61e inside thereof. On an outer circumferential edge portion of the photoconductive member 161, for example, four concave/convex shaped triangular marks 61a to 61d are provided. The photoconductive member 161 is obtained by die-injection-molding a transparent acrylic system resin. Of course, the photoconductive member 161 and the key-top 251 may be formed integrally. The thickness thereof is around 1.0 mm. A material thereof is a polycarbonate or the like.

In this embodiment, the photoconductive member 161 having the cylindrical ring shape is fitted into an outer circumferential groove portion of the key-top 251 with the key-top 251 on the operation panel 18' exposing the opening portion 61e of the photoconductive member 161. A circuit board 17' is mounted in the lower housing 11z. A glass epoxy board having the thickness of around 1.1 mm is used for the circuit board 17'. A plurality of LED devices 62a to 62e constituting one example of light sources are provided at predetermined positions of the circuit board 17', for example, at the positions under the key-top 251 and facing it and irradiate light to the photoconductive member 161 and the vicinity of the center portion of the key-top 251.

For example, the LED device 62a illuminates with a LED light the triangular mark 61a of the photoconductive member

161. The LED device 62*b* illuminates with a LED light the triangular mark 61*b* thereof. The LED device 62*c* illuminates with a LED light the triangular mark 61*c* thereof. The LED device 62*d* illuminates with a LED light the triangular mark 61*d* thereof. The LED device 62*e* illuminates with a LED light the vicinity of the center portion of the key-top 251. Of course, by integrating the light sources into one, it is also allowed to be light-dispersed and to be light-distributed. A laser diode which emits a red light, a laser diode which emits a green-light and/or a laser diode which emits a blue light are used for the LED devices 62*a* to 62*e* (LED light diffusion structure).

In this manner, according to the input device 280 relating to the twenty-eighth embodiment, the key-top 251 is provided with the photoconductive member 161. It is possible to illuminate the key-top 251 and the peripheral portion thereof with the LED light emitted from the LED devices 62*a* to 62*e*, so that the operability of the input device 280 can be improved. The above-mentioned LED light diffusion structure can be applied to not only the twenty-eighth embodiment but also the first to the twenty-seventh embodiments.

In this embodiment, although a case where the key-top 251 is provided on the front surface side of the lower housing 11*z* as shown in FIG. 66 has been described, of course, it is not limited to this; it is needless to say that the similar effect is obtained with respect to a case where the key-top is provided on the rear surface side of the lower housing 11*z*.

[Embodiment 29]

Figure 67:
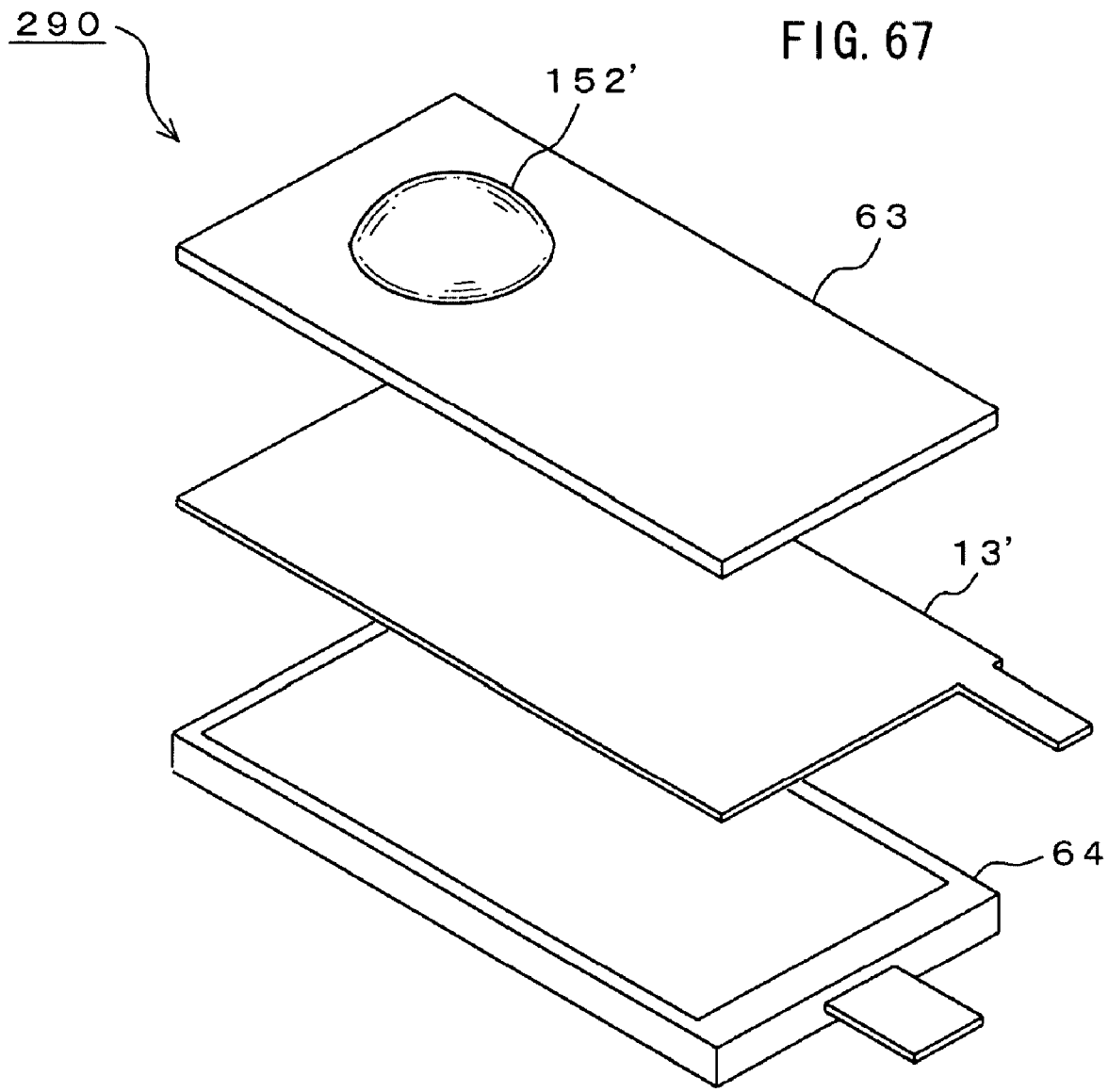
FIG. 67 is an exploded perspective view of an input device 290 as a twenty-ninth embodiment, showing a configuration thereof.

FIG. 67 shows a configuration of an input device 290 relating to a twenty-ninth embodiment. In the input device 290 shown in FIG. 67, a structure of the key-top 152 of the input device 180 shown in FIG. 33 is applied to the display unit 29 of any one of the mobile phones 101 to 103 shown in FIGS. 3A and 3B, FIGS. 26A and 26B, and FIGS. 28A and 28B.

The input device 290 shown in FIG. 67 includes a display unit 29. The input device 290 is constituted by layering a display top member 63, a sensor 13' and an LCD device 64 in order from an upper portion. The display unit 29 includes the display top member 63 and the LCD device 64. A key-top 152' formed in a convex shape is arranged at the predetermined position thereof. The display unit 29 displays information inputted by the key-top 152'.

The display top member 63 is assembled so as to cover the whole sensor 13'. A polycarbonate plate or the like having the thickness of around 1.0 mm is used for the display top member 63. In this embodiment, a convex portion constituting the key-top 152' is provided at a predetermined position of the display top member 63. An electrostatic capacitance sheet member, a pressure detecting sheet member or the like is used for the sensor 13'.

It is nice for the key-top 152' to be disposed, for example, at a little bit upward or downward position compared with the center region of the display unit 29 in order to improve the operability. It is nice for the key-top 152' to be formed by a method for pasting the key-top 152' on the display top member 63 or by a method for molding the display top member 63 and the key-top 152' integrally by die-injection-molding a resin for key-top. The thickness thereof is around 1.0 mm. The LCD device 64 is arranged on the rear surface side of the sensor 13' and a liquid crystal display device for color having the thickness of around 1.7 mm is used for the LCD device 64.

In this embodiment, the key-top 152' forms a hemispheric convex shape having a predetermined height and width. The key-top 152' is slide-operated along one orbit of the hemispheric convex shape or/and is slide-operated another orbit intersected with the orbit. An icon image for selecting input information is displayed in the display unit 29 through the LCD device 64 and it is also allowed for the operator's finger to slide-operate along this icon image.

In this manner, according to the input device 290 relating to the twenty-ninth embodiment, the key-top 152' is provided at a little bit upward or downward position compared with the center region of the display unit 29 in which the display top member 63, the sensor 13' and the LCD device 64 are layered in this order, and the display top member 63 and the key-top 152' having the hemispheric convex shape are integrally molded or the key-top 152' is pasted on the display top member 63.

Consequently, it becomes possible to provide the input device 290 of an airtight structure to which water-resistance is abundant. Furthermore, in addition to the slide operation feeling of becoming thicker in an arc shape along one orbit of the hemispheric convex shape from one portion of the display surface of the display top member 63 of the display unit 29 in response to the slide operation by the operator's finger, it is possible to present the slide operation feeling of becoming thinner in an arc shape toward the other portion of the display surface thereof. Then, in addition to the slide operation feeling of becoming thicker in an arc shape along another orbit intersected with one obit of the hemispheric convex shape from one portion of the display surface of the display top member 63, it is possible to present the slide operation feeling of becoming thinner in an arc shape toward the other portion of the display surface thereof.

Thus, there is improved the input operability of an electronic apparatus of a mobile phone, a video camera, a digital camera or the like which is applied with the input device 290 and unique operation feeling which does not exist in the touch panel in the past can be obtained.

The following will describe a mobile phone 101 with sense of touch input function or the like. FIG. 68 shows a configuration of a control system of the mobile phone 101 or the like and its feeling feedback function example.

The mobile phone 101 or the like shown in FIG. 68 is constituted by mounting each function block on a circuit board 17 or the like of the lower housing 11*b*. It should be noted that each portion corresponding to each portion shown in FIG. 3 to FIG. 15 or the like is indicated by the same reference numeral. The mobile phone 101 or the like includes a control unit 15, an operation panel 18, a receiving unit 21, a transmitting unit 22, an antenna diplexer 23, an input device 300, a display unit 29, a power supply unit 33, a camera 34, a memory unit 35, a speaker 36*a* for received melody and a speaker 36*b* with an actuator function.

Although cases in which the circuit board 17 and the FPC boards 81, 801 are used with respect to the sensor 13, the sensor sheets 81*a* to 81*e* or the like in FIG. 3 to FIG. 59 have been described, anything is acceptable in the input device 300 shown in FIG. 68 if function of the slide operation (cursoring) and function of the press-in (selection determination) can be distinguished. For example, an input device of the pressure detecting sheet member or the like is also acceptable, and preferably it is enough if the input device has a configuration such that the position detection information and the press-in detection information are applied to the control unit 15.

The input device 300 is provided in the lower housing constituting the mobile phone 101 or the like and inputs information by the slide operation and by the press-in operation depending on the operator's finger 30*a*. For example, the input device 300 detects a slide position or a press-in force of the operator's finger 30*a*, and outputs at least a position detection signal #S1 and a press-in detection signal #S2 to the control unit 15.

The input devices 10 to 290 relating to the first to the twenty-ninth embodiments can be used for the input device 300. For example, when the input device 250 relating to the twenty-fifth embodiment is used, the input device 250 includes a sensor 13 which is provided in the lower housing 11u and which detects a slide position of the operator's finger, and a key-top 246 which is provided so as to cover the sensor 13 and which is slide-operated along the operation surface of the lower housing 11u. The key-top 246 has a concave shape which is dug-down along the sliding direction from one portion of the operation surface of the lower housing 11u and also which is dug-up toward the other portion of the operation surface (also, this is similar to FIG. 59 and FIG. 60).

The control unit 15 constitutes a control system and includes an image processing unit 26, an A/D-driver 31, a CPU 32, and a storage unit 37. The A/D-driver 31 is supplied with the position detection signal #S1 and the press-in detection signal #S2 from the input device 300. In the A/D-driver 31, an analogue signal composed of the position detection signal #S1 and the press-in detection signal #S2 is converted to digital data in order to distinguish function of the cursoring and function of the icon selection. Other than this, the A/D-driver 31 performs arithmetic-calculation-processing on this digital data, detects which is a cursoring input and the icon selection information, and supplies image information data D3 by which the cursoring input or the icon selection is distinguished, position detection information D1 or press-in detection information D2 to the CPU 32. It is also allowed for these arithmetic calculations to be executed in the CPU 32.

The A/D-driver 31 is connected with the CPU 32. The CPU 32 controls the whole phone based on a system program. The memory unit 35 stores system program data for controlling the whole phone. RAM, which is not shown, is used as a work memory. The CPU 32 turns the power ON and at the same time, reads the system program data out of the memory unit 35, expands the system program data in the RAM, and turns on the system to control the whole mobile phone.

For example, the CPU 32 controls so as to receive the position detection information D1, the press-in detection information D2, and the information data D3 (hereinafter, simply also referred to as input data) from the A/D driver 31, supply predetermined instruction data "D" to the devices of the power supply unit 33, the camera 34, the memory unit 35, the storage unit 37, a picture and audio processing unit 44 or the like, receive the reception data from the receiving unit 21, and transmit the transmission data to the transmitting unit 22.

The picture and audio processing unit 44 is connected with the display unit 29 which displays, for example, the scroll image 29a', 29b' or the like corresponding to the slide operation or the press-in operation of the operator's finger 30a detected by the sensor 13. In this embodiment, the CPU 32 detects the slide operation speed of the operator's finger 30a, and adjusts a display pitch of the scroll image 29a', 29b' or the like in the display unit 29 in response to the slide operation speed of the operator's finger 30a.

Under the display control thus executed, adjustment is realized such that when retrieving information, a display pitch of the scroll image 29b' or the like in the display unit 29 is set as narrow in a case in which the slide operation speed of the operator's finger 30a is quick and on the contrary, a display pitch of the scroll image 29a' or the like in the display unit 29 is set as wide in a case in which the slide operation speed of the operator's finger 30a is slow. Consequently, when plural information retrieval objects exist and the aimed scroll image is far therefrom, the scroll image is transmitted so as to skip roughly but when approaching to the aimed scroll image, it becomes possible to execute the search so as to transmit the scroll image slowly.

In this embodiment, when the pressure detecting sheet member is used for the sensor 13, the CPU 32 compares the press-in detection information D2 obtained from the input device 300 with a preset pushdown determination threshold Fth, in addition to the display pitch adjustment of the scroll image 29a', 29b' or the like, and controls the storage unit 37 to read out thereof data that controls the vibration of the speaker 36b with an actuator function based on the comparison result. For example, when senses of touch propagated from the operation surface in the pushdown position of the input device 300 are assumed to be A and B, respectively, the sense of touch #A is obtained by changing the operation surface in response to the slide operation of the operator's finger 30a in the slide position thereof from vibration pattern of low frequency and small amplitude to vibration pattern of high frequency and large amplitude. Also, the sense of touch #B is obtained by changing the operation surface in response to existence or nonexistence of the pressing-in force of the operator's finger 30a in the slide position thereof from vibration pattern of high frequency and large amplitude to vibration pattern of low frequency and small amplitude.

The above-mentioned CPU 32 is connected with the memory unit 35 which stores display information D4 for displaying the display screen for input item selection three-dimensionally, for example, control information Dc relating to the selection position of the icon corresponding to the display information D4 and the vibration mode, and the like in every display screen. The control information Dc includes a plurality of specific vibration waveforms by which a plurality of differed senses of touch that are synchronized with applications (three-dimensional display and various kinds of display contents) in the display unit 29 can be generated and which generate these senses of touch thereof, and algorism that sets the specific sense of touch generation mode of every application. An EEPROM, a ROM, a RAM or the like is used for the memory unit 35.

In this embodiment, the CPU 32 executes the display control of the display unit 29 and the output-control of the speaker 36b with an actuator function based on the position detection information D1, the press-in detection information D2, and information data D3 which are outputted from the A/D-driver 31. For example, the control unit 15 reads the control information Dc out of the memory unit 35 based on the position detection signal #S1 and the press-in detection signal #S2 which are obtained from the input device 300, accesses to the storage unit 37 and controls so as to supply a vibration generating signal Sa to the speaker 36b with an actuator function.

In this embodiment, when the pressure detecting sheet member is used for the sensor 13, the CPU 32 controls the storage unit 37 to read the data out thereof such that the sense of touch #A is started up when the press-in detection information D2 less than the pushdown determination threshold Fth is detected, and then, the sense of touch #B is started up when the input device 300 detects the press-in detection information D2 which exceeds the pushdown determination threshold Fth. By doing like this, it is possible to generate different vibration patterns coincidentally with an [pressure force] by the operator's finger 30a or the like.

The CPU 32 is connected with the storage unit 37 and reads vibration generating data Da out of the storage unit 37 based on the control information Dc from the CPU 32. The vibration generating data Da includes an output waveform composed of a sinusoidal waveform. The storage unit 37 is connected with the picture and audio processing unit 44. Each item of the vibration generating data Da is supplied to the picture and audio processing unit 44, the vibration generating data Da thereof is audio-processed (digital/analogue conversion, amplification or the like) and becomes a vibration generating signal Sout 2, and it is supplied to the speaker 36b with actuator function. The speaker 36b vibrates based on the vibration generating signal Sout 2.

In this embodiment, the storage unit 37 memorizes the pushdown determination threshold Fth corresponding to each application. For example, the pushdown determination threshold Fth is stored beforehand in a ROM or the like provided in the memory unit 35 as trigger parameter. The memory unit 35 reads out the press-in detection information D2 under the control of the CPU 32, and the CPU 32 compares the preset pushdown determination threshold Fth with the impressed pressure force F obtained from the press-in detection information D2 to execute the determination process of Fth≧F, the determination process of Fth<F or the like.

For example, when the pushdown determination threshold Fth=100 [gf] is set in the storage unit 37, the operation surface vibrates based on the vibration pattern for obtaining the sense of touch of a classic switch. Also, when the pushdown determination threshold Fth=20 [gf] is set, the operation surface vibrates based on the vibration pattern for obtaining the sense of touch of a cyber switch.

The CPU 32 is connected with the image processing unit 26, in addition to the storage unit 37, which image-processes the display information D4 for scroll-displaying the scroll image 29a', 29b' or the like. The display information D4 thus image-processed is supplied to the display unit 29. In this embodiment, the CPU 32 controls the display unit 29 so as to display the scroll image 29a', 29b' or the like three-dimensionally with including the perspective in the depth direction of the display screen.

By the sense of sight depending on the eyes 30b of the operator, each function for the display contents of the display unit 29 is judged and by the sense of hearing depending on the ears 30c of the operator, each function for the sound release from the speakers 36a, 36b or the like is judged. The above-mentioned CPU 32 is connected with the operation panel 18 which is used, for example, when a phone number of the partner is inputted manually. The display unit 29 may display a received picture based on a picture signal Sv in addition to the above-mentioned icon selection screen.

Also, the antenna 16 shown in FIG. 68 is connected with the antenna diplexer 23 and receives a radio wave from the partner through a base station or the like when receiving calls. The antenna diplexer 23 is connected with the receiving unit 21 which receives the reception data introduced from the antenna 16, demodulates it to image picture data and audio data or the like, Din, and outputs the picture data and audio data, Din thus demodulated to the CPU 32 or the like. The receiving unit 21 is connected through the CPU 32 with the picture and audio processing unit 44 which performs digital/analog conversion on digital audio data to output an audio signal Sout or performs digital/analog conversion on digital image data to output a picture signal Sv.

The picture and audio processing unit 44 is connected with the speaker 36a which constitutes a big sound use and the speaker 36b with actuator function (vibration body) which constitutes a receiver. The speaker 36a rumbles the received sound, the received melody or the like based on an acoustic signal Sout 1 when receiving calls. The speaker 36b receives an audio signal Sout 2', and magnifies speaking voice 30d or the like of the partner. Also, the speaker 36b vibrates based on the vibration generating signal Sout 2 when presenting the sense of touch.

This picture and audio processing unit 44 is connected with a microphone 43 constituting a transmitter, in addition to the speakers 36a, 36b, which gathers the operator's voice and outputs an audio signal Sin. The picture and audio processing unit 44 performs analog/digital conversion on the analog audio signal Sin to be transmitted to the partner to output the digital audio data when transmitting calls, or performs analog/digital conversion on the analog picture signal Sv to output the digital image data.

The CPU 32 is connected with the transmitting unit 22, in addition to the receiving unit 21, which modulates picture data and audio data, Dout, or the like to be transmitted to the partner, supplies the transmission data thus modulated to the antenna 16 through the antenna diplexer 23. The antenna 16 radiates a radio wave supplied from the antenna diplexer 23 toward a base station or the like.

The above-mentioned CPU 32 is connected with the camera 34, in addition to the transmitting unit 22, which images a subject and for example, transmits still image information or operation information to the partner through the transmitting unit 22. It is also allowed for the camera 34 to be provided on the rear surface side of the upper housings 11a, 11x, 11x' or the like. The power supply unit 33 includes a battery, and supplies DC power to the operation panel 18, the receiving unit 21, the transmitting unit 22, the display unit 29, the CPU 32, the camera 34, the memory unit 35, the storage unit 37, the picture and audio processing unit 44, and the input device 300. It should be noted that in this embodiment, although a case where the storage unit 37 is provided separately from the picture and audio processing unit 44, it is also allowed to use compatibly the memory device which is included in the picture and audio processing unit 44. This enables the number of parts to be reduced.

Figure 69A:
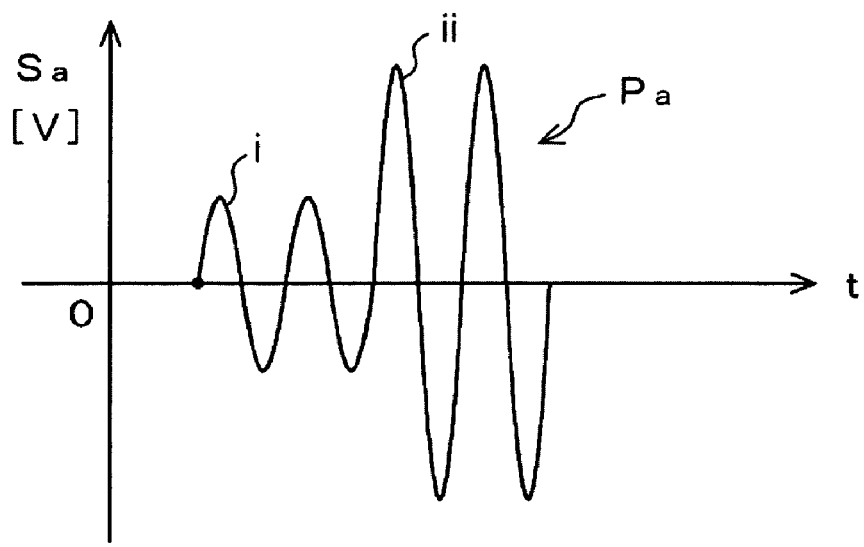
FIGS. 69A and 69B are waveform diagrams each showing vibration pattern example relating to sense of touch #A and #B.
Figure 69B:
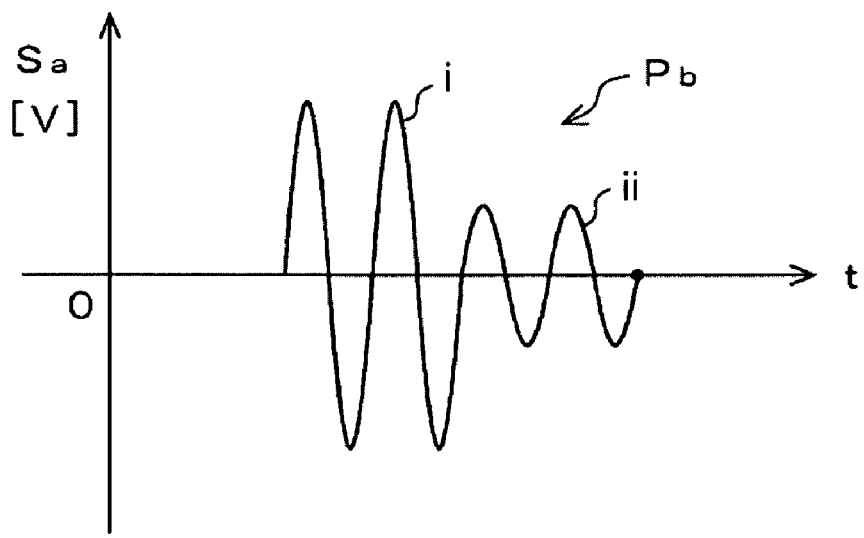

FIGS. 69A and 69B show vibration pattern examples relating to the senses of touch #A and #B. In FIGS. 69A and 69B, either one of horizontal axes indicates the time "t". Either one of vertical axes indicates amplitude Ax [V] of the vibration generating signal Sa. In this embodiment, in the scroll image 29a', 29b' or the like which is displayed on the display unit 29, for example, the sense of touch #A and the sense of touch #B are applied on an occasion of the slide operation of the operator's finger 30a. In this embodiment, there is cited an example of a case in which the sense of touch #A is applied in case of slide-operating by tracing on the key-top 246 and the sense of touch #B is applied in a case of pressing into the key-top 246.

The first vibration pattern Pa shown in FIG. 69A is a waveform which gives the sense of touch #A. The drive condition "a" of the sense of touch #A thereof is a case in which when the scroll operation (slide operation) is executed by the key-top 246 and the relation between the pushdown determination threshold Fth and the impressed pressure force F becomes Fth≧F, vibrate is made by a vibration pattern of frequency fx=50 Hz, amplitude Ax=5 μm and the number of times Nx=2 during a period of time of around 0.1 second, in the first step "i". Hereinafter, it is expressed as [fx, Ax, Nx]=[50, 5, 2]. Similarly, in the second step ii, the vibration is made by a vibration pattern of [fx, Ax, Nx]=[100, 10, 2] during a period of time of around 0.1 second. When the operation surface vibrates based on such a vibration pattern, it is possible to obtain the sense of touch of the JOG dial switch or the like.

The second vibration pattern Pb shown in FIG. 69B is a waveform which gives the sense of touch #B. The drive condition "b" of the sense of touch #B thereof is a case in which when the key-top 246 is pressed-into by the information selection determination operation or the like after the key-top 246 is scroll-operated (slide-operated) to scroll the scroll image 29a' or the like, the relation between the pushdown determination threshold Fth and the impressed pressure force F becomes Fth<F. In this case, in the first step "i", the vibration is made by a vibration pattern of [fx, Ax, Nx]=[80, 8, 2] during a period of time of around 0.1 second and similarly, in the second step ii, the vibration is made by a vibration pattern of [fx, Ax, Nx]=[40, 8, 2] during a period of time of around 0.1 second. Thus, it becomes possible to execute the same information selection determination operation as that of the dome switch 25. In this embodiment, when the pushdown determination threshold Fth=100 [gf] is set, it is possible to obtain the sense of touch of a classic switch.

FIGS. 70A and 70B show a relation example (No, 1 thereof) of the impressed pressure force F and the vibration pattern. In this embodiment, the pressure detecting sheet member is used for the sensor 13. The vertical axis shown in FIG. 70A indicates the impressed pressure force F which is obtained from the press-in detection signal #S2 (press-in detection information D2 after binarization). In FIG. 70B, the vertical axis indicates the amplitude [V] of the vibration generating signal Sa. In FIGS. 70A and 70B, either one of the horizontal axes is a sampling time "t". The sampling time "t" means a timing for latching the impressed pressure force F imposed on the pressure detecting sheet member by scanning the output value of the sensor 13 based on the sampling clock of a predetermined frequency.

Generally, in the button switch operation or the like, there exists an input motion peak. In a case in which the pushdown speed (operation input speed) is coincident with the design, it is known that the impressed pressure force F thereof is around 30 [gf] to 240 [gf]. The impressed pressure force distribution waveform Ja shown in FIG. 70A is reflected with the impressed pressure force F by the pushdown speed toward the press-in direction (Z direction), which is made to be a reference at a time of the input device design.

In this embodiment, the pushdown determination threshold Fth is set with respect to the press-in detection signal #S2 obtained from the input device 300 beforehand. The CPU 32 controls the storage unit 37 to reads the data out so as to generate the first vibration pattern Pa at a sampling time t11 when a rise-up waveform of the press-in detection signal #S2 crosses the pushdown determination threshold Fth, and so as to generate the second vibration pattern Pb at a sampling time t21 when a rise-down waveform of the press-in detection signal #S2 crosses the pushdown determination threshold Fth.

By doing like this, when the input device 300 detects the impressed pressure force F which is made as a reference on an occasion of the slide operation and the relation of Fth≧F between the pushdown determination threshold Fth and the impressed pressure force F is detected, it is possible to start up the sense of touch #A. It is possible to start up the sense of touch #B when the CPU 32 or the like detects the relation of Fth<F between the pushdown determination threshold Fth and the impressed pressure force F. It should be noted that there is provided a vibration-free blank period Tx=T1 between the vibration pattern Pa and the vibration pattern Pb. This blank period Tx varies in response to the pressing speed toward the press-in direction.

FIGS. 71A and 71B show a relation example (No, 2 thereof) of the impressed pressure force F and the vibration pattern. Even in this embodiment, the pressure detecting sheet member is used for the sensor 13. In FIG. 71A, the vertical axis indicates the impressed pressure force F which is obtained from the press-in detection signal #S2 (press-in detection information D2 after binarization). In FIG. 71B, the vertical axis indicates the vibration generating signal Sa (amplitude). In FIGS. 71A and 71B, either one of the horizontal axes indicates the time "t".

The impressed pressure force distribution waveform Jb shown in FIG. 71A is reflected with the impressed pressure force F when the scroll images 29a', 29b' or the like is pushed down in a midway of the slide operation. Also in this embodiment, similarly as FIG. 70A, the pushdown determination threshold Fth is set with respect to the press-in detection signal #S2 obtained from the input device 300 beforehand. The CPU 32 controls the storage unit 37 to read the data out so as to generate the vibration pattern Pa at a sampling time t12 when a rise-up waveform of the press-in detection signal #S2 crosses the pushdown determination threshold Fth, and so as to generate the vibration pattern Pb at a sampling time t22 when a rise-down waveform of the press-in detection signal #S2 crosses the pushdown determination threshold Fth.

By doing like this, the input device 300 detects the impressed pressure force F when the scroll image 29a', 29b' or the like is selection-and-press-in-operated during the slide operation, and it is possible to start up the sense of touch #A when the CPU 32 or the like detects the relation of Fth≧F between the pushdown determination threshold Fth and the impressed pressure force F, and also it is possible to start up the sense of touch #B when the CPU 32 or the like detects the relation of Fth<F between the pushdown determination threshold Fth and the impressed pressure force F.

It should be noted that there is provided a vibration-free blank period Tx=T2 (T2<T1) between the vibration pattern Pa and the vibration pattern Pb. Thus, the sense of touch #A is transmitted during the slide operation relating to the scroll image 29a' or 29b' or the like and the sense of touch #B is transmitted in a case in which the scroll image 29a', 29b' or the like is selection-and-press-in-operated, thereby enabling a load having the click feeling to be reached.

The following will describe an information processing example in the mobile phone 101 or the like. FIG. 72 shows the information processing example in the mobile phone 101 or the like relating to respective embodiments.

In this embodiment, the mobile phone 101 or the like is provided the input device 210 explained in the twenty-first embodiment and the sensor 13 and the key-top 246 are provided in the input device 210. Further, the display unit 29 for displaying the scroll image, which has been explained in the first embodiment, and the speaker 36b with actuator function, which has been explained in the second embodiment, are provided therein and there is assumed a case in which information is inputted by slide-operating or pushdown-operating the operation surface of the side surface of the mobile phone 101 or the like by the operator's finger 30a.

A function (algorism) for processing waveforms by making the impressed pressure force F by the operator's finger 30a or the like as parameter, for example, in the same vibration mode is provided in the mobile phone 101 or the like. The CPU 32 calculates the impressed pressure force F from the press-in detection information D2 and carries out the judgment corresponding to the drive conditions "a", "b" as shown in FIG. 69A and by the judgment result thereof, the sense of touch #A, #B corresponding to the movement during the input operation can be generated with respect to any kinds of inputs in the same vibration mode.

By setting these as the information processing conditions, the CPU 32 waits power ON in step G1 of a flowchart shown in FIG. 72. For example, the CPU 32 detects power-ON information and starts up the system. The power-ON information is generated normally when a time function or the like works, thereafter a power switch of the mobile phone or the like which is in a sleeping state is turned on.

Then, the operation shifts to step G2 where the CPU 32 controls the display unit 29 so as to display the icon screen of the menu or the like. For example, the CPU 32 supplies the display information D4 to the display unit 29 which displays the icon screen of the menu or the like. An information processing mode is set by this icon screen. In this embodiment, the information processing mode includes an icon input mode or other processing mode, so that the operator selects either one of them. The icon input mode includes, for example, a scroll image selection mode.

The scroll image selection mode means an operation for slide-operating or pushdown-operating the key-top 246 of the operation surface at a time of selection of the scroll image 29a', 29b' or the like. The scroll image selection mode includes a telephone mode, a mail making mode, a transmission display mode or the like. The telephone mode includes an operation for dialing telephone to the partner. The scroll image 29b' includes a character input item at a time of the telephone mode selection. The scroll images 29a', 29b' are input information as shown in FIGS. 9A and 9B.

At that time, as shown in FIGS. 9A and B, when quantity "x" of the selection items housable within one screen of the display unit 29 is maximum quantity Max or less, S1=4 mm is set as the amount of slide Sx of the key-top 246. When the quantity "x" of the selection items housable within one screen of the display unit 29 exceed maximum quantity Max, S2=2 mm is set as the amount of slide Sx of the key-top 246 (see FIG. 11). Also, as shown in FIG. 12, it is also allowed to set the amount of slide Sx of the key-top 246 arbitrarily based on the length Xs of the electrical detection area (3) of the sensor 13 and all quantity Ys of the selection items existed in the scroll direction (see FIG. 12).

Then, the operation shifts to step G3 where the CPU 32 branches the control based on the scroll image selection mode or other processing mode. If the scroll image selection mode is set, then the key-top 246 is slide-operated for the scroll operation of the scroll image 29a', 29b' or the like, and the operation shifts to step G4 where the CPU 32 detects the impressed pressure force F by the sensor 13. At that time, the key-top 246 is slide-operated along a concave shape which is dug-down along the sliding direction from one portion of the operation surface of the lower housing 11q of the input device 210 and also which is dug-up toward the other portion of the operation surface thereof. The sensor 13 detects the impressed pressure force F of the slide position of the operator's finger 30a which is slide-operated on the key-top 246, and outputs the position detection signal #S1 to the A/D-driver 31. The A/D-driver 31 performs A/D-conversion on the position detection signal #S1 to the position detection information D1 and transfers the position detection information D1 thus A/D-converted to the CPU 32.

Then, the operation shifts to step G5 where the CPU 32 compares the impressed pressure force F based on the position detection information D1 with the pushdown determination threshold Fth and judges whether or not the relation is F≦Fth. If the relation becomes F≦Fth, the operation shifts to step G6 where the sense of touch #A is started up. The sense of touch #A is obtained by vibrating the operation surface based on the vibration pattern Pb corresponding to the impressed pressure force F of the operator's finger 30a by the speaker 36b with actuator function. In the sense of touch #A, for example, with respect to frequency fx, amplitude Ax and the number of times Nx shown in FIG. 69A, in the first step "i", vibration is made by a vibration pattern of [fx, Ax, Nx]= [50, 5, 2] during a period of time of around 0.1 second and in second step ii, vibration is made by a vibration pattern of [fx, Ax, Nx]=[100, 10, 2] during a period of time of around 0.1 second. By doing like this, it is possible to generate different vibration patterns coincidentally with the [impressed pressure force] of the operator (drive condition "a"). It should be noted that if the relation between the impressed pressure force F based on the position detection information D1 and the pushdown determination threshold Fth is not F≦Fth, the operation shifts to step G7 where the detection of the impressed pressure force F is continued.

Then, when the press-in operation is executed to the key-top 246 by the operator's finger 30a, the operation shifts to step G7 where the CPU 32 calculates the impressed pressure force F based on the press-in detection information D2. At that time, the sensor 13 detects the impressed pressure force F of the pushdown position of the operator's finger 30a in the operation surface and outputs the press-in detection signal #S2 to the A/D-driver 31. The A/D-driver 31 performs A/D-conversion on the press-in detection signal #S2 to the press-in detection information D2 and transfers the press-in detection information D2 thus A/D-converted to the CPU 32.

Then, the operation shifts to step G8 where the CPU 32 compares the impressed pressure force F with the pushdown determination threshold Fth and judges whether or not the relation is F>Fth. If the relation becomes F>Fth, the operation shifts to step G9 where the sense of touch #B is started up. The sense of touch #B is obtained by vibrating the operation surface based on the vibration pattern Pb corresponding to the impressed pressure force F of the operator's finger 30a by the speaker 36b with actuator function. In the sense of touch #B, in the first step "i" shown in FIG. 72B, vibration is made by a vibration pattern of [fx, Ax, Nx]=[80, 8, 2] during a period of time of around 0.1 second and in second step ii, vibration is made by a vibration pattern of [fx, Ax, Nx]=[40, 8, 2] during a period of time of around 0.1 second. By doing like this, it is possible to generate different vibration patterns coincidentally with the [impressed pressure force] of the operator (drive condition "b"). It should be noted that if the relation between the impressed pressure force F based on the position detection information D1 and the pushdown determination threshold Fth is not F>Fth, the operation shifts to step G12.

Thereafter, the operation shifts to step G10 where the input is determined. At that time, the CPU 32 determines the input information displayed at the pushdown position in the input operation surface. Then, the operation shifts to the step G12. It should be noted that if other processing mode is selected in step G3, the operation shifts to step G11 where such other processing mode is executed. Such other processing mode includes a music reproduction function and a television reception function.

After such other processing mode is executed, the operation shifts to the step G12. The CPU 32 makes termination-judgment in the step G12. For example, the power OFF information is detected and the information processing is terminated. If the power-OFF information is not detected, the operation returns to the step G2 where the menu screen is displayed and the above-mentioned processing is repeated.

In this manner, according to the mobile phone 101 or the like to which the input device 210 with the sense of touch function for each embodiment is applied, the embodiments of the input device 300 are provided. Therefore, in addition to the slide operation feeling of being dug-down along the sliding direction from one portion of the operation surface of the side surface of the mobile phone 101 or the like in response to the slide operation of the operator's finger 30a which operates the mobile phone 101 or the like, it is possible to present the slide operation feeling of being dug-up toward the other portion of the operation surface thereof.

Consequently, it becomes possible to provide the side jog tool or the like of the non-rotary of the reverse structure with respect to the side jog tool or the like of the non-rotary of the first input device 10. Furthermore, miniaturization of the input device 210, thinner fabrication of the sensor sheets 81a' to 801e and operability can be improved, so that it is possible to attempt the lowering of malfunction of the mobile phone 101 or the like, cost-down and simplification of the manufacturing process.

[Embodiment 30]

Figure 73:
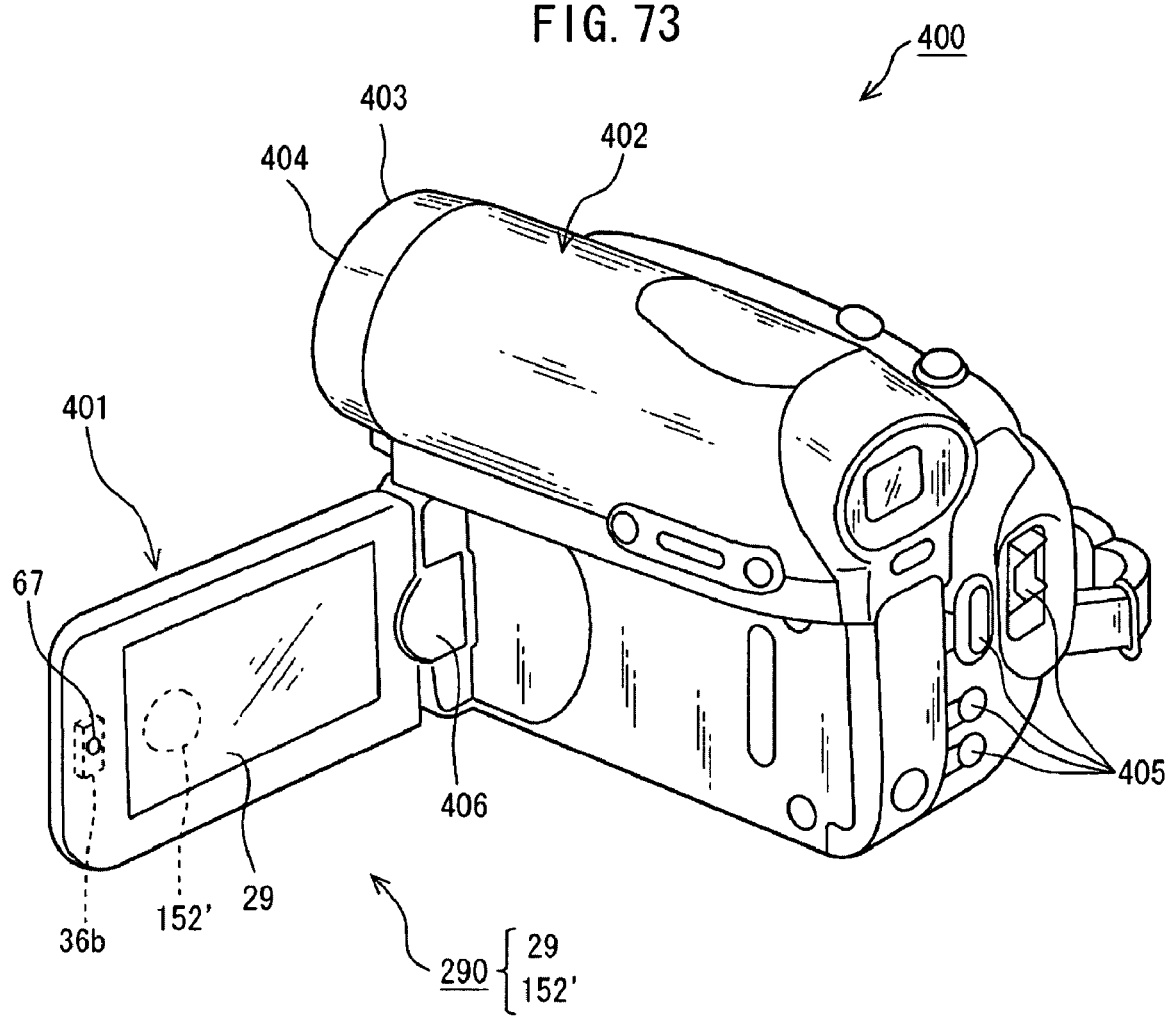
FIG. 73 is a perspective view of a video camera 400, which is provided with an embodiment of an input device, as a thirtieth embodiment, showing a configuration thereof.

FIG. 73 shows a configuration of a video camera 400 including an embodiment of the input device as a thirtieth embodiment. The video camera 400 shown in FIG. 73 constitutes another embodiment of an electronic apparatus that has a sense of touch function and presents a sense of touch to an operation body (operator) at the time of an information input operation. The video camera 400 images a subject image and also records the surrounding sound. Any one of the input devices 10 to 290 explained in the first to the twenty ninth embodiments is provided in the video camera 400, and the speaker 36b with actuator function is also applied to the video camera 400.

The video camera 400 includes a case 402 constituting a decoration and a lens mirror cylinder 403 in which an imaging optical system 404 is built is provided at a front surface upper portion of the case 402. An imaging device (not shown in drawings) for imaging a subject image introduced by the imaging optical system 404 is built-in in the rear end of the lens mirror cylinder 403.

There is provided on the rear surface, on the upper surface and on the side surface of the case 402 with various kinds of operation switches 405 such as a power switch, an imaging start/stop switch, a zoom switch and the like. On the left side surface of the case 402, a touch panel display device 401 is coupled to the case 402 so as to be openable/closable through a hinge, and displays the image imaged by an imaging device, which is not shown in the drawing.

There is provided in the touch panel display device 401, for example, with input device 290 explained in the twenty-ninth embodiment and the speaker 36b including actuator function shown in FIG. 14. According to the input device 290 explained in the twenty-ninth embodiment, as shown in FIG. 67, it is constituted by layering a display top member 63, a sensor 13' and a LCD device 64 in order from the upper portion. The display unit 29 is constituted by including the display top member 63 and the LCD device 64, and a key-top 152' which has a convex shape is arranged at the predetermined position thereof. The display unit 29 displays information inputted by the key-top 152'.

The key-top 152' is arranged, for example, on a little left side of the center region of the display unit 29 in order to improve the operability. The key-top 152' has a hemispheric convex shape having a predetermined height and width. The key-top 152' is slide-operated along one orbit of the hemispheric convex shape or/and is slide-operated along another orbit intersected with the orbit. It is needless to say that icon image for selecting input information is displayed on the display unit 29 through the LCD device 64 and the operator's finger may slide-operate along this icon image.

The speaker 36b is provided in the touch panel display device 40, and the speaker 36b is used containing: a lid member 1 including opening portions 1a, 1b, 1c, 1d at a predetermined region shown in FIG. 14; a housing portion 6 to which this lid member 1 is engaged; a yoke 5 for vibration which includes a bottomed cylindrical shaped concave portion 5a and which is arranged in the housing portion 6 freely movably; spring coils 51, 52 for supporting the yoke 5 freely movably in the housing portion 6; and a magnet 4 fixed at the bottom portion of the yoke 5 supported freely movably in the housing portion 6 thereof. The speaker further contains a coil 3 which includes a winding axis portion and which is arranged freely movably in the circumference of the magnet 4; and a vibration plate 2 which is mounted on one side of the winding axis portion of this coil 3 and which is sandwiched between the lid member 1 and the housing portion 6.

In this embodiment, when the icon image for input operation displayed on the display unit 29 for monitor of the touch panel display device 401 is operated by the finger, any click sound (cyber switch operation sound) is presented from the speaker 36b and at the same time, a sense of touch is presented to operator's finger touching on the display screen. It becomes possible to determine, even in the video camera 400, the input of the scroll image 29a', 29b' or the like which is displayed on the display unit 29 by this input operation. It should be noted that in the drawing, a hole 67 is an opening portion for click sound leaker.

In this manner, according to the video camera 400 as the thirtieth embodiment, there is included the embodiment of the input device 290 with sense of touch function, the key-top 152' is provided on a little bit left side as compared with the center region of the display unit 29 in which the display top member 63, the sensor 13' and the LCD device 64 are layered in order, and the display top member 63 and the key-top 152' having a hemispheric convex shape are integrally molded or the key-top 152' is pasted on the display top member 63.

Consequently, it becomes possible to provide the video camera 400 including the input device 290 of an airtight structure to which water-resistance is abundant. Furthermore, in addition to the slide operation feeling of becoming thicker in an arc shape along one orbit of the hemispheric convex shape from one portion of the display surface of the display top member 63 of the display unit 29 in response to the slide operation by the operator's finger, it is possible to present the slide operation feeling of becoming thinner in an arc shape toward the other portion of the display surface. Further, in addition to the slide operation feeling of becoming thicker in an arc shape along another orbit intersected with one obit of the hemispheric convex shape from one portion of the display surface of the display top member 63, it is possible to present the slide operation feeling of becoming thinner in an arc shape toward the other portion of the display surface. Thus, the input operability of the video camera 400 applied with the input device 290 is improved and it becomes possible to obtain the unique operation feeling which does not exist in a touch panel in the past.

In the above-mentioned embodiments, although the slide-type mobile phone 101 or the like and the video camera 400 to which the input device with sense of touch function is applied, with respect to the electronic apparatus, it is not limited to these; it is needless to say that the input device with sense of touch function can be applied to the normal one axis hinge type mobile phone 102, the two-axes hinge type mobile phone 103, a mobile terminal device including display screens in both of the upper housing 11x and the lower housing 11y, a digital camera and the like.

It should be noted that table 1 shows operability evaluation results in the respective input devices that were carried out.

TABLE 1

|  | slide operation | push operation |
|---|---|---|
| related art "1" | 478 | 478 |
| related art "2" | 302 | 300 |
| the present invention "1" | 450 | 495 |
| the present invention "2" | 468 | 493 |

Figure 1:
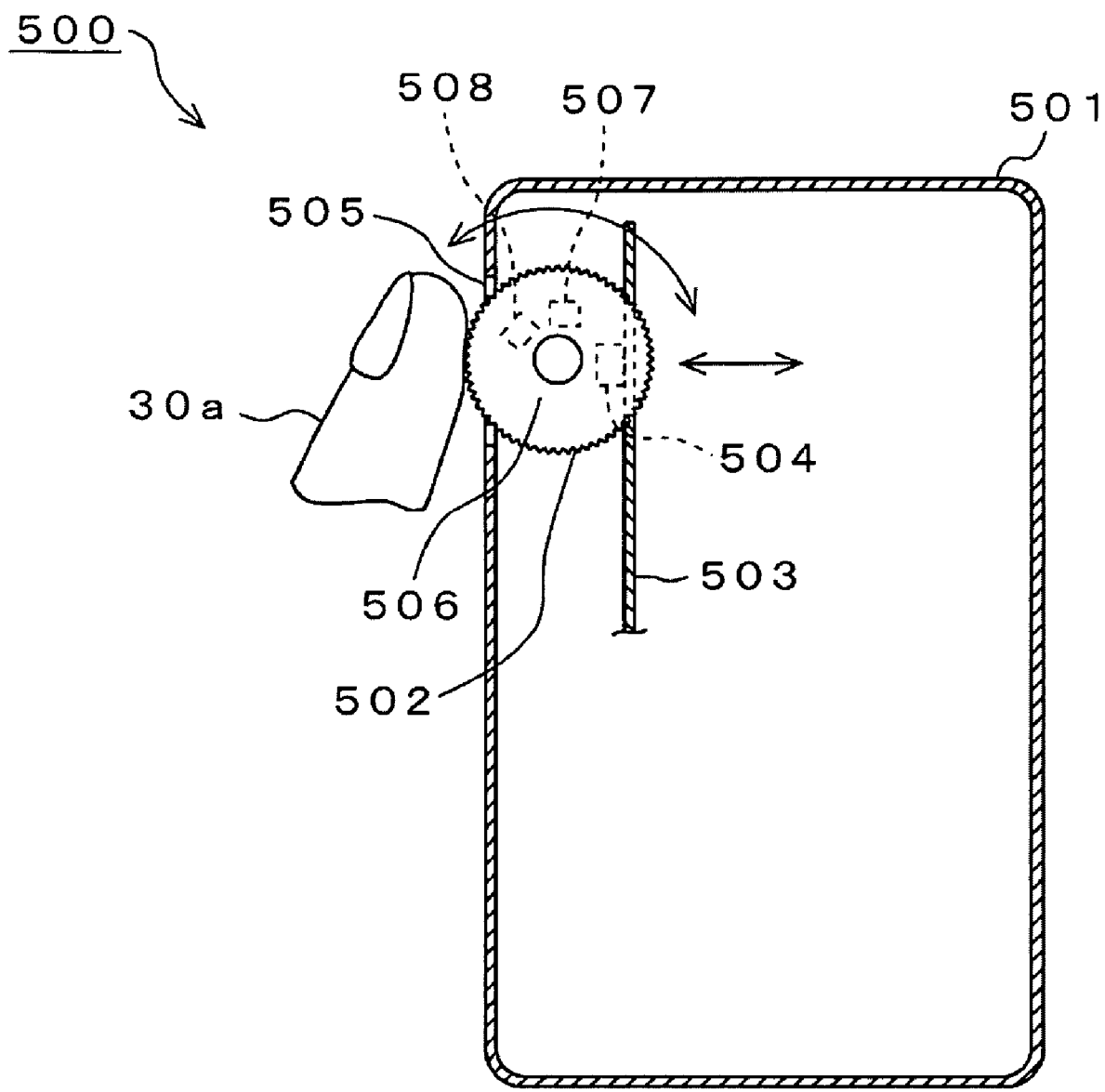
FIG. 1 is a cross-section diagram showing a configuration of an input device 500 relating to related art.
Figure 2:
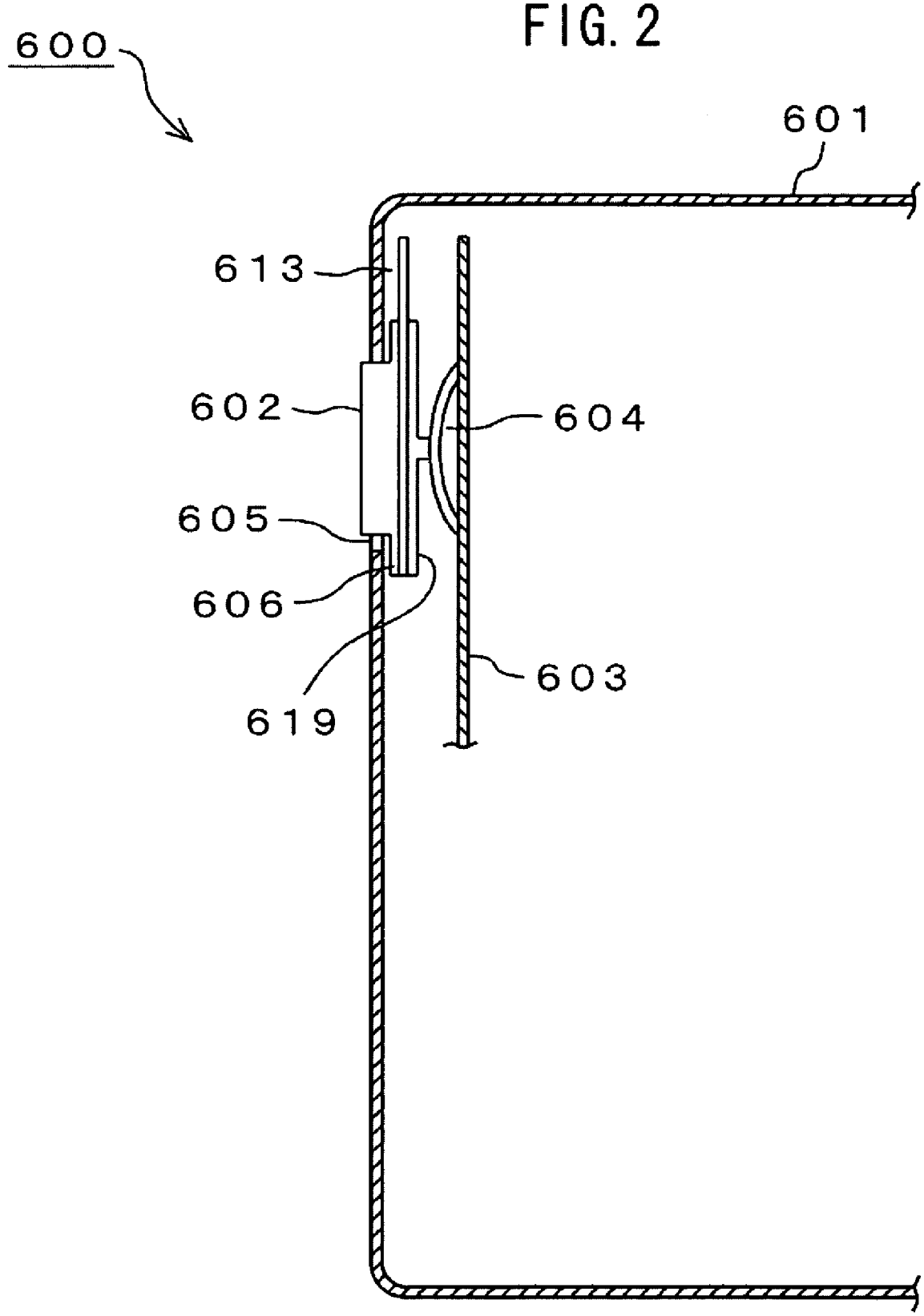
FIG. 2 is a cross-section diagram showing a configuration of an input device 600 relating to related art.

The operability evaluation results shown in table 1 are a summary of comparing operation accuracy in the respective input devices of related art "1", related art "2", the present invention "1" and the present invention "2". Such related art "1" relates to a case of the input device 500 of side jog rotary switch+dome switch structure as shown in FIG. 1. Such related art "2" relates to a case of the input device 600 with plane flat and unrotary key-top+dome switch as shown in FIG. 2. The present invention "1" relates to a case of the input device 30 with unrotary key-top+dome switch relating to the third embodiment shown in FIG. 16. The present invention "2" relates to a case of the input device 40 with unrotary key-top+dome switch+actuator function relating to the fourth embodiment shown in FIG. 17.

The slide operation and the push operation were evaluated with respect to these four input devices 30, 40, 500, 600. Any one of the evaluation methods was such that examinees were fifty members. With respect to the slide operation, the key-top operation in which a cursor was attached to and stopped at an aimed spot (target image) by a vertical scroll screen of the telephone directory application was executed. It was requested that items which the cursor was attached to and stopped at were ten pieces for one member. In this case, the number of right answers in which the cursor could be stopped at the target image by one time of the key-top operation was compared.

Also, with respect to the push operation, the key-top press-in operation was executed from a state of being selected and ended by a vertical scroll screen of the telephone directory application, a dome switch was turned on and the input determination (determination) operation was executed. In this case, it is a [right answer] if the target image which is selected before the key-top is pressed-into is directly determined, and it is made as a [wrong] if a different target image is selected or if the selection of the target image is not determined. The operation accuracy of the input devices 30, 40, 500, 600 was evaluated by comparing these number of right answers with respect to related art "1", related art "2", the present invention "1" and the present invention "2" respectively.

According to the operability evaluation result shown in table 1, with respect to the number of right answers in all 500 times of related art "1", related art "2", the present invention "1" and the present invention "2", respectively and in case of related art "1", the slide operation was 478 times and the push operation was 478 times. In case of related art "2", the slide operation was 302 times and the push operation was 300 times. In case of the present invention "1", the slide operation was 450 times and the push operation was 495 times. In case of the present invention "2", the slide operation was 468 times and the push operation was 493 times.

With respect to the slide operation, the present invention "1" and the present invention "2" were a little bit inferior to related art "1" in the number of right answers, but the operational reliability was improved than related art "2". With respect to the push operation, both the present invention "1" and the present invention "2" were a lot of the number of right answers than related art "1" and related art "2" and the operational reliability was improved. According to related art "1", a failure in which a key-top was rotated before a JOG dial was pressed-into and one in the vicinity of the target image was determined by mistake was seen. According to related art "2", a failure of a content in which when a key-top was pressed-into, it happened that a corner of the key-top was pressed-into, and a pusher piece was not pressed into a metal dome portion 511 accurately so that no target image was selected and determined was seen.

On the contrary, the present invention "1" and "2" employed a unrotary key-top+dome switch or a structure including a unrotary key-top+dome switch+actuator function, so that one in the vicinity of the target image was not determined by mistake and furthermore, a pusher piece comes to press-into the metal dome portion 511 accurately, so that it was possible to realize the high operability and reliability and it was possible to provide the input device 30, 40 or the like having excellent usability of user-friendliness.

The present embodiments are preferable for applying to a digital camera, a video camera, a mobile phone, a mobile terminal device, a personal computer, a note type PC, a home system electronic apparatus and the remote controller thereof or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An input device that inputs information by a slide operation depending on an operation body, the input device comprising:
a housing having an operation surface;
a detection unit that is provided in the housing and includes
an electrostatic capacitance sheet member which detects a slide position of the operation body to output a position detection signal; and
an operation unit that covers an entire surface of the detection unit and is slide-operated along the operation surface of the housing,
wherein the operation unit has a concave shape formed by being dug-down along a sliding direction from one portion of the operation surface of the housing and also, by being dug-up toward the other portion of the operation surface thereof, and
wherein the electrostatic capacitance sheet member includes a switch portion that is switched by a press-in operation of the operation body to the operation unit; and
wherein the electrostatic capacitance sheet member includes a sheet shaped detection electrode which detects the slide position of the operation body and outputs the position detection signal,
wherein a portion of the detection electrode protuberates in a dome shape, and
wherein a dome-shape-protuberating region of the detection electrode forms a movable contact constituting the switch portion.

2. The input device according to claim 1,
wherein the electrostatic capacitance sheet member includes a sheet shaped board,
wherein a sheet shaped detection electrode which includes the dome-shape-protuberating region is provided on one surface of the board and at the same time, a fixed contact constituting the switch portion is provided on the inside of the dome-shape-protuberating region, and
wherein a wiring to be pulled out from the fixed contact of the switch portion through a through-hole is provided on the other surface of the board.

3. The input device according to claim 1,
wherein the concave shape of the operation unit covering the entire surface of the detection unit forms a bottomed arc having predetermined depth and aperture width, and wherein the operation unit is slide-operated along a shape of the bottomed arc.

4. The input device according to claim 3, wherein a detection area in the detection unit, the detection area detecting the slide position of the operation body, is set to be wider than an operation area in the operation unit, the operation area being slide-operated by the operation body.

5. The input device according to claim 1,
wherein the concave shape of the operation unit covering the entire surface of the detection unit forms a bottomed cross concave shape having predetermined depth and aperture width, and
wherein the operation unit is slide-operated along the bottomed cross concave shape and a predetermined region thereof is pushdown-operated.

6. The input device according to claim 1,
wherein the operation unit is constituted by a material different from the material of the housing,
wherein surface roughness of the material constituting the operation unit is less than surface roughness of the material constituting the housing.

7. The input device according to claim 1, wherein a vibration body generating vibration is provided with respect to the slide position of the operation body, the slide position being detected by the detection unit.

8. The input device according to claim 1, further comprising:
a display unit that displays a scroll image with respect to the slide position of the operation body, the slide position being detected by the detection unit; and
a control unit that detects slide operation speed of the operation body and adjusts display pitch of the scroll image on the display unit in response to the slide operation speed of the operation body.

9. An input device that inputs information by a slide operation depending on an operation body, the input device comprising:
a housing having an operation surface;
a detection unit that is provided in the housing and includes an electrostatic capacitance sheet member which detects a slide position of the operation body to output a position detection signal; and
an operation unit that covers an entire surface of the detection unit and is slide-operated along the operation surface of the housing,
wherein the operation unit has a concave shape formed by being dug-down along a sliding direction from one portion of the operation surface of the housing and also, by being dug-up toward the other portion of the operation surface thereof, and
wherein the electrostatic capacitance sheet member includes a switch portion that is switched by a press-in operation of the operation body to the operation unit; and
wherein the electrostatic capacitance sheet member includes a sheet shaped board,
wherein a sheet shaped detection electrode which detects the slide position to the operation unit and outputs the position detection signal is provided on one surface of the board, and
wherein a movable contact which constitutes the switch portion, is provided on the other surface of the board, the movable contact protuberating in the dome shape, and at the same time, a fixed contact constituting the switch portion is provided on the inside of the dome-shape-protuberating region at a position apart by a predetermined distance.

10. The input device according to claim 9,
wherein a lower surface of the dome-shape-protuberating region, which constitutes the movable contact of the switch portion of the electrostatic capacitance sheet member, forms a C-shape, and
wherein the fixed contact of the switch portion is wired by passing-through a portion between open-end terminals of the C-shape lower surface.

11. The input device according to claim 10, wherein the movable contact of the switch portion, which includes the dome-shape-protuberating region, forms a cut-shape in which both the side terminal portions of the dome-shape-protuberating region are cut.

12. The input device according to claim 9, wherein a width of the operation unit is more than a width of the switch portion.

13. An electronic apparatus comprising:
a housing having an operation surface; and
an input device that is provided at the housing and inputs information by a slide operation depending on an operation body,
wherein the input device includes:
a detection unit that is provided in the housing and includes an electrostatic capacitance sheet member which detects a slide position of the operation body to output a position detection signal; and
an operation unit that covers an entire surface of the detection unit and is slide-operated along the operation surface of the housing,
wherein the operation unit has a concave shape formed by being dug-down along a sliding direction from one portion of the operation surface of the housing and also, by being dug-up toward the other portion of the operation surface thereof, and
wherein the electrostatic capacitance sheet member includes a switch portion that is switched by a press-in operation of the operation body to the operation unit; and
wherein the electrostatic capacitance sheet member includes a sheet shaped detection electrode which detects the slide position of the operation body and outputs the position detection signal,
wherein a portion of the detection electrode protuberates in a dome shape, and
wherein a dome-shape-protuberating region of the detection electrode forms a movable contact constituting the switch portion.

14. The electronic apparatus according to claim 13, wherein the housing contains an operation panel, and the operation panel and the operation unit are molded integrally.

15. The electronic apparatus according to claim 13, wherein the housing contains an operation panel, and the operation panel includes an operation surface provided with a ten-key portion, and
wherein the operation unit is molded integrally with the ten-key portion.

16. The electronic apparatus according to claim 15, wherein the housing contains a light source and the operation unit contains a photoconductive member, and
wherein light is illuminated from the light source in the housing to the photoconductive member.

* * * * *